United States Patent [19]

Daggett et al.

[11] Patent Number: 4,786,847
[45] Date of Patent: Nov. 22, 1988

[54] DIGITAL CONTROL FOR MULTIAXIS ROBOTS

[75] Inventors: Kenneth E. Daggett, Murrysville, Pa.; Eimei M. Onaga, Brookfield Center, Conn.; Richard J. Casler, Jr., Newtown, Conn.; Barrett L. Booth, Brookfield, Conn.; Rajan C. Penkar, Woodbury, Conn.; Leonard C. Vercellotti, Oakmont; Richard A. Johnson, Murrysville, both of Pa.

[73] Assignee: Unimation Inc., Danbury, Conn.

[21] Appl. No.: 932,989

[22] Filed: Nov. 20, 1986

[51] Int. Cl.$^4$ .............................................. G05B 19/42
[52] U.S. Cl. ......................................... 318/568; 901/3; 901/22; 901/23; 318/574; 364/513
[58] Field of Search ............... 318/568, 568 C, 568 D, 318/568 E, 568 G, 568 M, 566, 567, 569, 573, 574, 597, 598, 560, 565, 570, 576, 561, 562, 577, 568 B, 599; 901/2-25, 27, 529; 364/478, 513, 169

[56] References Cited

U.S. PATENT DOCUMENTS

| | | | |
|---|---|---|---|
| 4,308,584 | 12/1981 | Arai | 901/3 X |
| 4,348,731 | 9/1982 | Kogawa | 901/22 X |
| 4,506,335 | 3/1985 | Magnuson | 318/574 X |
| 4,529,921 | 7/1985 | Moribe | 318/568 B |
| 4,555,758 | 11/1985 | Inaba et al. | 901/20 X |
| 4,604,716 | 8/1986 | Kato et al. | 364/513 |
| 4,621,332 | 11/1986 | Sugimoto et al. | 318/508 X |
| 4,623,971 | 11/1986 | Ailman et al. | 901/23 X |
| 4,633,414 | 12/1986 | Yabe et al. | 318/568 X |

Primary Examiner—William M. Shoop, Jr.
Assistant Examiner—Paul Ip
Attorney, Agent, or Firm—J. L. Brzuszek

[57] ABSTRACT

A completely digital robot control operates at a predetermined sampling rate. The robot arm has a plurality of joints with each driven by an electric brushless or brush-type DC motor which is in turn supplied with drive current by a power amplifier bridge circuit having power switches connected therein to supply motor winding current in the forward or reverse direction.

Incremental or absolute encoders and tachometers provide for generating digital position and velocity feedback signals generated synchronously with the sampling rate. Digital motor current feedback signals are also generated synchronously with the sampling rate.

Paired position/velocity microprocessors generate torque commands for each of the robot axes at the sampling rate in response to the position commands and the position and velocity feedback signals. Paired torque microprocessors generate motor voltage commands for each of the robot axes at the sampling rate in response to the torque commands and the current feedback signals.

Pulse width modulators generate digital motor control signals for each of the robot axes at the sampling rate in response to the voltage commands. The digital control signals for each axis are coupled to control terminals of the corresponding power switches to control on/off switch time and satisfy the motor voltage commands and thereby satisfy the position commands.

8 Claims, 111 Drawing Sheets

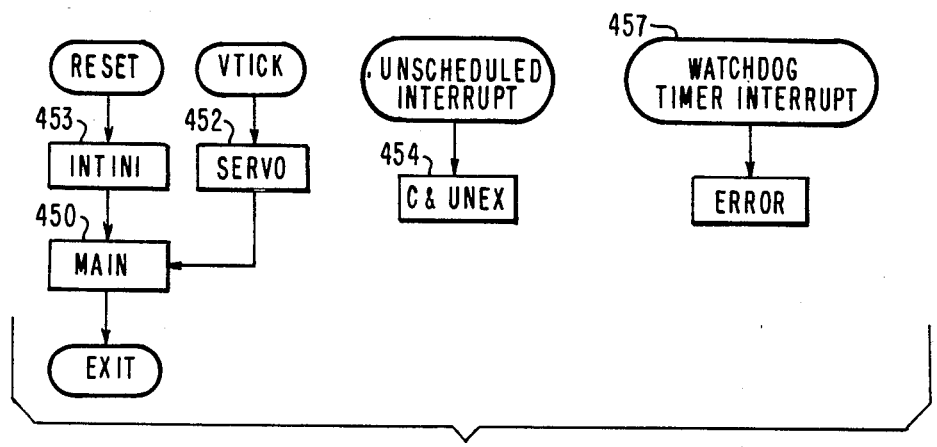
FIG. 7C
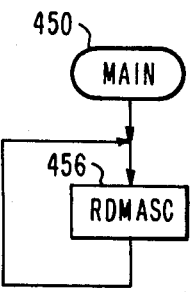
FIG. 7E
FIG. 7D

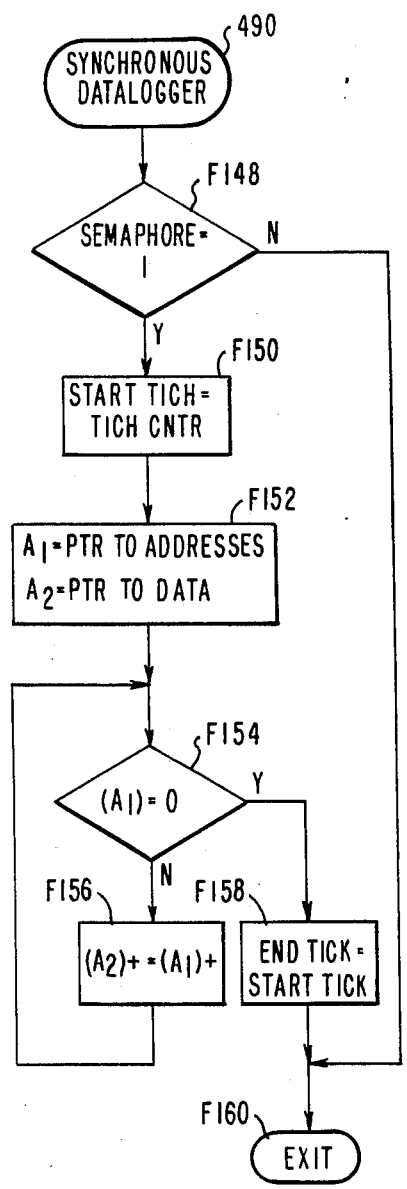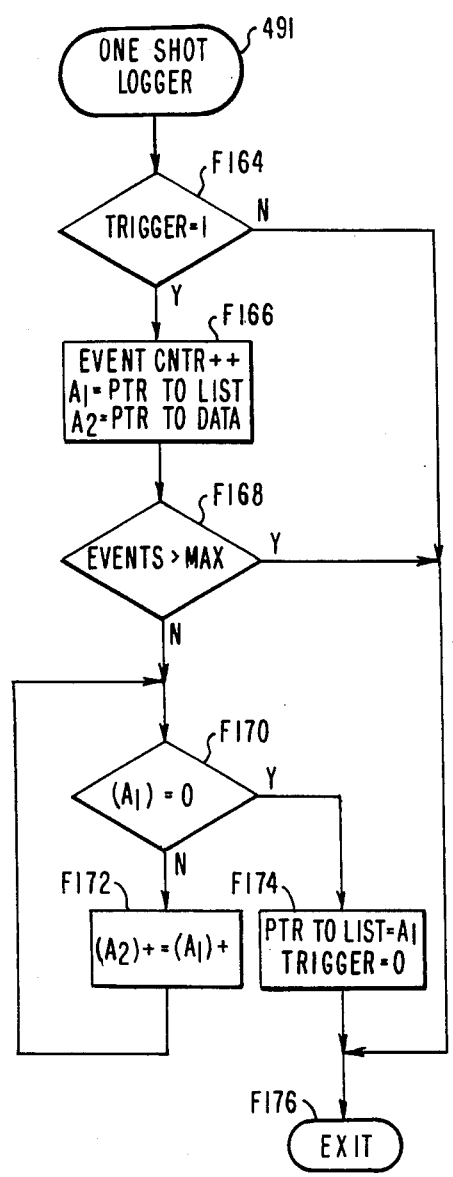
FIG. 7H
FIG. 7I

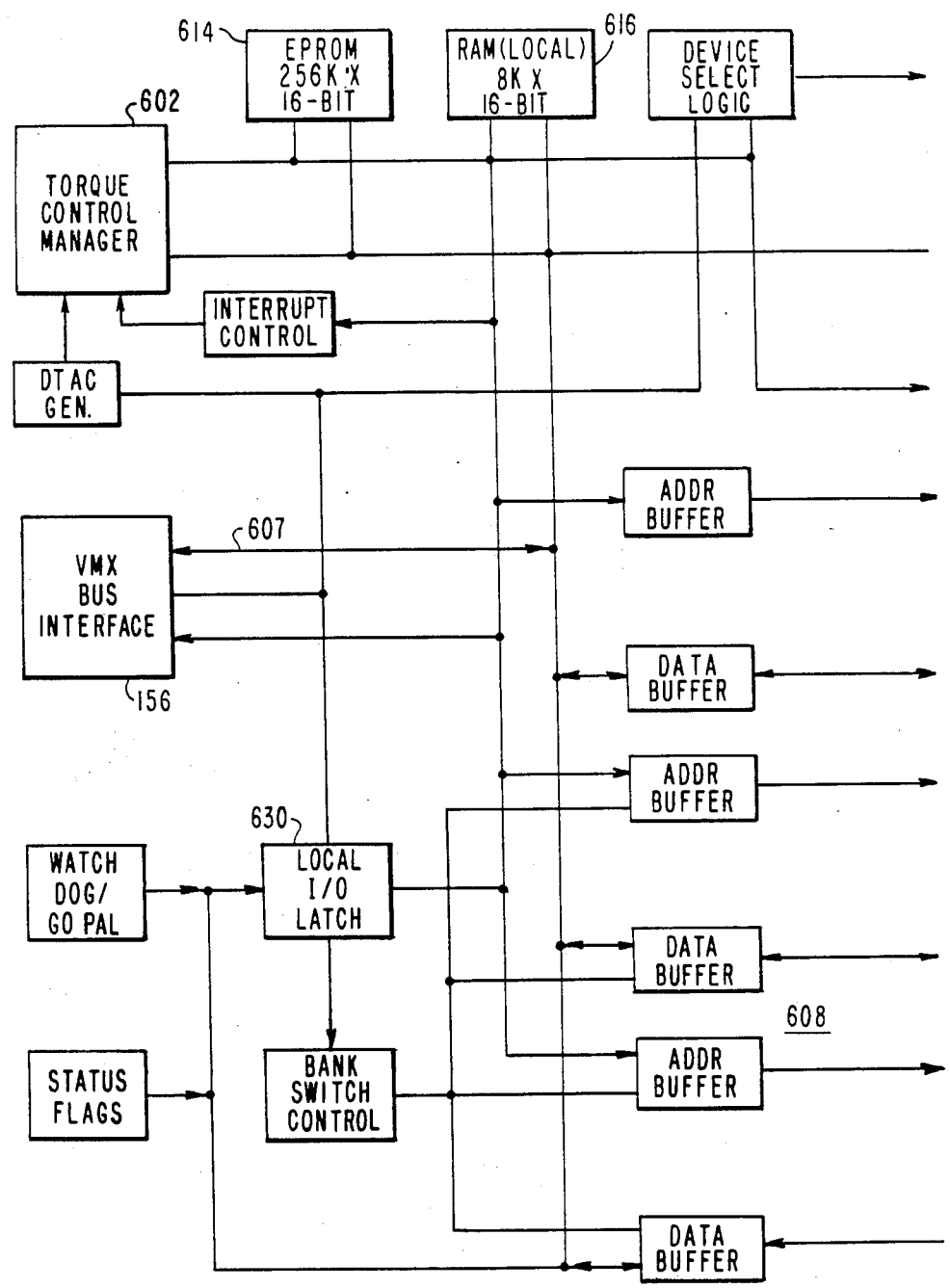
FIG. IOA-1

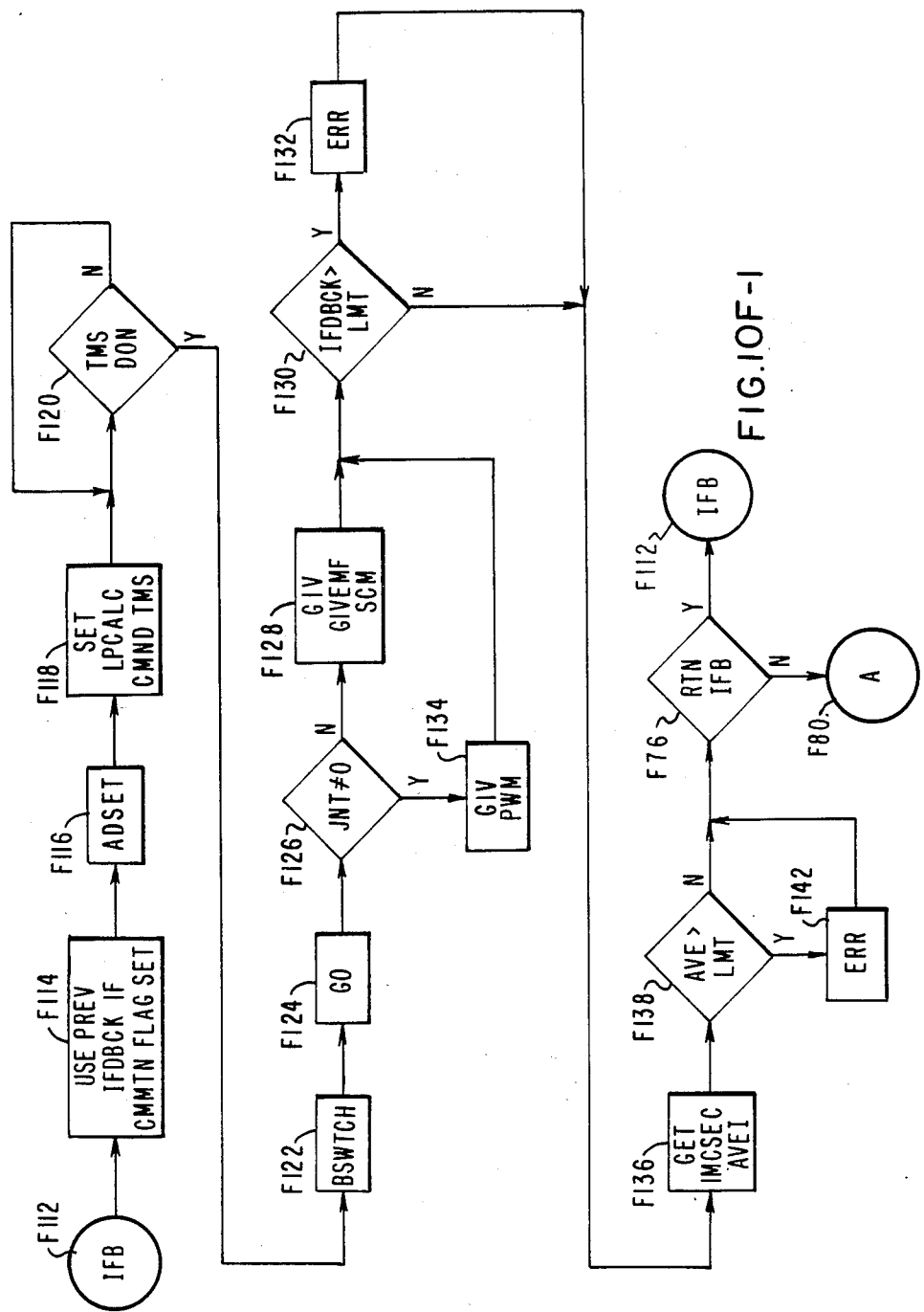
FIG.IOF-1

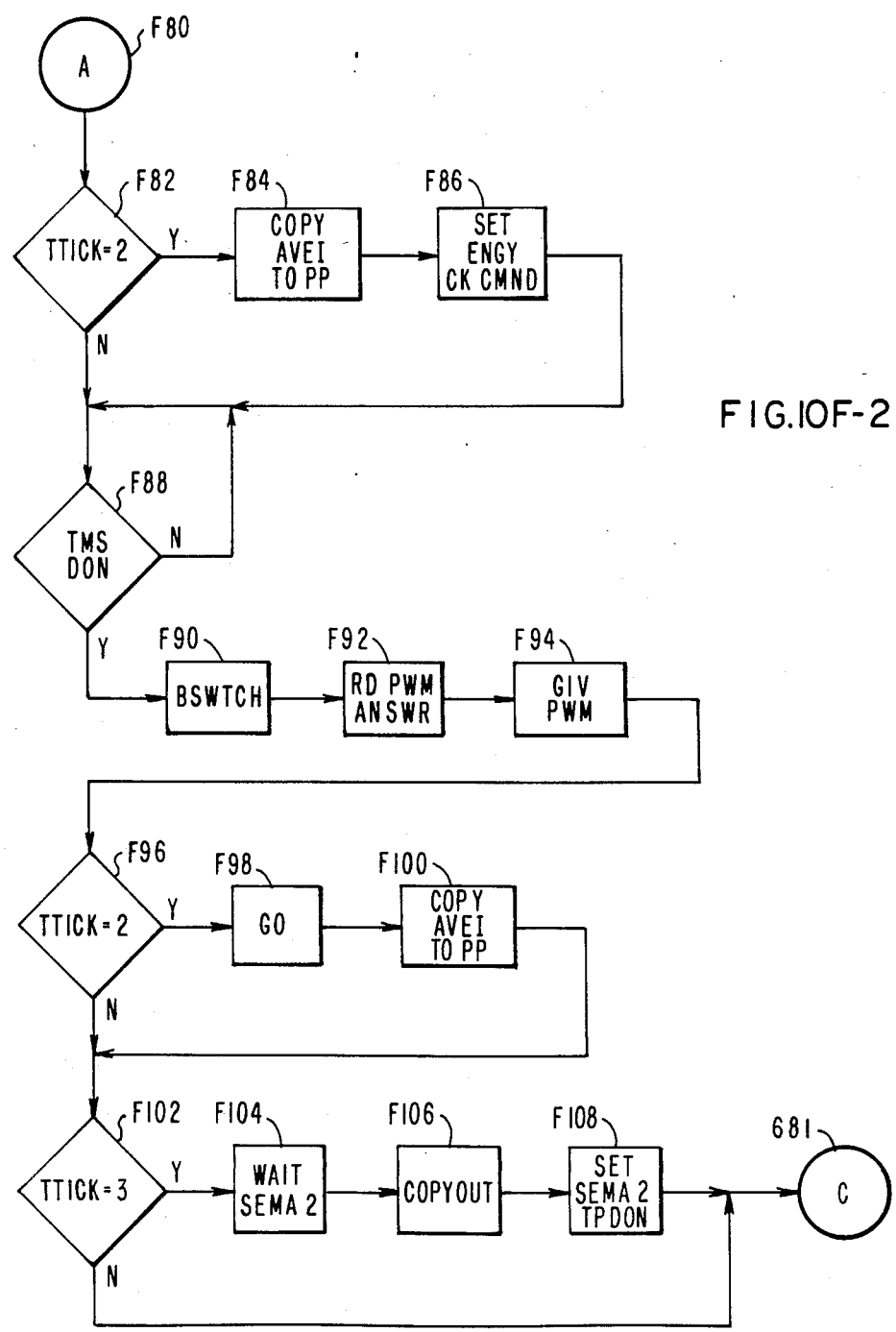
FIG.IOF-2

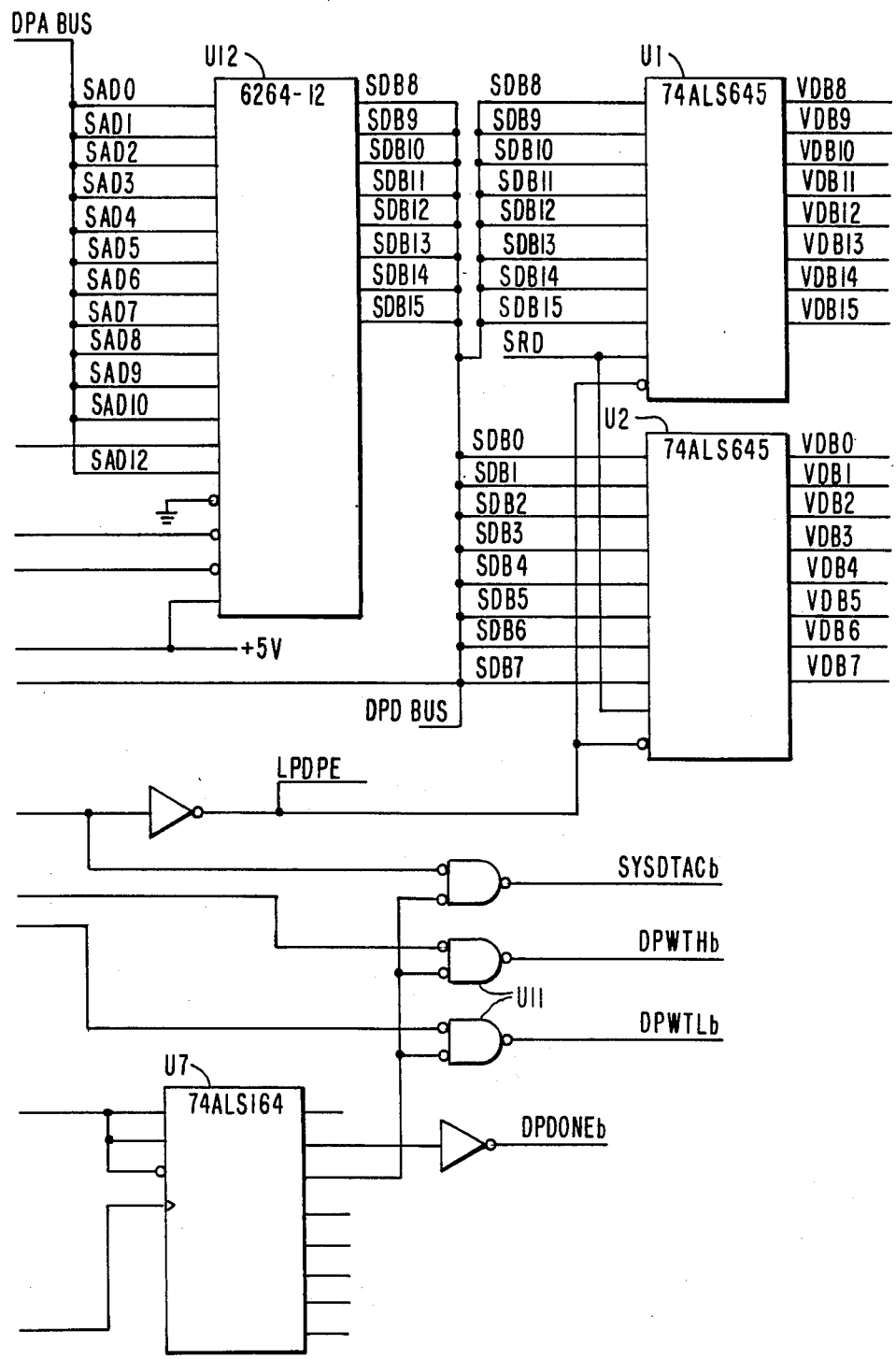
FIG.IIA-2

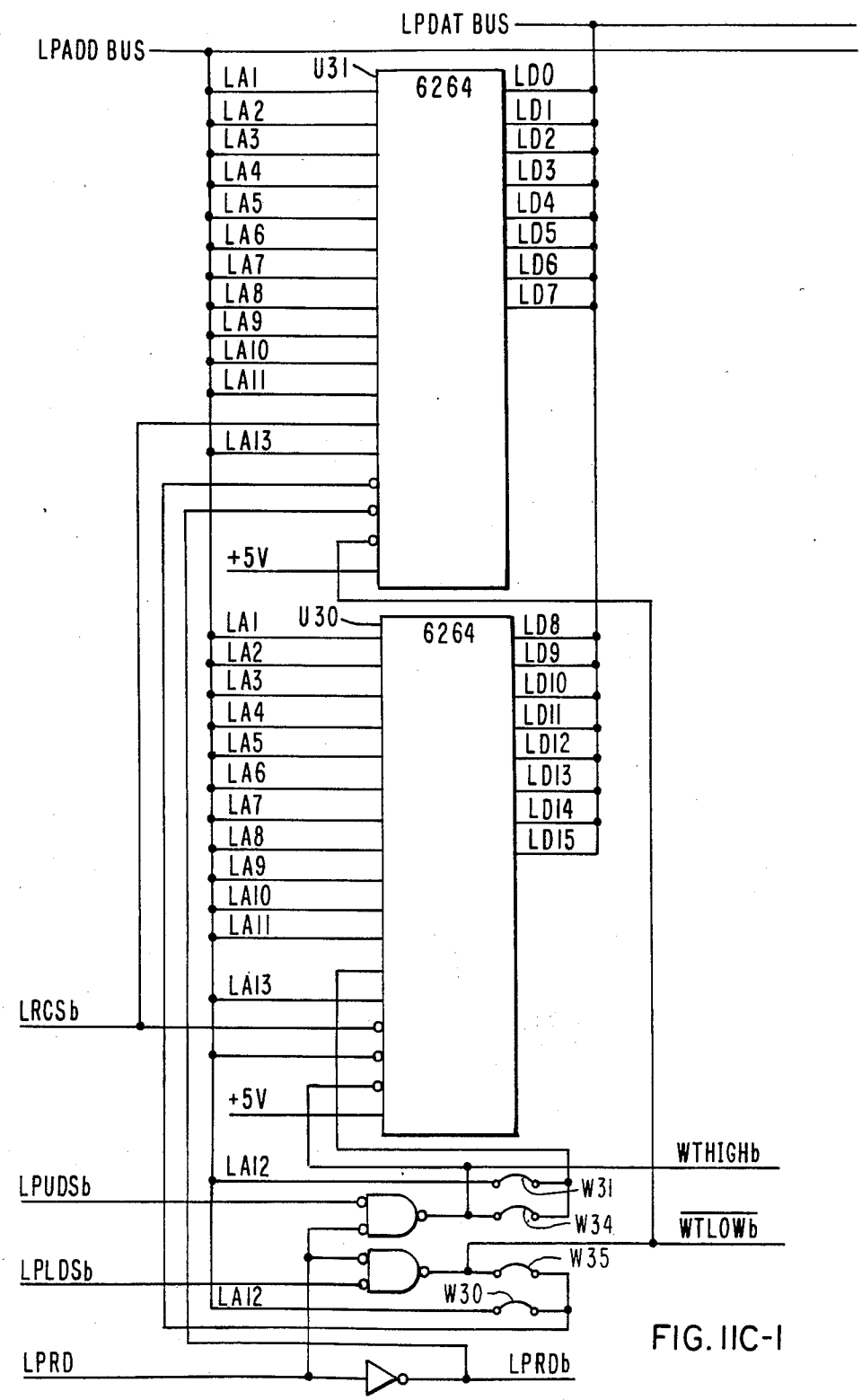
FIG. IIC-I

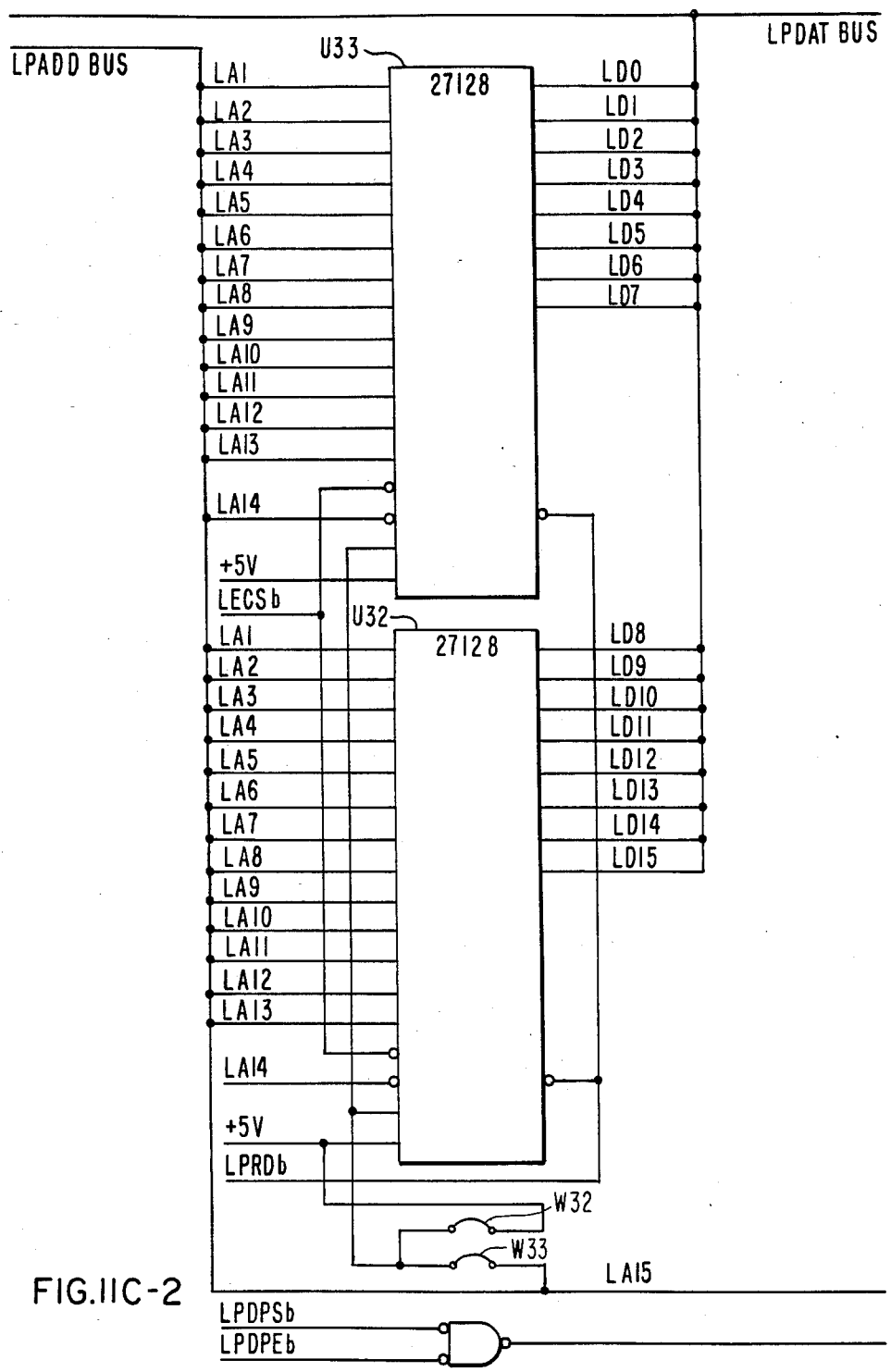
FIG.IIC-2

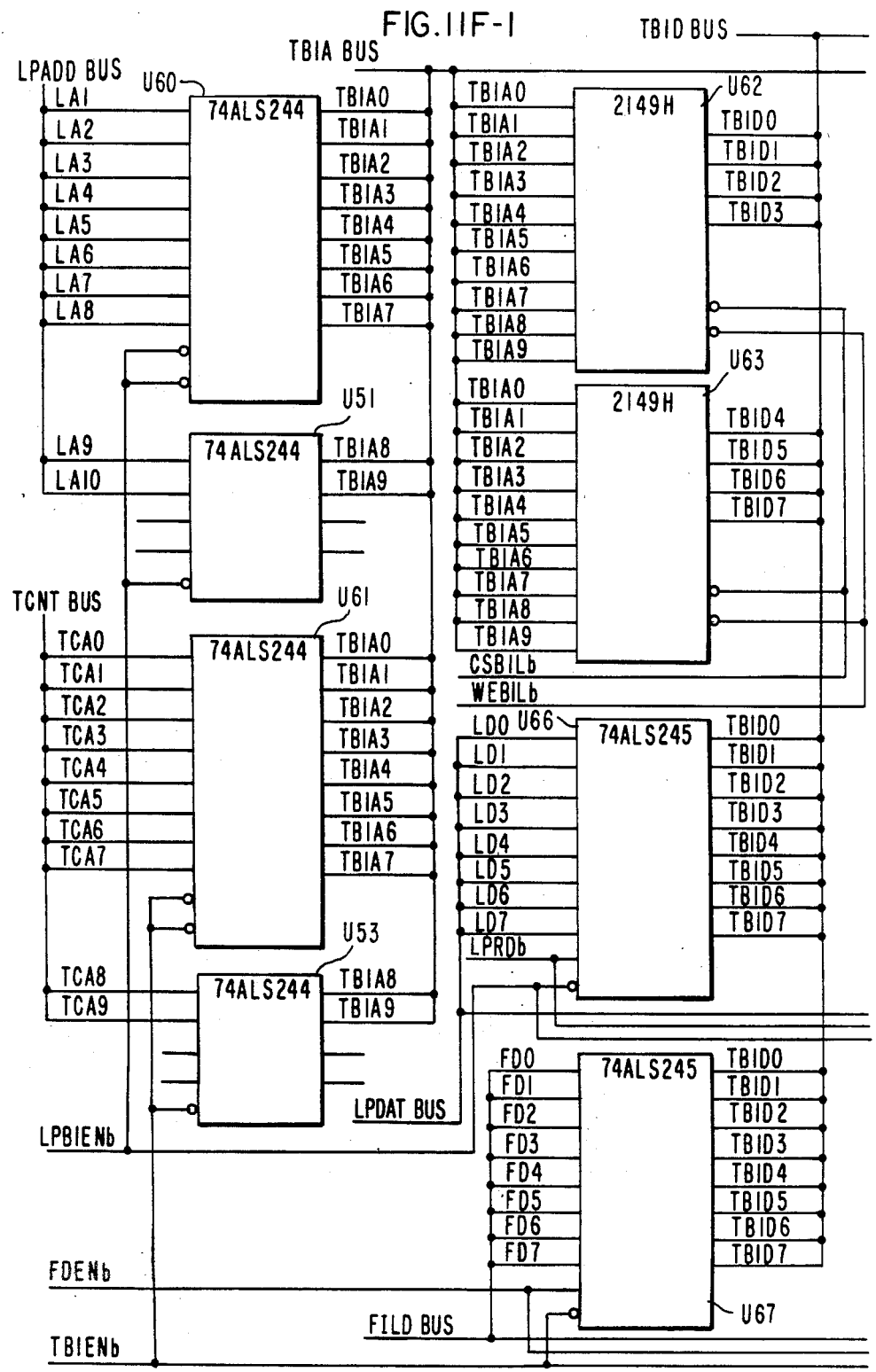

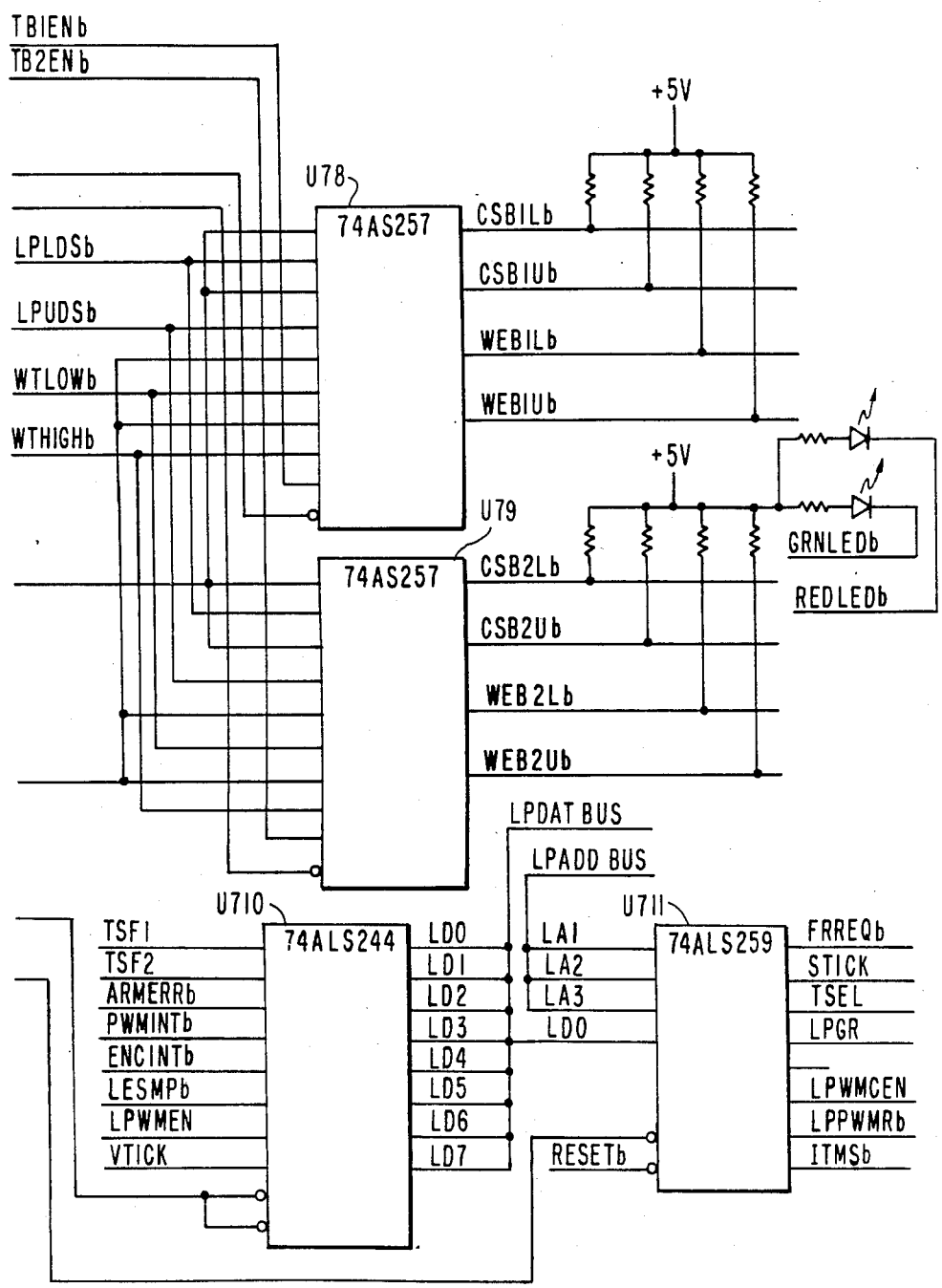
FIG.IIG-2

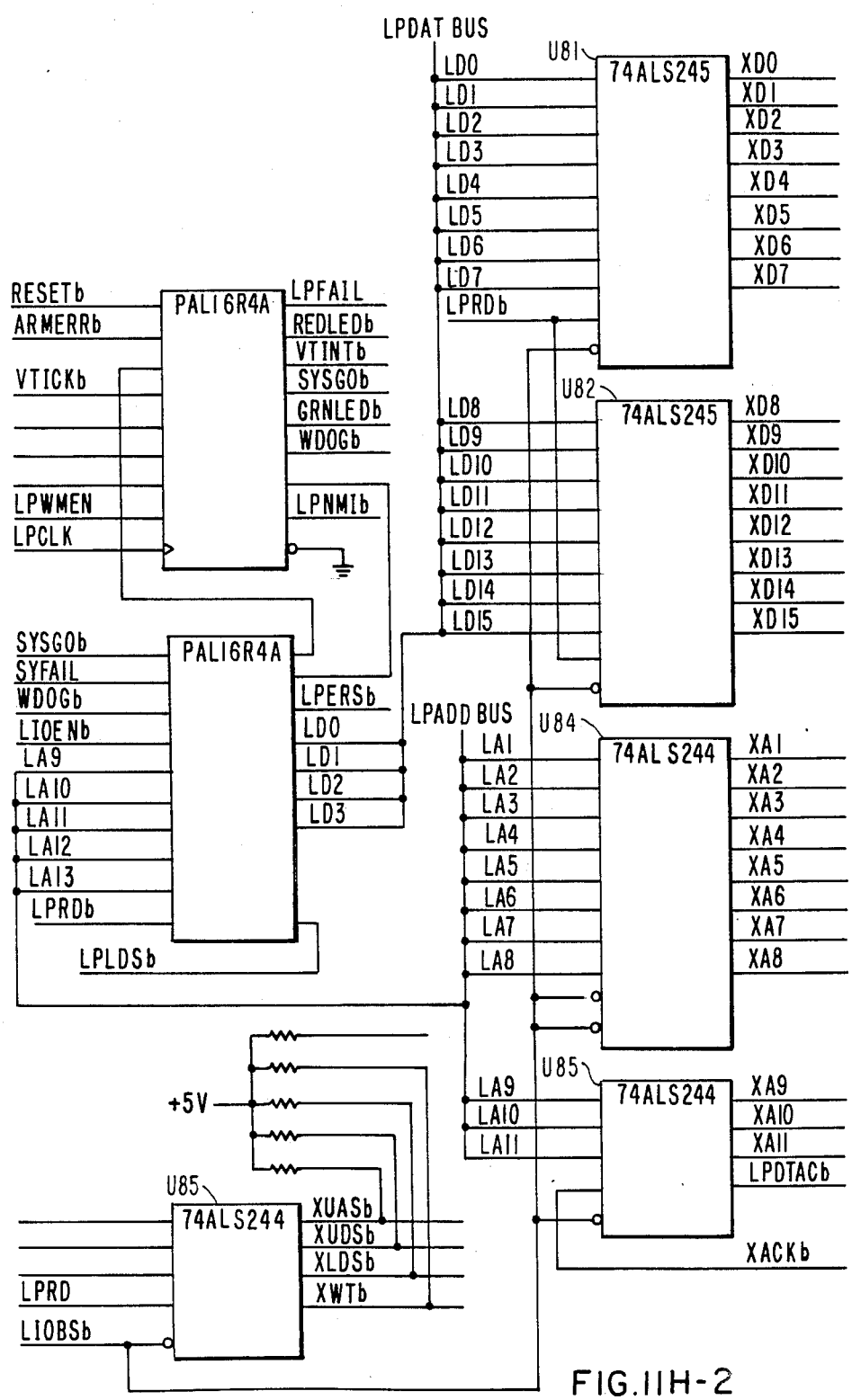
FIG.IIH-2

DIGITAL CONTROL FOR MULTIAXIS ROBOTS

CROSS REFERENCE TO RELATED APPLICATIONS

The following concurrently filed patent applications each filed on Nov. 20, 1986, are related to the disclosure of the present application, assigned to the present assignee and are hereby incorporated by reference:

U.S. Ser. No. 923,975 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 entitled DIGITAL ROBOT CONTROL HAVING AN IMPROVED PULSE WIDTH MODULATOR and filed by Kenneth E. Daggett.

U.S. Ser. No. 932,992 entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Ser. No. 932,976 entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Ser. No. 932,983 entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977 entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Ser. No. 932,986 entitled MULTIAXIS ROBOT HAVING IMPROVED MOTION CONTROL THROUGH VARIABLE ACCELERATION/DECELERATION PROFILING and filed by Rajan Penkar and Neil Tan.

U.S. Ser. No. 932,988 entitled MULTIAXIS ROBOT CONTROL HAVING CAPABILITY FOR EXECUTING TIMED MOVES and filed by Rajan Penkar.

U.S. Ser. No. 932,985 entitled MULTIAXIS ROBOT CONTROL HAVING IMPROVED CONTINUOUS PATH OPERATION and filed by Rajan Penkar.

U.S. Ser. No. 932,840 entitled MULTIAXIS ROBOT CONTROL HAVING FITTED CURVED PATH CONTROL and filed by Rajan Penkar and Timothy Skewis.

U.S. Ser. No. 932,973 entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Ser. No. 932,842 entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robot controls and more particularly to robot controls implemented with digital technology to produce better performance for multiaxis robots.

The design of robot controls has been based in part on what has been learned from the design of numerical machine tool controls. In a typical machine tool control, a position control loop may be implemented in a microprocessor or other digital controller which generates an analog voltage representing a velocity setpoint for a power amplifier assembly. Servo control loops for velocity and torque are closed typically with analog circuitry located within the power amplifier assembly.

In more recent robot controls, both position and velocity control loops have been implemented in a microprocessor or other digital controller which generates a voltage output representing velocity error or current setpoint for the power amplifier assembly. Analog circuitry in the power amplifier closes the current loop.

Requirements placed on robot control systems differ significantly from those placed on numerical machine tool controls. The following are two basic differences:

1. Control loop parameters can typically be established to optimize control at the time of machine tool installation because time constants for the system are relatively constant for all operating conditions of the machine. Robot control parameters cannot be similarly fixed since robot time constants can vary significantly over the operating range of the robot arm due to large inertia changes caused by the manipulation of variable weight loads from fully collapsed to fully extended arm positions.

2. Machine tools typically require stiff accurate path control. Robot arms typically require dexterity which in turn can require control over the force applied by the robot arm to an object.

Apart from these unique operating requirements, robot controls have been lacking in design adaptability to accommodate advancing robot technology with convenience and economy. They have further been lacking in design adaptability to be operable with high universality in meeting varied customer applications having different cost, robot performance and system requirements.

With a completely digital control configuration, all of the foregoing special robot control needs can be more readily and more effectively met through better robot performance enabled by digital capabilities and better design adaptability enabled by digitally facilitated modular hierarchical organization. The present invention is directed to the overall configuration of a new substantially completely digital robot control which meets these objectives. The referenced patent applications are directed to various aspects and features of the new digital robot control.

SUMMARY OF THE INVENTION

A completely digital robot control operates at a predetermined sampling rate. The robot arm has a plurality of joints with each driven by an electric DC motor which is in turn supplied with drive current by a power amplifier bridge circuit having power switches connected therein to supply motor winding current in the positive direction or the negative direction.

Digital position, velocity and motor current feedback signals are generated synchronously with the sampling rate.

Digital means are provided for generating torque commands for each of the robot axes at the sampling rate in response to the position commands and the position and velocity feedback signals. Another digital means are provided for generating motor voltage commands for each of the robot axes at the sampling rate in response to the torque commands and the current feedback signals.

Pulse width modulation means generate digital motor control signals for each of the robot axes at the sampling rate in response to the voltage commands. The digital control signals for each axis are coupled to control terminals of the corresponding power switches to control on/off switch time and satisfy the motor voltage commands and thereby satisfy the position commands.

BRIEF DESCRIPTION OF THE DRAWINGS

FIGS. 4A1-A3 show a schematic diagram of the control loop configuration of FIG. 3 in greater detail;

FIGS. 7A1-A2 show a schematic diagram of an SCM board employed in the control;

FIGS. 7B-7K show various flow charts for servo control programming executed on the SCM board;

FIGS. 8A1-8L2 show the SCM board circuitry in greater detail;

FIGS. 9B-9C2 show flow charts for system motion programming executed on the SCM board;

FIGS. 10A1-A2 show a schematic diagram of a TP board employed in the control;

FIGS. 11A1-11H2 show the TP board circuitry in greater detail;

FIGS. 13A1-13N2 show the AIF board circuitry in greater detail; and

DESCRIPTION OF THE PREFERRED EMBODIMENT

ROBOTS-GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
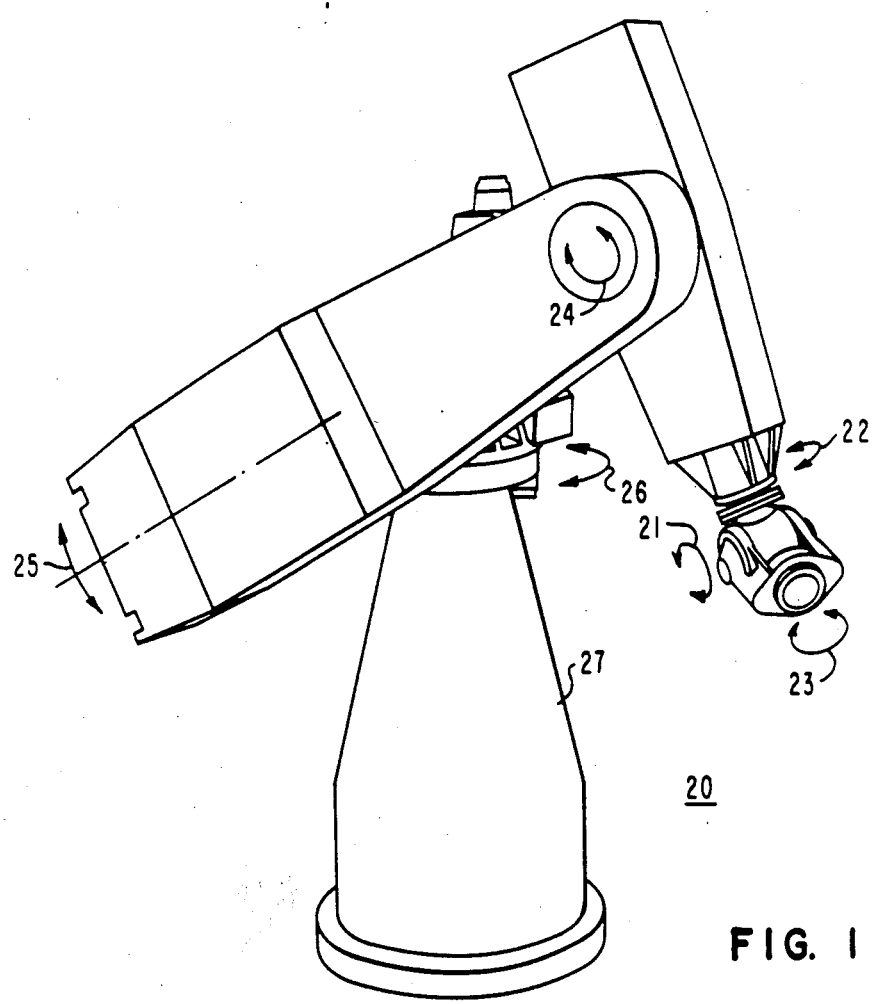
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the wrist is provided with three articulations, i.e., an up/down rotation indicated by arrow 21 and a left/right rotation indicated by arrow 22 and a third motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIG. 2, 3 or 6) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

CONTROL LOOPS

Figure 2:
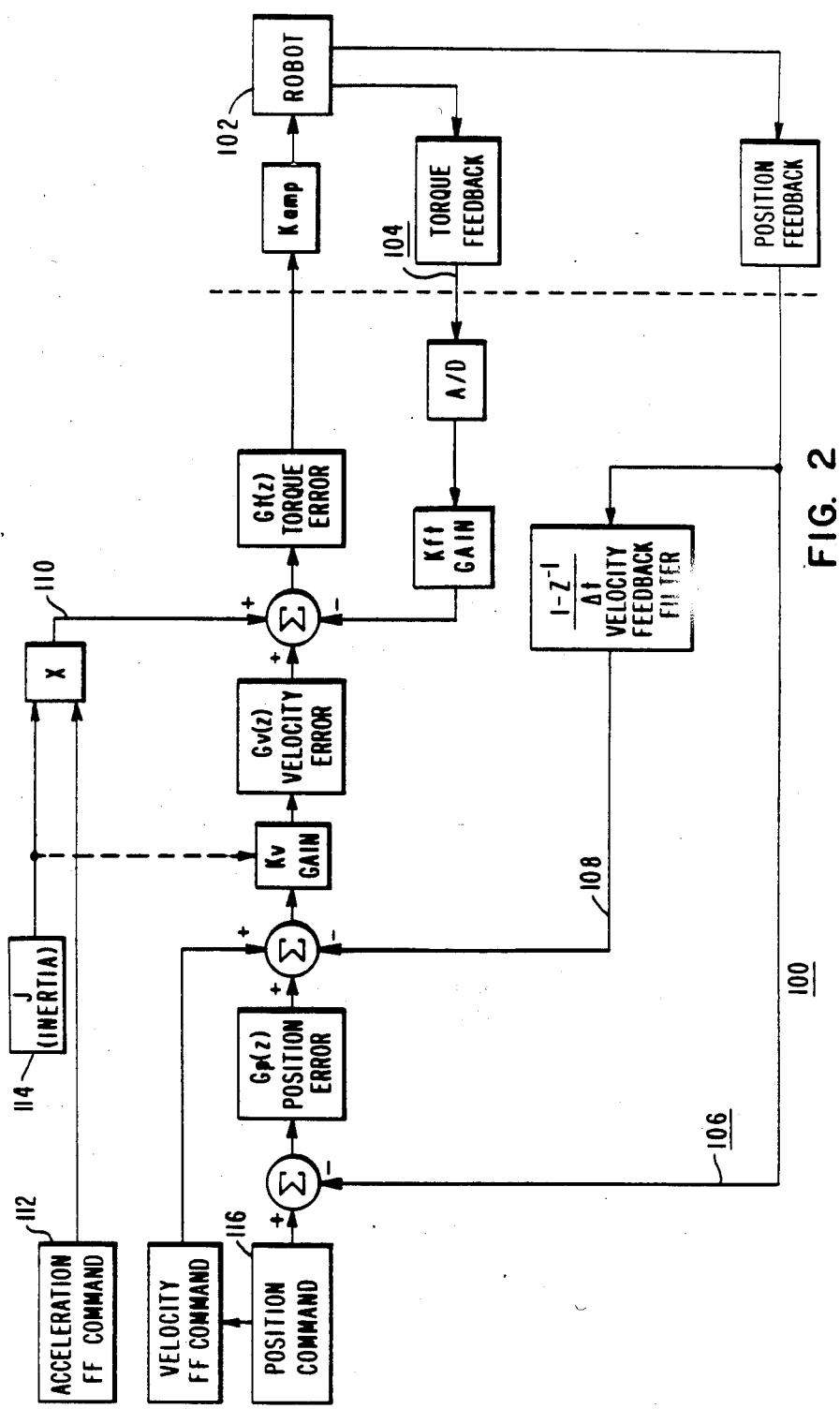
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
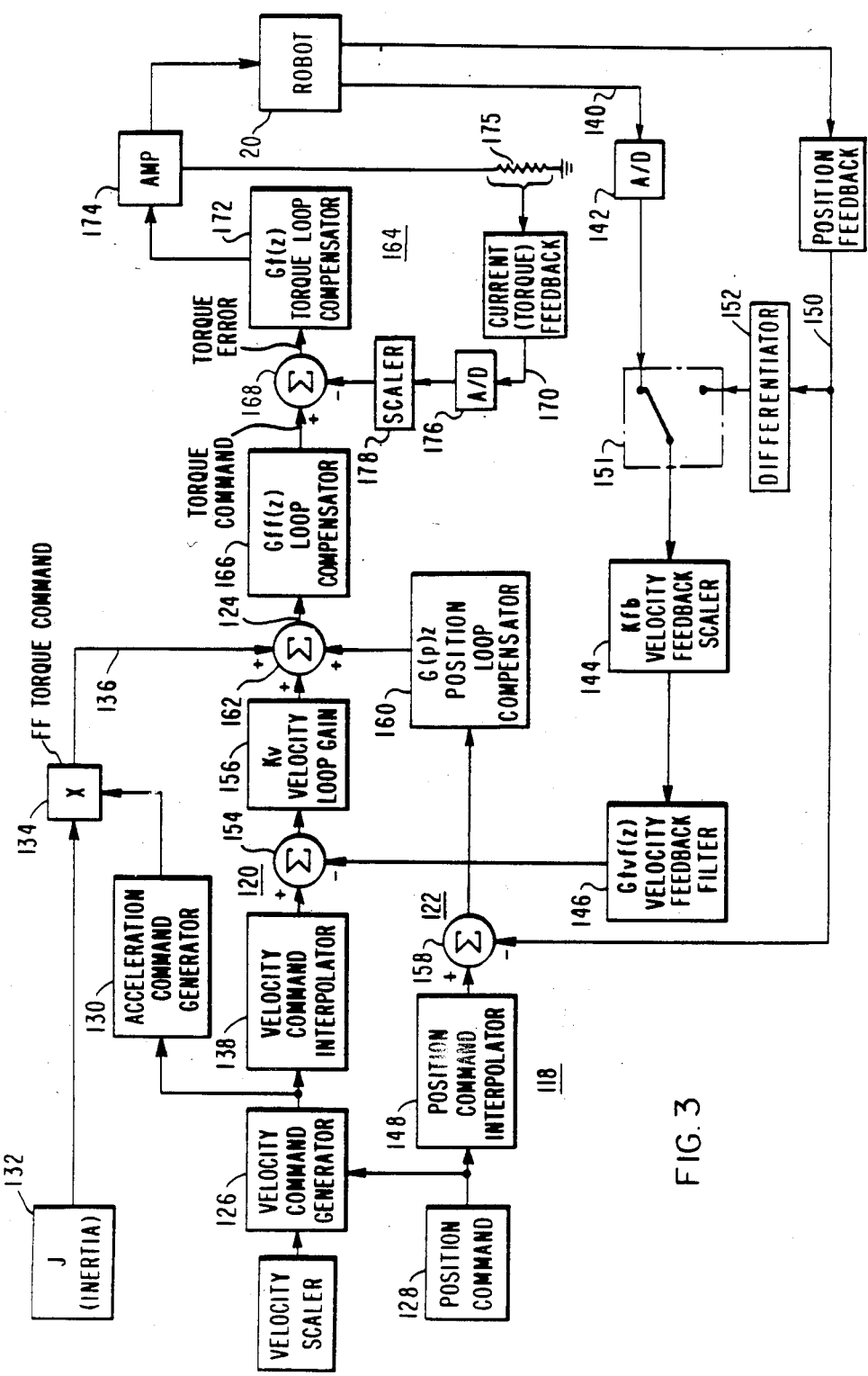
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL TM robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loop 122 and velocity control loop 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications Ser. Nos. 932,841 and 932,853.

Velocity error is generated by summer 154 with gain applied by loop 156. Similarly, position error is generated by summer 158 with gain applied to box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error (motor voltage commands) and pulse width modulated (PWM) output signals are applied to a power amplifier 174 which supplies the motor drive current for robot joint operation. Current feedback from resistor 175 is sampled every 250 microseconds (see referenced patent application Ser. No. 932,975 and converted to digital signals by box 176 with scaling applied by box 178.

Figures 1, 4A:
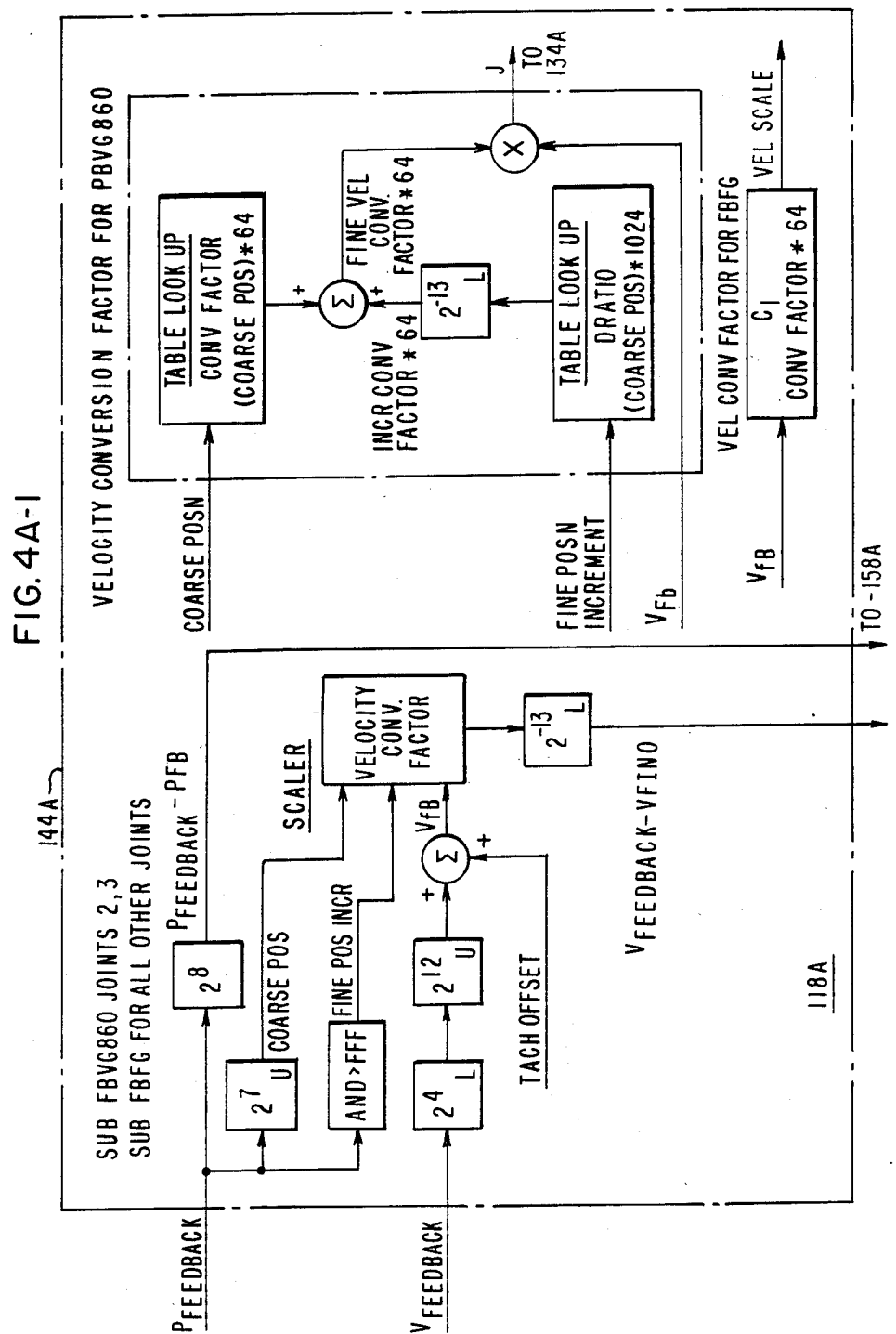
Figures 2, 4A:
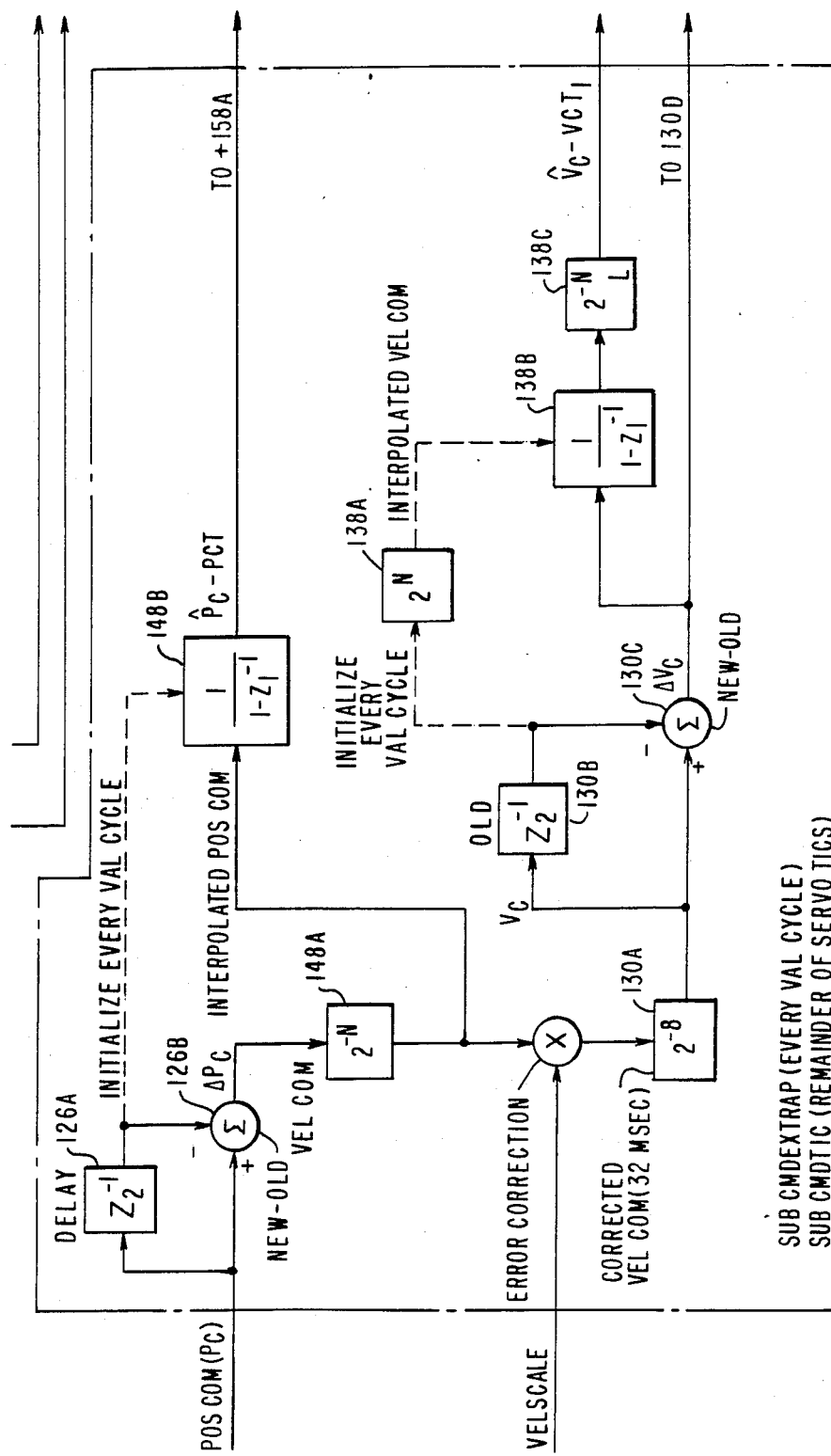
Figures 3, 4A:
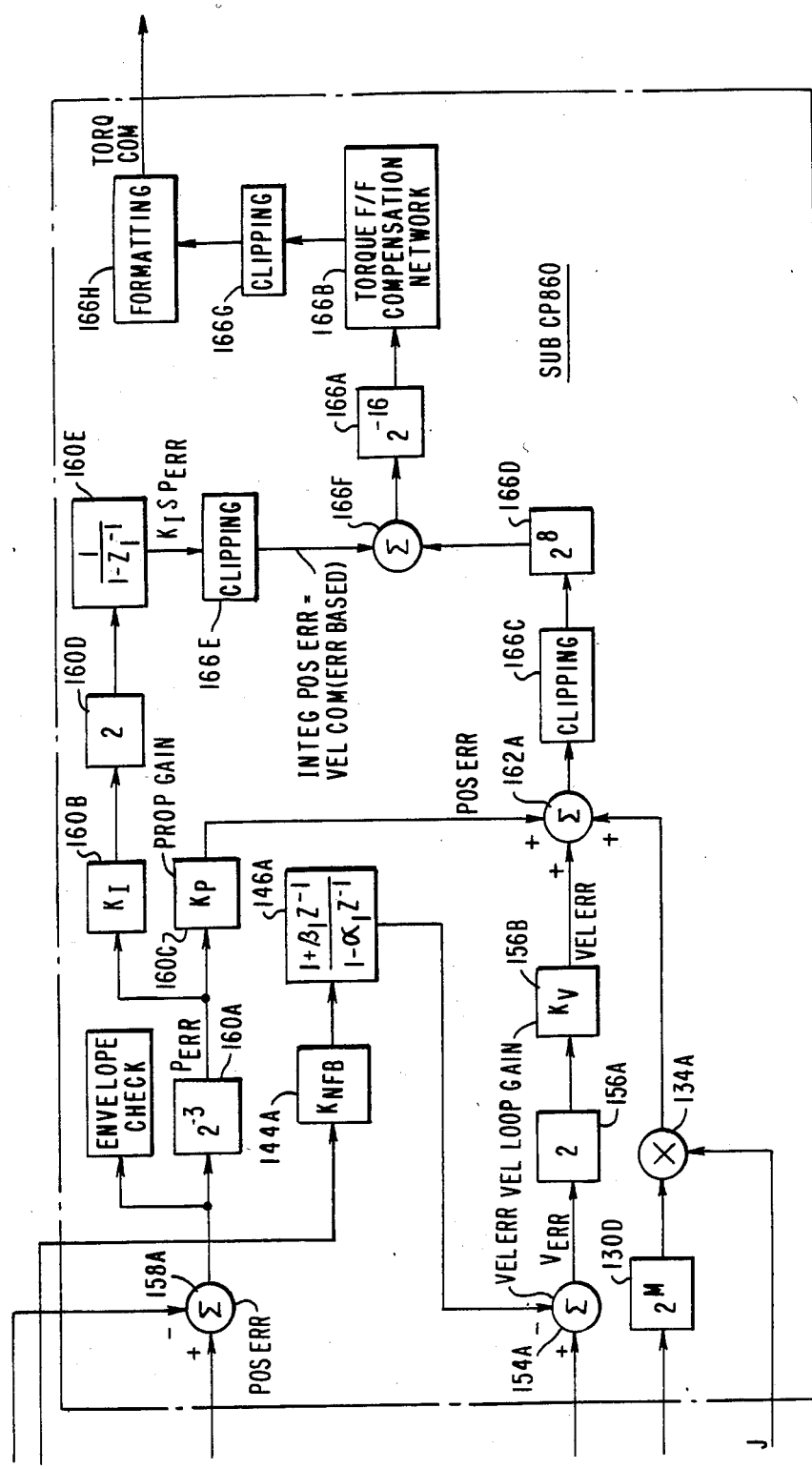

In FIGS. 4A-1, A-2, A-3, there is shown a control loop 118A representing another embodiment of the invention arranged to operate a particular Unimation 860 robot for which special velocity feedback processing is needed. The control loop 118A is structured and operates much like the control loop 118 and 120 in FIG. 3 and 118A in FIG. 4A-1, but it is shown with greater block detail. The following table provides correspondence between the control loop 118A and the control loop 118:

| ELEMENT IN LOOP 118 | CORRESPONDING ELEMENTS IN LOOP 118A |
| --- | --- |
| Velocity command generator 126 | 126A; 126B |
| Position command interpolator 148 | 148A; 148B |
| Acceleration command generator 130 | 130A; 130B; 130C; 130D |
| Velocity command interpolator 138 | 138A; 138B; 138C |
| Velocity loop gain 156 | 156A; 156B |
| Position loop compensator 160 | 160A through 160E |
| Loop compensator 166 | 166A through 166H |
| Velocity feedback scaler 144 | box 144A |

The velocity feedback scaler is specially structured to provide compensation for nonlinearity in the relationship between actual joint motor velocity and actual joint motor shaft velocity (the sensed velocity parameter) for certain Unimation 860 robots. The system uses a ballscrew with floating pivot point as a drive mechanism. The speed of ballscrew movement is related to motor speed by a nonlinear function. The JT2 and JT3 robots are the units that use this mechanism and a lookup table is provided to linearize the feedback velocity signal supplied to the servo system.

DIGITAL ARCHITECTURE FOR MULTIAXIS ROBOT CONTROL

Figure 5:
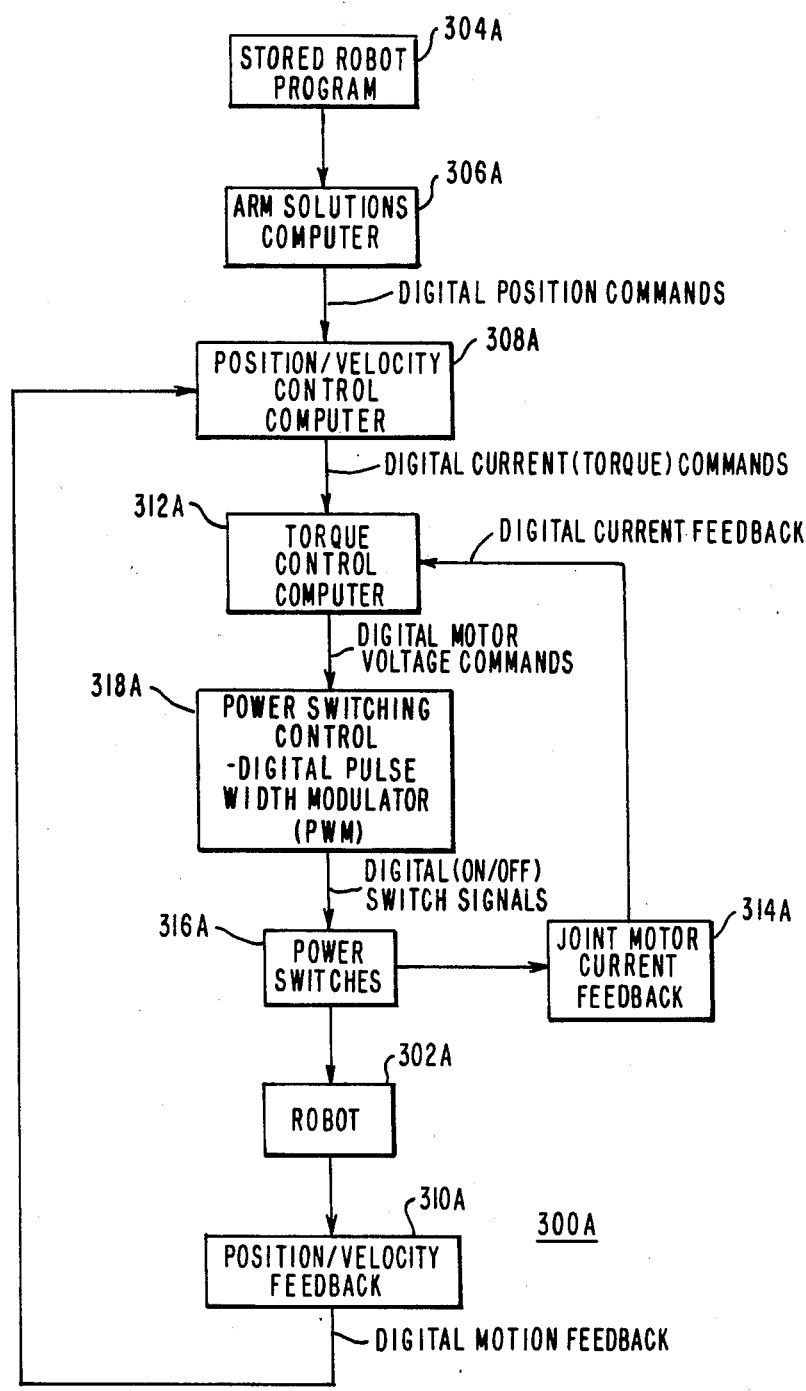
FIG. 5 shows a block diagram of the digital architecture of a completely digital robot control which embodies the control loop configuration of FIGS. 3 and 4 in accordance with the invention.
Figures 1, 8A:
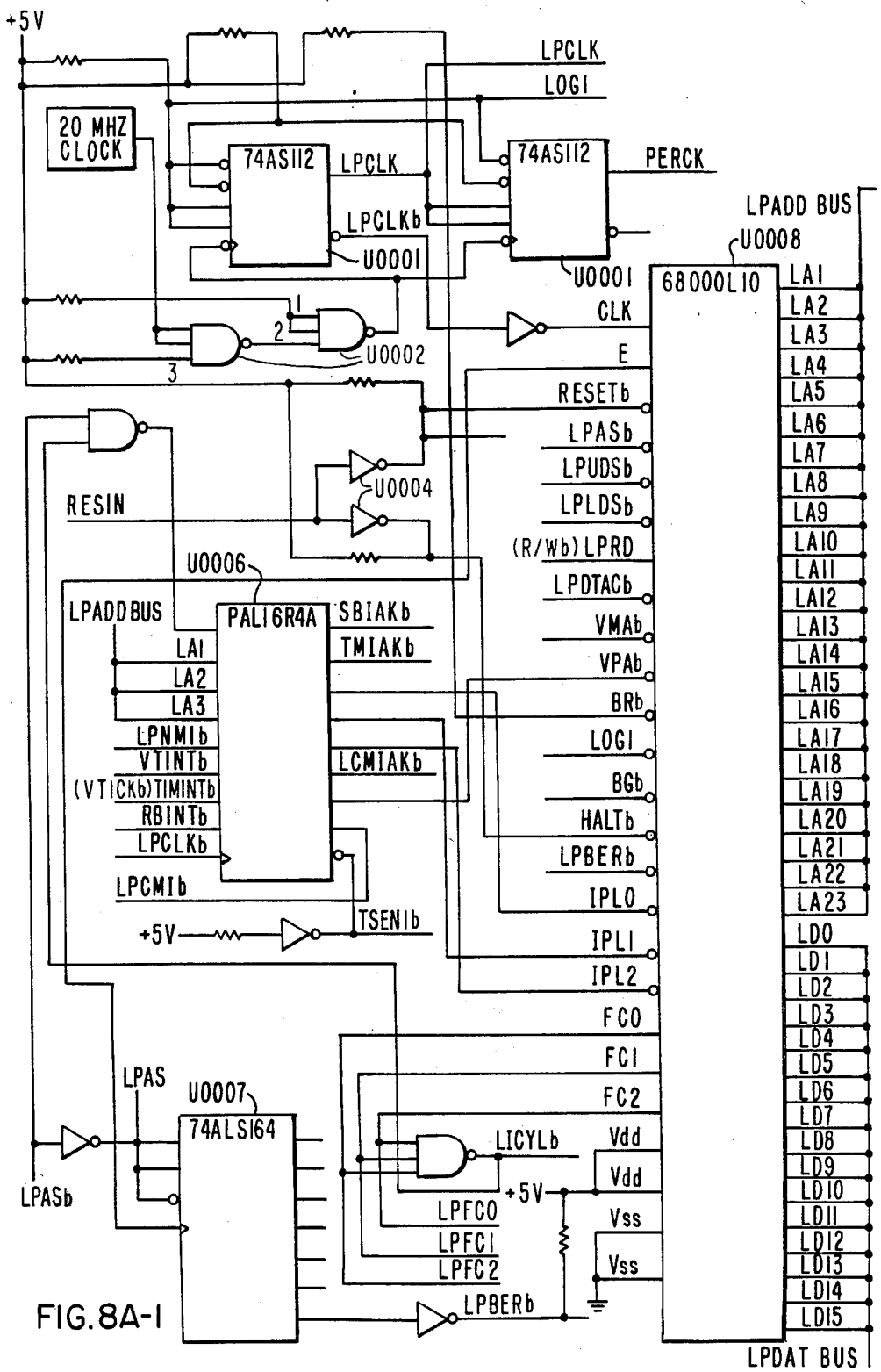
Figures 2, 8A:
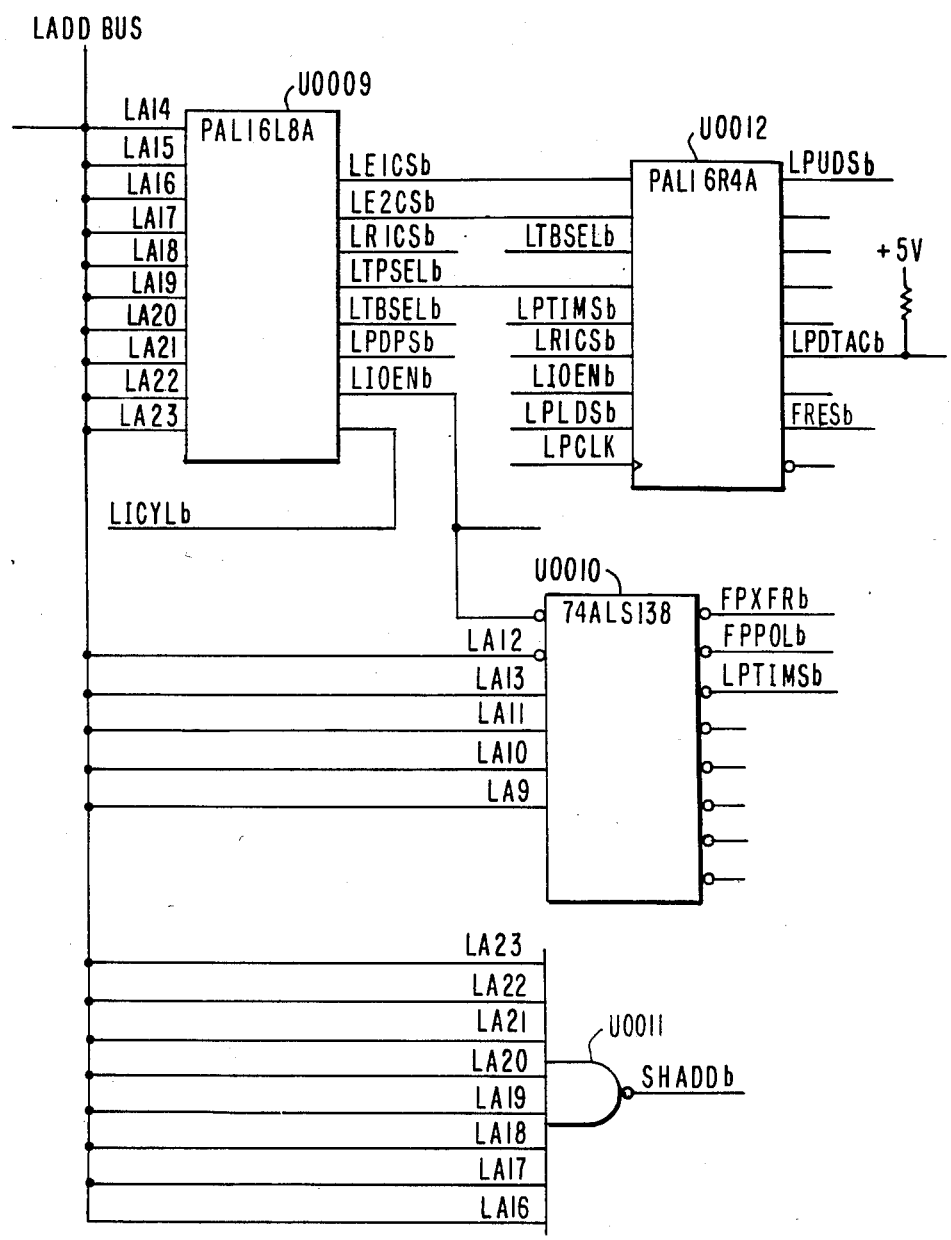
Figures 1, 8B:
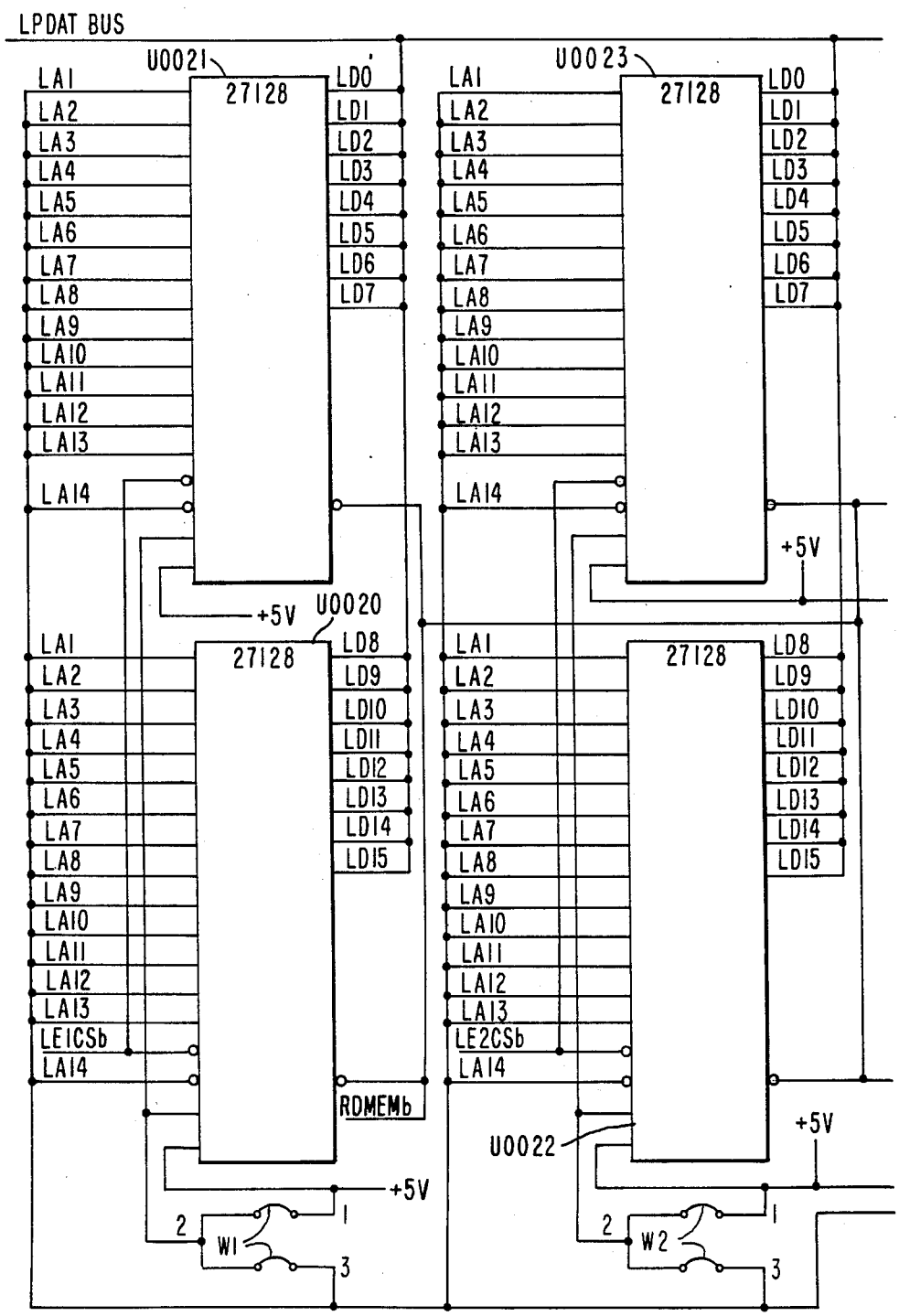
Figures 2, 8B:
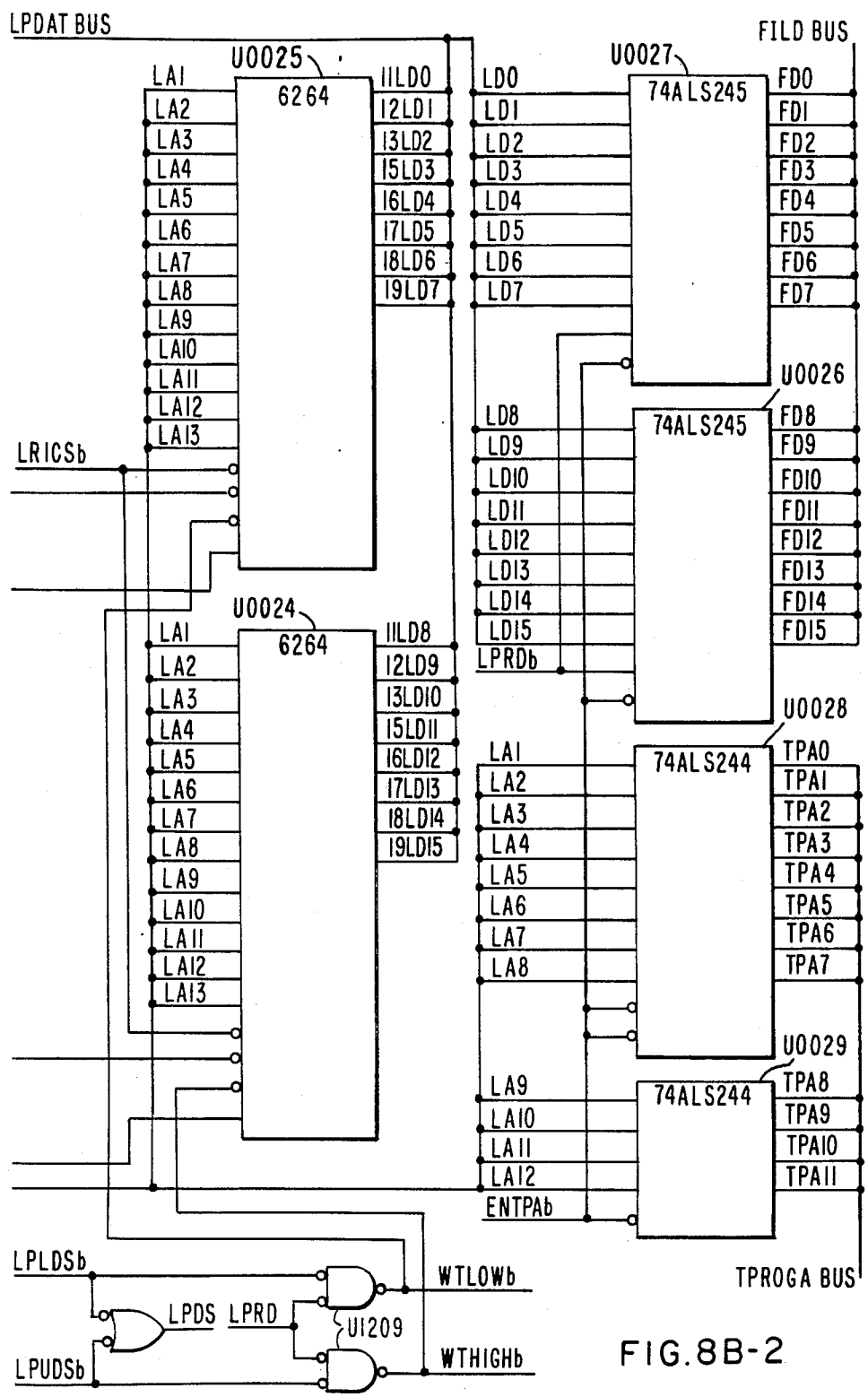
Figures 1, 8C:
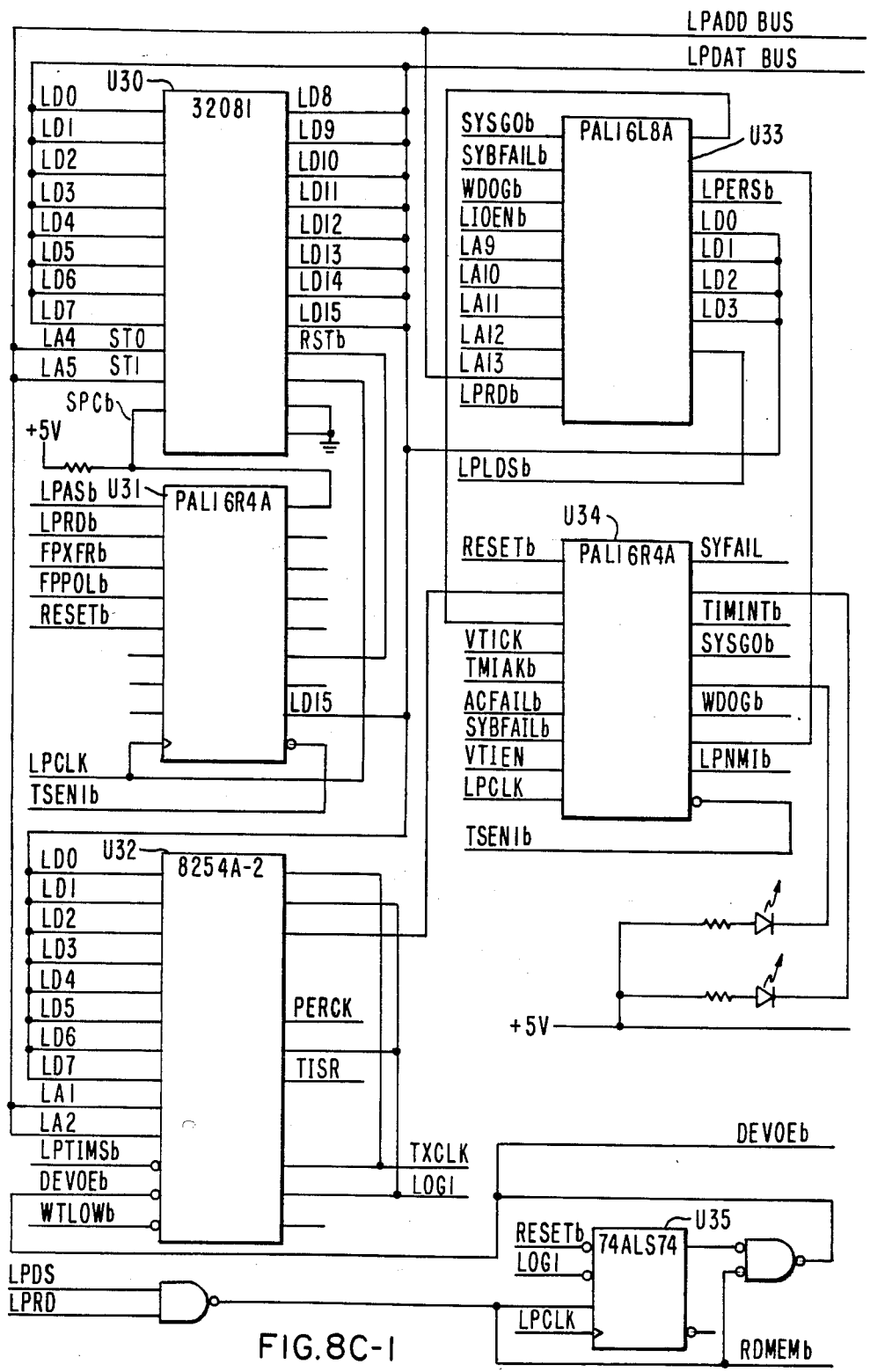
Figures 2, 8C:
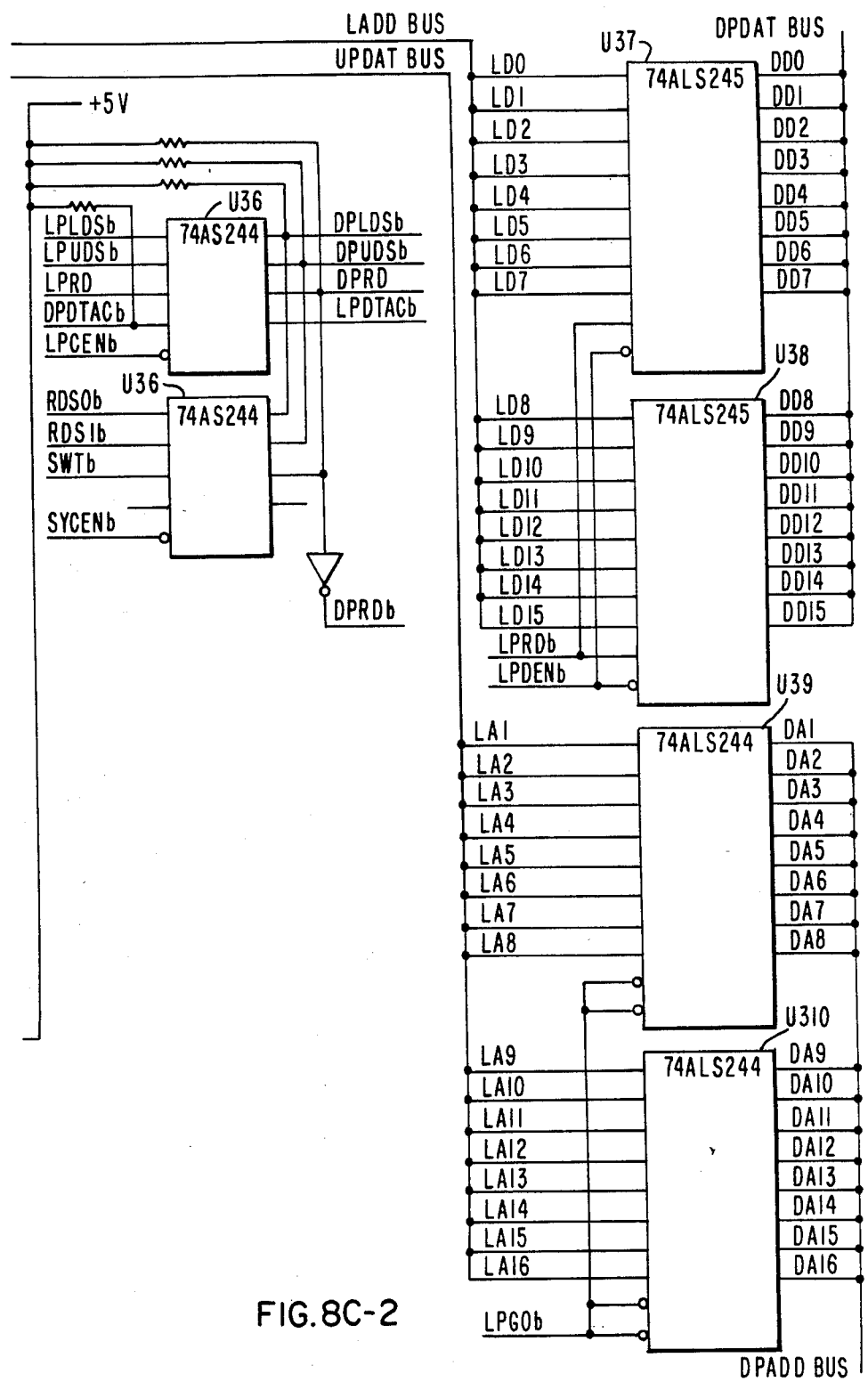
Figures 1, 8D:
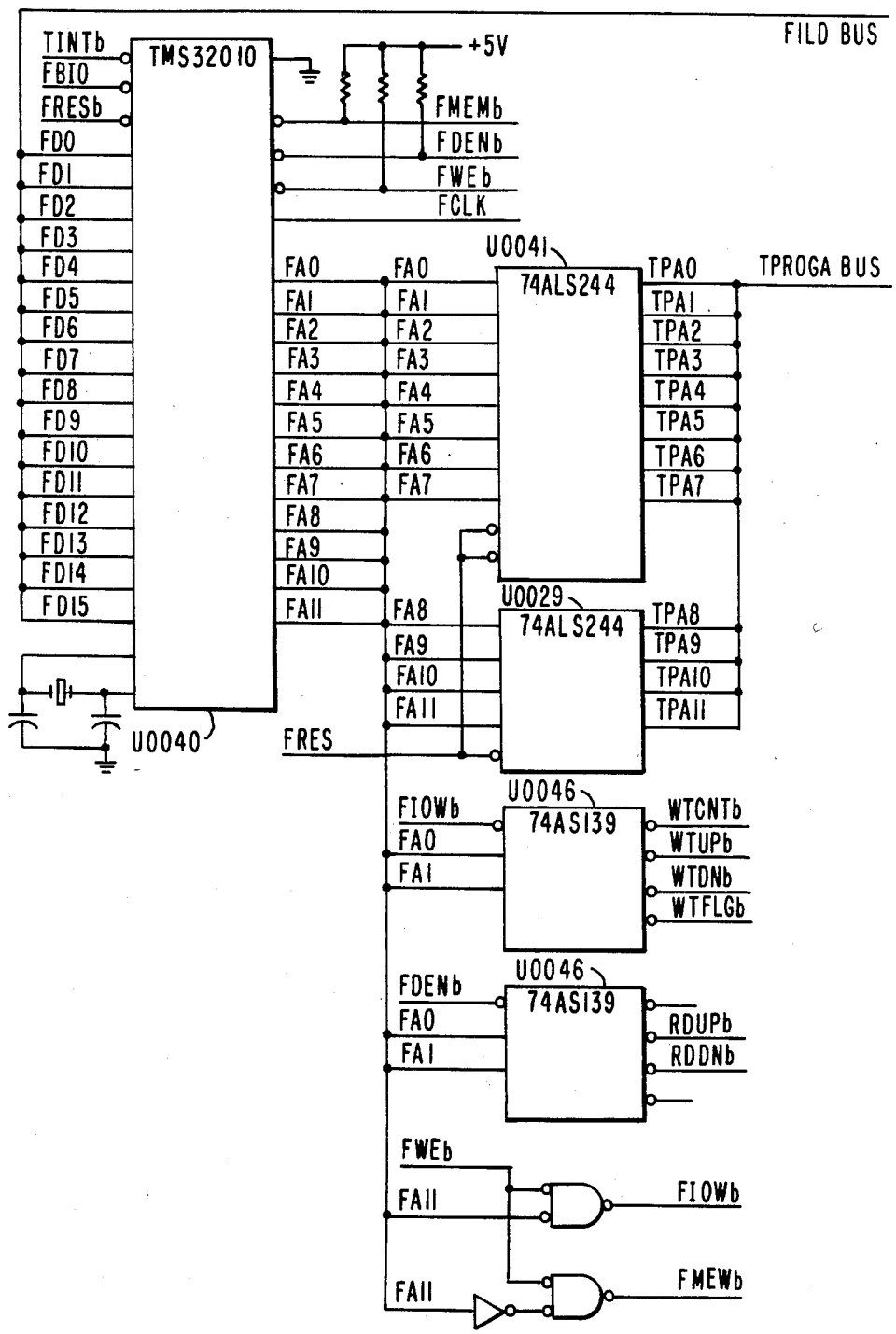
Figures 2, 8D:
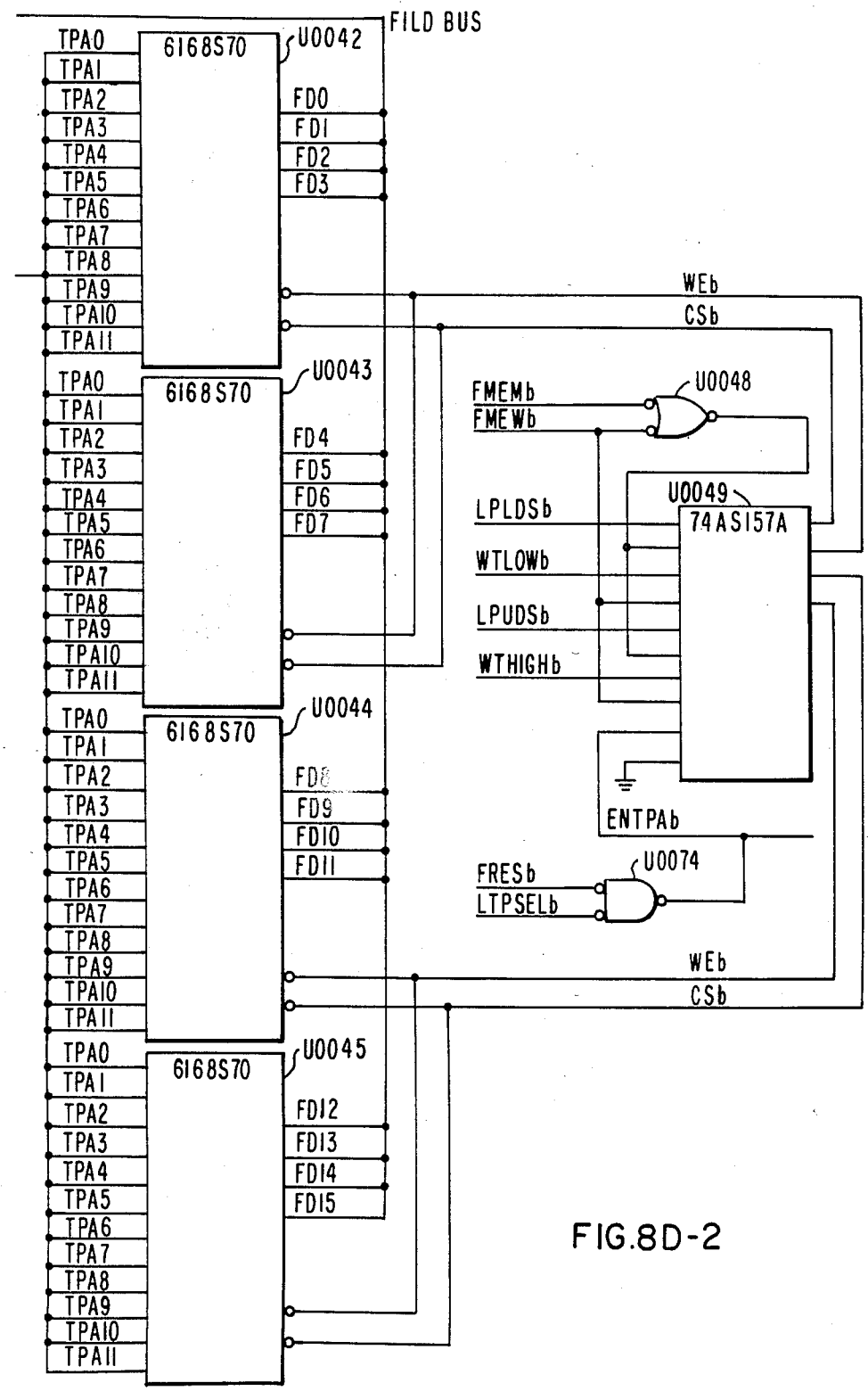
Figures 1, 8E:
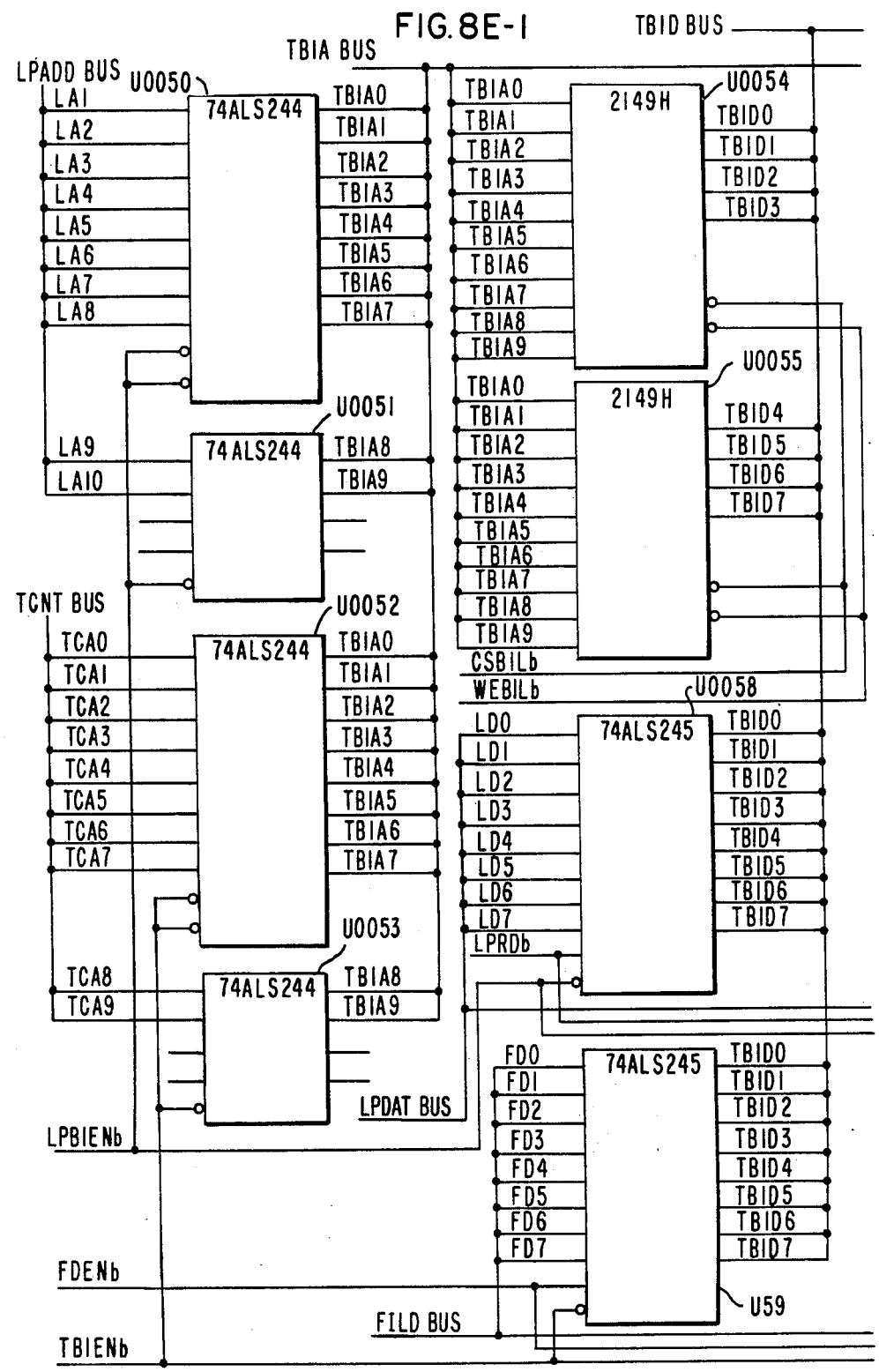
Figures 2, 8E:
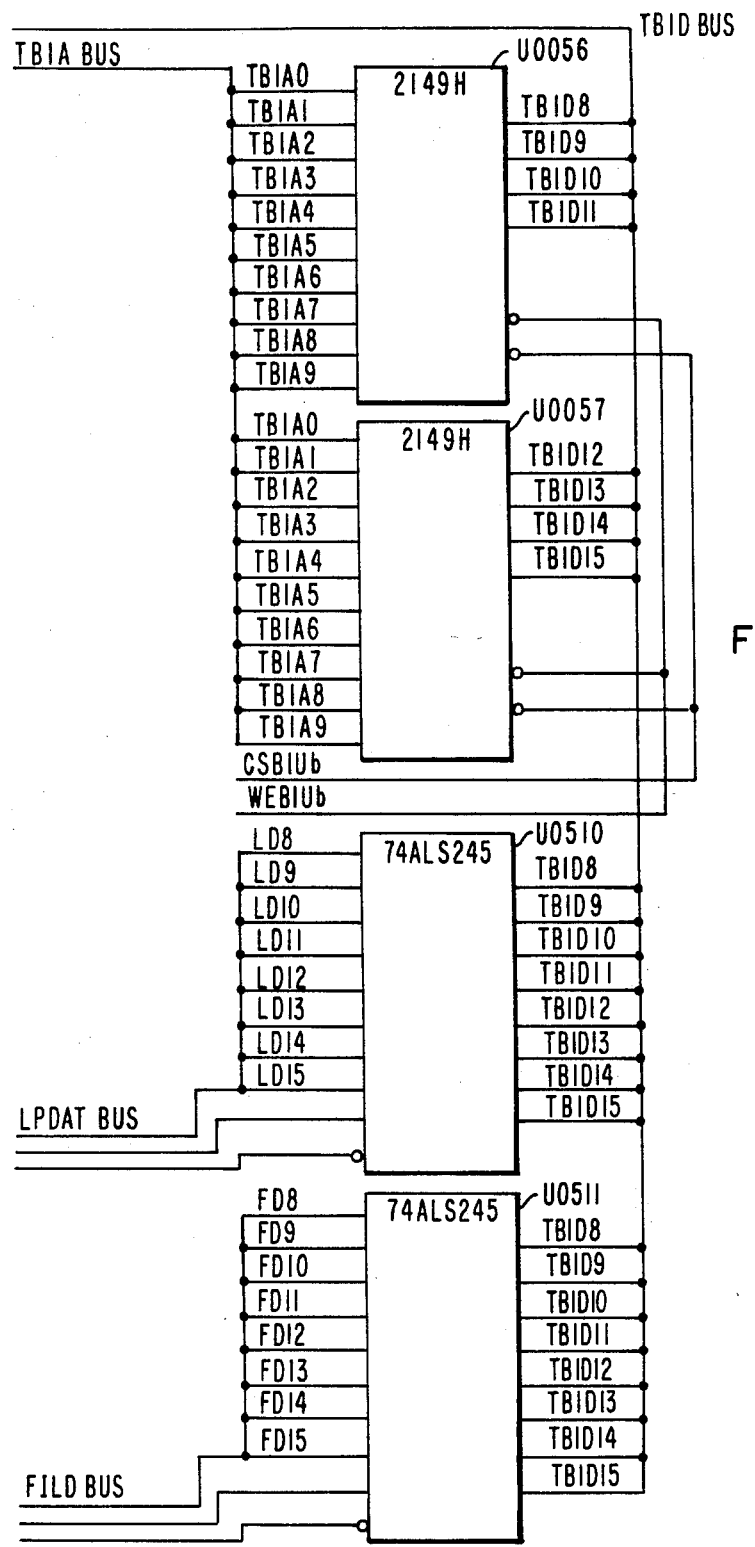
Figures 1, 8F:
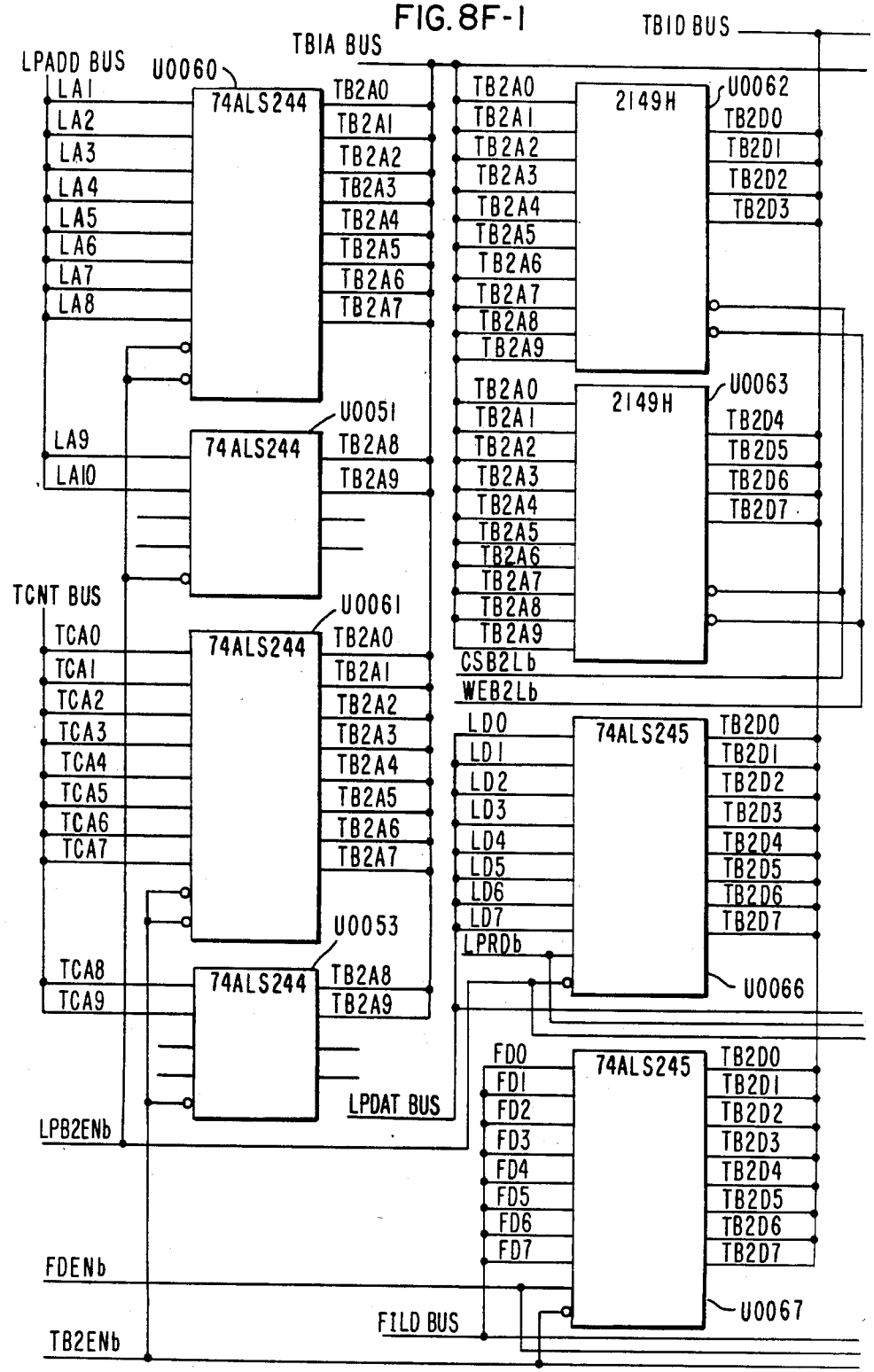
Figures 2, 8F:
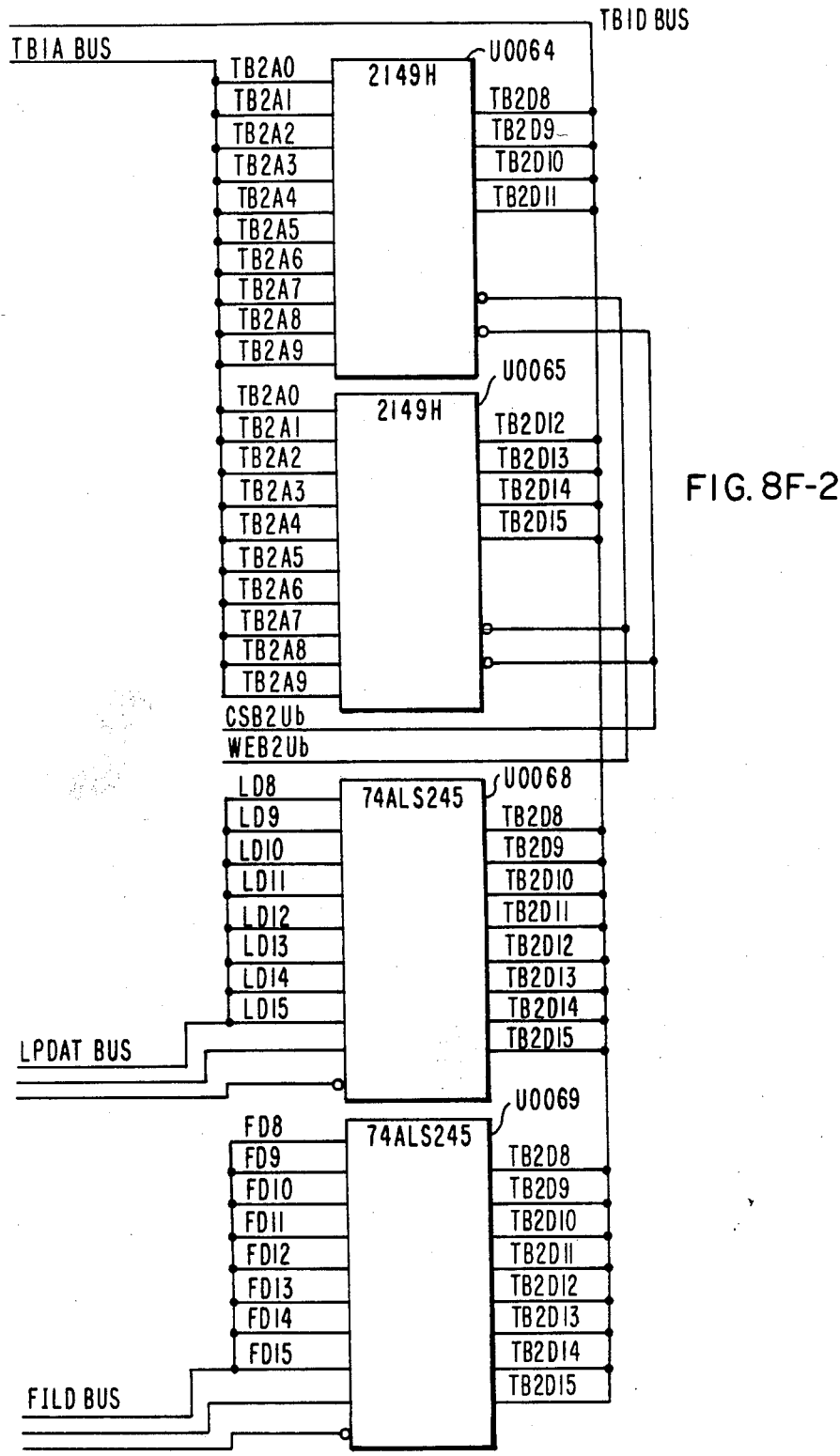
Figures 1, 8G:
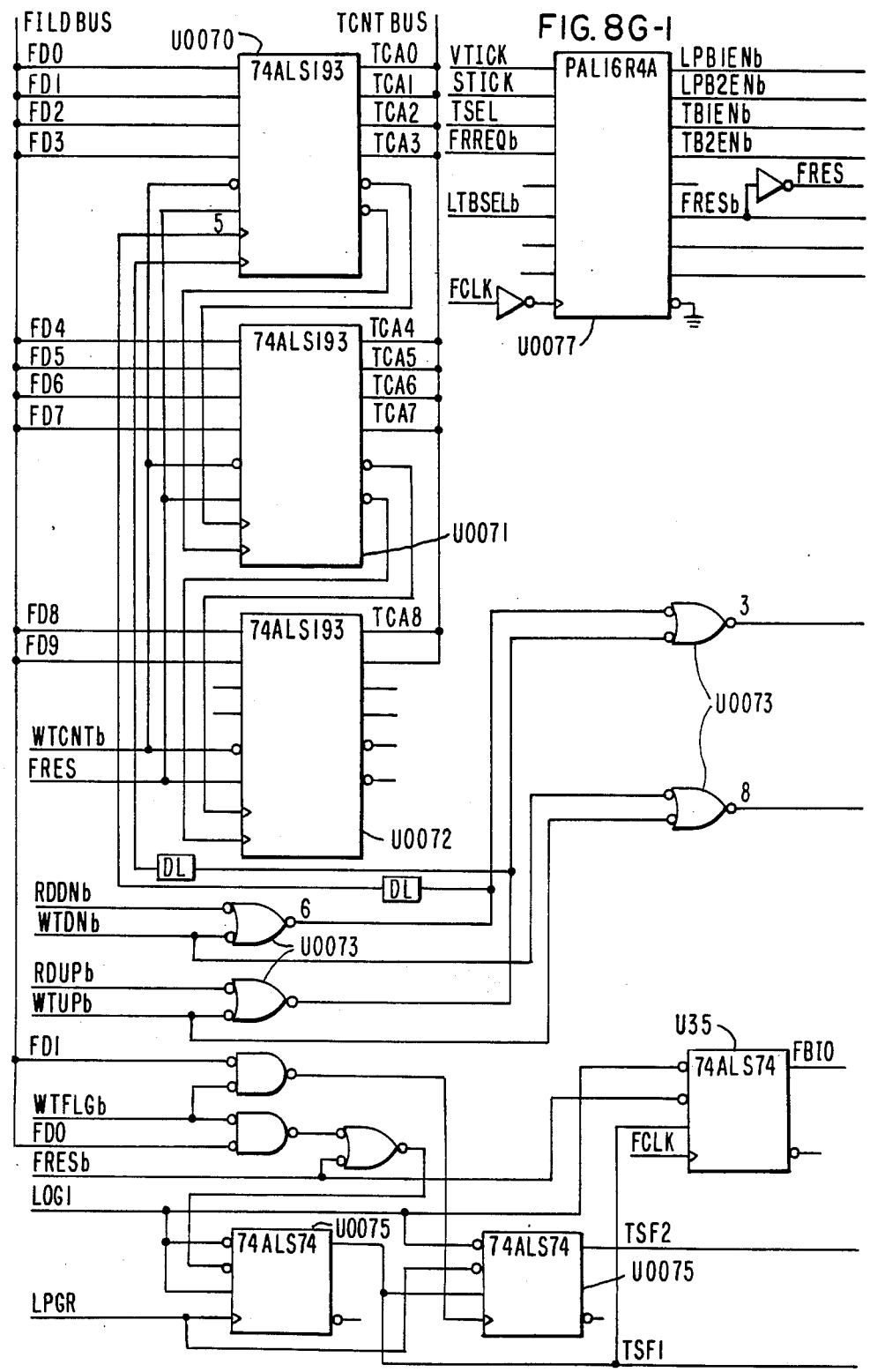
Figures 2, 8G:
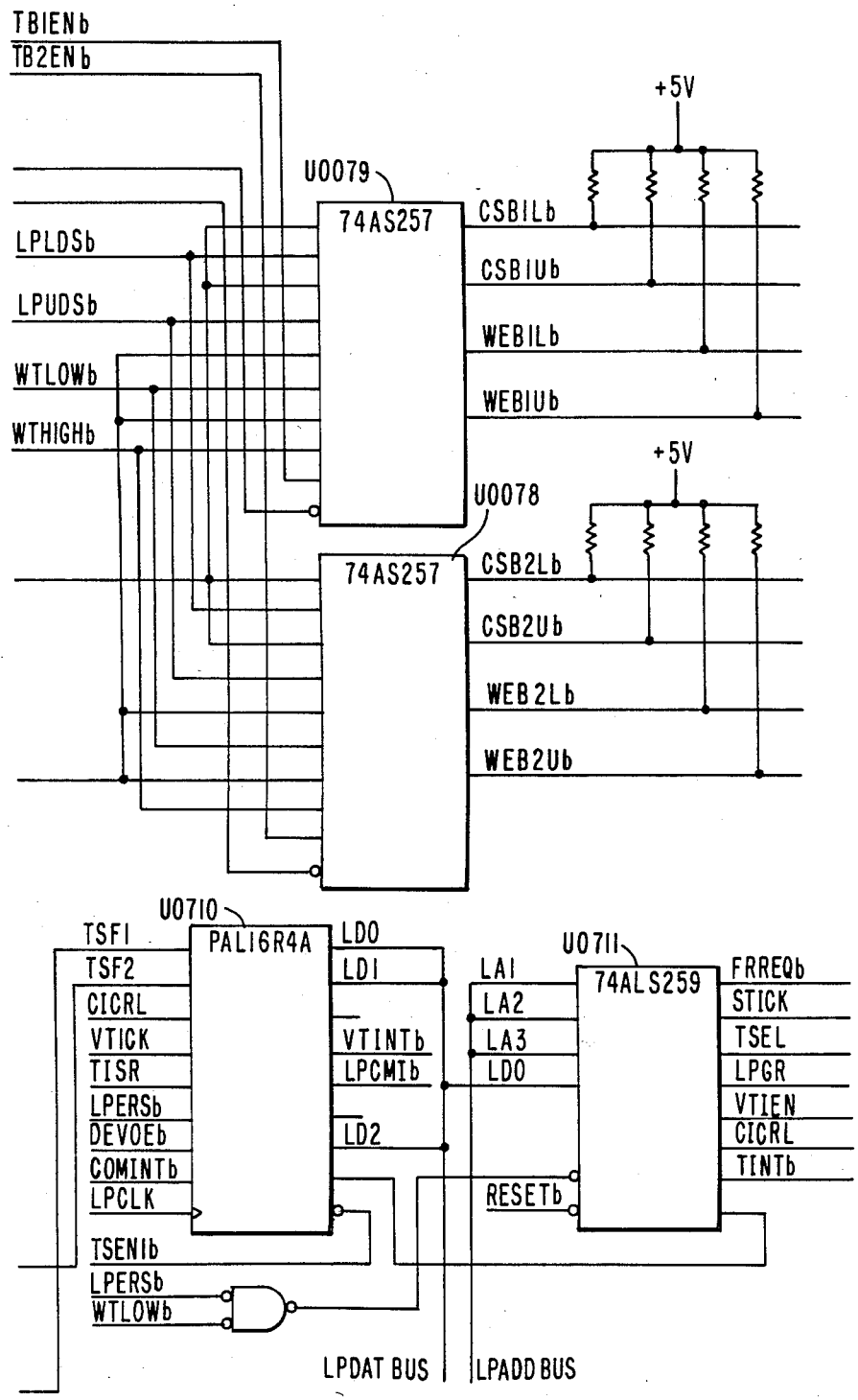
Figures 1, 8H:
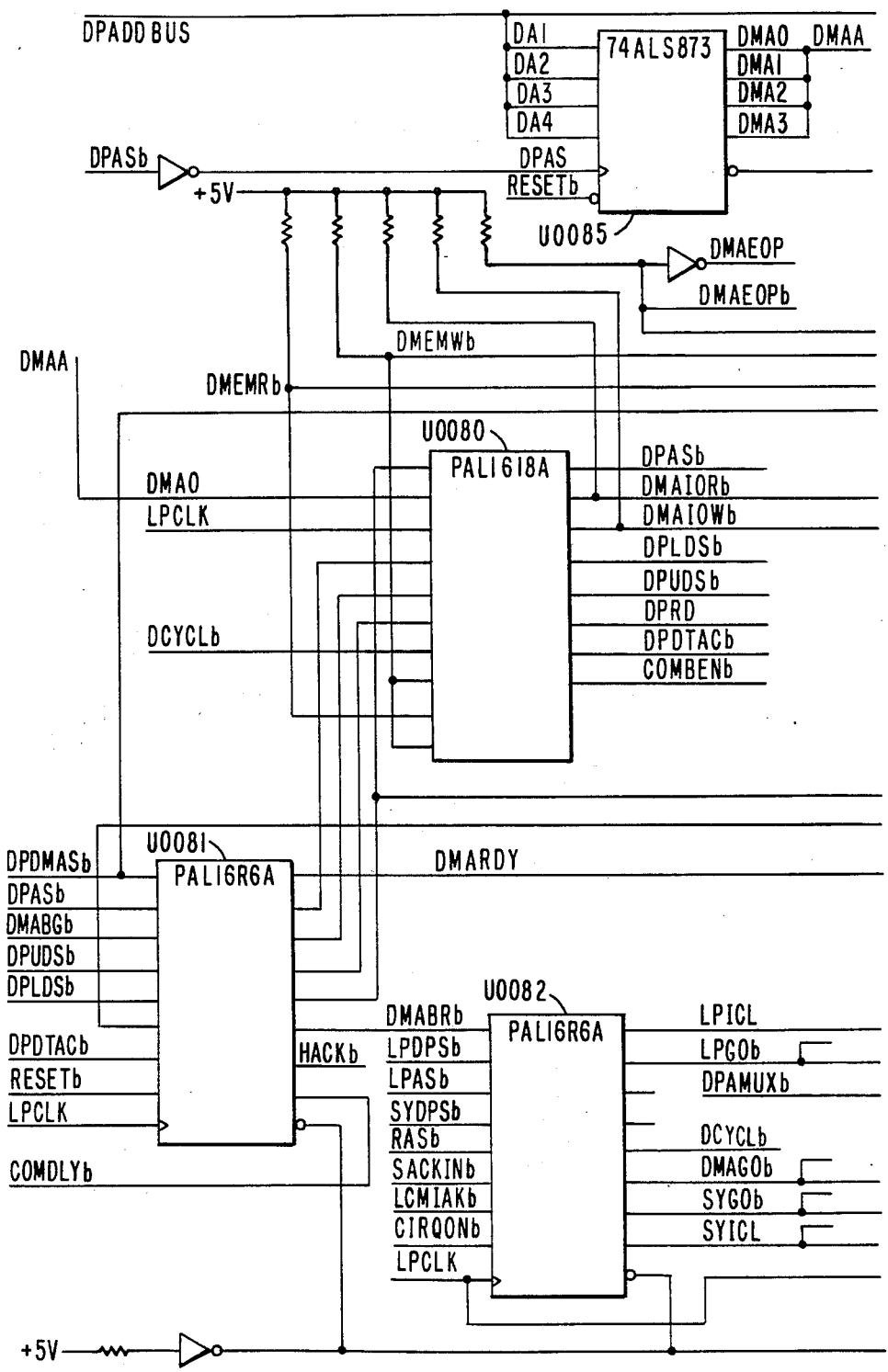
Figures 2, 8H:
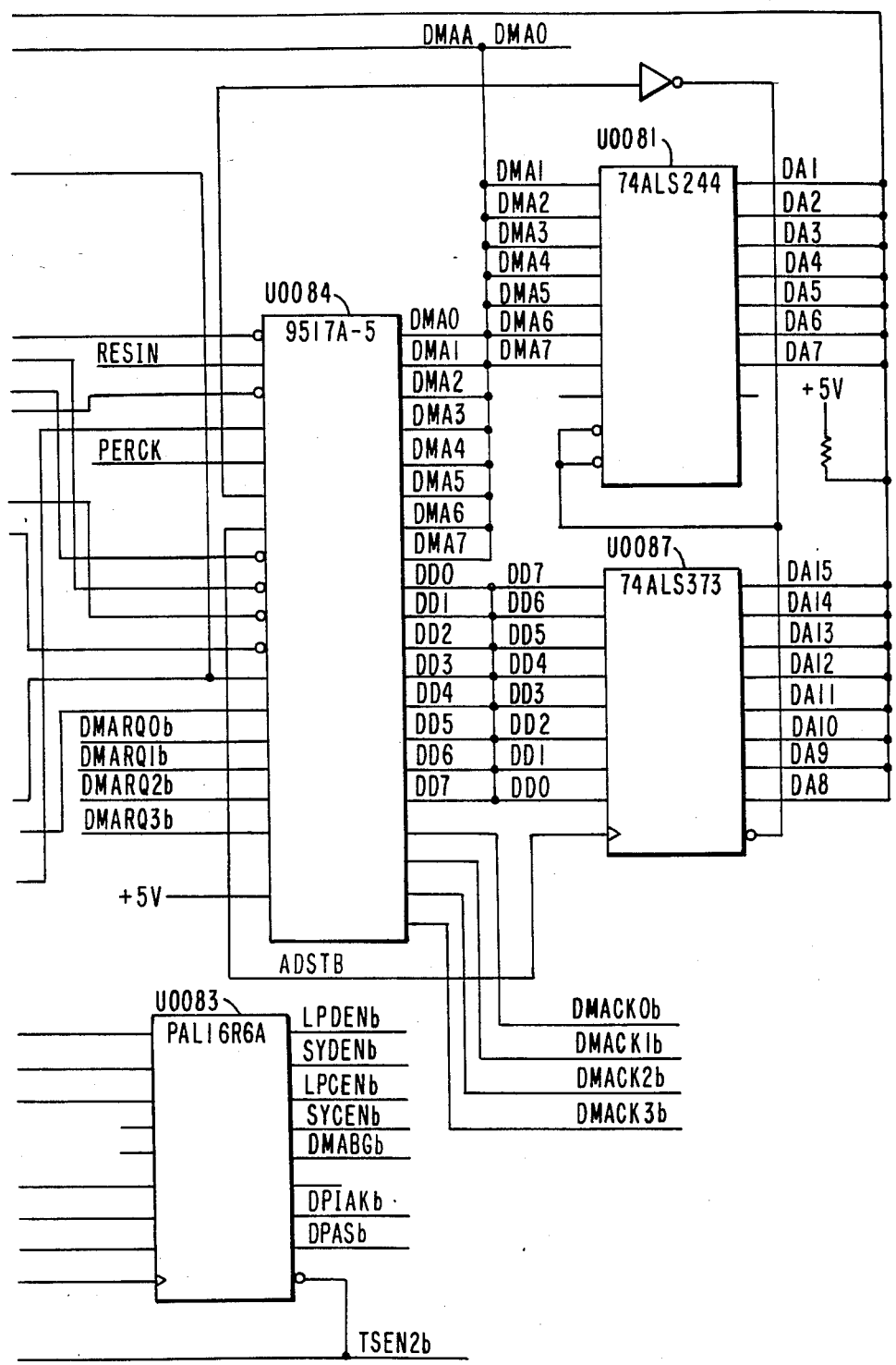
Figures 1, 81:
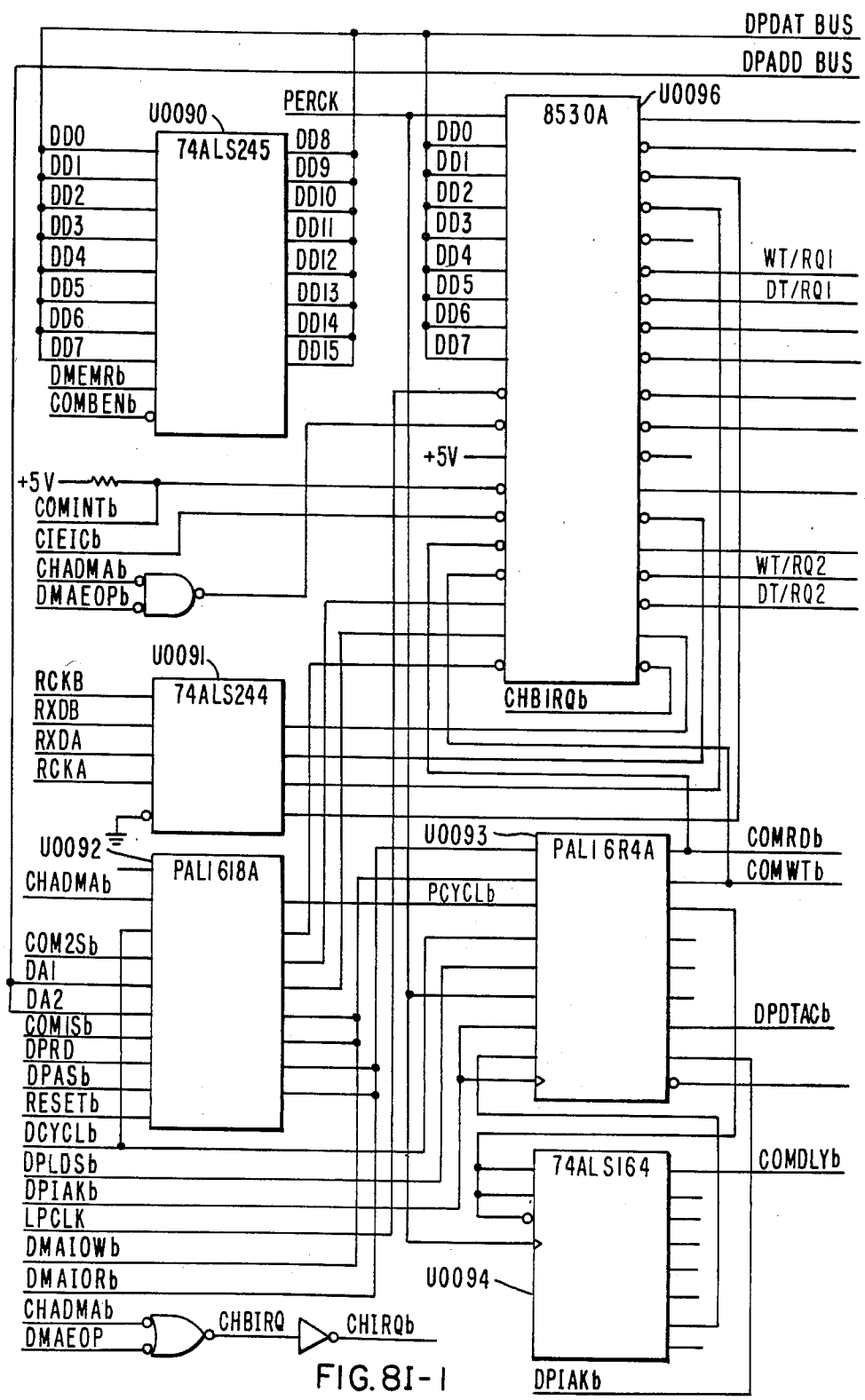
Figures 2, 81:
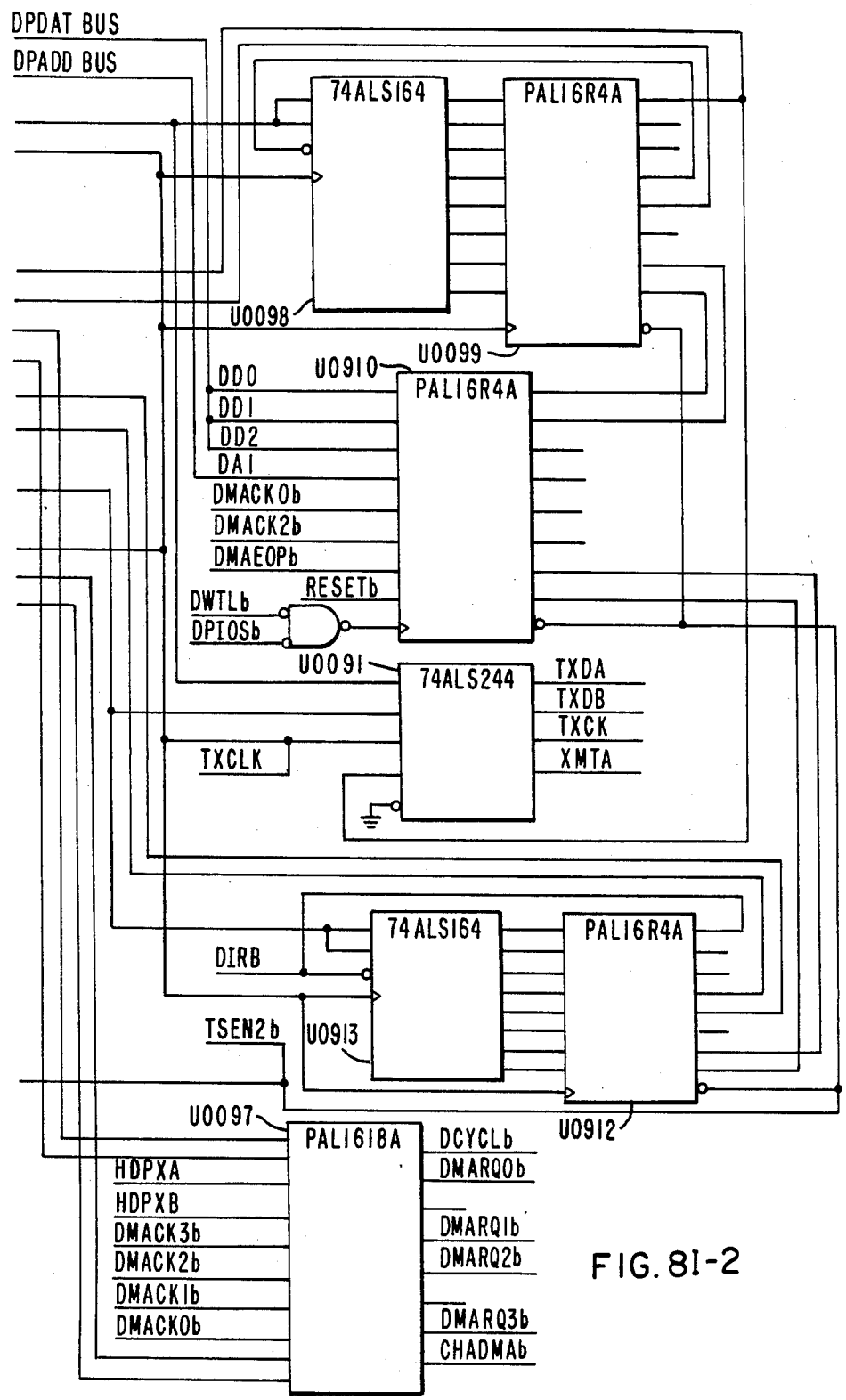
Figures 1, 8J:
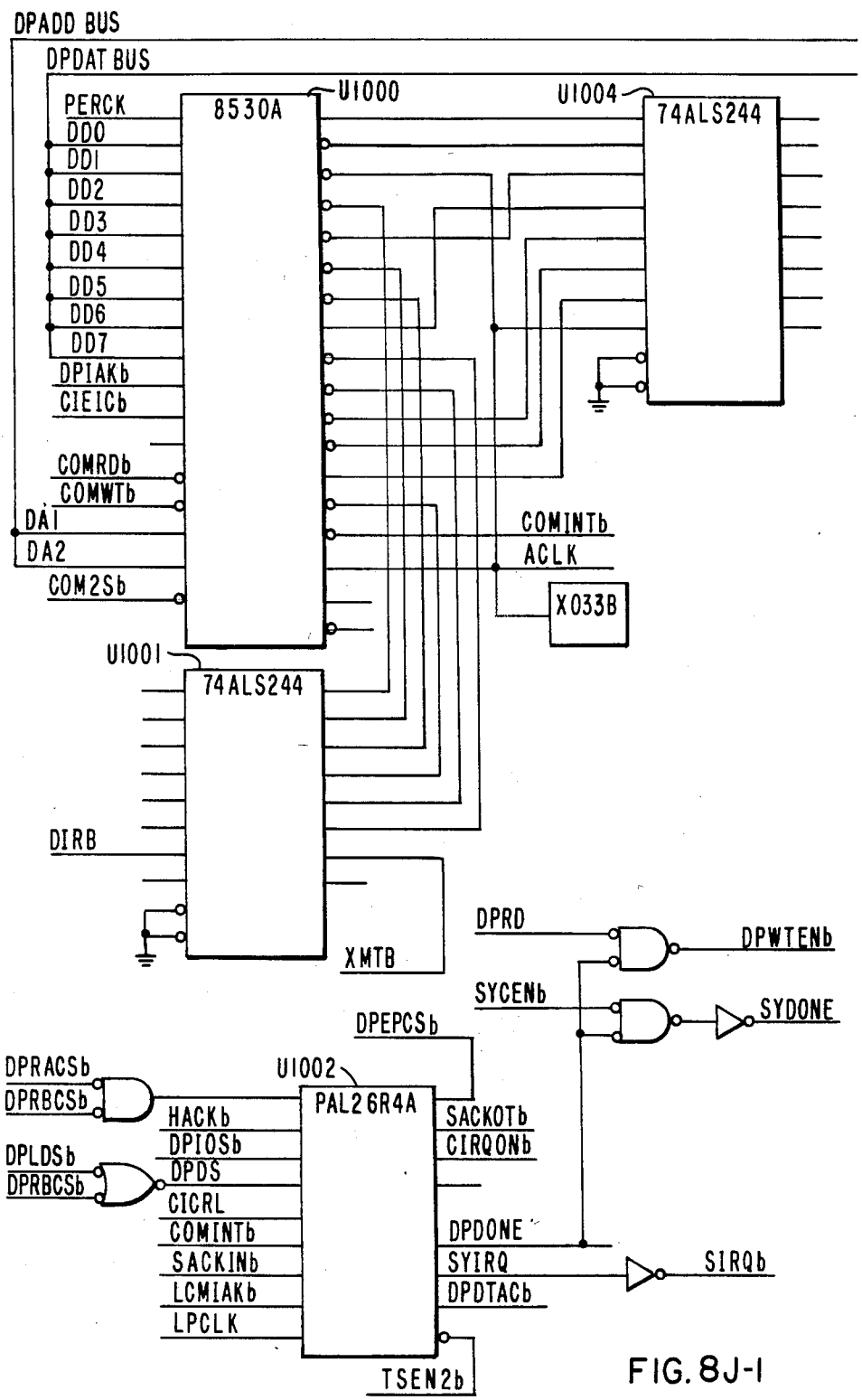
Figures 2, 8J:
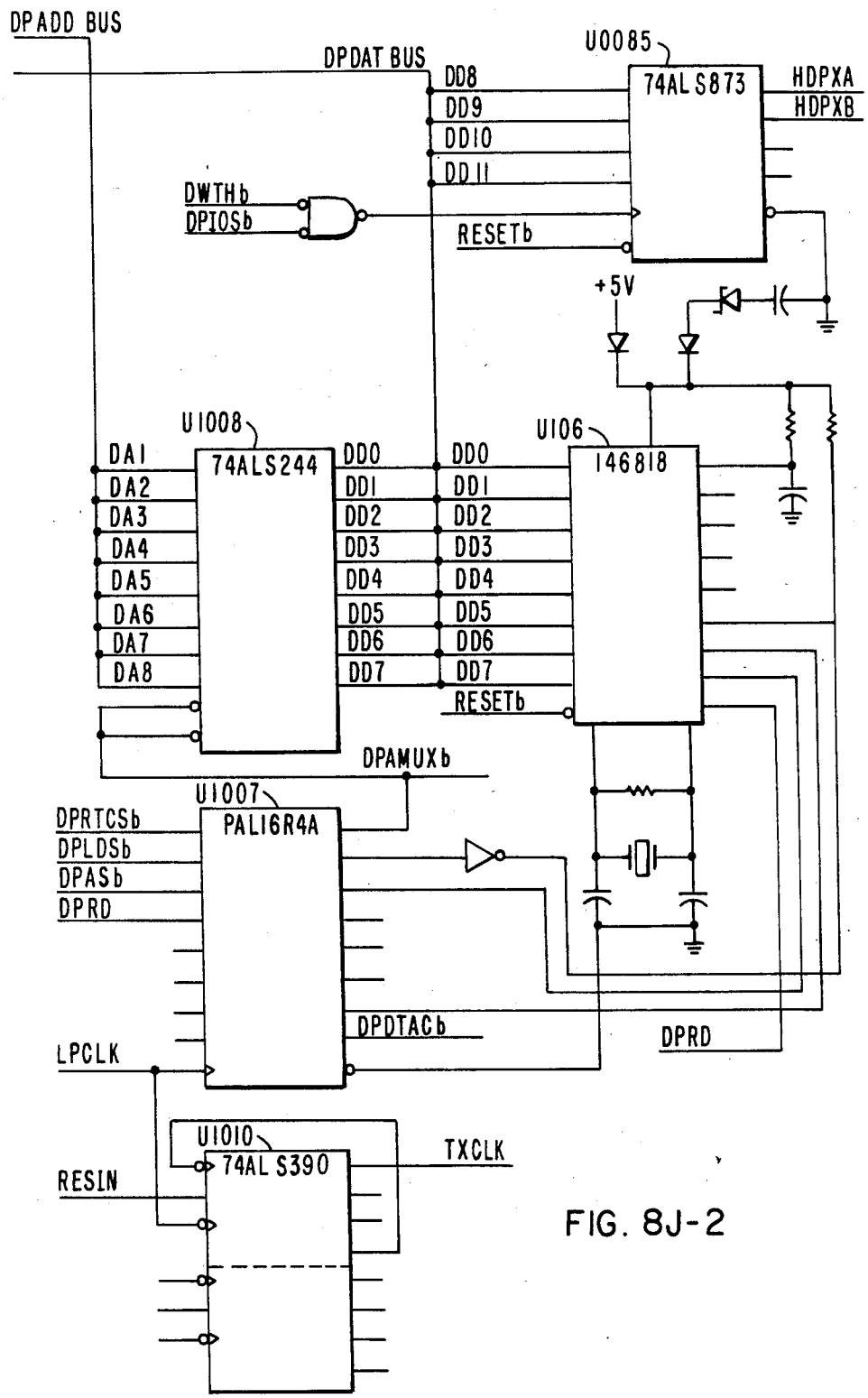
Figures 1, 8K:
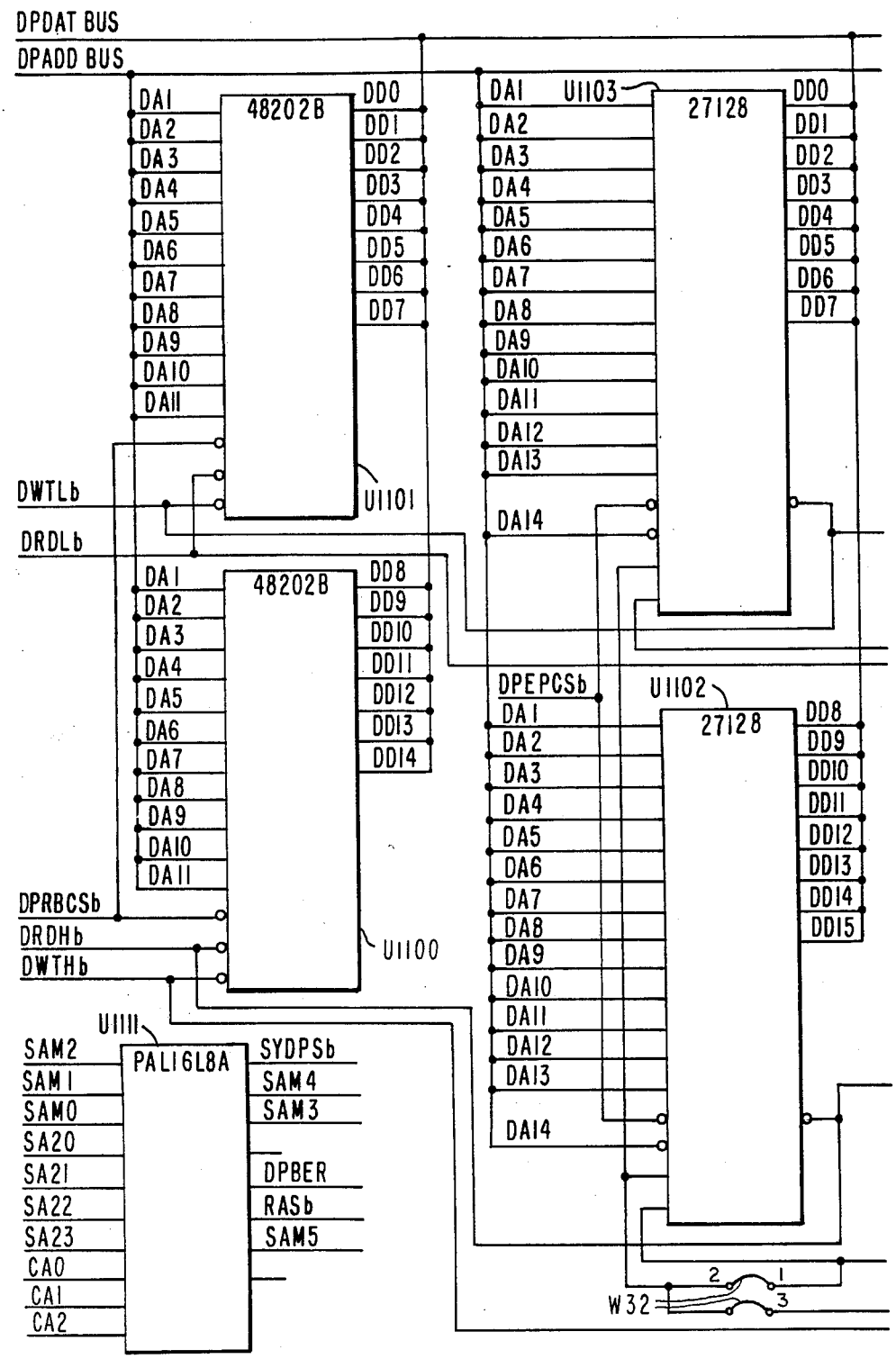
Figures 2, 8K:
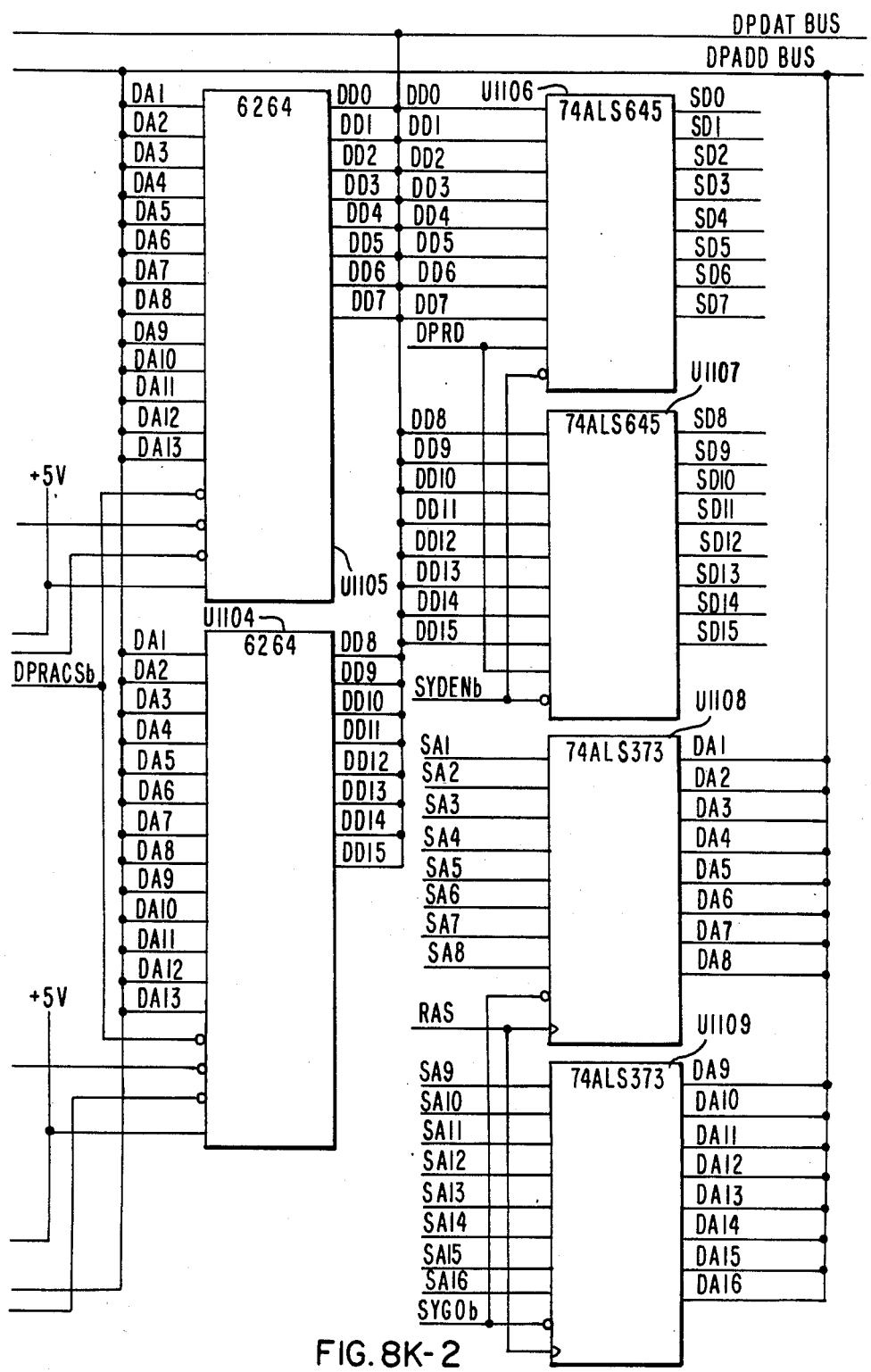
Figures 3, 8K:
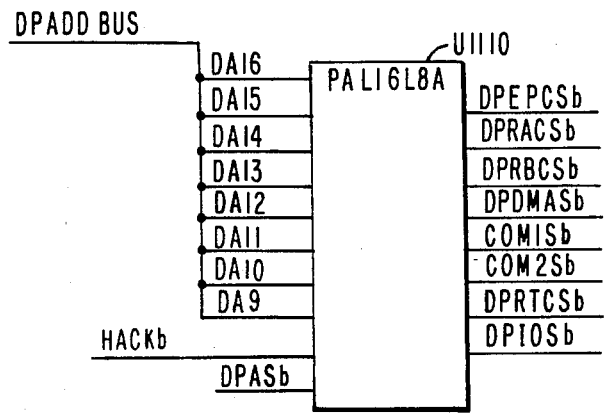
Figures 4, 8K:
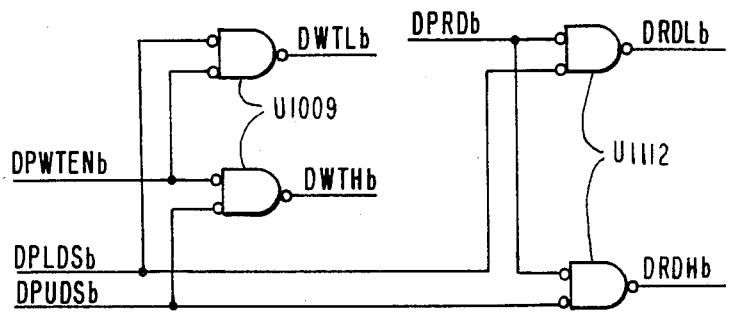

In FIG. 5, there is shown a digital control system 300A for multiaxis robots 302A which implements the control loop configuration of FIGS. 3 and 4. Thus, a stored robot program 304A is executed by an arm solutions computer 306A to generate digital position commands for a position/velocity control computer 308A.

The position/velocity computer 308A operates on the digital position commands and digital motion feedback from a position/velocity feedback system 310A to generate digital current or torque commands for a torque control computer 312A. The torque commands and digital motor current feedback 314A from power switches 316A are processed by the torque computer 312A to generate digital voltage commands for the drive motors that operate all of the robot joints (six in the preferred embodiment).

Power switching control is achieved digitally by a pulse width modulator 318A that develops on/off signals timed to operate the power switches so as to produce effective motor voltages that satisfy the voltage commands.

With the described digital architecture, the robot control 300A enables better operating adaptability in setting control loop parameters; and effector force control which provides robot arm dexterity; better robot control performance in terms of functions, speed and accuracy; better adaptability to variable customer needs, i.e., more universality in level of performance and scope of functions; and better adaptability to accommodating design changes required from time-to-time to implement advancing robot technology.

The overall electronic board organization employed in the preferred embodiment to implement the new completely digital robot control is described in the next section.

OVERVIEW-ELECTRONIC BOARDS

Figure 6:
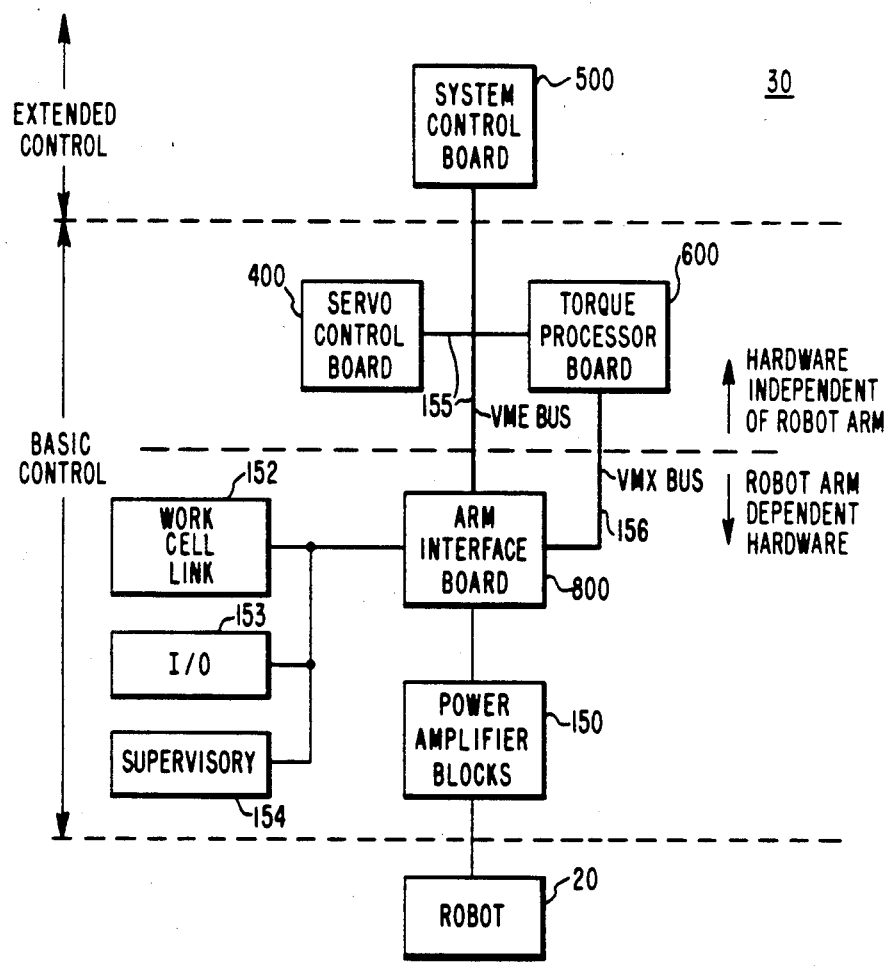
FIG. 6 shows an overview of an arrangement of electronic boards on which circuitry is arranged to implement the robot control system including the pulse width modulation circuitry of the present invention.

Implementation of the control looping for the robot control 30 in FIG. 6 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of use, and flexibility in choice of level of control performance.

As shown in FIG. 6, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 6) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

SERVO CONTROL BOARD

A servo control module (SCM) or board 400 (FIGS. 6 and 7A-1, A-2) is structured in accordance with the modular architecture of the robot control system to operate as a core board for a complete basic robot control and generate arm solutions from stored robot program commands or to operate as part of an expanded robot control and receive for implementation arm solutions produced from robot program commands by the higher level system control board 500. The generation of arm solutions involves the execution of robot control functions including robot program language interpretation, path planning, trajectory calculations (intermediate position commands and axis coordination) and transformation of position information between Cartesian and robot joint and robot tool coordinate systems. The SCM board 400 additionally provides communications interfacing with related peripherals and a host controller if provided.

The SCM board 400 is provided with program controlled digital circuitry to implement arm motion control loops for the robot control system. Motion control is achieved for each axis through a control loop arrangement which preferably includes interrelated position, velocity, and acceleration control loops from which torque commands are developed for implementation by the torque processor module 600. The digital servo control is a coordinated multiprocessor servo control that generates output torque commands from (1) position and velocity commands provided for each axis by the arm solution and (2) position and velocity feedback signals obtained from the position encoders and the tachometers through the arm interface module 800.

In the SCM control loop operation, a position error is calculated for each axis from the applied axis position command and the axis position feedback. A velocity error is calculated for each axis from a velocity command derived from successive position commands and from the axis velocity feedback. Preferably, the position and velocity control loops are operated in parallel, i.e., the position and velocity errors are summed to produce a torque command for the torque control loop on the torque control module 600. Additionally, an acceleration command preferably is derived from successive velocity commands and applied in a feedforward acceleration control loop which generates an acceleration based torque command for summation with the position and velocity errors in generating the SCM output torque command.

The frequency with which loop calculations are made is selected to produce robot arm motion which is fast, accurate, smooth and stable. For example, the frequency employed can be such as to provide a trajectory cycle of 32 milliseconds as in the present case. If desired, a faster trajectory cycle, i.e., as short as 8 milliseconds, can be achieved.

SCM DIGITAL CIRCUITRY

Figures 1, 7A:
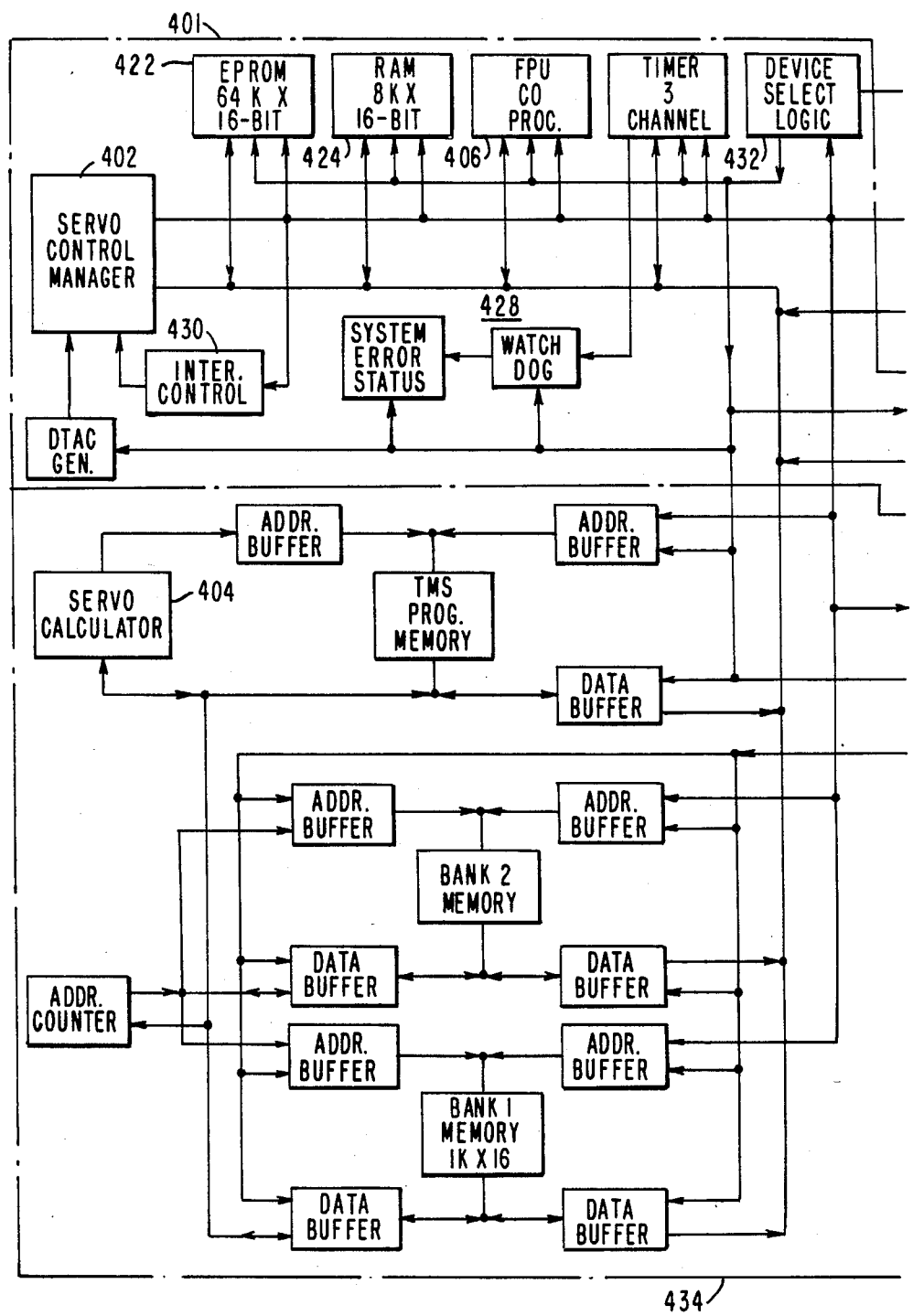
Figures 2, 7A:
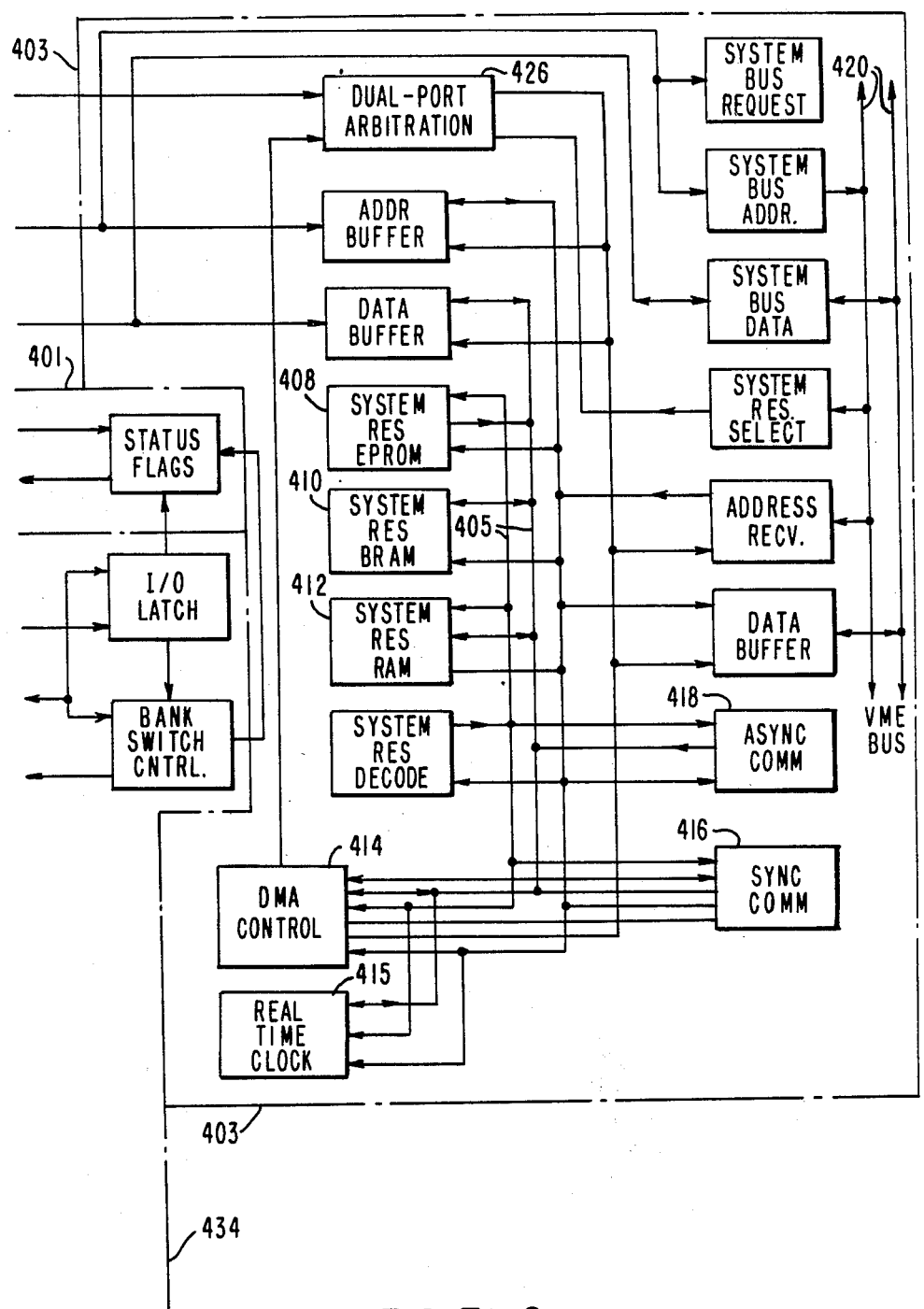

As observed in FIGS. 7A-1, A-2, the SCM board 400 generally comprises two sections, i.e., a local processor section 401 and a system resource section 403. The system resource section 403 employs a bus 405 and provides functions related to the overall robot control system and not specifically related to execution of the position and velocity control loops.

These functions include EPROM 408 for storage of the robot arm solutions, battery back-up RAM 410 for storage of non-valatile data, static RAM, 412 real-time clock, 415 a DMA controller 414 and two multi-protocol, dual channel communications controllers 416 and 418.

The system resource area is implemented as dual-port memory. As such, equal access to the system resource section is provided from either a local processor 401 or from the VME bus 420. The system resource functions appear as a bus slave to the VME bus. This provides the capability for these related functions to be controlled either from the SCM local processor, or from an optional processor connected to the system bus.

In the local processor section 401, the SCM digital circuitry includes coordinated digital coprocessors and interface and resource circuitry needed for specified performance, i.e., to provide control calculations and control data management needed for accurate and efficient control of all axes and to provide interfacing communication with a host controller, peripheral devices and other robot controllers. Preferably, a servo control manager 402 operates with a servo calculator 404 which functions as a slave processor principally to make position and velocity control loop calculations (i.e., feedback filters, loop gains, position and velocity errors, etc.).

The servo control manager 402 directs control, status and program data to and from the SCM board 400 and to and from the servo position/velocity control calculator 404. The servo control manager 402 can be a Motorola 68000 which has a high data processing capability. By separating data management and control calculation tasks in accordance with the respective capabilities of the processors 402 and 404, a basic circuit organization is provided as a basis for achieving substantially improved control performance with manufacturing and user economy.

In the illustrated embodiment, implementation of the local processor section of the SCM board 400 is based on usage of a 68000 processor as the servo control manager 402 and two coprocessors. Both coprocessors serve as peripheral devices to the 68000. One of the coprocessors 406 (preferably National Semiconductor 32081), provides floating-point calculation capability when arm solutions are to be provided by the SCM board 400. The other co-processor, or slave processor, is the position/velocity servo calculator 404 and is implemented with a Texas Instruments TMS-32010 Digital Signal Processor. The position/velocity processor provides high speed fixed point calculation capability.

The remaining functions which are a part of the local processor section include local memory, both EPROM 422 and RAM 424, a peripheral timer/counter device, interrupt control 430, and system error monitoring devices 428. The servo control manager 402 of the local processor 401 can serve as a master to the VME bus for access to the TPM or other related type functions. However, the SCM board 400 does not provide VME bus system controller type functions which normally include system reset generation, bus arbitration for access to the bus and system bus clock generation, since these functions are implemented on the arm interface board 800.

The SCM board 400 is arranged to provide as much systems flexibility as is reasonably possible, and to obtain the maximum performance from available large scale integrated (LSI) circuitry. This is one of the reasons that the DMA and communications facilities are implemented in the system resource area as opposed to being directly connected to the local processor bus. This architecture not only frees the servo control manager 400 from direct intervention in communications data movement, it also eliminates the local processor bus communications related overhead, thus allowing high speed serial communications to be conducted without significant impact on program execution time in the servo control manager 400. Also, by placing these functions in the system resource area, these facilities can be operated by any other optional processor with capability of serving as a VME bus master. This would then totally free the servo control manager 400 from communications related processing. This organization allows the complete functionality required for a robot control system to be implemented in a cost effective manner and on a minimal set of boards while also allowing increased performance controllers to be implemented without impacting the overall system design.

Another significant area is the interface between the servo control manager 402 and the servo calculator 404. Here, a special dual port memory organization, referred to as "ping-pong" or "bank switched" memory allows either processor to communicate with the other without impacting the processing performance of either processor.

PROGRAMMED OPERATION OF SERVO CONTROL BOARD

As schematically shown in FIGS. 7B through 7I, the program system for the servo control data manager 402 of FIG. 7A-1 comprises a background program 450 called MAIN and a cyclically operated foreground interrupt routine 452 called SERVO. When the system is started as indicated to RESET, an initialization routine 453 is executed prior to continuous running of the MAIN program 450. In addition to the cyclically executed SERVO interrupt 452, an interrupt routine 454 called C&UNEX operates in the foreground on demand to process unscheduled or unexpected interrupts. Further, a special highest priority routine 457 called the watch dog timer interrupt functions in response to opertion of the external watch dog hardware.

Where the robot control system includes the system control board 500 in FIG. 6 for higher performance through higher computing capacity, the MAIN program provides for receiving and distributing position commands from the system control board 500. In the minimum or basic robot control system configuration, the system control board 350 is not included and the MAIN program 450 further performs arm solutions to generate position commands locally on the servo control board 400. Additional description on the minimum robot control is presented subsequently herein.

Figure 7B:
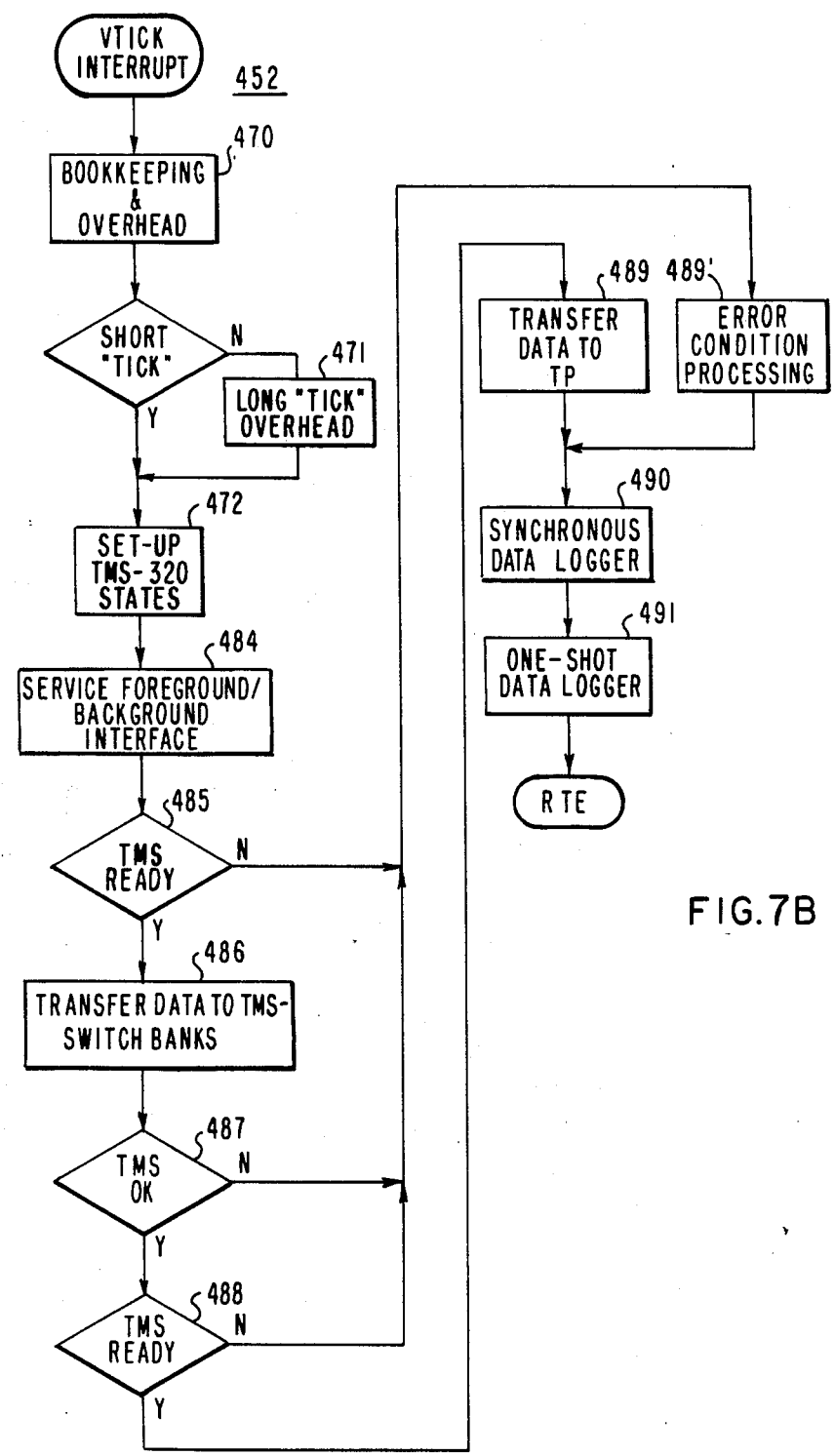

The rate at which the MAIN program 450 is interrupted for the cyclical execution of the SERVO routine 452 is controlled by the signal VTICK generated once each millisecond on the VME bus 155 from the arm interface board 800. The basic functions provided by the SERVO routine 452 better shown in FIG. 7B are:
(1) transfer control data to and from the servo calculator 404;
(2) transfer control data to and from the torque processor board 600;
(3) receive sensor feedback data over the VME bus 155 from the arm interface board 800;
(4) interface 456 to the supporting background task RDMASC in FIG. 7F;
(5) perform F146 synchronous data logging in FIG. 7H;
(6) perform F162 one shot data logging in FIG. 7I
(7) place broadcast data in a blackboard storage area;
(8) shut the system down if serious error conditions occur.

In the servo calculator 404, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithms executed by the servo calculator are described in greater detail in Ser. No. 932,990.

SYSTEM CONTROL BOARD

For more detail on the system control board, reference is made to Ser. No. 932,991.

GREATER DETAIL-SCM BOARD DATA MANAGER SIGNAL INTERFACE

The input and output signal interface provided by the servo cotnrol manager 402 in FIG. 7A-1 can be classified in functional groups consisting of an address bus, a data bus, asynchronous bus control, bus arbitration control, interrupt control, system control, Motorola 68000 peripheral control and processor status.

The LPADD address bus (A1 through A23) better seen in FIG. 8A-1, is a 23-bit, unidirectional, three-state bus. It provides the address for bus operation during all 68000 cycles except interrupt cycles. During interrupt cycles, address lines A1, A2, and A3 provide information about what level of interrupt is being serviced while address lines A4 through A23 are all set to the logical "1" state. The data bus (D0 through D15) is a 16-bit bidirectional, three-state bus. It provides the general purpose data path for interface with the 68000. The data bus supports transfers of either word or byte length. During an interrupt acknowledge cycle, an external device supplies the vector number on data lines D0–D7. This number is then multiplied by four, or left shifted two places, to provide the 68000 memory vector location from which the associated interrupt routine starting location is obtained.

The asynchronous bus control signal group consists of an address strobe signal (ABb), a read/write signal (R/Wb), two data strobe signals (LDSb), (UDSb) and a data transfer acknowledge signal (DTACKb). The ASb signal, asserted low, indicates that there is a valid address on the address bus. Note that this signal is also asserted during interrupt acknowledge bus cycles. The R/Wb (also shown in FIG. 8A-1 as LPRD) signal defines the direction of data transfer during bus cycles, and is asserted low for processor write cycles. The LDSb and USDb signals, asserted low, control the data transfer on the data bus. LDSb is associated with the least significant btye and UDSb is associated with the most significant byte of data. Assertion of these signals indicate that data is to be either accepted from or applied to the data bus as defined by the state of the R/Wb signal line. The DTACKb signal, asserted low, indicates that the processor bus cycle can be terminated. It is to be noted that for proper 68000 operation, the DTACKb signal must also be non-asserted after the bus cycle is terminated.

The bus arbitration control signal group consists of three signals, bus request (BRb), bus grant (BGb), and bus grant acknowledge (BGACKb generated but not shown in FIG. 8A-1). These signals form a bus arbitration circuit to determine which device 68000 or other device, will serve as bus master. The BRb signal, asserted low, indicates to the 68000 that some other device requires service as a bus master. The BGb signal, asserted low output form the 68000, is used to indicate to other potential bus masters that the 68000 will release bus control at the end of the current bus cycle. It is to be noted that potential bus masters must wait until the bus has gone idle after receiving the asserted BGb signal before actually assuming control of the bus. Idle bus condition is indicated by the signals ABb, LDSb, UDSb, DTACKb, and BGACKb all being in the non-asserted state. The BGACKb signal, asserted low, indicates to the 68000 that some other bus device has become the bus master. This signal must not be asserted until the asserted BGb signal has been received by the potential master and the bus is in the idle condition as described above. In the SCM design, the 68000 is the only bus master for the local processor bus. Therefore, the BRb signal line is hardwired to the non-asserted state.

The interrupt control signal group consist of signal lines IPL0b, IPL1b, and IPL2b. These signal lines are encoded, low true, to indicate the priority level of the device requesting interrupt service. Level seven is the highest priority, and represents the non-maskable interrupt condition. IPL0b represents the least significant bit and IPL2b represents the most significant bit. The interrupt mask field of the 68000 status register must be set to a priority level that is at least one less than the priority level encoding of the IPL lines for the interrupt to be serviced by the 68000. This is true for all priority levels with the exception of the non-maskable interrupt, priority level seven. Thus, acknowledgement of a priority level six interrupt requires that the 68000 mask register be set to level five or lower.

The system control signal group are used to either reset or halt the processor and to indicate to the processor thus bus errors have occurred. The three system control signals are bus error (BERRb), reset (RESETb), and halt (HALTb). The BERRb, asserted low, is used to inform the 68000 that something is wrong with the bus cycle currently being executed. In the SCM design, this signal is only generated in the case where devices do not acknowledge the transfer by asserting DTACKb within eight microseconds. The RESETb signal, asserted low, is an open collector type bidirectional signal. This signal is used by the system to reset the 68000. Assertion of this signal by the 68000 will cause all circuitry external to the 68000 to be initialized, but the 68000 will not itself be initialized. Recognition by the 68000 that it is to be initialized asserting both RESETb and HALTb. In this case, the 68000 force execution of the instruction whose address is contained in interrupt vector location 0. The HALTb signal, asserted low, is driven by external circuitry to cause the processor to stop at the completion of the current cycle. In the SCM design, this signal is only asserted to force 68000 initialization.

The processor status signal group consists of signals FC0, FC1 and FC2. These signals are encoded by the 68000 to provide information regarding the type of cycle currently being executed. The state of these signal lines is only valid during the time that ASb is asserted. The interrupt acknowledge cycle is indicated by these signal lines being in the all high state when ASb is asserted.

The M6800 signal group are provided for interface between the 68000 and 6800 type synchronous peripherals. This signal group consist of enable (E), valid peripheral address (VPAb), and valid memory address (VMAb). The E signal provides a clock signal that is low for six 68000 clock cycles and high for four 68000 clock cycles. In the SCM design this signal is used to provide a 1 megahertz clock signal for bus error timing. The VPAb signal, asserted low input, is used in he SCM design to force the 68000 to auto-vectoring for interrupt processing. In auto-vectored interrupt processing, the 68000 uses a vector location defined by the interrupt priority level to obtain the starting address of the interrupt service routine. It is to be noted that circuitry external to the 68000 must not assert the DTACKb signal during interrupt acknowledge cycles for which the VPAb signal line is to be asserted. The VMAb signal is not used in h SCM design.

It is to be noted that the circuitry necessary for interface between various peripheral devices and the 68000 require a significant amount of "glue" logic. In the implementation of the SCM, this functionality, as much as possible, is implemented in programmable array logic PAL). Usage of PAL reduces the overall number of packages required and provides capability for significantly changing the design in critical areas without necessitating printed circuit board artwork changes. Design equations for the PAL devices are given in the Appendix of Ser. No. 932,991.

SERVO CALCULATOR SIGNAL INTERFACE

The TMS 320 processor 404 in FIG. 7A-1 utilizes a modified "Harvard" architecture for speed and flexibility. In a strict Harvard architecture, program and data memory lie in two separate spaces, permitting a full overlap of instruction fetch and execution. The TMS 320 provides very high speed fixed point computational capability as it uses internal hardware to implement functions that other processors typically perform in software or microprogrammed firmware. As an example, the TMS 320 contains a hardware multiplier to perform a 16×16 bit multiplication in 200 nanoseconds. There is also a hardware barrel shifter for shifting data on its way into the ALU. This permits alignment of data and multiplication to be performed in a single instruction.

The input and output signal interface provided by the TMS 320 can be classified in functional groups consisting of an address bus, a data bus, transfer control and system control.

The address bus (A0 through A11) better seen in FIG. 8D-1 is a 12-bit unidirectional bus. It provides the address for bus operation during all TMS 320 cycles. During input/output cycles, address lines A0, A1 and A2 provide information about what port is being addressed for interchange of data, while lines A3 through A11 are all set to the logical "0" state. This provides the capability of addressing 4K words of program memory and eight peripheral or I/O ports. The data bus (D0 through D15) is a 16-bit bidirectional, three-state bus. It provides the general purpose data path for interface with the TMS 320. The data bus only supports transfers of word length, 16 bits wide, fields of data.

The transfer control signal group consists of a program memory read enable signal (MEMb), a data memory read enable signal (DENb), and a write enable signal (WEb). The MEMb signal, asserted low, to enable instruction fetches from the program memory. The DENb signal, asserted low, indicates that the TMS 320 is accepting data over the data bus from the addressed I/O port. The WEb signal, asserted low, indicates that data from the TMS 320 is available on the data bus. Note that this signal line is asserted for all external chip write operations. Distinction between program memory and I/O operations must be made by decoding the state of the address bus. A condition where address lines A3 through A11 are all zero indicates to external devices that the data is to be directed to an I/O device. It is to be noted that the TMS 320 does not provide capability for wait state generation. Accordingly, all external devices interfaced to the TMS 320 must respond appropriately within the TMS 320 bus cycles.

The system control signal group consist of a reset signal (RSb), an interrupt signal (INTb) and a branch control status input signal (BIOb). The RSb signal is asserted low to force initialization of the TMS 320. The TMS 320 data bus is held in the tri-state condition during the time that RS is asserted. However, note that the address bus is always actively driven by the TMS 320, even during assertion of RSb. The INTb signal is used by external devices to indicate requirement for interrupt service. Interrupts are recognized by the TMS 320 by applying a signal with a negative going edge to the INTb pin. The TMS 320 further requires that the signal be asserted low for a minimum of one clock cycle flowing the negative transition. The BIOb signal input pin is used for program branch control. If the BIOb signal is low asserted upon execution of the BIOZ instruction, the TMS 320 will transfer program control to the address specified by the instruction.

FLOATING POINT CALCULATOR SIGNAL INTERFACE

Floating point calculation capability is provided through usage of a floating point coprocessor 406 in FIG. 7A-1. At SCM design time, the Motorola floating point coprocessor was not in production. In review of available devices, it was found that the floating point coprocessor (32081) in the National Semi-Conductor processor family offered the next best choice for usage with the 68000 processor. This device 406 is interfaced as a peripheral to the 68000.

The input output signal interface associated with the 32081 consist of a data bus, two status signal lines (ST0, ST1), a control signal line (SPCb), and a reset signal (RSTb). The data bus (D0 through D15) is a 16-bit bidirectional, three-state bus. It provides the general purpose data path for interface with the NS32081. The data bus only supports transfers of word length, 16 bits wide, fields of data. The status input signal lines are used to indicate the type of transfer that is to be conducted with the coprocessor. These signal lines are connected to the 68000 address signal lines A4 through A5 respectively. The SPCb control signal line is a bidirectional, low asserted, signal used as a data strobe signal for bus transfers to and from the coprocessor. This signal line is also asserted by the coprocessor to provide indication that a requested operation has been completed.

LOCAL PROCESSOR SECTION

Circuitry associated with the local processor is shown in FIG. 8A-1. This circuitry as better seen in FIGS. 8A-1 and A-2 consists of the local processor (U0008), the clock generator (Y1, U0001), interrupt encoding (U0006), local processor device selection (U0009, U0010), system bus short address signal generator, SHADDb shown in FIG. 8A-1 DTAC signal generation (U0012), and local processor bus transfer time out detector (U0007). A 20 MHz oscillator (Y1) is used to generate the master clock. This frequency is divided by two by U0001 which results in generation of the 10 MHz local processor clock signal. The gates associated with U0001 are provided for manufacturing test purposes. Pin 3 of U0002 can be grounded by a test probe to disable the oscillator. An external frequency can then be injected on pins 1 and 2 of U0002 for testing purposes.

Circuitry associated with device U0004 comprise the local processor reset function. The high asserted signal RESIN, received from the VME bus, forces both RESETb and HALTb signals to the 68000 to be asserted. This condition forces the 68000 to be initialized and forces it to execute the reset vector. The 68000 reset signal pin is bidirectional. Execution of a reset instruction by the 68000 will force the RESETb signal to be asserted without assertion of the HALTb signal. This condition permits the 68000 to reset the remainder of the SCM circuitry without itself being reset. Implementation of this function requires U0004 to be an open collector device.

DEVICE SELECTION

Local processor device selection logic 432 in FIG. 7A-1 is provided in device U0009 and device U0010 as shown in FIG. A8-2. The inputs to devices U0009 consisting of local processor address bus bits 23 through 14, and the LICYLb signal. LICYLb signal being asserted indicates that an interrupt acknowledge cycle is being executed by the 68000. Assertion of this signal prevents assertion of any of the outputs of U0009. Execution of an interrupt acknowledge cycle is indicated by 68000 function lines, FC2—FC0, being in the all ones state. This condition is decoded by U0002 to generate the LICYLb signal. LIOENb, local I/O enable, signal is used as an enable input to device U0010, which further decodes the local processor address bits 13 through 9 to generate the local timer and floating point coprocessor select signals. The following table provides a listing of memory map for the SCM local process:

| | | |
|---|---|---|
| 000000 to 00FFFF | LE1CSb | Local Processor EPROM No. 1 Pair |
| 010000 to 01FFFF | LE2CSb | Local Processor EPROM No. 2 Pair |
| 020000 to 02FFFF | DPECSb | System Resource EPROM |
| 030000 to 033FFF | DPRBSCb | System Resource BAT RAM |
| 034000 to 037FFE | LPDPSb | System Resource RAM |
| 038000 to 038FFE | LRCSb | Local Processor RAM |

-continued

| | | |
|---|---|---|
| 03C000 to 03C7FE | LTBSELb | Local Processor TMS Bank Memory |
| 040000 to 041FFE | LTPSELb | Local Processor TMS Prog. Memory |
| 080000 to 083FFE | LIOBSb | VMX Bus |
| 07Exxx | LIOENb | Local Processor I/O |

Device U0011 in FIG. 8A-2 is used to detect the condition where an address of FFxxxx is being addressed for a transfer. The output of this device is the signal SHADDb, which is then used by the VME bus interface to generate the "short address transfer" address modifier function code. This signal is used by VME bus slave devices to indicate that only the lower 16 bits of the address bus are to be used for device selection.

Device U0012 is associated with generation of the local processor DTACb signal. This device will cause the DTACb signal to be asserted for local processor selection of devices which within their own control do not assert the DTACb signal. Devices which generate their own DTACKb signal include system resource area, and the VME bus interface. It is to be noted that U0012 also provides DTACb signal timing required for insertion of the proper number of wait states associated with the selected devices. Presently, all devices with the exception of the local EPROM and the timer require zero wait states, and the EPROM and timer both require one wait state. Device U0012 has one conditional signal input in addition to the device selection and bus control signal lines. This signal, FRESb seen input to U0012 in FIG. 8A-2 is used to provide indication that the TMS 320 is being held in the reset condition. Invalid transfers will occur if attempt is made to transfer data between the local processor and the TMS 320 program memory without the TMS 320 being reset. Device U0012 indicates invalid bus cycles by not asserting the DTACKb signal. This will then result in assertion of the LPBERb signal which will cause execution of the bus error exception vector. Device U0007 provides for generation of the local processor bus error signal. This device is clocked by the E clock signal, approximately 1 MHz, generated by the 68000. The shift register is reset by local processor address strobe signal being non-asserted. Assertion of LPASb in FIG. 8A-1 allows a "1" to be shifted through the shift register. If LPASb remains asserted for more than 8 microseconds, indicating that DTACb has not been asserted, the LPBERb signal will be asserted.

A diagram illustrating the timing associated with generation of DTACKb by device U0012 is given in FIG. 8A-2. Three bus control signals are used as inputs for generation of DTACKb. These signals are local processor address strobe (LPASb), local processor lower data strobe (LDSb), and local processor upper data strobe (UDSb). LPASb is used to start the timing sequence during which DTACKb is to be asserted, and the data strobe signals are used to terminate assertion of the DTACKb. Note that the DTACKb signal is actively driven to the non-asserted state for one clock cycle before being released to the tri-state condition by U0012. This is necessary to ensure 6800 timing specifications are satisfied.

INTERRUPT CONTROL

The device 428 in FIG. 7A-1 receives the interrupt request lines, and encodes these lines to produce the prioritized interrupt request for the processor 402. The following are the interrupts and associated priority levels. Level 7 is the highest priority interrupt.

| Signal | Priority | Function |
|---|---|---|
| LPNMIb | 7 | Non-maskable interrupt |
| LPCMIb | 6 | Communications Controllers Interrupt |
| VTINTb | 5 | System TICK interrupt (1 millisecond rate) |
| RBINTb | 1 | VME bus general purpose interrupt |
| TIMINTb | 3 | Local timer generated interrupt (software controlled) |

Interrupt processing by the processor 402 can be either vectored or auto-vectored. The distinction between vector or auto-vectored is determined by the state of the valid peripheral address signal VPAb when the interrupt acknowledge cycle is executed. Assertion of the VPAb signal indicates that the interrupt vector is to be obtained from an auto vector table processor 402. If the VPAb signal is not asserted in the interrupt acknowledge cycle, the processor 402 inputs the state of data bus bits 0 through 7, shift this value two places to the left, and use the resulting number for exception table entry. Presently, all interrupts are auto-vectored, with the exception of the general purpose VME bus and the communications interrupt. Both VPA and DTACKb signals must not be asserted during the interrupt acknowledge cycle. The other inputs to the interrupt controller 430 include local processor address bits A1 through A3, and the interrupt acknowledge signal gated by LPASb. During the interrupt acknowledge cycle, the local processor address signal lines A1 through A3 indicate the interrupt level being acknowledged. These signal lines are decoded to generate the specific interrupt acknowledge signal. The interrupt requests for which specific interrupt acknowledge signals are generated include the VME bus tick interrupt (VTICKb), the communications interrupt (LCMIAKb), and the general purpose VME bus interrupt (SBIAKb) all shown in FIG. 8A-1. The other interrupts require some specific action to be performed in the interrupt routine to provide indication of interrupt acknowledgement.

LOCAL MEMORY

The local processor memory, illustrated in FIGS. 8B-1 and 8B-2, consists of six sockets. Four of these sockets are associated with EPROM, U0020, U0021, U0022 and U0023, and two of these sockets are associated with RAM, U0024 and U0025. The EPROM can be implemented with either 27128 or 27256 devices. Jumpers W1 for sockets U0020 and U0021, and W2 for sockets U0022 and U0023 are associated with EPROM device type usage. Pins 1 and 2 must be connected with usage of 27128 devices and correspondingly, pins 2 and 3 must be connnected with usage of 27256 devices. The local processor RAM is implemented with 8K by 8-bit devices. The gates associated with device U1209 provide the necessary gating of the data strobe signals with the 68000 read/write control signal to generate the write enable signals for the RAM devices.

COPROCESSOR

The circuitry required to interface the NS32081, floating point coprocessor 406, (FPU) of FIG. 7A-1 is seen as device U30 to the 68000 bus shown in FIG. 8C-1. The FPU data bus connects directly to the 68000 local processor data bus, and the FPU status lines ST0 and ST1, are directly connected to the 68000 address bus bits A4 and A5 respectively. The remaining interface is provided by the interface PAL, device U31. The primary interface between the 68000 and the FPU is associated with the SPC signal. SPCb is a low asserted, bidirectional signal used to provide data strobe information to the FPU for information transfer between the 68000 and the FPU, and is asserted by the FPU to indicate completion of and a FPU operation. Timing of the SPCb signal with respect to the FPU clock is critical for proper operation of the FPU. Proper transfer for write operations require that the SPCb signal only be asserted for one FPU clock cycle, and proper transfer for read operations require that the SPCb signal be asserted for two FPU clock cycles. This requires the DTACKb signal to be generated so that the 68000 performs these transfers with zero wait states.

The FPU interface PAL receives the local processor address strobe signal (LPASb), local processor read control signal (LPRDb), two FPU related device select signals (FPXFRb, FPPOLb), and the SCM board reset signal (RESETb). Device U31 actively drives the SPC signal during transfers between the 68000 and the FPU. Request for interchange of information with the FPU is indicated by signal FPXFRb being asserted.

Device U31 also provides capability for the 68000 to poll the status of the FPU for completion. The SPC signal is received by U31, and assertion of SPC by the FPU will cause a flip-flop internal to U31 to be set. The state of this flip-flop can be read by the 68000. Indication of the poll bus cycle is given by assertion of FPPOLb. This allows for the completion status of the FPU, internally latched in the PAL, to be gated onto the local processor data bus bit 15. It is to be noted that device U31 only actively drives LD15 in FIG. 8C-1 when the FPPOLb signal is asserted. The internal flip-flop is within U31 reset to the non-completed state whenever the 68000 interchanges information with the FPU.

Proper initialization of the FPU requires that the reset signal input make transitions synchronously with the clock signal. Accordingly, U31 synchronizes the FPU reset signal with the FPU clock signal.

COUNTER/TIMER

A three-channel counter/timer, Intel 8254A-2, device U32, is included on the SCM. Channel 0 of the timer is used in implementing the local processor "watch dog" time out function. Channel 1 of the timer provides a general purpose timer with the capability of producing a 68000 interrupt. Channel 2 of the timer provides a general purpose software configurable timer. The timer implementation is shown in FIG. 8C-1. Interface to the device requires that the address signal inputs be setup prior to assertion of the device read or write enable signals. The circuitry which ensures this requirement is satisfied for a read cycle is associated with devices U35 as in FIG. 8C-1. This circuitry delays assertion of the timer read enable signal, DEVOEb, by one clock cycle after assertion of the data strobe signal by the 68000. The 68000 bus transfer timing provides sufficient time between establishment of the address for the transfer and assertion of the data strobe signal on write operations. The minimum pulse width specifications associated with assertion of the read and write enable signals for the 10 MHz version of the 68000 requires usage in U32 of the "A-2" version of the 8254.

SYSTEM ERROR MONITORING

Figures 1, 8L:
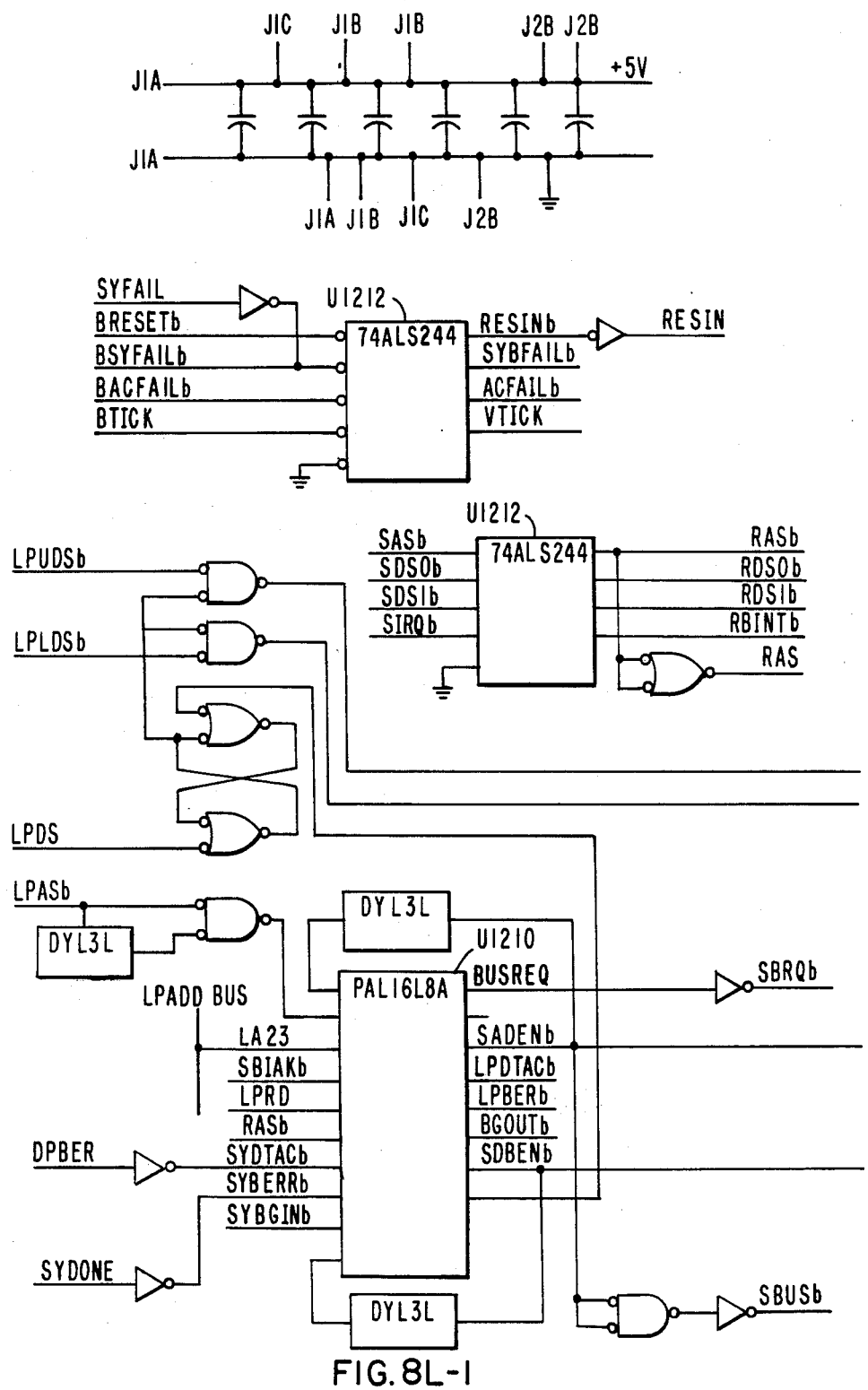
Figures 2, 8L:
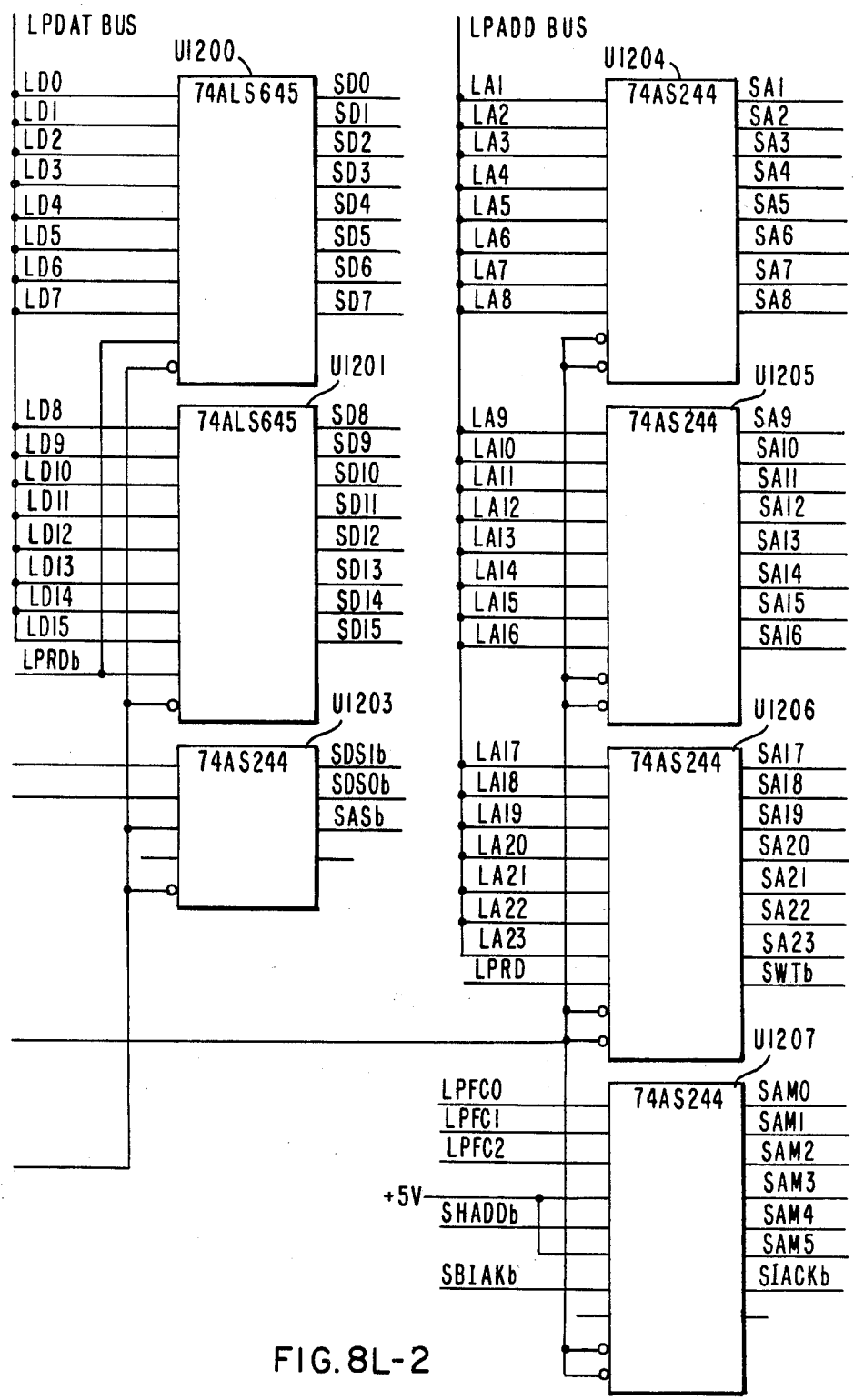

The VME bus 155 in FIG. 6 provides two system error signals BACFAILb and BSYSFAILb as shown in FIG. 8L-1. The SCM provides capability for monitoring these system bus error signals. The UNIVAL controller provides a multi-processor environment. Diagnostic testing by each of the modules is required to ensure that the controller is operational. Each of the UNIVAL processor based modules includes four operational states, diagnostic, test, on-line, and failed. Two "LED" indicators, one red and one green, are provided on each module to provide visual indication of the state of the module.

Initialization of the module, initiated by either the system bus reset signal or internal reset signal being asserted, places the module in the diagnostic state. In the diagnostic state, the red "LED" is on, and the module a local processor failed signal, which forces the assertion of the system bus, system failed signal. In the diagnostic mode, each processor performs internal diagnostics for self testing and for testing of the system bus interface. If the module serves as a system bus master, successful execution of self diagnostics will result in the module local processor entering the test state. This state is indicated by the red "LED" indicator being turned off. Coincident with this, the modules non-assert its local processor failed signal, which in turn forces the module to non-assert the system bus, system fail signal. Since the system bus, system failed signal is a "collector-or" type signal, it will only be non-asserted when all processor modules have entered the test state. Each processor must wait in the test state until the system bus, system failed signal, is non-asserted before entering the run state. The run state is indicated by the green "LED" being turned on. In the run state, the watch dog timer and system bus, system failed signals, non-maskable interrupt mask is disabled which permits non-maskable interrupts to the local processor to be generated upon assertion of these signals. Assertion of the watch dog time out signal will result in the module entering the failed state, which is indicated by the red "LED" being turned on, and in assertion of the system bus, system failed signal. Exiting from this state to the diagnostic state can only be accomplished by an initialization operation.

The SCM implementation of these functions is provided by PAL devices U33, U34, and associated circuitry shown in FIG. 8C-1. Device U34 provides system error and watch dog error status monitoring, generation of the logic signals for driving the LED indicators, and provides the logic implementation for generation of the non-maskable interrupt. This device also includes the logic for generation of the VME bus "tick", VTICK, interrupt. It will be noted that transition from the "test" state to the "run" state is made by enabling of the VTICK interrupt.

Device U33 provides capability for the 68000 to read the status of the error signals, and provides local processor address decoding associated with exiting from the diagnostic state. This device also provides further decoding of the local processor address bus signal lines A9 through A13 to generate the local processor peripheral select signal (LPERSb).

SERVO CONTROL DATA MANAGEMENT AND CALCULATIONS INTERFACE

THE PING-PONG OR BANK SWITCHED MEMORY

Digital interface circuitry 434 of FIGS. 7A-1 and 7A-2 enables control data to be transferred to and from the servo control calculator 404 under the control of the servo control data manager 402. As previously indicated, a signal processor having fast calculating capability like the TMS 320 is very efficient at performing computation operations. However, the TMS 320 program memory or I/O operations cannot easily be suspended as required to allow concurrent memory access by the processor 402. As such, the spatial digital interface circuitry 434 is needed to enable usage of the device 404 in a coprocessor application 402. These interface circuitries 434 provide the capability for the servo control manager 402 to load the program memory of the calculator 404 and provide a facility for interchange of data between the processors 402 and 404. Access to the calculator program memory by the data manager 402 requires the calculator 404 be in the reset condition, that is the calculator reset input must be asserted. The state of the calculator reset signal, in FIG. 8D-1 FRESb is directly controllable as a latched output from the servo control manager 402.

The primary interface for interchange of data between the processors 402 and 404 is provided by implementation of a concept referred to as bank switched memory. The bank switched memory consists of two identical, physically separate, 1K by 16-bit RAM arrays. These arrays are referred to as banks. From the data manager side, both banks are resident within the same memory address space and from the calculator side, both banks are resident within the same I/O address space. During the time that the reset signal is asserted to the calculator 404 both of the banks are controlled by the servo control manager 402, and any write to the bank memory results in writing both banks. However, a read from the bank results in reading data from the bank selected for the servo control manager 402 by the bank switch logic.

At any time that the calculator reset signal is non-asserted, ownership of one of the memory banks is associated with the servo control manager 402 and ownership of the other bank is associated with the calculator 304. Since the memory appears as a single 1K by 16-bit RAM, access to the memory by either processor is totally transparent to operations by the other processor. This provides for simultaneous access to the interface memory by both processors. Control and handshake signals are associated with switching of the bank ownership.

Four states are associated with the servo control servo control manager/calculator interface. These states are referred to as idle, go, processing, and done. Assertion of the calculator reset signal forces the interface to be in the idle state. The interface remains in the idle state until the go state is requested by the data manager 402. Bank switching can only be effected while the interface is in the idle state. A request for bank switching, at any other time is not performed until the idle state is reached.

In operation, the servo control manager 402 writes data including commands and data in the bank memory, requests a bank switch, and sets the go state. Switching of the banks makes this information available to the calculator 404. The calculator 404 detects the go state, sets the processing state, and operates on the data, writing the results back into the bank memory. Concurrently, the servo control manager 402 can write the bank memory with the next set of commands and data transparent to the calculator operation. The calculator 404 sets the done state upon completion of the required processing. The servo control manager 402 detects the done state, forces the idle state, and switches the banks to obtain access to the calculation results.

As previously stated, the bank switch memory appears as I/O locations to the calculator 404. Limitations in the number of I/O ports available necessitates usage of circuitry external to the calculator 404 for efficient usage of the bank switch memory. Four of the eight calculator I/O ports are associated with the bank switch memory and handshake flags. Address generation for access to the memory by the calculator 404 is provided by a binary up-down counter U0070, U0071 and U0072 as shown in FIG. 8G-1. The counter is operated in either post-decrement or post-increment mode. Execution of an output to port 0 results in the counter being loaded with the data value being output. This data value then serves as the bank memory address for the next bank memory operation. I/O ports 1 and 2 (associated with address lines 1 and 2 in software) are used for actual interchange of data with the bank memory. Operations on I/O port 1 result in either reading or writing of the bank memory with a post-increment of the memory address. Operations on port 2 result in either reading or writing of the bank memory with a post-decrement of the memory address. Thus, the memory address counter need only be preset with an address at the beginning of a series of read or write operations.

The TMS 320 BIOb pin and I/O port 3 are associated with the handshake interface with the 68000. The 68000 request the TMS 320 enter the GO state by outputting a hexidicimal data value of XXX1 to address 7EA07. This forces the TMS 320 BIOb signal pin in FIG. 8D-1 the a logical "1". The TMS 320, under software execution, acknowledges reception of the "GO" state by outputting a data value of XXX1 to I/O port 3. This provides indication to the 68000 that the TMS 320 has entered the "processing" state. After completion of the required processing the TMS 320 sets the DONE state by outputting a XXX2 to I/O port 3. The 68000 then forces the IDLE state by outputting a XXX0 to address 7EA07. Indication of the IDLE state is reflected by the BIOb signal pin being at a logical "0".

Circuitry associated with the TMS 320 processor is shown in FIGS. 8D through 8G. Circuitry shown in FIG. A4 is associated with the TMS 320 processor and program memory. Circuitry shown in FIGS. 8E and 8F is associated with the bank switch memory. Circuitry shown in FIG. 8G is primarily associated with bank memory addressing generation and bank switch control logic.

The TMS 320 program memory, 4K by 16-bit, is implemented with static high speed, access time of 70 nanoseconds or less, RAM provided by devices U0042 through U0045 in FIG. 8D-2. Contents of this memory must be downloaded by the 68000 before the TMS can be allowed to begin program execution. Access to the TMS 320 program memory by the 68000 is only allowed when the TMS 320 is being held reset, FRESb signal asserted. The 68000 can force the TMS 320 to be reset by writing a 0 to location 7EA01. Writing a 1 to address 7EA01 will release the reset to the TMS 320.

Assertion of the FRESb signal to the TMS 320 will force the TMS 320 to be reset. During reset, the TMS 320 will force its data and control lines to the tri-state condition. However, the address lines are not tri-stated. Therefore, address buffers, devices U0041 and U0029 in FIG. 8D-1 are required to permit access to the program memory by the 68000. The TMS 320 provides three signals for external indication of the operation being performed. These signals are FMEMb, which is asserted for indication of a program memory read operation; FDENb, which is asserted for indication of an I/O read operation; and FWEb, which is asserted for indication of either a program memory or I/O write operation.

It is to be noted that circuitry external to the TMS 320 on the SCM supports program memory write operations by the TMS 320. However, since only one control signal, FWEb, is provided for external indication of a write operation, external address decoding is required to differentiate between program memory and I/O write operations. On the SCM, any write operation with the TMS 320 address bus bit A11 at a logical "1" is interpreted as a program memory write operation, and correspondingly, any write operation with A11 at a logical "0" is interpreted as a write to the I/O port address selected by address bus bits A0 through A2. Program memory write operations are performed through execution of the table write instruction. The memory devices used for implementation of the TMS 320 program memory provide two input control signals, write enable, WEb, and chip select, CSb in FIG. 8D-2. A memory read operation is performed by assertion of the CSb signal with the WEb signal non-asserted. A memory write operation is performed by assertion of both control signals. It is to be noted these devices do not provide an output enable signal. Therefore, assertion of CSb and WEb during memory write operations must be essentially coincident in order to prevent data bus contention between the memory devices and the data bus drivers.

The circuitry shown on FIG. 8D-2 of the schematics consisting of U0049, U0048, and U0074 in FIG. 8D-2 provides control signal interface to the TMS 320 program memory. This circuitry multiplexes the TMS 320 program memory control signals between either the 68000 or the TMS 320, depending on the state of the TMS 320 reset signal, FRESb. Byte operations from the 68000 are supported. The signal ENTPAb being in the logical "0" state indicate that the 68000 is attempting to access the TMS 320 program memory with the TMS 320 reset. This allows the 68000 write high, WTHIGHb, and write low, WTLOWb, signals shown in FIG. 8D-2 to be multiplexed to the write enable inputs of the respective bytes of TMS 320 program memory. This also allows the 68000 data strobe signals, LPUDSb and LPLDSb to be multiplexed the chip enable inputs of the respective bytes of the TMS 320 program memory. ENTPAb being in the logical "1" state selects the TMS 320 related control signals for multiplexing to the TMS 320 program memory control lines. The write enable input to both bytes will then be asserted whenever the FMEWb signal is asserted, and the chip enable input will be asserted whenever either FMEMb or FMEWb is asserted.

The TMS 320 provides for implementation of 8 I/O ports. The SCM implementation utilizes 4 of these I/O ports for operations related to the bank memory. No attempt is made to fully decode the I/O port addresses. As such, the 4 unused ports overlap the 4 used ports. That is, for example, TMS 320 operations on part 0 or port 4 will result in the same function being performed. Device U0046, shown in FIG. 8D-1, is used to provide decoding of the TMS 320 port address for I/O operations. This device decodes the TMS 320 least significant two address signal lines to provide the decoded bank memory related control signals.

The bank memory is shown in FIGS. 8E and 8F, and control signal and bank switch logic is shown in FIG. 8G. The circuitry shown in FIGS. 8E and 8F is essentially identical. Therefore, a description will only be given for the circuitry shown in FIG. 8E. Devices U0050, U0051, U0052 and U0053 and other similarly designated devices will now be abbreviated for ease of reference as U50, U51, U52, U53 and these provide for bank memory address signal line multiplexing. Devices U50 and U51 are associated with the 68000, and devices U52 and U53 are associated with the TMS 320. Inputs to the 68000 address multiplexer consist of the 68000 address signal lines LA1 through LA10, and inputs to the TMS 320 multiplexer consists of the outputs of the bank memory address counter shown in FIG. 8G. Devices U58, U510, U59 and U511 provide bank memory data signal line multiplexing. Devices U58 and U510 are associated with the 68000, and devices U59 and U511 are associated with the TMS 320. Word and byte operations for 68000 related access to the bank memory are supported. Generation of multiplexer enable control signals is provided by the bank switch control PAL, U77, shown in FIG. 8G-2. The TMS 320 related multiplexer enable signal, TB1ENb, of FIGS. 8G-1 and 8E-1, is asserted whenever the TMS 320 has ownership of the bank. The 68000 related multiplexer enable signal, LPB1ENb is only asserted when the 68000 has ownership of the bank and access to this memory by the 68000 is being attempted.

Bank memory bank switch control logic is shown in FIGS. 8G-1 and 8G-2. This logic consists of the bank switch control PAL, device U77 in FIG. 8G-1 and the bank memory control signal multiplexers, devices U78 and U79. The bank switch logic supports two possible sources for determining bank switching. These two sources are referred to as hard tick and soft tick. The hard tick signal is derived from hardware on a fixed time basis. In the case of the SCM, this signal is derived from the VME bus tick signal VTICK. The soft tick, STICK, is derived from software. The signal, TSEL is used to select between the hard and soft tick for determination of bank selection. TSEL is output controllable by the 68000. This signal being in the logical "0" state selects the STICK signal for bank switch selection. STICK being in the logical "0" state selects bank 1, circuitry shown in FIG. 8E, for ownership by the 68000. The state of TSEL is determined by the state of data bit 0 when a write operation is performed to location 7EA05, and the state of STICK is determined by the state of data bit 0 when a write operation is performed to location 7EA03. The presently intended applications of the SCM uses the STICK signal for bank memory selection. The other inputs to the bank switch control PAL consist of the 68000 bank memory select signal, LTBSELb, and the interface handshake flags, TSF1 and TSF2. TSF1 and TSF2 are used by the bank switch control to effect bank switching only when the interface is in the IDLE state.

The outputs of device U77 consist of 68000 data and address signal line multiplexer enable signals, LPB1EN*b* and LPB2EN*b;* TMS 320 data and address signal multiplexer enable signals, TB1EN*b* and TB2EN*b;* and the bank memory control signal multiplexer enable signal lines. The signals TB1EN*b* and TB2EN*b* are also used to select the source for the bank memory control signals. Switching of the control lines for the bank memory during the bank switch operation requires a special sequence in order to ensure that the outputs of U78 and U79 remain in the non-asserted state during the switching operation. This sequence requires that both signal lines TB1EN*b* and TB2EN*b* be asserted, so that the TMS 320 related control signals are multiplexed to the bank memory control signals. Then the bank memory control multiplexer enable signals are non-asserted, forcing the outputs of U78 and U79 to the tri-state condition. Then either TB1EN*b* or TB2EN*b*, according to corresponding new ownership of the bank memory by the 68000 as determined by the state of the selected tick signal, is non-asserted. This is then followed by assertion of the appropriate control multiplexer signal. The TMS 320 data and address multiplexer enable signal and memory control signal then remain asserted until the next bank switch operation. The 68000 related data, address and memory control multiplexer enable signals only become asserted when the 68000 is requesting access to the bank memory.

Device U73 is used to generate the TMS 320 related bank memory control signals. Pin 3 of U73 will be asserted whenever a TMS 320 bank memory read or write operation is performed. Pin 8 of U73 will be asserted whenever a TMS 320 bank memory write operation is performed. These signal lines are then multiplexed to the appropriate bank memory chip select and write enable signals by U78 or U79.

The bank memory address counter consists of devices U71 and U73. Assertion of the FRESb signal resets the counter. TMS 320 output on port 0 or 4 forces WTCNTb to be asserted which forces the counter to be parallel loaded with the data value being output. Input or output on ports 1 or 5 will result in reading or writing of data to or from the appropriate bank memory. This will force pin 6 of U73 to be asserted. Completion of the read operation will then force U73 pin 6 to be non-asserted, which will result in the address counter being incremented. Delay lines DL are inserted between devices U73 and U70 (clock pin 5) to ensure address hold time requirements for the bank memory are satisfied. In a corresponding sense, input or output on ports 2 or 6 will result in similar operation with the address counter being decremented.

Device U75 in FIG. 8G-1 provides for state storage of the interface handshake flags. In the idle state both sections of U75 are reset. The 68000 request the go state by writing a 1 to address 7EA07. This forces the signal LPGR in FIG. 8G-2 to transition to the logical "1" state, which clocks TSF1 to a logical "1". LPGR being in the logical "1" state also forces the reset signal to TSF1 to be non-asserted. Device U35 synchronizes the FB10 signal with the TMS 320 clock. The TMS 320 sets the PROCESSING state by outputting a data value of XXX1 to port 3 or 7. This results in setting TSF2 to a logical "1". The TMS 320 sets the DONE state by outputting a data value of XXX2 to I/O port 3 or 7. This forces TSF1 to the logical "0" state. The 68000 forces the IDLE state by writing a 0 to address 7EA07, which forces LPGR to the logical "0" state, resetting TSF1.

Signals TSF1 and TSF2 are also connected to device U710 in FIG. 8G-2. This provides capability for the state of the interface handshake signals to be monitored by the 68000. A 68000 read from location 7EA01 will result in the data bits 0 and 1 reflecting the state of TSF1 and TSF2 respectively. Device U710 also provides the capability for monitoring the status of the VME bus "tick" signal. The state of the VME bus tick signal is reflected on local processor data bit LD2 when reading location 7EA01.

Device U711 in FIG. 8G-2 provides for storage of the TMS 320 control signals. U711 is an eight-bit addressable latch, which provides for implementation of an eight location, single bit wide memory element. Assertion of RESETb forces all locations to the logical "0" state. Three additional outputs, not previously described, are provided by U711. These VME bus tick interrupt enable, VTIEN, communications interrupt control, CIRCL, and a signal which provides the capability for the 68000 to interrupt the TMS 320, TINTb. The signal VTIEN provides an input to the "system go" PAL. This signal being in the logical one state indicates that transitions from the logical "0" to the logical "1" state of VTICK are to produce interrupts. It also indicates that the watch dog timer is to be enabled.

COMMUNICATIONS

A four channel direct memory access (DMA) controller 414 in FIG. 7A-2 is preferably dedicated for usage with a multiprotocol, dual channel communications controller 416. Both communications channels of the controller 416 can be operated in either the synchronous or asynchronous mode without requiring intervention of the servo control manager 402 for transfer of data.

Another communications controller 418 operates only in the asynchronous mode. A real time clock 415 provides the timing signals needed for the communications system.

By implementing the communications channels in the system resource section 403 as opposed to being directly connected to the local processor bus in the local processor section 401, the servo control manager 402 is freed from direct intervention in communications data movement and its associated duty cycle load thereby permitting high speed serial data communications to be conducted without significant impact on program execution time in the servo control manager 402. Moreover, this architecture permits the communications channels to be operated by an external processor having the capability of serving as a VME bus master thereby totally freeing the servo data control manager 402 from communications related processing. With this structural organization feature, support is provided for economically and flexibly enabling a robot control system to be modularly configured according to the performance capacity desired by the user while providing for networking with other robot controls in a work cell. At the same time, the modularly configured robot control is universally operable with a wide variety of robots with improved control performance attributable to the digital control circuitry.

The system resource section 403 is provided with dual port memory operation. Equal access is thus provided to the system resource memory from both the servo control manager 402 and from higher level or other external processors through a VME bus 420. Accordingly, functions controllable through the VME bus 420 can, with design flexibility, be controlled by either the servo control manager 402 or by an external processor. A dual port arbitrator 426 in FIG. 7A-2 receives bids for memory access and assigns access control to the servo control manager 402 or the DMA control 414 or the VME bus 420.

Communications controllers, implemented as a part of the system resource facility, can under software control, provide interrupt indication of conditions requiring processor intervention. Because the communications controllers can be operated from either the system bus or the local processor, some facility must be provided for directing resulting interrupt request signal to the controlling device and for directing the corresponding interrupt acknowledge from the controlling device to the communications controllers. This is accomplished by the CICRL signal as seen in FIG. 8G-2. Initialization of the SCM results with control of the communications facilities being associated with the system bus, CICRL at logical "0". The SCM local processor forces this signal to the logical "1" state if control of the communications facilities is to be associated with the SCM.

An address map for device related signals is as follows:

| Address | Signal | Function |
| --- | --- | --- |
| 7EA01 | FRREQb | TMS 320 reset signal source |
| 7EA03 | STICK | Software generated bank memory select signal |
| 7EA05 | TSEL | Bank memory switch signal select source |
| 7EA07 | LPGR | Local processor request for TMS "go" state |
| 7EA09 | VTIEN | VME bus tick interrupt enable signal source |
| 7EA0B | CICRL | Communications interrupt control select signal |
| 7EA0D | ITMS | TMS 320 interrupt source |
| 7EA0F | TIMIAKb | Timer interrupt enable and acknowledge signal |

SUBSECTION (SYSTEM BUS INTERFACE)

The unival robot controller implements a subset of the VME bus specifications. This subset adheres to the VME bus specifications in all significant aspects relating to bus protocol and timing. The only significant departure relates to the number of bus and interrupt request levels. The VME bus provides capability for four levels of system bus request, and seven levels of interrupt request, whereas this version only provides for a single level of request for each. The SCM local processor can serve as a VME bus master for interchange of data with VME bus slave modules. The SCM circuitry associated with the VME bus interface is shown in FIG. 8L. This circuitry consists of VME address bus drivers, devices U1204, U1205 and U1206, VME bus address modifier drivers, device U1207, bidirectional VME data bus drivers, devices U1200 and U1201, VME bus control signal drivers, device U1203, and VME bus access control, device U1210.

The VME bus arbitration protocol includes a common "open collector" low asserted bus request signal line, SBRQb, a common "open collector" bus busy indicator signal, SBUSb, and a low asserted, bus grant acknowledge in and bus grant acknowledge out "daisy chained" signal pair, SYBGINb/BGOUTb in FIG. 8L-1.

Any module capable of serving as a bus master indicates request for bus control by asserting the common bus request signal. The module then must wait until permission to obtain control of the bus is granted to the module. Permission to obtain control of the bus is indicated when the bus grant acknowledge in signal to the module is asserted. The module then indicates that it has assumed control of the bus by asserting the common bus busy signal. The module then has ownership of the bus and is free to non-assert the bus request signal. However, the module must ensure that any current bus cycle is complete before it actively starts actual bus transfer. This condition is satisfied when the module has obtained bus ownership and the bus address strobe signal, SASb, is non-asserted.

Arbitration for access to the bus is provided on the AIF. Bus arbitration is performed by monitoring the status of the SBRQb and SBUSb VME bus signal lines. The bus grant acknowledge signal is asserted upon detection of the condition where the bus request signal is asserted and the bus busy signal is non-asserted. The bus grant acknowledge signal, asserted by the arbiter, must be routed to the bus grant acknowledge in signal pin on the first VME slot of the bus arbitration daisy chain.

As in all asynchronous systems, the VME bus arbitration protocol exhibits a propensity for problems in obtaining bus ownership due to metastability in the bus acknowledge daisy chain. Asynchronous metastability is a seemingly random unpredictable, condition that occurs in systems that mix asynchronous components, i.e., components that are not synchronized to a common clock. Metastability occurs at the outputs of the synchronization devices that coordinate the interactions between components. This random behavior, unless accounted for, can cause a system to be unpredictable and unreliable. In the case of the VME bus, metastability can result in two devices obtaining simultaneous ownership of the bus, which necessarily results in corrupted bus transactions. Typically, if a module requires ownership of the bus, it issues a bus request and waits for the arbiter to issue a bus granted signal. The first module that receives the bus grant signal, and also has a bus request pending, will block the bus grant signal from propagating down the daisy chain, return a bus busy signal to the arbiter, and assume ownership of the bus. This scheme results in acceptable operation unless a bus request signal and a bus grant signal occur simultaneously at the requester of an "up-stream" in the acknowledge daisy chain bus master.

The metastability condition associated with the VME bus can be exhibited by considering an example with two modules competing for ownership of the bus, with module 2 located at a lower priority on the daisy chain. The requester associated with module 2 receives indication that the module requires ownership of the bus. Therefore, the module 2 requester issues a bus request to the arbiter and the arbiter returns an acknowledge signal. To reach the module 2 requester, the acknowledge must first pass through the requester on module 1. Because a requester can issue a request at any time, module 1 may make a request after the arbitration associated with the module 2 request has been initiated. If the bus grant in resulting from module 2's request arrives at module 1 at the same time as the request signal for the module is generated, module 1 requester will intercept the bus grant signal as it should, access the bus and issue a bus busy signal. However, the coincidence of the bus request and bus grant, at module 1 requester, can cause the grant-in to grant-out circuitry, associated with module 1 to become metastable. This can result module 1 momentarily passing the bus grant signal to module 2, which in turn will result in module 1 and module 2 both assuming bus ownership. This condition can only be avoided by allowing sufficient time, in a requester, for the daisy chain blocking circuitry to settle before the grant signal is passed to the next lower priority requester.

Device U1210, PAL1618A, in FIG. 8L-1 serves as the SCM VME bus requester. The SCM requires ownership of the VME bus for acknowledgement of system bus generated interrupts and for transactions, either instruction execution or data transfer, where the addresses is equal to or greater than 800,000. A request for VME bus ownership is indicated by local processor address bus bit A23 being at a logical "1", and with a non-interrupt function code, or by assertion of the system bus interrupt acknowledge signal, SBIAKb, coincident with assertion of the local processor address strobe signal LPASb. Assertion of LPASb to U1210 is delayed by 50 nanoseconds to allow for settling of function code and address signal lines. Request for VME bus ownership results in setting an internal "R-S" flip-flop in device U1210, provided the acknowledge daisy chain, SYBGINb, signal is not asserted. Setting of request flip-flop results in assertion of the bus request signal, SBRQb. Assertion of SYBGINb with the request flip-flop set indicates that the SCM has obtained ownership of the bus. Non-assertion of VME bus address strobe, SASb, then indicates that the SCM can start the bus transaction. This results in assertion of address driver enable signal, SADENb. This is then followed 50 nanoseconds later by assertion of the data bus driver enable signal SDBENb. The VME bus address strobe signal is asserted at the same time as the data bus drivers are enabled. For bus read operations, the VME bus data strobe signals are also asserted at the same time as the data bus drivers are enabled; however, with VME bus write operation, assertion of VME bus data strobe signals is delayed by an additional 50 nanoseconds to allow for settling data bus settling. The VME bus request signal is non-asserted at the same time as the data bus driver enable signal is asserted.

Equations implemented within device U1210 utilize the delayed feedback signals to provide settling time required to reduce metastability associated with the acknowledge daisy chain. As previously discussed, metastability within device U1210 can result with simultaneous assertion of SCM bus request and SYBGINb. Since the metastability condition cannot be prevented, equations for device U1210 include capability for detection of the metastability condition. Possibility for metastability occurring within U1210 is indicated by the bus grant-out signal BGOUTb, being asserted between the time the bus request flip-flop is set and the time the data bus drivers are enabled. If this condition is detected, the bus request flip-flop is reset and cannot be set again until the grant-in signal is non-asserted. This will result in the SCM relinquishing the bus until the next arbitration cycle is completed.

SYSTEM RESOURCES

As previously indicated, the system resource functions implemented on the SCM are related to the overall robot control system which are not specifically related to closure of the position and velocity loops. These functions shown in FIG. 7A-2 include EPROM 408 for storage of the robot arm solutions, battery backed-up RAM 410 for storage of non-volatile data, static RAM 412, real-time clock, a DMA controller and two multi-protocol, dual channel communications controllers. The system resource area is implemented as dual-port memory. As such, equal access to the system resource section is provided from either the local processor or from the VME bus. The system resource functions appear as a slave device to the VME bus. This provides the capability for these related functions to be controlled either from the SCM local processor or from an optional processor connected to the system bus.

SYSTEM RESOURCE ARBITRATION

Arbitration for access to the system resource devices, and control of the access, implemented on the SCM, is provided by PAL devices U0082 and U0083 shown in FIGS. 8H-1 and 8H-2. There are three sources of request for system resource access. These consist of the SCM local processor, the system bus and the DMA controller which will be described in the next section. The DMA controller is implemented within the system resource area. Priority for granting access, with presence of simultaneous request, is dynamically controlled. The dynamic priority allocation scheme implemented by the logic incorporated within PAL device U0083 ensures that the DMA controller will be granted every other system resource access bus cycle and that the local processor and the system bus will be granted one out of every three system resource access bus cycle. This ensures that no single requester will be able to completely absorb system resource access. As a result, the DMA controller will have to wait, at most, one system resource access cycle, and that the local processor or system bus will have to wait, at most, two system resource access bus cycles before its request is granted.

A state table representation indicates the priority allocation as a function of requesting device service. Under static conditions, i.e., no request present, the DMA controller has the highest priority, the local processor is assigned the next priority, and the system bus is assigned the lowest priority. Granting access to any of the requesters automatically results in changing the priority levels associated with the requesters, for the next access with the requester completely access receiving the lowest priority, provided an active request is present upon completion of the associated system resource access cycle. If an active request is not present upon completion of the associated system resource access cycle, the priority level reverts to the static condition with the associated priority given above.

With one exception, granting access to the DMA controller will automatically result in the system bus being given the highest priority, followed by the local processor, for the next system resource access cycle. Also, granting access to either the local processor or the system bus will automatically result in the requester receiving service being assigned the lowest priority with the DMA controller being assigned the highest priority. Since granting access to the DMA controller normally results in the system bus being assigned the highest priority, special care must be taken to prevent alternate DMA and system bus requests from locking out local processor request. Thus, a system bus access followed by a DMA access will result in the local processor being granted the highest priority for the next access.

Request for system resource access by the DMA controller in FIGS. 8H-1 and 8H-2 is indicated by assertion of the DMABRb signal. Request for system resource access by the system bus is indicated by assertion of the system bus system resource select signal, SYDPSb, or the system bus system resource interrupt acknowledge signal, SACKINb, coincident with assertion of the system bus address strobe signal, RASb. Request for system resource access by the local processor is indicated by assertion of the local processor system resource select signal, LPDPSb, or by assertion of the local processor system resource interrupt acknowledge signal, LCMIAKb, coincident with assertion of the local processor address strobe signal LPASb. Device U0082 performs the arbitration function and grants access to the requester. This is indicated by assertion of the appropriate "go" signal; DMAGOb for the DMA controller, SYGOb for the system bus and LPGOb for the local processor. Indication that the active system resource cycle is an interrupt acknowledge cycle is provided by assertion of either SYICL for the system bus or LPICL for the local processor. The interrupt acknowledge indicator signal is asserted coincident with assertion of the corresponding "go" signal.

The additional signal is provided as an input to device U0082. This signal CIRQONb being asserted indicates that a communications related interrupt acknowledge cycle is being performed by either the system bus or by the local processor, as indicated by the state of SACKINb and LCMIAKb.

Interface to devices within the system resource area is provided by a 17-bit tri-state address bus signals DA0 through DA16, a 16-bit tri-state data bus signals DD0 through DD15, a low-asserted, address strobe signal DPASb, two low-asserted data strobe signals DPLDSb, DPUDSb, as seen in FIG. 8H-1, a read/-write control signal DPRD and a low-asserted transfer acknowledge signal, DPDTACKb. Buffer devices are used to isolate the system resource signals from system bus and local processor related signals. Buffers associated with the local processor to system resource interface are shown in FIG. 8A-2. Buffers associated with the system bus to system resource interface are shown in FIG. 8K.

Device U0083 of FIG. 8H-2 operates in conjunction with device U0082 of FIG. 8H-1 in providing access to the system resource area. This device generates the "enable" signals associated with the system bus and local processor to system resource interface buffers. Assertion of the buffer enable signals is staggered in time. The interface address buffers are enabled by assertion of the "go" signal. One clock cycle later, the interface data buffers are enabled, this is then followed, one clock later, by assertion of the enable signal for interface control signal buffer. The system resource address strobe signal DPASb is asserted at the same time as the data buffers are enabled.

An additional function provided by device U0083 relates to resolving potential metastability conditions resulting from performing the arbitration function. This device provides one clock cycle delay before enabling the data buffers or assertion of the DPASb signal. Also, the equations associated with granting access include mutually exclusive terms so that access cannot be simultaneously granted to more than one requester.

DIRECT MEMORY ACCESS CIRCUITRY

The DMA controller and related circuitry is shown in FIG. 8H-2. The DMA controller is implemented through usage of an advanced micro devices AMD95-17A-5 device U0084. This device for the DMA controller, referred to hereinafter also as the 9517, provides for implementation of four DMA channels. The count register is referred to as the "word count" register in 9517 literature; however, in the SCM implementation, the value loaded into this register actually determines the number of bytes to be transferred. Information is transferred to the DMA controller address and count registers in bytes through execution of two consecutive write operations to the same address. The 9517 includes a "first/last flip-flop", the state of which determines whether a write operation is to be directed to the most or least significant byte of the correspondingly addressed 16-bit register. The first/last flip-flop can be initialized to a known state by writing to its corresponding register.

This controller is primarily intended for usage in 8-bit Intel type microprocessor based systems. As a result, circuitry external to the controller is required for proper operation in the SCM system resource environment. The interface associated with the DMA controller must support interchanges of data between the DMA controller and the controlling processor. These operations are classified as I/O transfers and involve the DMA controller serving as a slave device. The interface must also support interchanges of data between the related communications controller, device U0096, and system resource RAM. These operations are classified as DMA transfers and involve the DMA controller serving as a system resource bus master for generation of related address and control signals.

The signal interface in FIG. 8H-2 provided by the 9517 as device U0084 consists of an 8-bit, bidirectional tri-state address bus, an 8-bit, bidirectional tri-state data bus and four tri-state, low-asserted control signals (IORb, IOWb, MWMRB, MEMWb) which are not specifically shown. Signals I/O read, IORb and I/O write, IOWb are used as input control signals for transfers where the controller serves as a slave device, and are used as output control signals for transfers when the controller is serving as a bus master. The related memory read, MMERb, and memory write, MEMWb, control signals are asserted by the DMA controller for transfers where the controller serves as a bus master.

The signal interface provided by the 68000, the VME bus, and hence by the system resource address bus, does not include an address bit 0 signal, instead, byte operations are distinguished by assertion of the appropriate data strobe signal, lower data strobe for odd addressed bytes and upper data strobe for even addressed bytes, with word related operations distinguished by assertion of both data strobes with a correspondingly implied even address. The DMA controller, being an 8-bit device, requires byte addressing when being operated in the slave mode. Operation of the 9517 in the slave mode utilizes the least significant four bits of the device address bus, 9517 signals A0 through A3, to determine the internal register address, and uses the 9517 data bus, signals D0 through D7 for the actual interchange of data. The signals IORb and IOWb are asserted, external to the device, at the appropriate time to effect either read or write operations, respectively.

Operation of the 9517 in the slave mode requires system resource address bus bits A1 through A4 be connected to 9517 device address bits A0 through A3, respectively. However, operation of the 9517 as a bus master requires that the 9517 A0 signal line be used for upper/lower data strobe signal generation and that 9517 address bus bits A1 through A7 be connected to system resource address bus bits A1 through A7. This requires the creation of a DMA address bus (DMA0 through DMA7), through usage of buffers, that is logically isolated from the system resource address bus. Device U0085 provides the capability for driving the DMA address bus bits DMA0 through DMA3 from the system resource address bus bits DA1 through DA4, respectively, for slave mode operation. This device further latches the state of the system address bus upon assertion of the system resource address strobe signal DPASb in FIG. 8H-1. This is necessary to meet 9517 device address hold time specification, with respect to non-assertion of IORb and IOWb.

The 9517 provides for generation of 16-bit addresses when serving as a bus master. The least significant 8 bits are output on the device signal pins A0 through A7, connected to signal lines DMA0 through DMA7. Signal DMA0 is input to PAL device U80 and is used in generation of DPUDSb and DPLDSb. Device U0081 enables signal lines DMA1 through DMA7 to be logically connected to the system resource address bus bits DA1 through DA7, respectively. The most significant 8 bits are output on device signal pins BD0 through DB7. The address information is only valid on these signal lines at the beginning of the DMA transfer cycle, indicated by assertion of the signal ADSTB in FIG. 8H-2. Therefore, the state of these signals must be latched before being used to determine the state of the system resource address bits DA8 through DA15. This is accomplished by device U0087. It is to be noted that all DMA transfers are associated with system resource RAM and the RAM is mapped into the upper 64K bytes of system resource address space. Therefore, system resource address bit DA16 is always forced to a logical "1" for DMA transfers.

DMA operations are always associated with data interchange between the communications controller, device U0096 shown in FIG. 8I-1, and system resource RAM. The communications controller provides an 8-bit data bus interface, connected to the least significant byte of the data bus, and the system resource RAM is implemented as 16-bit. Proper operation of the DMA transfers thus requires multiplexing of the upper byte of the data bus onto the lower byte of the data bus for DMA memory read transfers associated with even bytes of memory. Correspondingly, the lower byte of the data bus to be multiplexed on the upper byte of the data bus for DMA write operations associated with even bytes of memory. Device U0090, shown in FIG. 8I-1, implements this data bus multiplexing. DMA transfers associated with odd bytes of memory do not require data bus multiplexing. Data bus multiplexing also requires qualification of system resource read signal with the data strobe signals to generate memory device output enable signals. This function is implemented by device U1112 in FIG. 8K-4.

PAL device U0080 provides interface control associated with the DMA controller in both slave and bus master modes of operation. In the slave mode, device U0080 actively drives the IORb, IOWb and DPDTACb signal lines. Slave mode timing information required for assertion of IORb and IOWb is generated by device U0081. During DMA transfers, i.e., with 9517 serving as bus master, device U0080 receives DMAI-ORb, DMAIOWb, DMEMRb, DMEMWB and DMA0, and actively drives the system resource memory control signal lines. Master mode timing information required for assertion of these signal lines is supplied by 9517 through assertion of DMEMRb, DMEMWb, DMAIORb and DMAIOWb, with DMA0 determining whether upper or lower data strobe is to be asserted.

Device U0081 is also involved with master mode operation of the 9517. This device recognizes request for DMA transfers, indicated by 9517 assertion of the hold request signal line, and asserts the DMA bus request, DMABRb, signal which is input to the system resource arbitration PAL, device U0082. Successful arbitration in favor of the DMA controller is indicated by assertion of DMAGOb, which results in assertion of the hold acknowledge signal to the 9517, provided the system resource bus control signal lines are quiescent. The 9517 interface also provides for a transfer acknowledge signal to provide indication that the DMA cycle can be terminated. This signal, DMARDY, is asserted high in response to low assertion of the system resource transfer signal DPDTACb.

Four request signal lines are associated with providing indication to the 9517 that a DMA transfer cycle is required. These low asserted signal lines are labeled in FIG. 8H-2 as DMARQ0b through DMARQ3b. Each of the request signals are specifically associated with one DMA channel, DMARQ0b being associated with DMA channel 0. Acknowledgement of the requested transfer is provided by low assertion of a corresponding DMA transfer acknowledge signal, DMACK0b through DMACK3b, with DMACK0b corresponding to channel 0. The 9517 must be programmed to recognize low-asserted request signals and provide low-asserted transfer acknowledge signals. A common DMA end-of-process signal, DMAEOPb, is asserted by the 9517 whenever the number of DMA transfers established for a given channel, following initialization of the channel, has been completed. This signal is only asserted during the actual DMA transfer cycle for which the "word count" is decremented from zero to FFFF.

COMMUNICATIONS CIRCUITRY

A significant feature of the UNIVAL TM robot controler relates to usage of serial communications for interface between controller and peripheral devices. This communications interface is implemented through usage of the BIT-BUS serial communications protocol. BIT-BUS involves a specific embodiment of industry standard synchronous data link control, SDLC, communications protocol. Reference is made to appropriate BIT-BUS and SDLC specifications for complete details with regard of these protocols. BIT-BUS requires half-duplex operation of communications channel between a master controller and slave nodes. Slave devices only transmit in response to reception of valid messages from the master. The unicorn BIT-BUS implementation uses one megabaud, baseband, serial comminications with communications clock and data being supplied over separate wires by the transmitting device.

The SCM provides a total of four communications channels. These facilities are implemented through usage of two multi-protocol communications controllers, AMD8530A's, shown in FIGS. 8I-1 and 8J-1. Two of the communications channels can be used for BIT-BUS communications and two of the channels are strictly intended for asynchronous communications. The circuitry shown in FIGS. 8I-1, I-2 is primarily associated with the communications channels that can be used for BIT-BUS communications, and the communications controller shown in FIGS. 8J-1, J-2 is associated with the two channels that are strictly intended for asynchronous communications. The distinction between these channels relates to implementation of support circuitry required to facilitate BIT-BUS and high baud rate serial communications.

BIT-BUS implementation requires the communications lines be "turned around" following transmission of a complete message. That is, drivers associated with the master device must supply clock and data to the network while the master is transmitting then the drivers associated with master must be disabled to allow the slave device addressed to transmit the response message. A complete message consist of opening flags, required for synchronization, followed by the message body, followed by a 16-bit, CRC check character, followed by closing flags. The communications lines cannot be turned around until the closing flag has been transmitted. The DMA controller EOP signal indicates when the last byte of the message has been transferred to the communications controller, and the communications controller can be configured to generate an interrupt when the last byte of the message has been transmitted. However, there is no conveniently available signal which can be used to indicate completion of transmission of the corresponding closing flag. Circuitry external to the communications controller is therefore required to detect transmission of the closing flag.

Devices U0099 and U0098 in FIG. 8I-2 provide closing flag detection for BIT-BUS channel "A" and U0913 and U0912 provide this function for BIT-BUS channel "B". Device U0910 provides control associated with both of the BIT-BUS channels. The closing flag detector is used to provide interrupt indication that the complete message has been transmitted. The interrupt is generated through usage of external status signal input to the communications controller. The communications controller must be configured to provide interrupt generation upon change of status of the data carrier detector, external status signals, which is treated as a special condition interrupt by the communications controller.

The external closing flag detector circuitry can be software configured to provide either automatic or commanded modes of operation for turning the communications line around upon completion of message transmission. In either mode, a specific command is required to place the communication drivers in the transmit direction. In the auto-turnaround mode, the channel will be automatically switched from transmit to receive upon completion of the message transmission, whereas in the commanded mode, a specific software command execution is required to turn the line around. It is to be noted that actual communications line drivers and receivers are implemented on the AIF. The control line used to indicate direction of drivers and receivers is provided from the SCM to the AIF. Device U910 is used to store two bits of information for each of the BIT-BUS channels. These bits are stored by performing a write operation to hexidecimal address OFFFX1 for channel A or OFFFX3 for channel B. The state of DA0 written determines the requested direction for the channel and the date of DA1 written determines the turnaround mode of operation for the channel.

Initialization of the SCM, via assertion of RESETb, results in the communications channels being placed in the receive direction. Writing a 1 to OFFFX1 results in channel A being placed in the transmit direction. This is then followed by writing a 3 to OFFFX1 to place channel A in the transmit direction with auto turnaround mode selected. It is to be noted that the external circuitry must be placed in the receive mode before another message transmission sequence, with end of process detection, can be initiated. This is automatically performed in the auto turnaround mode. However, this must be specifically commanded by writing a 0 to OFFFX1, after the end-of-process interrupt has been generated, in the non-auto turnaround mode. It is also to be noted that auto turnaround mode of operation requires transmit direction be selected before auto turnaround mode is selected. Therefore, a value of 1 must be written to OFFFX1 at the start of any message transmission sequence to request transmit direction, and that this must then be followed by writing a 3 to OFFFX1 to selected auto turnaround mode of operation. Operations on address OFFFX3 perform comparable operations for BIT-BUS channel B.

Device U0099 implements a state machine for setting the actual line direction, for direction of end of message transmission and for generating the communications controller status change which results in communications transmission end of process interrupt generation. Initialization results in entering the idle state. Transition from the idle state to the opening flag state occurs when transmit direction is requested. Transmission from this state to the message body state is made upon recognition of a flag character followed by a non-flag character. An SDLC flag character is indicated by an 8-bit data stream consisting of a zero followed by six consecutive ones, followed by a zero. Device U0099 performs, in effect, a serial to parallel conversion on a per hit basis of the transmitted data stream. The parallel representation of the data stream is provided as input to device U0099. Transition from the message body state to the closing flag state is performed when DMA end of process indication for the channel is received. Transition from the closing flag state to the interrupt state occurs upon recognition of a flag character. The interrupt state only occurs for one communications clock cycle. The end of message state is then entered. The circuitry will remain in this state until receive direction is requested, at which time the idle state will be entered.

Device U0910 provides two signal lines which are used by U0099 and U0912 for determining state transition operation. One of these signals is used to request channel direction. The other signal line is used to provide decoded DMA end of process indication. Assertion of the DMAEOPb signal coincident with assertion of DMACK0b results in assertion of the end of process signal for channel A and assertion of the DMAEOPb signal coincident with assertion of DMACK2b results in assertion of the end of process signal for channel B. In the auto turnaround mode, receive direction is automatically requested when the end of process for the corresponding channel is detected. However, the communications channel is not placed in the receive direction until the idle state is entered.

The DMA controller is strictly associated with the two communications channels implemented with device U0096. Each of the communications channels can use separate DMA channels for transmission and reception of data. That is, the DMA controller and communications controller can be configured to provide full duplex operation, simultaneously on both communications channels, independent of the fact that the actual communications is being conducted in a half duplex mode, over a single data wire, provided the channel receiver is disabled while the channel is transmitting. In this configuration, DMA channel 0 is associated with transmission of data on communications channel A, DMA channel 1 is associated with reception of data on communications channel A, DMA channel 2 is associated with transmission of data on communications channel B, and DMA channel 3 is associated with reception of data on communications channel B.

The communications controller provides two signal lines for each channel which can be software configured to provide hardware DMA request indication. The following description only applies to one of the communications channels designated by 1 and 2 in FIG. 8I-1. These two signal lines for channel are labeled WT/RQ1 and DT/RQ1. The communications controller can be software configured so that the WT/RQ1 pin operates in either the transmit mode or receive mode. However, the DT/RQ1 pin can only be used for DMA request indication in the transmit mode. Thus, full duplex operation requires configuration of the communications controller such that the WT/RQ1 pin is operative with receive channel and the WT/RQ1 is operative with transmit channel. Half duplex operation requires the DT/RQ1 pin be operative with both transmit and receive operations. Support circuitry external to the communications controller, device U0097, directs the communications controller request to the appropriate DMA controller channel.

It is to be noted that the communications controller DMA request external hardware must also be configured for half or full duplex operation. Device U0085, shown in FIG. 8J-2, is used to store the mode of operation for each of the communications channels. Assertion of RESETb initializes this latch for full duplex operation on both communications channels. Writing to location OFFX02 allows the mode of operation to be changed. Signal HDPXA being in the logical "1" state selects half duplex operation for communications channel A and signal HDPXB being in the logical "1" state forces half duplex operation for communications channel B. These two signals are used as inputs to device U0097 in FIG. 8I-2 for assignment of the communications controller WT/RQ1 and DT/RQ1 signals to the appropriate DMARQXb signals where X represents any one of signals 0 to 3 to provide the indicated mode of operation. Device U0097 provides two signal outputs in addition to the DMARQXb signals. Signal DCYCLb provides an encoded DMA transfer acknowledge indicator. This signal is thus asserted for every DMA transfer operation. Signal CHADMAb provides an encoded DMA transfer achkowledge indicator for communications controller channel A. This signal is thus asserted for every DMA transfer operations associated with communications channel A.

As previously stated, communications controller device U0097 can bed software configured to operate in either synchronous or asynchronous modes. Either mode of operation can utilize the DMA controller for actual interchange of data between system resource memory and the communications controller. In the synchronous mode, a change of state on the communication controller data carrier detect external status pin is used to provide interrupt indication of completion of the transmit operation. In the asynchronous mode of operation, external circuitry is used to provide a change of state on the communications controller sync detection external status pin whenever a DMA end of process condition is detected for either receive or transmit operation on the channel. This change of state can also be used to provide interrupt indication. However, it should be noted that this interrupt is generated whenever the last byte of data has been transferred by the DMA controller. Thus, on transmit operations, the complete message will not have been transmitted by the communications controller when this interrupt is generated.

The peripheral device signal interface provided by the communications controller, U0096 shown in FIG. I-1, consists of: an 8-bit data bus, DB0 through DB7, two address signals A/Bb and D/Cb, a read control signal RDb, a write control signal WRb and a device selection signal CSb (not specifically shown). Each communications controller provides control and status registers for configuration of the mode of operation of the device and for determining device status as well as data registers for actual interchange of communications data. One of the interface address signal lines are A/Bb is used to select either channel A, logical "1", or channel B logical "0" registers. The other interface address signal line C/Db is used to select the control registers, logical "1" or data registers, logical "0". Actual interchange of information with the control registers involves a two step operation. The address of the register for which information is to be interchanged is transferred to the device by performing a write operation with the A/Bb signal line set for channel A or B and the C/Db signal line set for control. The state of data lines DB0 through DB3 determine the register address. This is then followed by second bus cycle, with the same A/Bb, C/Db signal line state, for the actual control/status information interchange. It is to be noted that the data registers are directly addressed in a single bus cycle by setting the C/Db signal line to the appropriate state.

Interface of the communications controller involves three different types of system resource bus cycles, each with different timing and control requirements. These three types of bus cycles consist of a processor initiated cycle, a DMA initiated cycle, and an interrupt acknowledge initiated cycle. During processor related bus cycles, the system resource address bus provides indication that a transfer involving a communications controller is required. The most significant 8 bits of the system resource address bus, DA16 through DA9 shown in FIG. 8K-3, are decoded by device U1110 to result in assertion of the appropriate communications controller device select signal. The least significant two bits of the system resource address bus, DA2 and DA1, directly provide the communications controller register address. The system resource read/write control signal, DPRD, provides in FIG. 8H-1 an indication of the direction of transfer and the system resource lower data strobe signal, DPLDSb, provides indication that the controller is to either accept data from or apply data to the system resource data bus.

DMA initiated bus cycles, indicated by assertion of the DCYCLb signal in FIG. 8H-1, require the system resource address bus be used to specify the system resource memory address for the data transfer. The peripheral device, communications controller related address is directly implied by the DMA channel acknowledge signals. DMA initiated transfers can only be associated with the communications device data register. Thus, DMA transfers require the communications controller A/Bb signal line state be determined by the state of the DMA channel acknowledge signals. Also, the communications controller C/Db address signal line must be forced to the logical "0" state, and device select, CSb signal line for U0096 in FIG. 8I-1 must be asserted, independent of the information contained on the system resource address bus. Timing and transfer direction information is provided by the DMA controllers assertion of either DMAIORb or DMAIOWb signals.

The communications controller interrupt related circuitry in FIG. 8I-1 consists of a common "open-collector" interrupt request signal, COMINTb, a common interrupt acknowledge signal, DPIAKb, and prioritized interrupt acknowledge daisy-chain signals, IEI and IEO. IEI must be at a logical "1" for the communications controller to respond with a vector during an interrupt acknowledge cycle. If a communications controller has an interrupt pending when the interrupt acknowledge signal is asserted, the device will cause the IEO signal to be asserted, which is connected to the IEI signal pin of the next device in the interrupt daisy chain. Interrupt acknowledge bus cycles are indicated by assertion of the DPIAKb signal. The DPLDSb signal is used to provide indication that an interrupt vector is to by applied to the system resource data bus. The interrupt acknowledge daisy-chain signals determine which of the devices is to provide the interrupt vector. In the SCM implementation, device U0096 has the highest priority. That is, if both devices are asserting the common interrupt request signal, device U0096 will respond with the vector during the interrupt acknowledge bus cycle. This is determined by the fact that the IEI signal for device U0096 is hard-wired to a logical "1" and the IEI signal for device U1000 in FIG. 8J-1 is connected to the IEO signal output of device U0096. Timing associated with assertion of COMRDb signal during the interrupt acknowledge cycle must provide for settling in the interrupt acknowledge daisy-chain signals.

The interface timing specifications associated with the U1000 also referred to an 8530 include a read/write recovery time, which requires that the RDb or WRb (not specifically shown) signal not be asserted for a specified time following non-assertion of either signal. It is also to be noted that an external reset signal pin is not provided. Hardware initialization of the controller is accomplished by simultaneous assertion of the device RDb and WRb signal lines. Circuitry external to the communications controller is required for conversion of the system resource control signal lines, DPRDb and DPLDSb for conversation of the DMA control signal lines, DMAIORb and DMAIOWb, to device RDb and WRb signals, and to ensure device setup and hold timing specifications for data and address with respect to WRB and RDb are satisfied.

Devices U0092, U0093 and U0094 in FIG. 8I-1 provide communications controller address and control interface implementation associated with all three types of system resource bus cycles. Device U0093 is used to provide timing associated with assertion of the communication read COMRDb and write COMWTb enable control signals. Device U0094 is used in conjunction with U0093 as an auxiliary timer to ensure communications controller read/write recovery time specifications are satisfied. Device U0093 also asserts the transfer acknowledge signal DPDTACb for all communications related transfers. Inputs to device U0093 consist of a read control signal DMAIORb, a write control signal DMAIOWB, the system resource lower data strobe signal DPLDSb, a processor related bus cycle indicator signal PCYCLb in FIG. 8I-1, a DMA bus cycle indicator signal DCYCLb, the interrupt acknowledge signal DPAIKb, and a feedback signal from the auxiliary timer. Request for communications controller transfers are indicated by assertion of PCYCLb, DCYCLb or DPIAKb. DMAIOWb and DMAIORb signals are used to indicate the type of cycle to be performed, either read or write, and DPLDSb is used as a timing signal during processor requested transfers. DMAIOWb and DMAIORb signals are used to provide timing information in addition to providing indication of the type of transfer to be performed during DMA requested transfers. DMAIOWb and DMAIORb are tri-state, low-asserted signals which are actively driven by either the DMA controller or by device U0092.

Device U0092 serves as a multiplexer of the address and chip select signal for device U0096. During DMA requested transfers, this device forces the device select signal for U0096 to be asserted, force the D/Cb signal for device U0096 to the logical "1" state, and uses the CHADMAb signal to determine the state of the A/Bb signal for U0096. Also, U0092 device drivers for DMAIOWb and DMAIORb signals are tri-stated during DMA requested transfers. Processor requested cycles result in system resource address bus bits DA1, DA2 and COM1Sb directly determining the state of U0096 A/Bb, D/Cb and CDb signal lines respectively. Device U0092 also actively drives DMAIORb and DMAIOWb signal lines, and the state of DPRD is used to determine which of these lines is to be asserted. Device U0092 asserts both DMAIORb and DMAIOWB in response to assertion of RESETb.

Actual communications line drivers are implemented on an arm interface (AIF) module 800 in FIG. 6 for interfacing with circuitry external to the robot controller. The communications interface signals between the SCM and the AIF are provided on the P2 connector (not specifically shown). The synchronous communications channels interface consists of TTL level signals for transmit data, transmit clock, line direction, receive data and receive clock for both of the channels. The asynchronous communications channels interface consist of TTL level signals for the 8530 device of FIG. 8I-1 provided modem control signals in addition to the above signals. A clock signal, derived from the oscillator associated with U1000 is also provided as a part of the communications interface.

REAL TIME CLOCK

The SCM implementation includes a battery backed up real time clock as a part of the system resource functionality. The circuitry associated with this device is shown in FIG. 8J-2. The real time clock device U106 used, MC14618, provides 50 bytes of static RAM in addition to the normal clock functions. The signal interface associated with the device consists of an 8-bit multiplexed address/data bus and a set of control signals similar to 6800 related peripheral devices. External interface circuitry is required to interface the device to the system resource bus. Device U1008 multiplexes the least significant 8 bits of the system resource address bus onto the least significant 8 bits of the system resource data bus for interface with the real time clock device. PAL device U1007 provides timing and control related to interface of the real time clock.

SYSTEM RESOURCE MEMORY

The system resource memory implementation is shown in FIG. 8K-1. This memory consists of both EPROM and RAM. Two sockets, U1102 and U1103, are provided for EPROM implementation. These sockets can accommodate either of the 27128 or 27256 type devices. Jumper W32 is provided for selection of EPROM device usage. W32 pins 1 to 2 must be connected for 27128 usage, and pins 2 to 3 must be connected for 27256 usage. Four sockets are provided for system resource RAM implementation, U1100, U1101, U1104 and U1105. Sockets U1100 and U1101 are strictly associated with 2K by 8-bit ram device usage. These sockets are intended to provide battery backed up memory implementation through usage of Mostek 48202B "zero-power" RAM devices. Sockets U1104 and U1105 are strictly associated with usage of 8K by 8-bit static RAM devices of the 6164 type.

Device U1110 provides decoding associated with system resource device selection. The input signals for U1110 consists of the most significant 8 bits of the system resource address bus along with the system resource address strobe signal. One additional input signal is provided to U1110. This signal, HACKb, is asserted during DMA transfer cycles and is used to ensure that DMA cycle data transfers only occur between the system resource memory and the communications controller.

The system resource implementation requires generations of byte write enable and byte read enable control signals. Byte write operational capability is a standard requirement in computer systems. Byte read operational capability is required for implementation of the data bus, byte multiplexing associated with DMA transfers. Devices U1009 and U1112, shown in FIG. 8K-4, are used to generate the byte enable signals.

The system resource functions implemented on the SCM serve as a slave device to the VME bus. The system resource slave interface is given in FIG. 8K-2. Devices U1106 and U1107 interface the system resource data bus to the VME data bus. Devices U1108 and U1109 interface the system resource address bus to the VME address bus. Latches are used for the address bus interface in order to ensure that the system resource address bus remains stable at the end of a VME related bus cycle. This is necessary to ensure device address hold time and VME bus data hold time requirements are satisfied.

Selection of SCM system resource area by the VME bus is implemented by PAL device U1111 in FIG. 8K-1. The input signals used for system resource selection by the VME bus consists of the most significant 4 bits of the VME address bus, the VME bus address modifier bits, three card slot identifier signals, and the VME bus address strobe signal. The VME bus address modifier bits are used to indicate the length of the address field and the type of address space associated with the requested bus cycle. Reference is made to the VME bus specifications for a description of the address modifier field definitions. Selection of SCM system resource devices by the VME bus is indicated by assertion of SYDPSb. This occurs whenever VME address bus signal SA23 is at a logical "1", provided the state of VME address bus signals SA22–SA20 directly correspond to the state of the card slot identifier signals CA0, CA1, CA2 in FIG. 8K-1, respectively, and the VME address modifier bits correspond to the equations associated with U1111. At the present time, the SYDPSb signal will only be asserted for standard address fields, i.e., 14 bits, in either supervisory or user memory space.

The system resource transfer acknowledge signal DPDTACb in FIG. 8J-1 is asserted by the interface circuitry associated with DMA controller, communications controller and the real time clock. Device U1102 is used to assert the transfer acknowledge signal for all other system resource devices. It should be noted that assertion of DPDTACb will result in non-assertion of the system resource write enable signals. This is to ensure that changes in data at completion of related bus cycles will not result in writing incorrect data to system resource devices.

SERVO CONTROL BOARD PROGRAMMING—GREATER DETAIL

The initialization routine is shown in greater detail in FIG. 7D. The process essentially comprises the performance of a series of tasks as indicated in the successive blocks in FIG. 7D. The following list provides further information on the nature on these tasks:

| TASK | INITIALIZATION |
| --- | --- |
| INISRC | bit-bus emulator for handshake |
| INSCROM | feedback interface |
| INIFIX | global variables |
| INCONF | robot default configuration |
| INTMS | servo calculator-download program store |
| INIAIB | torque processor board 600 |
| INROB | robot software configuration |
| INJTMS | bank switch memory |
| INJONT | joint data structure via servo calculator program memory and torque processor board shared RAM reads |
| INBUF | internal buffer management areas |
| INIDLC | one shot and synchronous data logger interface |
| CRTINI | input/output hardware-servo control board 400 |
| BBINIT | bit-bus emulator interface and handshake with system control board 500 |

Figure 7F:
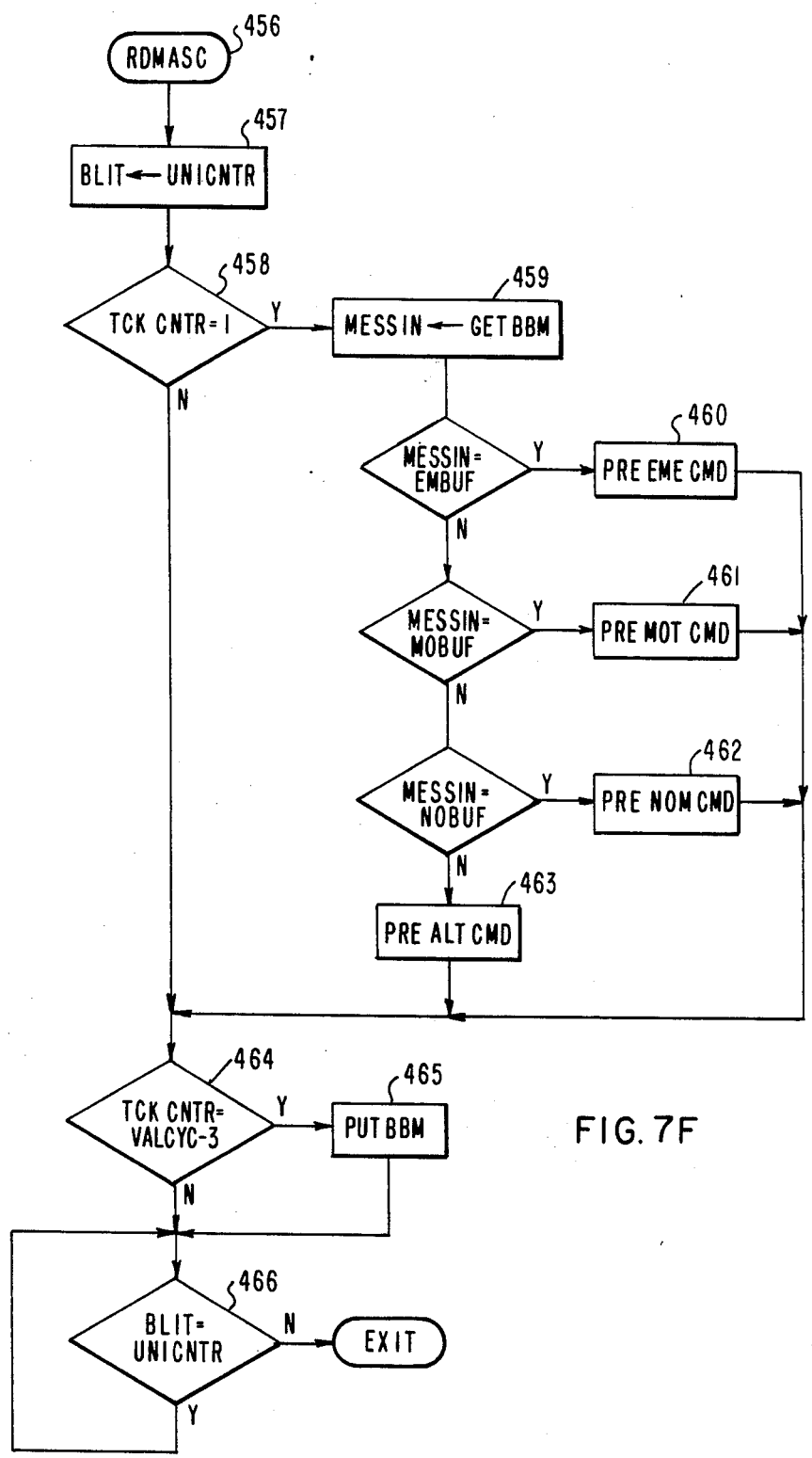

Once the system is initialized, the MAIN program 450 (FIG. 7E) begins continuous cyclical background execution. As shown in FIGS. 7E and 7F, a routine 456 called RDMASC is run to provide ongoing reading of system position commands from the bit-bus emulator which is a designated memory area in shared RAM where system commands are deposited when received from the system control board 500.

Viewed as a whole, the background and interrupt routine can take on the following finite servo states:
 0-Start-up state
 1-Initializing state
 2-Calibrating state
 3-Servo desabled state
 4-Servo enabled, hold state
 5-Servo enabled, moving state The background task is responsible for assuring that valid state transitions occur, and for sequencing the interrupt task to new states. The interrupt task is therefore written to accept "commanded" states and to supply "current" states. In addition, the background task is sequenced via commands from the bit-bus emulator. The following state transition table defines this operation:

| Current State | Command ID from bit-bus | | | | | | | | | |
|---|---|---|---|---|---|---|---|---|---|---|
| | 36 | 17 | 45 | 1 | 16 | 34 | 20 | 2 | 18 | 46 |
| 1 | −1 | −1 | −1 | −1 | −1 | 2 | −1 | −1 | −1 | −1 |
| 2 | −1 | 3 | −1 | −1 | −1 | 2 | −1 | −1 | −1 | −1 |
| 3 | 3 | 3 | 3 | 4 | −1 | −1 | −1 | 3 | −1 | 3 |
| 4 | 4 | −1 | −1 | 3 | −1 | −1 | 5 | 4 | 4 | 4 |
| 5 | −1 | −1 | −1 | 3 | 4 | −1 | 5 | −1 | −1 | −1 |

Where a "−1" indicates an illegal state transition. The 10 bit-bus commands are defined as follows:
36-Where command
37-Calibrate command
45-Install servo parameters command
1-Enable/disable servos command
16-Hold command
34-Initialize command
20-Normal motion command
2-Brake command
18-Limp command
46-Upload current servo parameters command Generally, a set of position commands is generated for the servo loops once each Valcycle, in this case once every 32 milliseconds. In turn, each Valcycle is measured by Vticks which are generated on the VME bus once every millisecond. There are thirty-two (32) Vticks in each VALCYCLE in this case.

A cycle counter named TCKCNTR counts the Vticks in each VALCYCLE. A running counter called UNICNTR keeps a summing count on Vticks up to $2^{31}$ ticks.

When the next previous VALCYCLE has been ended as indicated in FIG. 7F by the UNICNTR in block 457, block 458 operates on the beginning of the new VALCYCLE when TCKCNTR=1 to initiate reception of the new set of position commands for the new VALCYCLE. Thus, block 459 reads the new commands from the bit-bus emulator.

If the command includes an emergency command (such as disable servo), block 460 directs the emergency command to an emergency command buffer. Block 461 sends motion (position) commands to a motion command buffer. Similarly, block 462 sends the non-motion commands to a non-motion command buffer.

The blocks 460, 461 and 462 perform basic system functions. First, the command is read from the bit-bus emulator in shared RAM. Next, prescribed checks are made to validate the command. Finally, the command is routed to the designated buffer in local non-shared internal RAM.

If no direction is found to transfer a system command to an internal RAM buffer, block 463 records a no command error and prepares an alternate command (same as last command or a shutdown if this is the second occurrence of this no command error).

Next, blocks 464 and 465 send a response to the system control board 350 that the newest command has been received when the value of the tick counter nears the end of the current VALCYCLE, i.e., when it equals the VALCYC minus three. Block 466 next repeatedly polls UNICNTR until RDMASC is to be re-executed to receive the next system command.

When a VTICK occurs (i.e., once every millisecond), RDMASC is temporarily interrupted for execution of the SERVO routine 452. As shown in the flowchart in FIG. 7B, the SERVO routine 452 first performs needed bookkeeping and overhead tasks as indicated in block 470. For example, the watchdog timer is reset for the 2 millisecond interrupt. If the tick is a long tick, i.e., the tick counter equals one to mark the start of a new VALCYCLE, block 471 performs additional overhead tasks. The basic functions performed are: reset tick counter to 1; route the new position command from the system control board to the servo calculator; and process changes of state in the SERVO routine.

LOADING DATA FOR SWITCHING TO THE SERVO CALCULATOR

If the tick is a short tick, i.e., an intermediate tick in the 32 tick cycle, or after long tick overhead has been performed, block 472 prepares for transferring data to the servo calculator by loading data to the bank switched memory according to the state in which the servo calculator is to be.

Figure 7G:
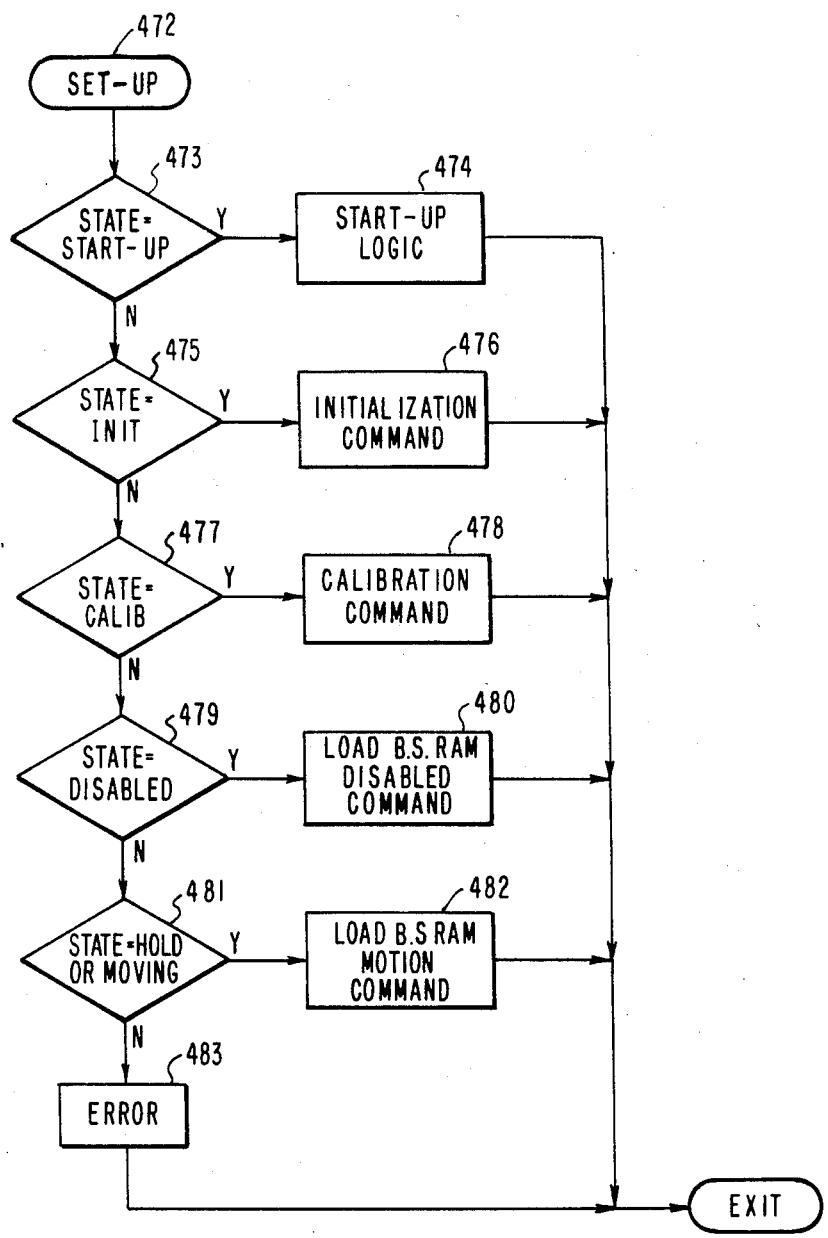
Figure 7J:
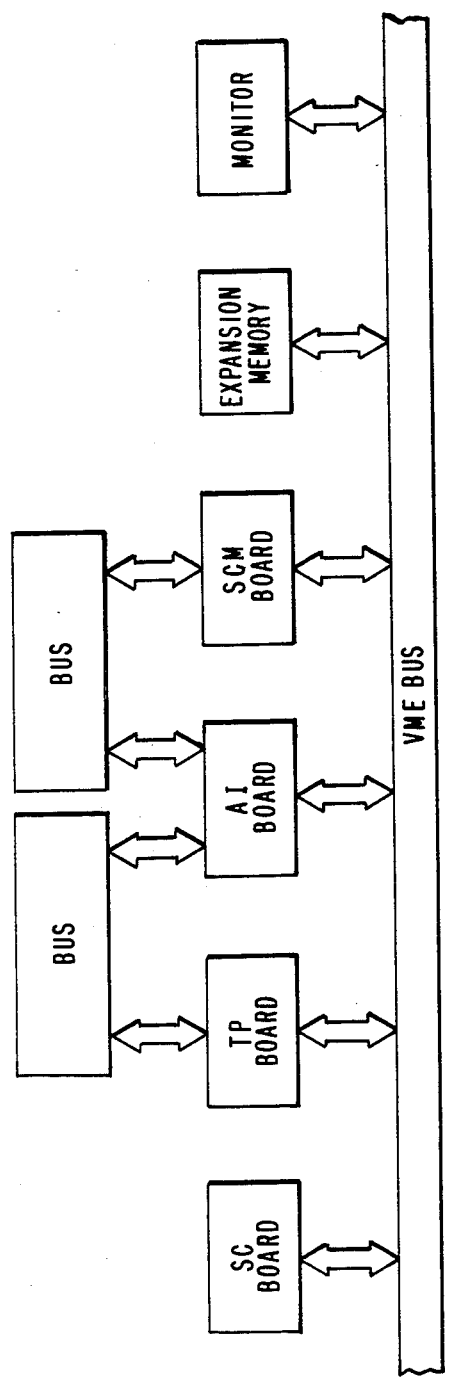

The flowchart in FIG. 7G shows the servo calculator setup in greater detail. If block 473 finds the calculator is to be in the start-up state, block 474 fetches data needed for start-up logic for downloading to the servo calculator 404 in FIG. 7A-1. . For the initialization state, blocks 475 and 476 fetch initialization command data for downloading to the servo calculator 404. Similarly, calibration command data is readied for the servo calculator 404 by blocks 477 and 478 for the calculator calibration state.

If the calculator is to be disabled, blocks 479 and 480 load into the bank switched memory a disabled command. Finally, if the calculator state is to be hold or moving, which covers most of the operating line, blocks 481 and 482 load motion command data into the bank switched memory. If none of the listed states are detected, block 483 records an error.

DATA FLOW AND TIMING

In the HOLD/MOTION state, control data generally flows as follows as seen in overview FIG. 7K. Once every VALCYCLE, i.e., once every 32 milliseconds in this case, position command data for all axes is received by the servo control board main program from the system control board and shuttled through the bank switch memory to the servo calculator. Feedback data (position and velocity) is generated for each axis every millisecond and it is transferred to the servo calculator through the bank switched memory every millisecond by the servo control data manager through operation of the servo interrupt routine.

The servo calculator computes a torque command every millisecond for each axis from the command and feedback data. In turn, the torque commands are transferred every millisecond by the servo control data manager from the bank switched memory to the torque processor board. On the TP board, torque calculations based on torque commands and current feedback are performed to generate motor voltage commands for all axes every 250 microseconds.

SWITCHING DATA TO THE SERVO CALCULATOR

After completion of the setup subroutine 472 in FIGS. 7B and 7G block 484 performs whatever data transfer service is needed for the foregound/background interface within the servo control manager 402 of FIG. 7A-1.

"MAILBOX" INTERFACE FOR 68K FOREGROUND/BACKGROUND TASKS

In order to effectively use the interrupt routines in the 68000 microprocessor of servo control manager 402 (68K), it has become necessary to perform various asynchronous "setup" operations in the background task, while using the foreground task(s) to initiate the changes. This approach allows the foreground tasks to have complete control of subordinate processors and devices. It also allows the less time critical setup to be spread out over several servo cycles. (In this discussion background refers to the non-interrupt task.)

A shared RAM mailbox interface was chosen to allow the background routine to communicate a list of tasks to be performed by the foreground routine. Each task request is encoded into a "packet" which contains the information required by the foreground task. The packet structure was designed to be simple yet as generic and efficient (in terms of decoding and execution time) as possible. The following table describes the format of the interface:

| Offset (bytes) | | Contents |
|---|---|---|
| 0 | | Semaphore byte (1 = Full, 4 = Empty) |
| 1 | | Number of Packets (requests) |
| 2-3 | | → Command Field |
| 4-5 | first | Message size (number of 16-bit words) |
| 6-9 | packet | FROM Address Field |
| a-d | | → TO Address Field |
| e-15 | | Second packet (items 2-d from above) |
| 16-1d | | Third packet |

For the servo interrupt routine the elements in each packet are interpreted as follows (descriptions assume a single packet is presented):
Command Field (CF):
CF>0: TMS 320 servo command

*Load CF into the TMS command list (see "TMS Ping-Pong Memory Map")
*copy "message size" words from "FROM" and append to the TMS input buffer.
*set semaphore byte to "empty"

CF=0: Transfer data command
*copy "message size" words from "FROM" to "TO"
*set semaphore byte to "empty"

CF=−9999: TMS reset command (allows direct writes to TMS program memory)
*disable (level 5-VTICK) interrupts *put TMS into reset state
*copy "message size" words from "FROM" and "TO"
*remove reset state from TMS
*set stick to bank 0
*enable (level 5-VTICK) interrupts
*set sempahore byte to "empty"

CF<0: Multipass TMS 320 servo command
*set CF=−CF
*Load CF into the TMS command list
*copy "message size" words from "FROM" and append to the TMS input buffer.
*DO NOT set semaphore byte to "empty".

Notes:
*In order to avoid time consuming packet management for multipass commands, ALL packets will be re-processed on the second pass if ANY packet is of type Multipass.
*Because resetting the TMS results in automatically switching to bank 0 (which may not be the bank earlier packets were stored in), the TMS bank memory is NOT switched if a TMS reset command is present. Therefore these commands should be sent separately.
*Currently 300 (hex bytes of system resource RAM is set aside for the mailbox area and for free space to store the data. The following list of suggested global symbol names further defines the area.

| List of Global Symbols | | |
|---|---|---|
| FB_SHR | 0x34900 | /* shared ram base address to start of /* foreground/background semaphore area */ |
| FB_SEM | 0x0000 + FB_SHR | /* ptr to FB semaphore byte */ |
| FB_NOP | 0x0001 + FB_SHR | /* ptr to number of packets (byte) */ |
| FB_CF1 | 0x0002 + FB_SHR | /* ptr to the first command field */ |
| FB_MAX | 0x0004 | /* maximum number of packets allowed */ |
| FB_DAT | 0x0032 + FB_SHR | /* ptr to area of free space to store data to /* be transferred to foreground task */ |
| FB_MXD | 0x02ce | /* maximum size of FB_DAT in bytes */ |
| FB_EMPTY | 0x04 | /* no command list */ |
| FB_FULL | 0x01 | /* command list present */ |

If block 485 in FIG. 7B detects that the TMS servo calculator 404 of FIG. 7A-1 is ready, block 486 transfers the previously prepared position command and/or other data to the calculator 404 through the ping-pong memory 434. If the block 485 or block 487 finds that the servo calculator 404 is in a defective state, an error shutdown is commanded. The following command list provides greater detail on the data transferred to the servo calculator.

| Ping-Pong Memory Map | | | |
|---|---|---|---|
| Adresses | | | |
| 68k | TMS | Symbol | Contents |
| 3c000-3c007 | 0-7 | TMSCOM | TMS Command List |
| 3c010-3c09f | 8-4f | TMSIN | TMS Input Buffer |

-continued

Ping-Pong Memory Map

| Adresses | | | |
|---|---|---|---|
| 68k | TMS | Symbol | Contents |
| 3c0a0-3c0ff | 50-7f | TMSSTA | TMS Status Buffer |
| 3c100-3c11f | 80-8f | TMSTOR | TMS Torque Output Buffer |
| 3c120-3c21f | 90-10f | TMSLOG | TMS Logged Data Buffer |
| 3c220-3c7ff | 110-3ff | TMSGC | TMS General Communication Area |

Each of the buffers which comprise the 1k word ping-pong memory is described in detail below. The symbols shown in the table are simply suggested names to use for the start of each buffer to promote consistency between the 68k and TMS code. The buffers are organized such that the first two areas (TMSCOM and TMSIN) are read-only for the TMS (write-only for the 68k). The next three areas are write-only for the TMS and vise versa for the 68k. Whereas the final area (TMSGC) is a read/write area for both processors.

The TMS command list is simply a NULL command terminated list of task requests for the TMS to perform in a given cycle. Up to seven (7) commands can be included in a list. Each element is a 16-bit command used to direct the actions of the TMS. The preferred commands are as follows:

| Command | Action |
|---|---|
| 1 | Not currently used |
| 2 | Not currently used |
| 3 | Not currently used |
| 4 | Not currently used |
| 5 | Not currently used |
| 6 | Calibrate initial position and velocity |
| 7 | Calculate torque (execute servo with no cycle update) |
| 8 | Calculate torque (execute servo with cycle update) |
| 9 | Not currently used |
| a | Identify TMS servo parameters and version ID |

The TMS input buffer contains additional input data required by the TMS conditioned on the value of the command word and its relative location in the command list. Input data required by each command is stored sequentially in the same order as the commands in the command list. Currently this buffer has the following format if the command word=8 (e.g., a cycle or "long" tick); note that the organization of this table is by 16-bit "short" word count.

TMSIN if absolute encoders and tachometers are used (e.g. 860/rx)

| Word | Contents |
|---|---|
| 0 | Time stamp |
| 1 | Servo enable mask |
| 2 | Velocity scale factor |
| 3 | High word of position command for joint 1 |
| 4 | Low word of position command for joint 1 |
| 5 | Absolute encoder measurement for joint 1 |
| 6 | Absolute velocity measurement for joint 1 |
| 7-10 | Words 3-6 for joint 2 |
| 11-14 | Words 3-6 for joint 3 |
| 15-18 | Words 3-6 for joint 4 |
| 19-22 | Words 3-6 for joint 5 |
| 23-26 | Words 3-6 for joint 6 |

If the command word=7 (e.g., a non-cycle or "short" tick) the TMS input buffer assumes the following form:

| Word | Contents |
|---|---|
| 0 | Time stamp |
| 1 | Servo enable mask |
| 2 | Absolute encoder measurement for joint 1 |
| 3 | Absolute velocity measurement for joint 1 |
| 4-5 | Words 2-3 for joint 2 |
| 6-7 | Words 2-3 for joint 3 |
| 8-9 | Words 2-3 for joint 4 |
| 10-11 | Words 2-3 for joint 5 |
| 12-13 | Words 2-3 for joint 6 |

TMSIN for command=8 if ONLY incremental encoders are used (e.g., Puma line)

| Word | Contents |
|---|---|
| 0 | Time stamp |
| 1 | Index interrupt/servo enable mask |
| 2 | Carry (wrap) for position feedback |
| 3 | Velocity scale factor (1608 format) |
| 4 | High word of position command for joint 1 (in 3208 form) |
| 5 | Low word of position command for joint 1 |
| 6 | Encoder count/index for joint 1 |
| 7-9 | Words 4-6 for joint 2 |
| 10-12 | Words 4-6 for joint 3 |
| 13-15 | Words 4-6 for joint 4 |
| 16-18 | Words 4-6 for joint 5 |
| 19-21 | Words 4-6 for joint 6 |

If the command word=7 (e.g., a non-cycle or "short" tick) the TMS input buffer assumes the following form when using incremental encoders:

| Word | Contents |
|---|---|
| 0 | Time stamp |
| 1 | Index interrupt/servo enable mask |
| 2 | Encoder count/index for joint 1 |
| 3 | Encoder count/index for joint 2 |
| 4 | Encoder count/index for joint 3 |
| 5 | Encoder count/index for joint 4 |
| 6 | Encoder count/index for joint 5 |
| 7 | Encoder count/index for joint 6 |

TMSIN for command=8 if absolute resolvers are used (e.g., 100 robot)

| Word | Contents |
|---|---|
| 0 | Time stamp |
| 1 | Servo enable mask |
| 2 | Velocity scale factor |
| 3 | High word of position command for joint 1 |
| 4 | Low word of position command for joint 2 |
| 5 | Absolute resolver measurement for joint 1 |
| 6-8 | Words 3-5 for joint 2 |
| 9-11 | Words 3-5 for joint 3 |
| 12-14 | Words 3-5 for joint 4 |
| 15-17 | Words 3-5 for joint 5 |

-continued

| Word | Contents |
|---|---|
| 18-20 | Words 3-5 for joint 6 |

If the command word=7 (e.g., a non-cycle or "short" tick) the TMS input buffer assumes the following form:

| Word | Contents |
|---|---|
| 0 | Time stamp |
| 1 | Servo enable mask |
| 2 | Absolute resolver measurement for joint 1 |
| 3 | Absolute resolver measurement for joint 2 |
| 4 | Absolute resolver measurement for joint 3 |
| 5 | Absolute resolver measurement for joint 4 |
| 6 | Absolute resolver measurement for joint 5 |
| 7 | Absolute resolver measurement for joint 6 |

If the command word=6 (e.g., a calibration command) the TMS input buffer is:

| Word | Contents |
|---|---|
| 0 | Time stamp |
| 1 | Absolute position in encoder bits (3208) for joint 1 |
| 2 | Absolute position in encoder bits (3208) for joint 2 |
| 3 | Absolute position in encoder bits (3208) for joint 3 |
| 4 | Absolute position in encoder bits (3208) for joint 4 |
| 5 | Absolute position in encoder bits (3208) for joint 5 |
| 6 | Absolute position in encoder bits (3208) for joint 6 |

If the command word=A (e.g., ID command), no inputs are required in the TMS input buffer.

The purpose of the TMS status buffer is to provide an area where any process can look to find out the current position/velocity of the arm. As such this buffer is ordered as follows:

| Word | Contents |
|---|---|
| 0 | Time stamp (future) |
| 1 | Enable/disable bit mask |
| 2 | Limp status bit mask |
| 3 | Brake status bit mask |
| 4 | PFB, Position of joint 1 in encoder bits in 3208 form (high word) |
| 5 | PFB, Position of joint 1 in encoder bits (low word) |
| 6 | VFINO, Velocity of joint 1 in encoder bits/servo-tick in 1608 form |
| 7-9 | 4-6 for joint 2 |
| 10-12 | 4-6 for joint 3 |
| 13-15 | 4-6 for joint 4 |
| 16-18 | 4-6 for joint 5 |
| 19-21 | 4-6 for joint 6 |
| 22 | Status (error/no error/command error) |
| 23 | Servo coincidence word (fine/course) |
| 24-25 | Error status (hi and low) |
| 26 | Input task bit mask (hi byte)/completion status bit mask (low byte) |

The torque output buffer contains the torques to be applied over the next servo tick. The torques are formatted such that the 68k can simply copy them directly to the appropriate device (DAC/TP board) without modification. This buffer is simply organized as:

| Word | Contents |
|---|---|
| 0 | Torque output for joint 1 |
| 1 | Torque output for joint 2 |
| 2 | Torque output for joint 3 |
| 3 | Torque output for joint 4 |
| 4 | Torque output for joint 5 |
| 5 | Torque output for joint 6 |

The logged data buffer currently is composed of the following items all recorded at the servo sample rate:

| Word | Contents |
|---|---|
| 0 | Joint 1 PCT, Position command in 3208 form (high word) |
| 1 | Joint 1 PCT, Position command (low word) (bits) |
| 2 | Joint 1 VCT, Velocity command in 1608 form (B/tick) |
| 3 | Joint 1 VFBF Filtered velocity feedback in 1608 form (B/tick) |
| 4 | Joint 1 Position error in 16Q5 form (bits) |
| 5 | Joint 1 Integration error in 32016 form (high word) |
| 6 | Joint 1 Integration error (low word) |
| 7 | Joint 1 Velocity error in 1608 form (B/tick) |
| 8 | Joint 1 DVHATC Accel command in 1608 (B/tick/tick) |
| 9 | Joint 1 SUM, Intermediate signal sum in 1600 form |
| 10-18 | 0-8 for joint 2 |
| 19-27 | 0-8 for joint 3 |
| 28-36 | 0-8 for joint 4 |
| 37-45 | 0-8 for joint 5 |
| 46-54 | 0-8 for joint 6 |

The General Communication area is used as a general read/write area for passing information to and from the servo calculator.

Next, block 488 in FIG. 7B determines whether the torque processor board 600 of FIG. 6 is ready for data transfer and if not an error shutdown is commanded. Normally, however, the TP board 600 would be ready and block 489 transfers torque command and/or other data to the TP board 600. Other data may include servo gains and correct gains for the particular robot being controlled, all of which would be downloaded during set-up time. Blocks 490 and 491 then perform synchronous and one-shot data logging routines. The one-shot data logger 491 is flagged for operation by various routines when an error occurs.

SCM Data Logger Mechanisms

Both data loggers 490 and 491 shown in FIGS. 7H and 7I, respectively, are controlled by a shared RAM "mailbox" interface. In addition, both are invoked in the servo interrupt routine immediately following the execution of the servo code. Therefore, the fastest rate at which data can be logged is dictated by the servo update rate employed (currently this is 1 ms). In the case of the one-shot data logger, it can also be invoked via a subroutine call. This is provided so that conditions present during unexpected errors can be recorded immediately (for example, prior to an emergency shutdown).

The shared RAM interface for the synchronous data logger is organized as follows (where all addresses are specified as offsets from a base address):

| Offset | Size | Contents |
|---|---|---|
| 0 | 8 bits | Semaphore (1 = > log data) |
| 1-3 | 24 bits | Not used |
| 4-5 | 16 bits | Starting tick counter |
| 6-7 | 16 bits | Not used |
| 8-9 | 16 bits | Ending tick counter |
| a-b | 16 bits | Not used |

-continued

| Offset | Size | Contents |
|---|---|---|
| c-f | 32 bits | Pointer to list of addresses to log (32 bit data transfers) |
| 10-13 | 32 bits | Pointer to area in memory for SCM to deposit logged data |

Note: The areas which are not used in the above map will be eliminated in the future. They exist only because the original interface exclusively used long word quantities.

The shared RAM interface for the asynchronous one-shot data logger is organized as follows (where all addresses are specified as offsets from a base address):

| Offset | Size | Contents |
|---|---|---|
| 0 | 8 bits | One-shot trigger (1 = log, reset to 0) |
| 1 | 8 bits | Not used |
| 2-3 | 16 bits | Total event counter |

In the servo calculator, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithm executed by the servo calculator is as follows:

DESCRIPTION OF SERVO CALCULATOR ALGORITHM

The major functional blocks which characterize the algorithm are shown in FIG. 3. Notice that the servo calculator includes all of FIG. 3 up to the Torque command. The Servo Calculator will first be described from an input output point of view as it relates to the 68000 based servo interupt routine as shown in FIG. 7K. This macroscopic view will then be followed by a detailed mathematical description of each functional block shown in FIG. 3.

In the servo calculator all mathematical operations are performed on integers. Because of the integer nature of the data, it is important to properly scale all quantities used. To indicate the scaling, a "Q" formatted numbering scheme is employed. A number is said to be formatted as 16Q6, for example, if the data is 16 bits wide, the least significant (LS) 6 bits is used to represent the fractional portion of the value, and the most significant (MS) 10 bits is used to represent 2's complement (sign and magnitude) of the non-fractional part of the value.

The algorithm is defined in terms of a 1 millisecond base sample period, and a 32 millisecond Val cycle. Each sample period, data is exchanged between the servo interupt routine and the servo calculator via the bank switch memory (see FIG. 7K.) Additional inputs are transferred every Val cycle (in this case every 32 milliseconds.) In particular, the following key data is exchanged (Note, this memory based interface to the servo calculator is described in detail under the previous heading "Ping Pong Memory Map"):

| (1) Inputs sent every millisecond: | | |
|---|---|---|
| (6) Position feedback | Pfb | [encoder bits] |
| (6) Velocity feedback | Vfb | [tachometer bits] |
| (1) Servo joint enable mask | SEjm | [unitless bit mask] |

Where:
*Pfb is formatted as follows for the Unimate series:
  Adddddddddddddddd
With A being an annunciator bit which is set if a hardware detected error in the data is found, and d indicating the 15 bits of absolute encoder data.
*Pfb is formatted as an 8Q0 quantity in the Puma series, and represents 8 bits of incremental encoder data.
*Vfb is only used in the Unimate series (Vfb is generated in the Puma series by differentiating Pfb). It is formatted as follows:
  xxxxSdddddddddddd
With x representing unused bits, and the remaining 12 least significant bits (LSB) formatted as 12Q0.
*Sejm is defined as:
  xxxxxxxxxIjjjjjj
Where the I bit is set if the integrator is to be bypassed in the position loop compensator (block 160 in FIG. 3), and each j bit set coresponds to executing the servo compensation and computing the torque output for that joint. Where the LSB is for joint 1, and the MS j bit corresponds to joint 6.)

| (2) Additional Inputs sent every Val cycle (32 milliseconds): | | |
|---|---|---|
| (6) Position command | Pc | formatted as 32Q8 [encoder bits] |
| (1) Velocity scale factor | SFv | formatted as 16Q8 [unitless] |
| (3) Outputs sent every millisecond: | | |
| (6) Torque command | Tc | formatted as 16Q6 |
| Various status Information as described in "Ping Pong Memory Map" | | |
| Various logged data as described in "Ping Pong Memory Map" | | |

Figure 7K:
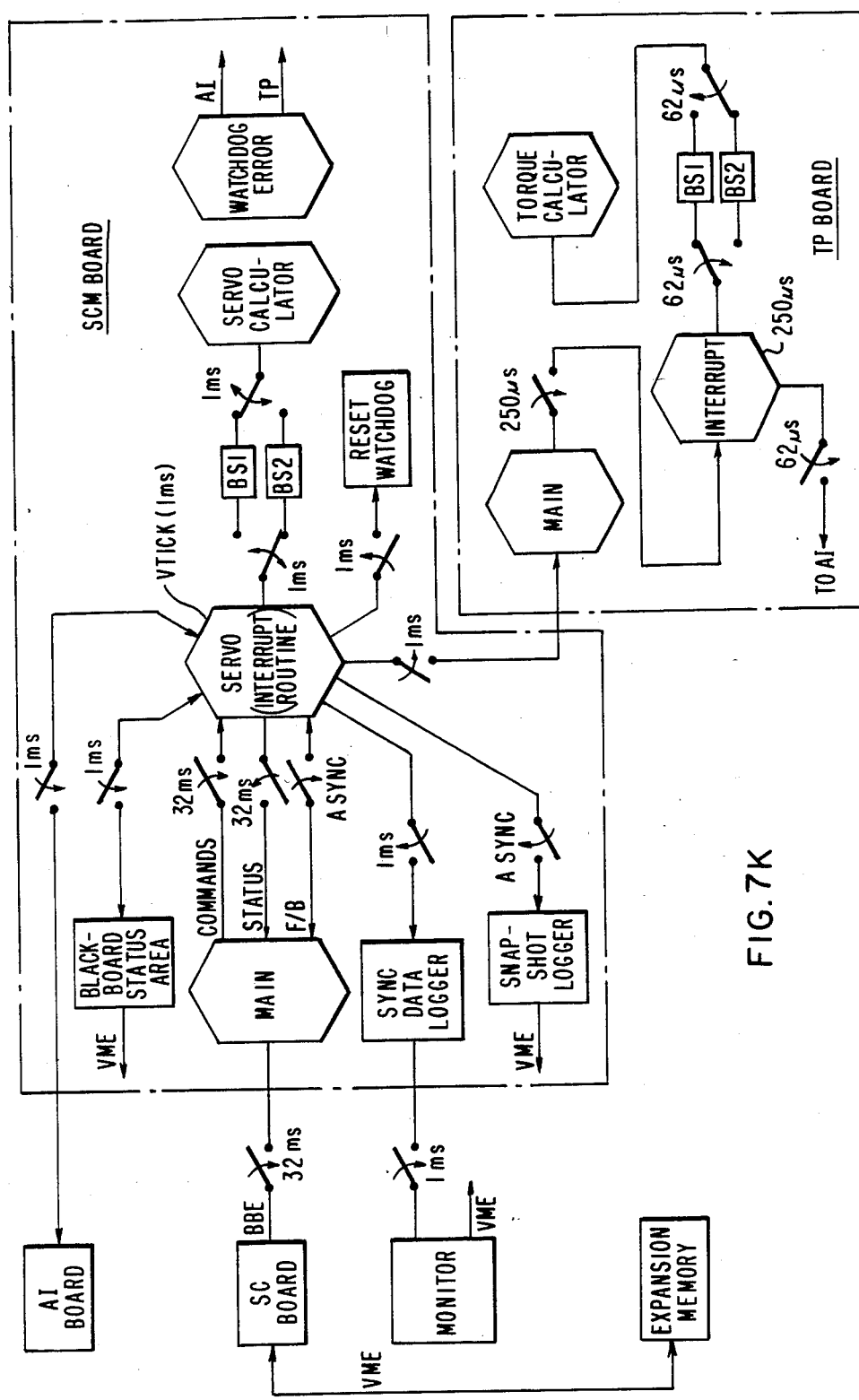

FIG. 7K shows the source/destination of each of the inputs and outputs described above. In particular, notice that Pc and SFv are passed from Val (block Main) to the bank memory via the servo interupt routine once every Val cycle. Status information is passed back to Val both at a 32 millisecond and a 1 millisecond rate (via the blackboard status area). Pfb and Vfb are obtained via the AI board, and Tc is passed to the TP board every millisecond. In addition, logged data is made available to the synchronous data logger every millisecond, and to the snap-shot logger whenever an error occurs.

The details of the Servo calculator will now be discussed systematically. The algorithm will be described for a single axis for a Unimate robotic arm. Identical operations are performed on each axis servoed, with the axes selected by means of the servo enable mask, Sejm, as defined above under C). Each functional block in FIG. 3 will be described in the approximate order of execution.

1 MILLISECOND COMMAND GENERATION

(1) Block 128, Position command presentation.

(a) Inputs:

| | |
|---|---|
| Pc(i) | Position command at time "i", where i represents the val cycle index. Pc(i) is the desired position in encoder bits (32Q8). The robot should be at Pc(i) by the end of the current val cycle (e.g. just prior to time i+1). |

(b) Process:
Executed once every val cycle:
Pcd(i) = Pc(i) − Pc(i−1)
Vcd(i) = LOWER [Pcd(i)/32]
k = 0
Pct(k) = Pc(i−1)
where:

| | |
|---|---|
| Pcd(i) | is the Position command (first) difference in encoder bits 32Q8 |
| Vcd(i) | is the Velocity commmand difference in encoder bits/tick (16Q8). Tick refers to 1 millisecond. |
| LOWER[ ] | returns the lower 16 bits of a 32 bit quantity. |
| k | represents the tick level (1 millisecond) index. |
| Pct(k) | is the tick level position command in encoder bits (32Q8). This module initializes its starting value (e.g. for Pct(O).) |

(c) Outputs:

| | |
|---|---|
| Pct(k) | encoder bits (32Q8). |
| Pc(i) | encoder bits (32Q8). |
| Vcd(i) | encoder bits/tick (16Q8). |
| k | tick index |

(2) Block 148, Position command interpolator.

(a) Inputs:

| | |
|---|---|
| Pct(k) | encoder bits (32Q8). |
| Pc(i) | encoder bits (32Q8). |
| Vcd(i) | encoder bits/tick (16Q8). |

(b) Process:
k = k + 1
If (k < 32) then    Pct(k) = Pct(k-1) + Vcd(i)
Else                Pct(k) = Pc(i)
Where:
The Else portion above simply forces the final position command to exactly match the desired Val position command (to avoid problems with accumulated errors due to integer arithmetic)

(c) Outputs:

| | |
|---|---|
| Pct(k) | encoder bits (32Q8) |
| k | tick index |

(3) Block 126, Velocity command generator.

(a) Inputs:

| | |
|---|---|
| Vcd(i) | encoder bits/tick (16Q8). |
| SFv | Velocity scale factor, Unitless (16Q8) |

(b) Process:
Executed once every val cycle:
Vcds(i) = LOWER[SFv * Vcd(i)/256]
Acd(i) = LOWER[Vcds(i)/32]
Vct(k) = Vcd(i-1)
Where:

| | |
|---|---|
| Vcds(i) | is the scaled velocity command difference in encoder bits/tick (16Q8). |
| Acd(i) | is the scaled acceleration command in encoder bits/tick/tick (16Q8). |
| Vct(k) | is the initial value for Vct(O) in encoder bits/tick (16Q8). |

(c) Outputs:

| | |
|---|---|
| Vct(k) | encoder bits/tick (16Q8) |
| Acd(i) | encoder bits/tick/tick (16Q8) |

(4) Block 138, Velocity command interpolator.

(a) Inputs:

| | |
|---|---|
| Vct(k) | encoder bits/tick (16Q8) |
| Acd(i) | encoder bits/tick/tick (16Q8) |

(b) Process:
If (k < 32) then    Vct(k) = Vct(k-l) + Acd(i)
Else                Vct(k) = Vcd(i)
Where:
The Else portion above simply forces the final velocity command to exactly match the desired velocity command (to avoid problems with accumulated error due to integer arithmetic)

(c) Outputs:

| | |
|---|---|
| Vct(k) | encoder bits/tick (16Q8) |

(5) Blocks 130 & 134, Acceleration command generator.

(a) Inputs:

| | |
|---|---|
| Acd(i) | encoder bits/tick/tick (16Q8) |

(b) Process:
Tff(k) = Tfg * Acd(i)
Where:

| | |
|---|---|
| Tff(K) | is the tick level torque feedforward command in torque bits (32Q16). |
| TFg | is the torque feedforward gain (16Q8) |

(c) Outputs:

| | |
|---|---|
| Tff(k) | Torque feedforward in torque bits (32Q16) |

At this point all three command inputs (position, velocity, and torque FF) have been computed and are present at the three summing nodes.

1 MILLISECOND FEEDBACK GENERATION

(1) Position Feedback Path 150 in FIG. 3

(a) Inputs:

| | |
|---|---|
| Pfb | encoder bits (16Q0) |

(b) Process:
Pfb(k) = 256 * Pfb (c) Outputs:

| | |
|---|---|
| Pfb(k) | encoder bits (32Q8) |

(2) Velocity Feedback blocks 144 and 146

(a) Inputs:

| | |
|---|---|
| Vfb | tachometer bits (12Q0) |

(b) Process:
Vfb(k) = LOWER[ (Kfb * ( SXT[Vfb] + Voff))/128]

$$Vfb(k) = Cvf * \left[ \frac{z + Bvf}{z - Avf} \right] * Vfb(k)$$

Where:

| | |
|---|---|
| Voff | velocity offset in tachometer bits (16Q0) |
| STX[ ] | sign extend function |
| Kfb | velocity conversion scale factor (16Q15) in (encoder bits/tick)/(tachometer bits) |
| Vfb(k) | tick level velocity feedback signal in encoder bits/tick (16Q8) |

The second equation provides for first order digital filtering of the velocity feedback signal. This filter is usually only used for the Puma line since Vfb is filtered via an analog filter before the A/D in the unimates.

| | |
|---|---|
| Cvf | Velocity FB filter gain (16Q12) |
| Bvf | Velocity FB backward filter coefficient (16Q12) |
| Avf | Velocity FB forward filter coefficient (16Q12) |
| $z^{-1}$ | digital delay operator |

(c) Outputs:

| | |
|---|---|
| Vfb(k) | encoder bits/tick (16Q8) |

FORWARD LOOP COMPENSATION

(1) Velocity Loop, block 156, summing node 154

(a) Inputs:

| | |
|---|---|
| Vct(k) | encoder bits/tick (16Q8) |
| Vfb(k) | encoder bits/tick (16Q8) |

(b) Process:
Ve(k) = Kv * (Vct(k) − Vfb(k)) * 256
Where:

| | |
|---|---|
| Ve(k) | scaled velocity error to be summed at node 162. (32Q16) |
| Kv | velocity loop gain (16Q0) |

(c) Outputs:

| | |
|---|---|
| Ve(k) | scaled velocity error in torque bits (32Q16) |

(2) Position Loop, block 160, summing node 158

-continued (a) Inputs:
    Pct(k)     encoder bits (32Q8)
    Pfb(k)     encoder bits (32Q8)
(b) Process:
    Pen(k) = Pct(k) − Pfb(k)
    If (|Pen(k)| > ENV)   Report envelope error
    Pe(k) = LOWER[ Pen(k)/8]

$$Pe(k) = Cp * \left[ \frac{z + Bp}{z - Ap} \right] * Pe(k)$$

$$Pef(k) = \left[ \frac{Kp + Ki * z}{z - 1} \right) * Pe(k)$$

Where:
Pen(k)    position error (marked 122 in FIG. 3) in encoder bits (32Q8)
ENV    position envelope limit in encoder bits (32Q8)
| |    absolute value function
Pe(k)    truncated position error in encoder bits (16Q5)
The fourth equation provides for first order digital filtering of the position error signal, where:
Cp    position error filter gain (16Q12)
Bp    position error backward filter coefficient (16Q12)
Ap    position error forward filter coefficient (16Q12)
$z^{-1}$    digital delay operator
The fifth equation provides for position and integral digital compensation of the position error signal, where:
Pef(k)    filtered position error in torque bits (32Q16)
Kp    proportional position gain (16Q3)
Ki    integral position gain (16Q10)
Note, if the "I" bit is set in SEjm then the integral term (Ki * z) is frozen at the current value (this compensates for any gravity loading)
(c) Outputs:
    Pef(k)    filtered position error in torque bits (32Q16)

(3) Torque FF Loop, block 166, summing node 162
(a) Inputs:
    Pef(k)    filtered position error in torque bits (32Q16)
    Ve(k)    scaled velocity error in torque bits (32Q16)
    Tff(k)    Torque feedforward in torque bits (32Q16)
(b) Process:
    Te(k) = LOWER[ Pef(k) + Ve(k) + Tff(k)]

$$Tc(k) = \left[ \frac{(1-Aff2) * z}{z - Aff2} \right] \left[ \frac{Kff}{Kff + 1} + Cff * \frac{Aff1 * z}{z - (1-Aff1)} \right] * Te(k)$$

Where:
Te(k)    uncompensated torque command in torque bits (16Q0)
Tc(k)    compensated torque command in torque bits (16Q6)
The second equation provides for a first order digital rolloff filter (first term) and lead-lag compensation (second term) of the torque command signal, where:
Kff    Torque FF loop compensator feed through gain (16Q15)
Cff    Torque FF loop compensator constant gain (16Q12)
Aff1    Torque FF loop compensator first backward gain (16Q15).
Aff2    Torque FF loop compensator second backward gain (16Q15)
The fifth equation provides for position and integral digital compensation of the position error signal, where:
Pef(k)    filtered position error in torque bits (32Q16)
Kp    proportional position gain (16Q3)
Ki    integral position gain (16Q10)
Note, if the "I" bit is set in SEjm then the integral term (Ki * z) is frozen at the current value (this compensates for any gravity loading)
(c) Outputs:
    Tc(k)    compensated torque command in torque bits (16Q6)

MOTION SOFTWARE AT THE SYSTEM LEVEL

Robot position commands are generated by motion software at the system level. In the basic robot control, system motion software is resident on the SCM board 400.

Figure 9A:
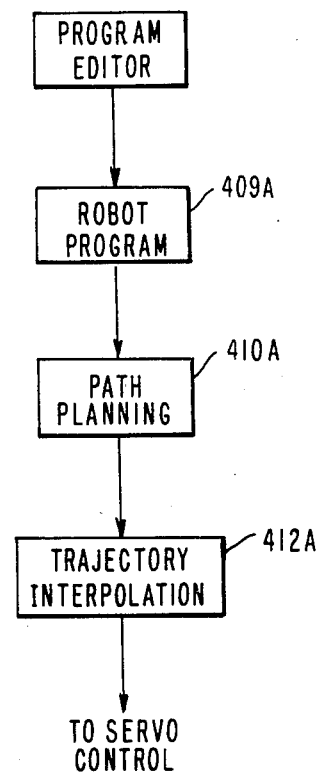
FIG. 9A shows a flow sequence for producing robot programs.

As shown in FIG. 9A, the system motion software includes a path planning program 410A and a trajectory interpolation program 412A. A robot program 498A prepared by the user, in this case preferably with use of the present assignee manufacturer's programming language called VAL, specifies the robot destination points along its programmed path as well as certain other requests and specifications regarding robot operation. In effect, the planning and trajectory programs operate at the system level to process robot program outputs so as to enable robot controller execution of the robot program.

Thus, where a complicated path has been programmed, the robot program normally includes additional intermediate path points. Additionally, the robot program specifies tool tip speed, acceleration and deceleration as a percentage of maximum, and the type of path control, i.e., continuous or point-to-point.

The planning and trajectory programs can be installed on internal UNIVAL ™ robot board memory, preferably EPROM, or it may be loaded when placed in use into general board memory from floppy disk or other storage means. The user robot program is loaded into UNIVAL board memory at the time of use.

In the case of the basic UNIVAL ™ robot control, system motion software is resident on the SCM board 400. In expanded versions of the UNIVAL ™ robot control, the system motion software is resident on the system control board. Of course, other variations are possible.

The planning program 410A runs on a demand basis, i.e., when a new destination point is received from the robot program. The trajectory interpolation program 412A runs cyclically at the system cycle rate, i.e., at the rate of once each 32 or 16 or 8 milliseconds in the preferred embodiment depending on the configuration of the UNIVAL ™ robot control system as explained elsewhere herein or in the referenced patent applications.

1. PLANNING PROGRAM

Basically, planning is performed by the robot control to define how the robot tool tip is to move from its present position to its commanded destination. Thus, the planning program generates a time profile for acceleration, slew and deceleration for successive segments of motion defined by the robot program.

Figure 9B:
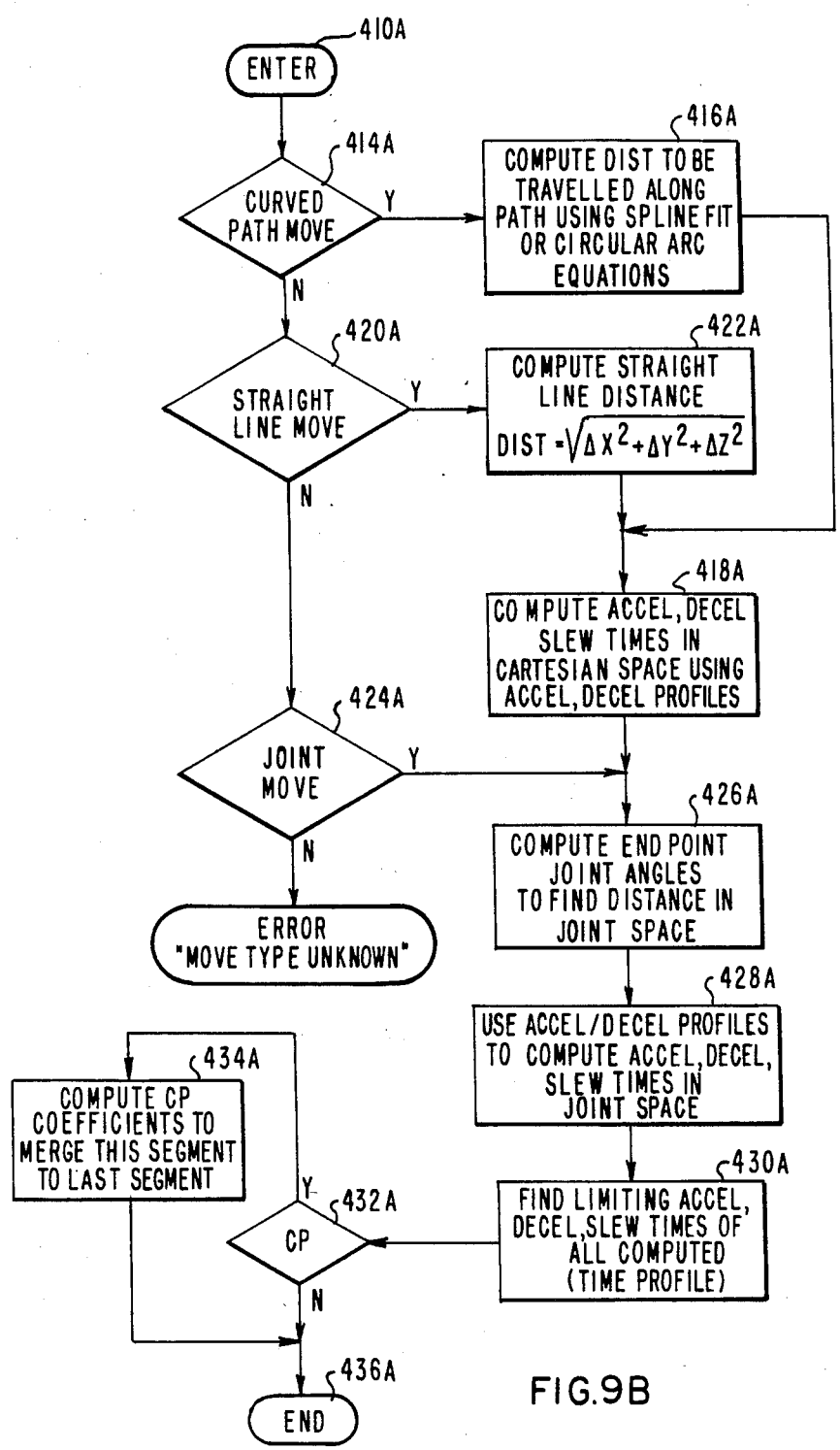

As shown in FIG. 9B, the planning program 410A determines the type of move to be made for each segment and then computes the segment time profile in accordance with the type of move.

Thus, block 414A determines whether a prescribed path move has been specified. If so, box 416A computes the distance to be traveled along the path using spline fit equations (up to third order polynomials in the present embodiment) and/or circular arc equations. Block 418A then computes the acceleration, slew and deceleration times in Cartesian space making use of selected acceleration and deceleration profiles (squarewave, sinusoidal wave or table of values profiles in the present embodiment).

Reference is made to Ser. No. 932,840 for more disclosure on the planning feature that employs spline path fitting. Reference is made to Ser. No. 932,986 for more disclosure on the planning feature that employs acceleration/deceleration profile selection.

If a prescribed path move has not been directed, block 420A detects whether a straight line move is to be executed. In a straight line move, the tip of the tool moves along a straight line in Cartesian space and thus moves across the shortest distance between its present location and the destination location. A straight line move may not be the fastest move between two points since a joint move may be faster. The nature of the user application determines whether and when straight line moves are needed.

As in the case of a prescribed path move, the distance to be traveled in Cartesian space is computed when a straight line move has been directed. Thus, block 422A computes the straight line distance with use of the indicated formula.

A joint move is employed when the user wants the tool tip to be moved from one point to another in the shortest time. However, joint moves are avoided obstacles exist in the field of possible motion. In a joint move, all of the joints are moved in coordination to produce the fastest tool tip move regardless of the path of the tool tip.

Box 424A determines whether a joint move is to be executed. If so, block 426A computes the endpoint joint angles for all axes for the joint move. Next, the joint distance is computed in joint space by taking the difference between the destination and present joint angles for each axis. The joint move for each joint is accordingly established.

Similarly, block 426A computes the joint moves in joint space for prescribed path and straight line moves. Block 428A then computes the acceleration, slew and deceleration times in joint space from the joint distances using the selected acceleration/deceleration profiles, i.e., the time profile for each joint motion is basically determined.

Box 430A next determines what limits apply to acceleration, slew and deceleration times to modify the time profiles in accordance with limits if necessary. The limit time for any particular joint is set as a limit time for all of the joints, i.e., for the move as a whole, The acceleration/deceleration (torque) and velocity capabilities of the robot being controlled are used in setting time limits.

For disclosure on a feature of the UNIVAL TM robot control in which the time for a move is specified by the user (i.e., programmed time move), reference is made to Ser. No. 932,988. The manner in which programmed time moves are integrated into determining the joint time profiles (block 430A).

If box 432A determines that continuous path operation has been directed by the user, box 434A computes the continuous path coefficients to be used for smooth merging of the present motion segment with the upcoming motion segment. In smoothing the transition between the slews of successive motion segments, box 434A essentially eliminates unnecessary deceleration/acceleration in changing from one velocity to another. Reference is made to Ser. No. 932,985 for more disclosure on the operation of the continuous path feature of the UNIVAL TM robot control.

Once continuous path smoothing calculations have been completed or if continuous path smoothing has not been required, block 436A ends execution of the planning program.

2. TRAJECTORY PROGRAM

Figures 1, 9C:
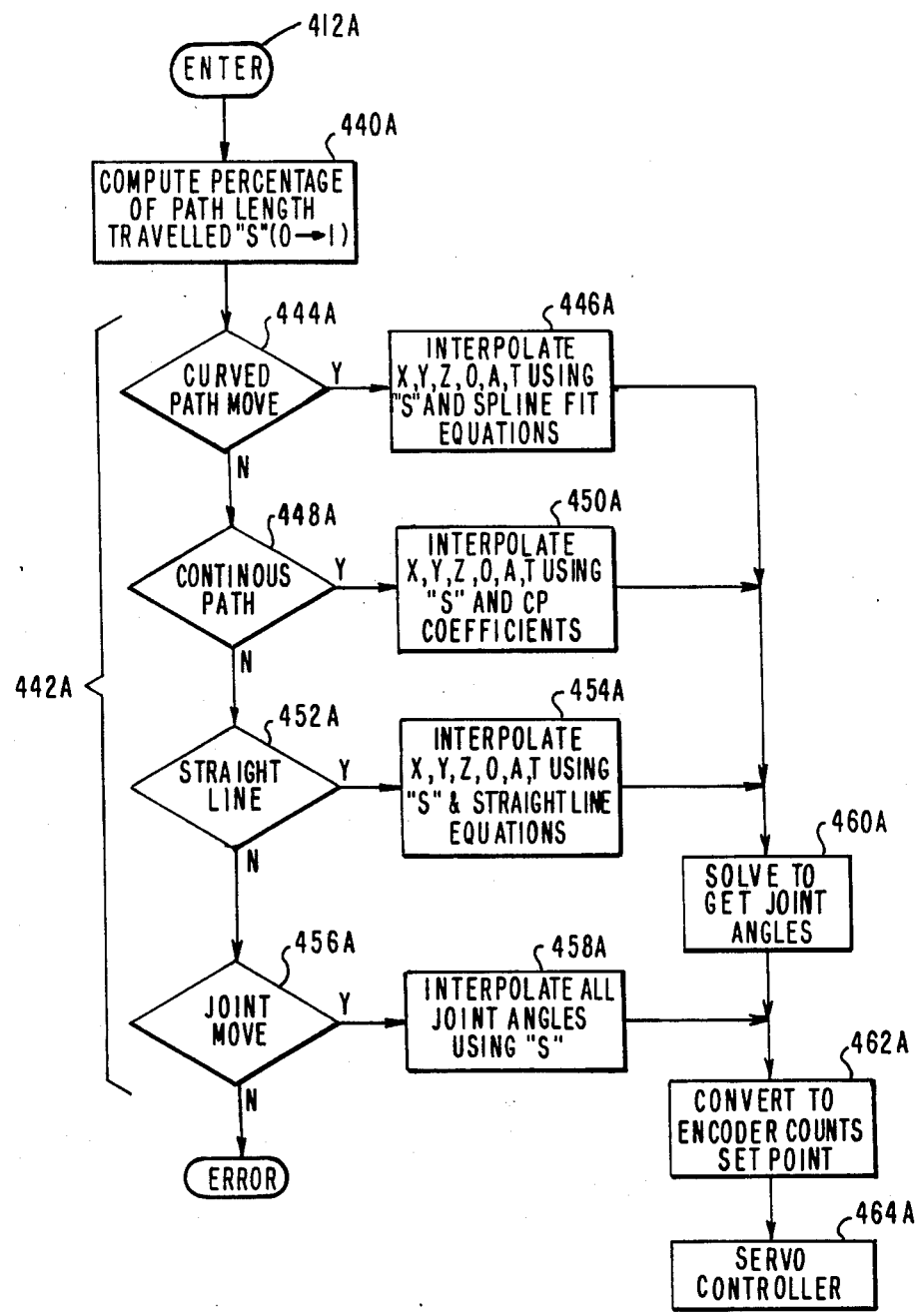
Figures 2, 9C:
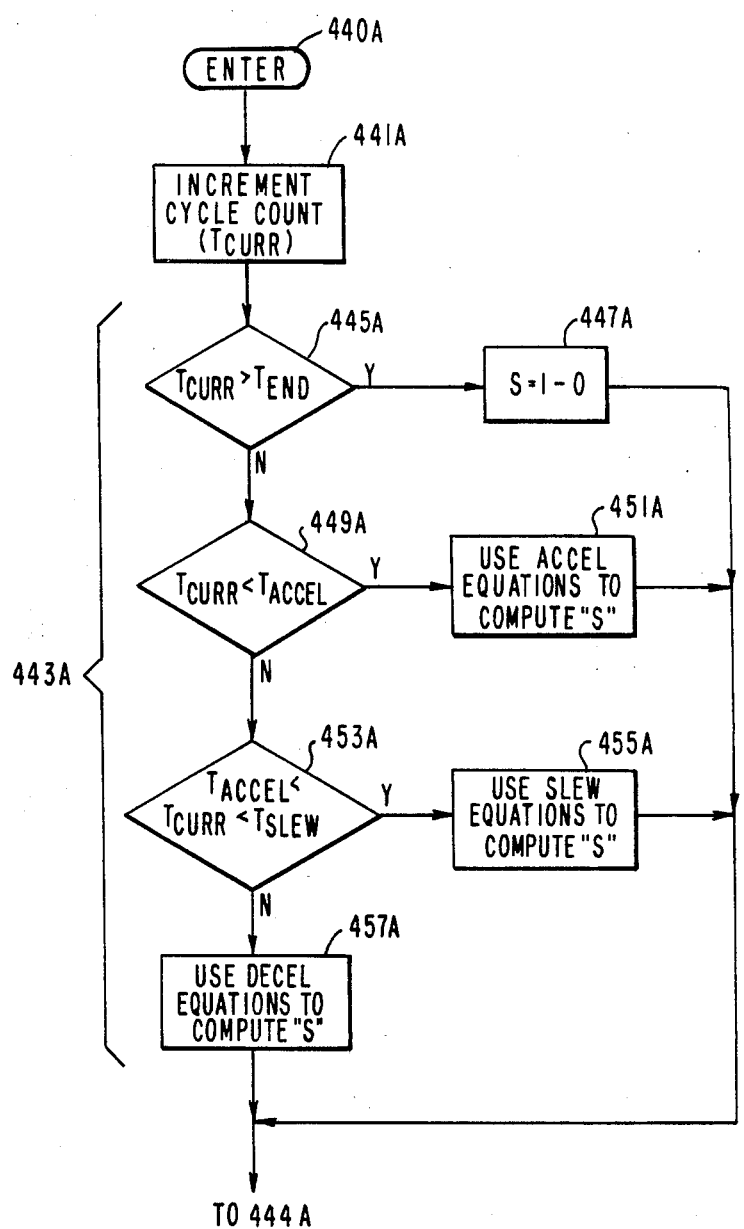

The trajectory program 412A shown in FIG. 9C-1 is executed during each system cycle to generate joint position commands for the next system cycle. Generally, the trajectory program 412A computes for each upcoming system cycle the accumulated distance to be traveled for each joint when the upcoming cycle is completed. A factor referred to as "S" is computed in the distance calculation. Thus, S is the accumulated distance (S) as a percentage of the total distance to be traveled in terms of a normalized path length (0-1).

A new set of interpolated endpoints are generated to provide position commands for the robot axes for execution during the upcoming system cycle, i.e., the total user specified segment move is subdivided into cycle moves to be executed in successive system cycles (which may in this case have a length of 32, or 16 or 8 milliseconds).

The new position commands are based on the S calculation and the type of move being performed. In implementing the position commands, the servo control provides further real time interpolation by dividing each system cycle into millisecond intervals during which moves of equal distance are executed for each joint.

As shown in the flow chart of FIG. 9C-1, block 440A first makes the distance computation for the upcoming system cycle, i.e., S is calculated. In boxes 442A, the type of move is determined and the interpolation calculations for that type move are executed.

Specifically, block 444A determines whether a prescribed path move has been directed, and if so box 446A calculates the Cartesian X, Y. Z, O, A, and T interpolations using the S distance factor, spline fit equations (up to 3rd order polynomials) and circular arc equations. The O, A, and T coordinates represent the orientation of the tool tip in angles.

Generally, in making interpolation calculations for the various types of path moves, the S factor operates as a percentage multiplier in computing for each axis the fraction of the total commanded move to be completed in the upcoming system cycle.

Box 448A determines whether a continuous path move has been directed, and if so box 450A calculates the X, Y, Z, O, A, and T interpolations using the S distance factor and stored continuous path coefficients. The latter are employed in equations that are used to produce smooth transitioning between different slew values in successive path segments.

In block 452A, a determination is made as to whether a straight line move has been directed. If so, box 454A makes the interpolation calculations for X, Y, Z, O, A and T using the S distance factor and straight line equations.

If a joint move is detected in box 456A, block 458A makes interpolation calculations for all of the joint angles using the S distance factor. Box 460A converts Cartesian interpolations to joint angles for the case of a prescribed path move, a continuous path move or a straight line move. The conversion to joint angles represents the arm solution and involves knowledge of kinematics of the robot arm, specifically the lengths of the various links and the angles between axes of rotation.

Finally, block 462A converts the interpolated joint angle commands to respective encoder counts operable as a set of position commands applied to the various robot axes by the servo controller 464A. The encoder count conversion reflects the resolution of the encoders, gear ratios and any mechanical coupling between joints (usually only wrist joints are coupled).

The S calculation is shown in greater detail in the flow chart in FIG. 9C-2. block 441A first increments the system cycle counter. Block 445A then compares the current cycle count to the time profile computed in the planning program for the current path segment. In this manner, the segment portion (acceleration, slew, deceleration) in which the tool tip is currently located is determined. The applicable acceleration, slew or deceleration value is accordingly identified for the S computation.

If box 445A detects that the cycle count exceeds the segment time, S is set equal to 1 by block 447A. If the acceleration segment portion is detected by box 449A, block 451A uses acceleration equations to compute S. Similarly, if block 453A detects the slew segment portion, box 455A uses slew equations to compute S.

Block 457A employs deceleration equations to compute S if the acceleration, slew and segment terminated blocks 445A, 449A, and 453A are negated. The S calculation routine is then completed and trajectory program execution returns to block 444A.

The following equations are employed in making the S calculation:

Acceleration Equations:

square wave $\quad s = t^2/(t_a*(2*t_s + t_a + t_d))$ sinusoidal profile $\quad s = \dfrac{t_a*[(t/t_a) - (\sin(180*(t_a/t)))/pi]}{[t_a + 2*t_s + t_d]}$ Deceleration Equations:

square wave
$s = ((2*t_s + t_a + t_d) - ((tt-t)**2/t_d))/(2*t_s + t_a + t_d)$ sinusoidal profile $\quad s = \dfrac{t + t_s + (t_d/pi)*[\sin(180*y/t_d)]}{(t_a + 2*t_s + t_d)}$ where: $y = (t - tt + t_d)$ Slew Equation:

$s = (2*t - t_a)/(2*t_s + t_a + t_d)$ $t_a$ = acceleration time
$t_d$ = deceleration time
$t_s$ = slew time (constant velocity)

$t$ = current time
$tt = (t_a + t_s + t_d - t)$
$pi = 3.1417$

TORQUE PROCESSOR BOARD CONCEPTS

The torque processor (TP) board 600 provides a functional interface to the robot joint drive motors. Functionally, the TP board 600 implements the lowest level of control in the hierarchical control system, providing closed loop servo torque control for six robot axes. Physically, the TP board 600 electrically interfaces the robot path planning control system and the servo control (SCM) board with the arm interface (AIF) board 800, which in turn interfaces to the robot joint drive motors. The primary function of the TP board 600 is to regulate robot joint motor currents to commanded values by modulating motor winding voltages using a pulse width modulation scheme.

The TP board 600 interfaces at one level to the SCM board, accepts from the SCM board torque commands and servo parameters for six axes and returns status data. The TP board 600 interfaces at a second lower level to the AIF board 800 providing servo voltage commands for the six robot axes. The AIF board 800 receives drive motor current, position and velocity feedback for closed loop control on the SCM and TP boards.

The TP microprocessors used in the specific embodiment are the Motorola 68000 (16-bit microprocessor operating at 10.0 Mhz system clock frequency), and the TI TMS-320 Signal Processor.

The TP board 600 provides a number of features including the following:
1. Torque loop control for six axes (250 micro sec per 6 axes) for brush and brushless motors;
2. Software adjustable current offset-eliminates protentiometers;
3. Downloadable gains-arm dependent parameters can be downloaded from the SCM board;
4. PWM compensation;
5. Commutation compensation;
6. Current averaging for data logging and other purposes;
7. Current limit check;
8. Velocity monitoring (back emf) for safety check;
9. Energy check (IIT) to test stall condition;
10. Power-up self diagnostics; and
11. Downloadable diagnostics system.

TORQUE PROCESSOR BOARD

More advanced robot performance is produced by controlling the torque applied at the arm workpoint when the arm is in motion to control the arm workpoint position in accordance with a command trajectory. Thus, axis drive forces are adjusted in accordance with actually experienced workpiece loading to satisfy position and trajectory commands with greater speed, accuracy and efficiency.

The torque control is embodied on a generic control circuit board 600 (FIGS. 6, 10A1 and 10A-2) called a torque processor (TP) board i.e., an electronic board usable to provide torque control for a wide variety of robots having different load capacities, different types of drives, different numbers of axes, etc.

The torque processor board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback signal is also proportional to actual motor torque.

The digital torque control circuitry is preferably structured with multiple digital processors so that needed control computation and control support functions can be achieved for all axes accurately and efficiently within sampling frequency requirements.

In particular, a torque control manager 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The interface memory 604 between the TP and SCM boards is a dual port shared memory which serves as a slave to the VME bus 606. Othe board memories include a ping-pong memory 608, program EPROM 614 local RAM 616 and TP calculator memory 611 in FIG. 10A-2.

The torque control manager 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) memory 608 operates under the control of handshake flags to store command, feedback, and status data so that it is available when needed for torque control calculations or for higher control level reporting requirements or for axis drive control.

A compressor 610 provided in the form of a digital signal processor operates as a torque loop calculator which receives torque commands and feedback currents from the torque control manager 602 through the ping-pong memory 608, calculates drive voltage commands for the various robot axes from the torque errors computed from the torque commands and feedback currents, and transfers the drive voltage commands through the ping-pong memory 608 to the arm interface circuitry on command from the torque control manager 602.

With the described digital circuit structure, all needed torque control functions are able to be performed rapidly (250 microsecond sampling rate or better) and accurately within frequency response requirements. Specifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manager 602 can, for example, be a Motorola 68000 which has an architecture well suited for the tasks described for data management but which has a calculating speed (i.e., over 4 microseconds for a $16 \times 16$ bit multiplication) too limited to meet torque control bandwidth requirements. The torque calculator 610 can for example be a Texas Instruments 320 digital signal processor which has an architecture set for Z transform calculations (i.e., a calculating speed of 200 nanoseconds for a $16 \times 16$ bit multiplication) but which is otherwise generally unsuitable for the kinds of tasks assigned to the torque control manager 602.

TORQUE CONTROL PROGRAMMING

The torque processor board 600 is operated under the control of programs executed in the on board processors 602 and 610 to implement torque command signals from the higher SCM control level.

The torque processor software generally performs the following tasks which are partitioned as indicated:

Torque Control Manager 602

Communication with SCM
Command handling
Current sampling, conversion and offset adjustment
Commutation switch flag (state reading)
Ping-pong memory management
PWM chip management
Diagnostics
Error reporting

Torque Loop Calculator 610

(program cycling based on 250 microsecond interrupt)

Overcurrent check-absolute and average
Torque loop calculations
Current averaging
PWM compensation
Commutation compensation
Back emf check-monitors velocity for safety
Energy check-tests for stall conditions

TP MANAGER

More particularly, the torque control manager 602, as its name implies, directs most of the torque processor board operations. The torque loop calculator 610 affects board operations in the sense that calculated outputs enable certain board operations to occur under the direction of the torque control manager 602.

The programming for the torque control manager 602 includes various conventional system housekeeping programs which support the operation of application programs involved in embodying the invention. The application programming is stored in an EPROM memory 614 referred to as the TCM (torque control manager) program memory. Operating data is stored in a local RAM memory 616 referred to as a TC (torque control) data base memory.

Figures 2, 10A:
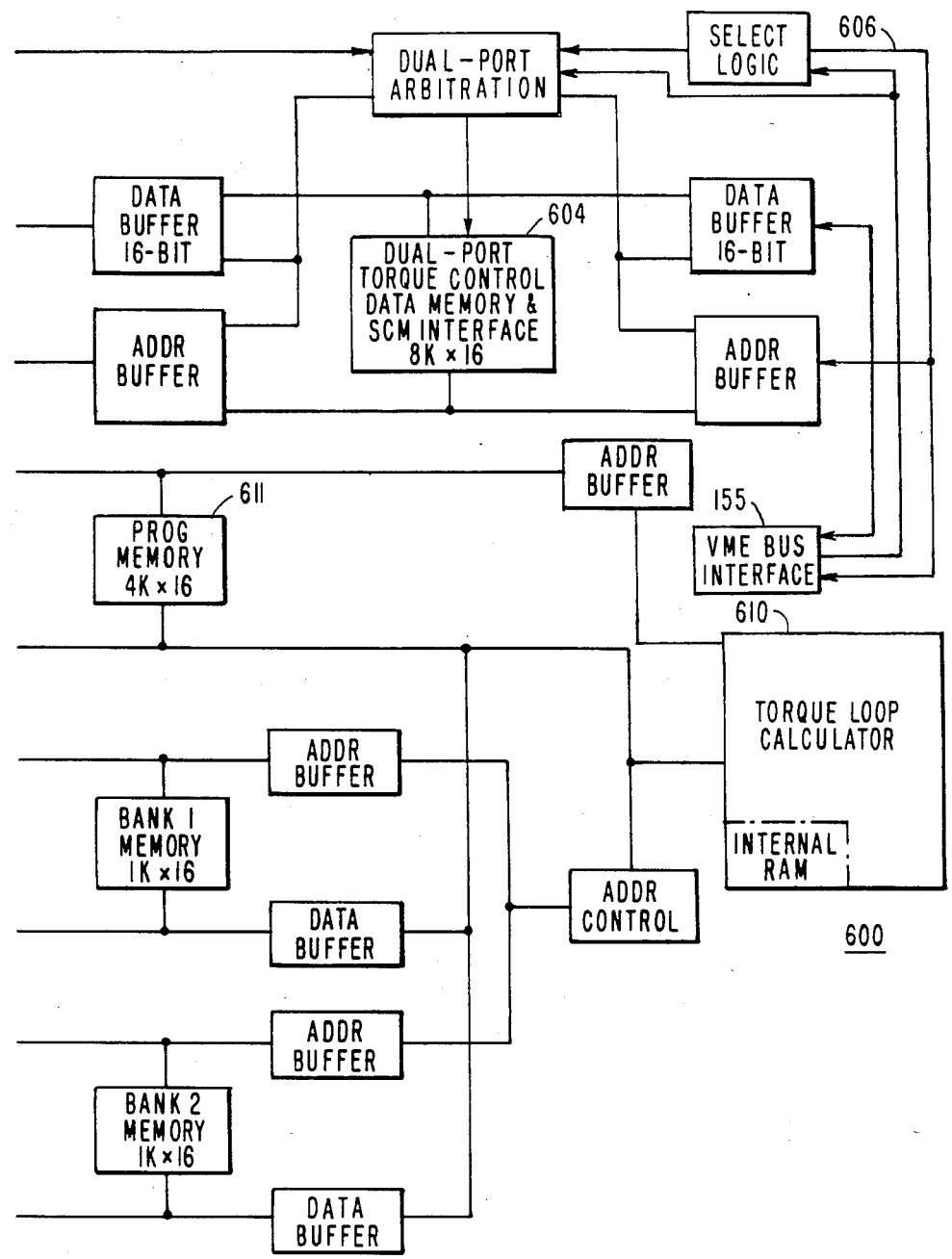
Figure 10B:
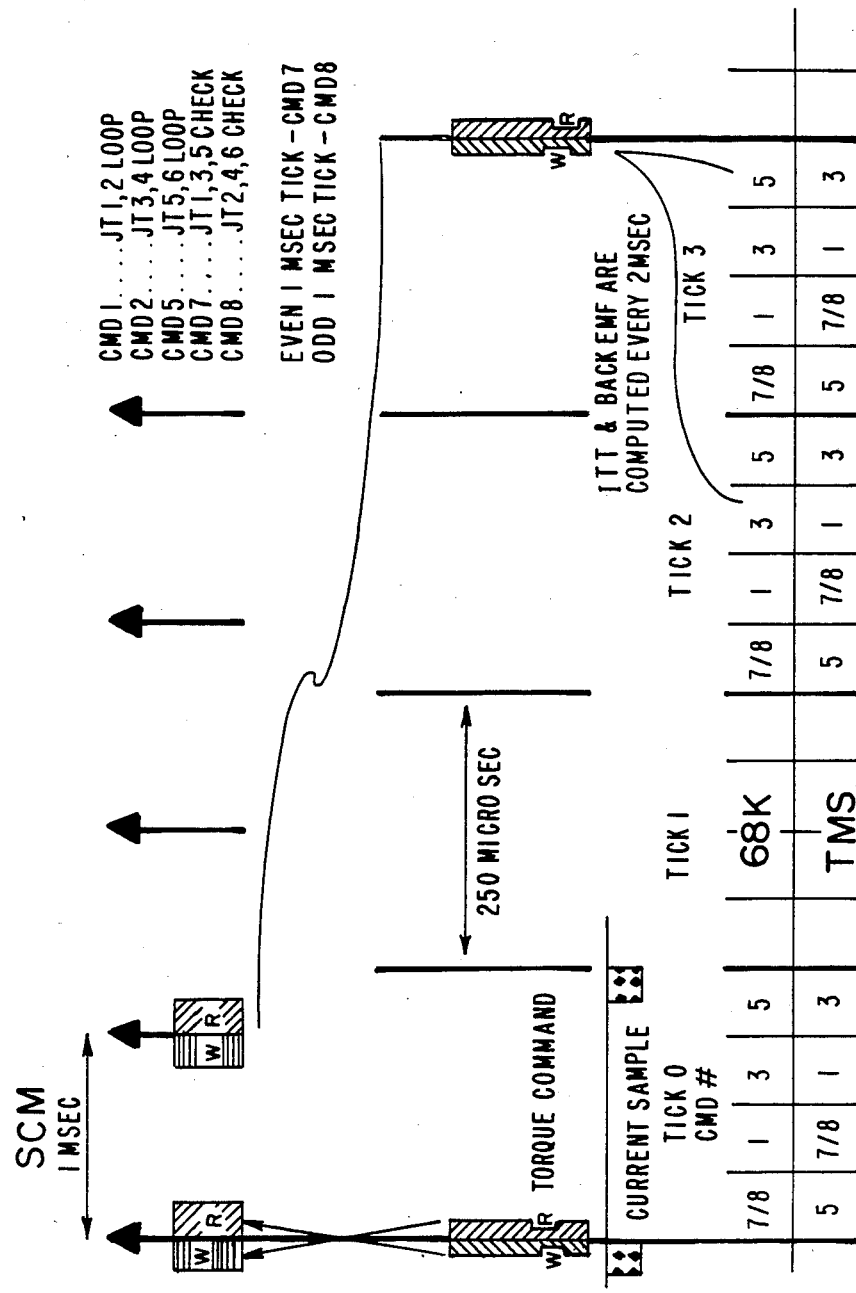
FIG. 10B shows a timing diagram for the TP board.
Figure 10C:
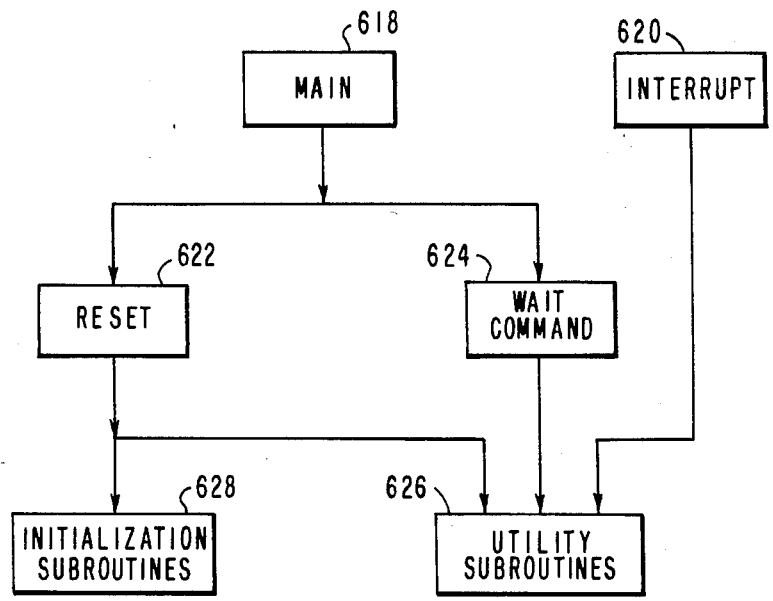
FIGS. 10C-10H show flow starting for programs excited on the TP board.

Referring to FIG. 10C torque control management programs include a main program 618 and an interrupt program 620. Generally, the main program 618 includes a reset subprogram 622 which provides the initialization service subroutine 628 needed at the arm interface and torque processor control levels for startup of TP board operation. The reset subprogram 622 additionally signals the higher SCM control level when the TP board 600 is ready for operating commands.

Thereafter, a wait command subprogram 624 administers the execution of diagnostic and other high priority nonmotion commands from the higher SCM control level. During motion control, torque commands are periodically generated, preferably each millisecond, and transferred under the control of the torque manager interrupt program 620, detailed in FIGS. 10F-1 to 10F-4, through the ping-pong memory 608 to the torque loop calculator 610 in FIG. 10A-1. The interrupt program 620 is operated cyclically by interrupt signals generated at the sampling rate (preferably every 250 microseconds) by an interrupt clock located in the lower level AIF board 800. The interrupt clock also provides the timing control for generation of the SCM torque commands every millisecond.

The interrupt program 620 in turn performs various administrative functions needed to support the operation of the torque loop calculator 610 as it performs torque calculations for each of the six axes of the robot arm during each interrupt cycle. Voltage commands resulting from torque loop calculations are routed from the ping-pong memory 608 for storage in the TC manager local RAM memory 616 and then through a data bus 607 and bus interface 156, preferably the VMX type, to the AIF board circuitry for conversion to pulse width modulated signals by the axis drives. Current and status feedback data is also transferred from the VMX bus 607 for storage in the TC manager local RAM memory 616 and subsequent routing through the ping-pong memory 608 for use in the torque calculator 610.

The bus 607 operates in the specific embodiment in accordance with VMX specifications for timing and signal pin number association. However, full VMX bus specifications associated with arbitration, multiple bus masters, and 24-bit address capability are not supported. Further, certain signals not specified in the VMX bus specifications are employed for control, interrupt, and error condition status information.

Various subroutines 626 FIG. 10C are employed by the reset and wait command subprograms 622 and 624 and the interrupt program 620. The reset subprogram 622 also employs initialization subroutines 628.

Figure 10D:
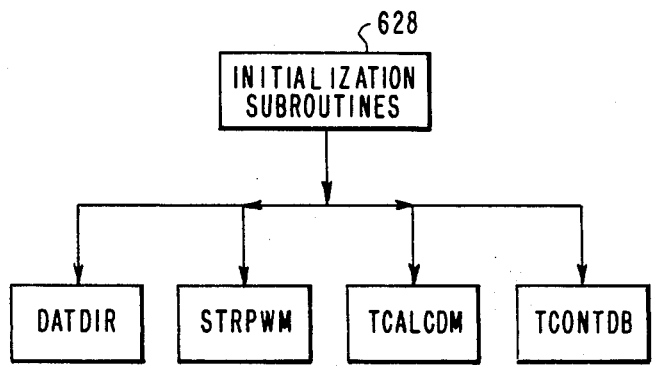
Figure 10E:
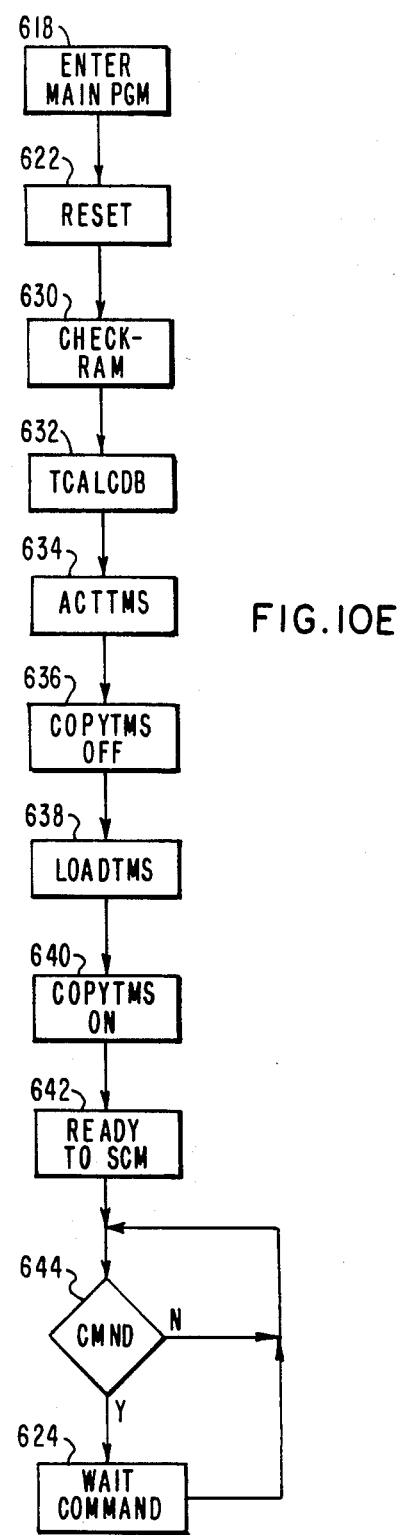
Figures 3, 10F:
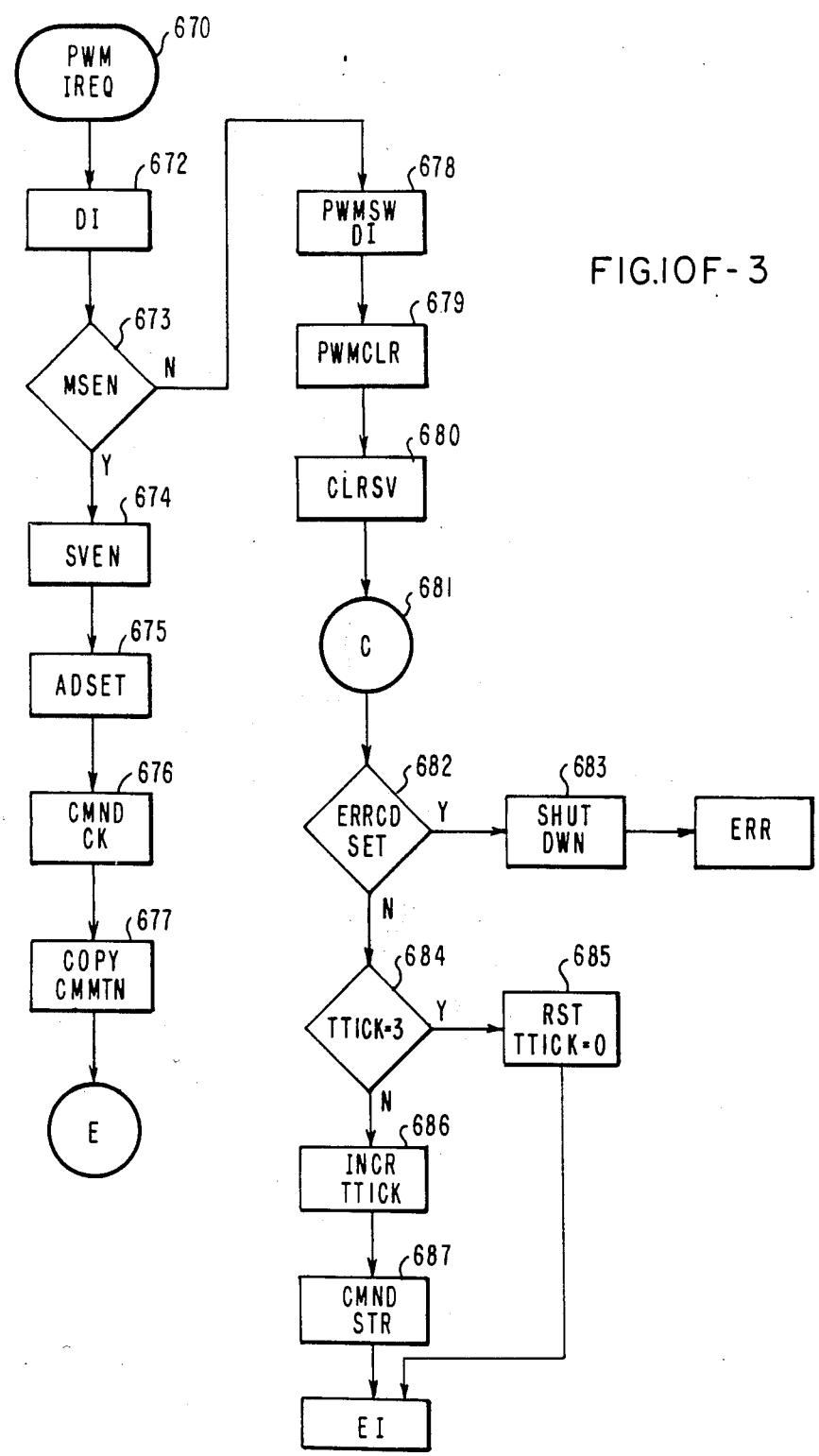
Figures 4, 10F:
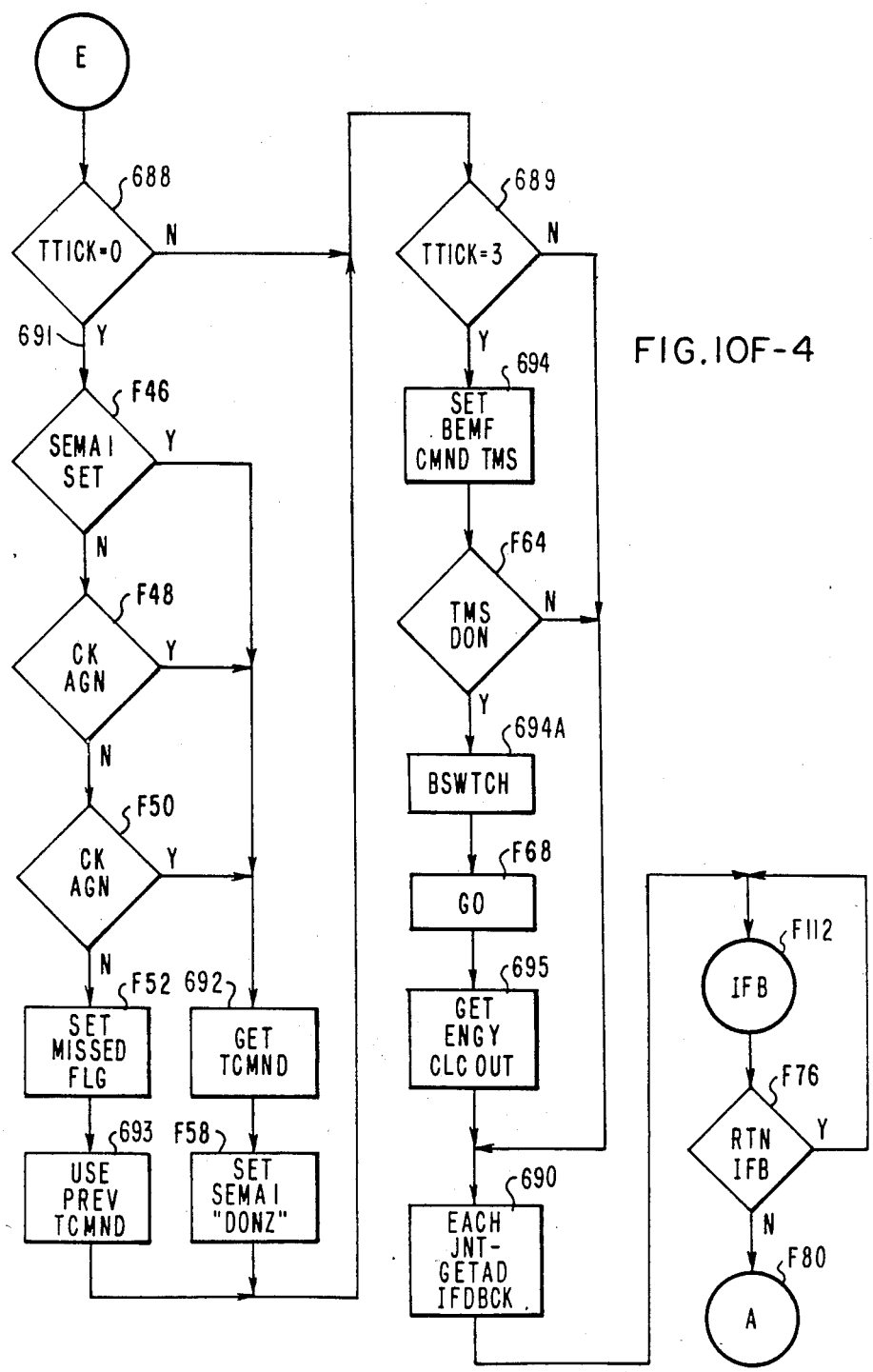
Figure 10G:
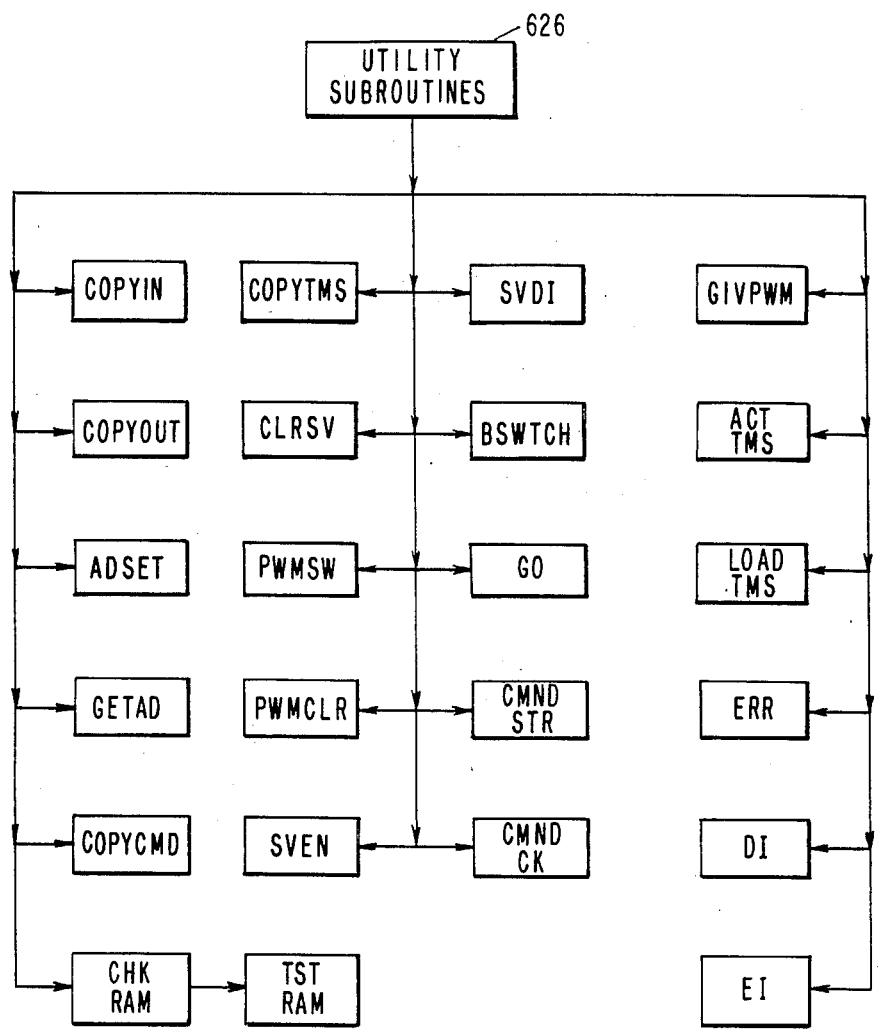

As shown in FIG. 10G, the utility subroutines include the following with the functions indicated:

CHECKRAM—preselected memory diagnostics—check all RAM memories on board 600.

RAMTEST—apply bit tests to selected memory locations.

GETAD—enable transfer of analog input to memory.

AD-SET—set analog/digital converters in feedback channels.

COPYIN—copy specified parameters for 6 arm joints from torque control data SCM interface memory 604 to TC manager local RAM memory 616.

COPYOUT—copy specified parameters for 6 arm joints from TC data base memory 616 to torque control data SCM interface memory 604.

COPYTMS/S-COPYTMS—copy to/from TC data base memory 616 and ping-pong memory 608.

COPYCMD—copy command from TC data base memory 616 to ping-pong memory 608.

CLRSERVO—clear on-line torque loop calculation data in TC manager local RAM memory 616 and ping-pong memory 608.

PWMSW—on/off switch for PWM chip which is located in the arm interface control level and normally generates power amplifier commands for the arm drives.

PWMCLEAR—zero output command to PWM chip.

SVENABLE—specify maximum voltage command acceptable for execution.

SVDISABLE—hold PWM at zero output.

LOADTMS—download program to RAM memory 611 for the torque loop calculator 610.

ACTTMS—activate/deactivate torque loop calculator 610.

GIVPWM—apply voltage command to PWM chip.

COMMCHECK—receive position feedback data for all 6 drives and set respective flags if different from the next previous data.

COMMSTORE—store commutation state for all 6 joint motors.

GO—send GO signal to control register 630 (FIG. 10A) for torque loop calculator 610.

BSWITCH—switch command for ping-pong memory 608.

ERR—report error to higher SCM control level.

DI—disable execution of interrupt program 620.

EI—enable execution of interrupt program 620.

The initialization subroutines 628 employed in the reset subprogram are shown in FIG. 10D and include the following:

DATDIR—create in the TC data base memory 616 a data directory for the SCM interface memory 604.

STRPWM—store PWM I/O address in TC data base memory 616.

TCALCDB—clear and initialize the torque loop calculator data base in the internal RAM memory of the torque loop calculator 610.

TCONTDB—clear data base parameters in the TC manager local RAM memory 616.

PROGRAM FLOW CHARTS FOR TP BOARD MICROPROCESSORS

The main program 618 of FIG. 10C is illustrated in greater detail in FIG. 10E. Once the torque processor board 600 is started, the torque control manager 602 enters the main program 618 and executes the reset subprogram 622 to provide initialization service. As a result, the identification code for the torque control manager 602 is written onto the VME data bus 606 for communication to the higher control levels that may be packaged together in any particular robot application.

In addition, all semaphores are set to the same invalid state and the torque loop calculator 610 is cleared and reset. The local input/output hardware latch 607 operates as a selector for hardware or software control for the torque loop calculator 610 and a flag is set to enable control from the torque control manager 602 when the software control flag is set.

In its final phase of execution, the reset subprogram 622 in FIGS. 10C and 10E calls the utility subroutine PWMEN and a signa is thus generated for the next lower control level (arm interface level) to clear the arm drive circuitry and specifically to switch a controlling digital device referred to as the PWM chip to the OFF state.

The main program 618 in FIG. 10E continues the start-up procedure by calling the utility subroutine CHECKRAM in block 630 to provide memory diagnostics on all RAM memories on the TP card 600. Next, the initialization subroutine TCALCDB is called as indicated at 632 to clear/initialize the torque loop calculator data base in the TC data base memory 616.

The torque loop calculator 610 is then activated to the ON state by the subroutine ACTTMS as shown at 634. Next, the utility subroutine COPYTMS is called in block 636 to disable data copy to and from the TC data base memory 616 and the ping-pong memory 608. The utility subroutine LOADTMS is then called to download the TMS programming to the memory 611 as indicated at 638.

In block 640, the utility subroutine COPYTMS is again executed to enable copy to and from the TC manager local RAM memory 616 and the ping-pong memory 608. A signal is then generated by block 644 for the next higher SCM control level that the TP board 600 is now ready for robot control operation.

During subsequent active robot control operation, the main program 618 enters a wait command mode in which it undergoes continuous looping operating awaiting special high priority commands that may be generated by the higher SCM control level. Thus, block 644 determines whether a special command has been sent down to the TP board 600. Looping continues on the block 644 until a command is detected at which time the wait command subprogram 624 is called. After its execution, the command detection loop is re-entered until the next SCM command is received. In the block 644, SCM command detection is performed by looking at the appropriate semaphore 3 to determine whether a flag has been set to signify that the higher SCM control level has downloaded a special command to the TP board 600.

Figure 10H:
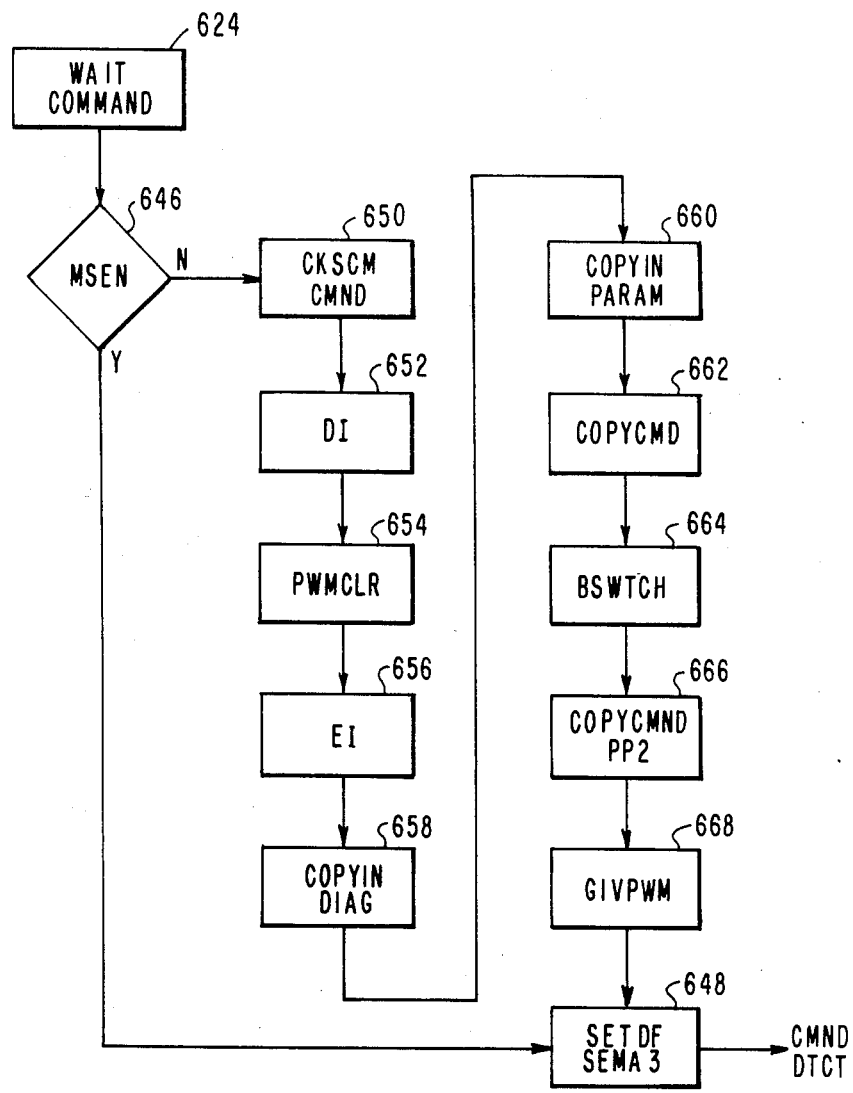

As shown in FIG. 10H, the wait command subprogram 624 first determines whether the system is ready for controlled robot arm motion, i.e., whether the higher SCM control level has just generated a master servo enable signal as indicated in block 646. In the master servo enabled mode, the SCM control generates a series of torque command signals for execution by the TP board 600. Preferably, the torque commands are generated once each millisecond as clocked from the AIF control level.

If a master servo enable signal has been generated to provide priority motion control, block 648 sets the the appropriate semaphore flag down acknowledging to the higher SCM control level that the command has been received and that a response has been taken. The wait command subprogram then returns to the SCM command detection loop as robot arm motion control is implemented.

On the other hand, if the master servo is disabled, block 650 first checks an SCM command setup bit and block 652 next disables interrupt program execution since a command having higher priority than motion commands must be ascertained and implemented. Block 654 then calls the subroutine PWMCLEAR to set the output voltage command to zero. Next, the interrupt program is enabled to resume arm motion control on an interrupt control basis.

In blocks 658 and 660, a determination is made whether a diagnostic command or a parameter change command has been downloaded, and the SCM command is copied by the subroutine COPYIN inthe TP manager RAM memory 616 for execution. Block 662 executes the utility subroutine COPYCMD to transfer the command to bank 1 of the ping-pong memory 608. Thereafter, BSWITCH is executed by block 664 to enable block 666 to transfer the SCM command to bank 2 of the ping-pong memory 608. In turn, the torque loop calculator 610 then executes the SCM command, and block 668 generates a signal for the SCM control level that the downloaded SCM command has been executed. The block 648 then sets the appropriate semaphore down flag and program execution continues as previously described.

The interrupt program 620 of FIG. 10C is shown in greater flow chart detail in FIGS. 10F-1 to 10F-4. It is initiated as indicated at block 670 in FIG. 10F-3 once the interrupt clock signal from the AIF board 800 is enabled in the wait command subprogram 624 shows in FIG. 10C. Thereafter, it is executed at the control loop sampling rate, i.e., the interrupt rate of once every 250 microseconds.

Block 672 disables the interrupt and block 673 determines whether the master servo is enabled to permit robot control. If it is, the SV-ENABLE (SVEN), AD-SET, COMMCHECK (CMND and COMMSTORE (COPY CMMTN) utilities are executed in blocks 674–677.

If the master servo is not enabled, i.e., robot control is not permitted, PWMSW subroutine is executed in block 678 to disable PWM generation chips on the AIF board 800 and the utilities PWMCLR and CLRSV are executed in blocks 679 and 680.

Thereafter, an end interrupt branch 681 is entered and block 682 checks for shutdown errors. Block 683 executes robot shutdown if shutdown error exists. If block 684 detects that the interrupt clock tick (generated every 250 microseconds) has reached a 3 count in the current millisecond common cycle time, block 685 resets the counter to 0 and the program ends. If not, block 686 increments the counter, block 687 stores the motor commutation states and the program ends.

With reference to FIG. 10F-4F or the case of an enabled master servo, blocks 688 and 689 check for a tick count of 0 and 3. If neither exists, block 690 next gets the current feedback for each robot axis. If the tick count is zero, branch 691 gets the new torque command (box 692) or, if missed, uses the previous torque command (box 692). At the tick count of 3, back emf command is set to TMS (box 694) and energy calculation output is obtained (box 695) and the ping-pong memory switch is set (box 694A).

The routine for fetching current feedback and performing other functions to be performed after each tick is designated as IFB, and it is looped in FIG. 10F-1 until the six axes have been completed. As shown in FIG. 10F-1, the ping-pong memory switch F122 is set, PWM voltage commands are outputted by box F134 and BACKEMF is outputted by box F128. Limit checks are also made at F130 and F138. Thereafter, the program is branched to F80 via F76.

On return to main program branch F82 in FIG. 10F 699, box F84 copies average current to the ping-pong memory and box F86 sets the energy check command if the tick count is 2. Box F90 sets the ping-pong memory switch and box F94 outputs PWM voltage commands.

Block F96 in FIG. 10F-2 again checks the tick counter and if the count had not been but is now 2, block F100 copies average current to the ping-pong memory. Thereafter, flags are set and certain data is copied out in block F106 if the tick count is 3 in block F102. Finally, the end interrupt branch 681 in FIG. 10F-3 is entered to close out the execution of the interrupt program 620, using instructions shown at 682 to 687 in FIG. 10F-3.

TP CALCULATOR

Programming for the TP calculator 610 of FIG. 10A-1 includes a MAIN program (not shown) executed cyclically at the sampling rate, and successive blocks provide calculator (TMS) reset, and calculator (TMS) RAM check, clear and initialization. A torque command from the torque manager 602 is then awaited.

When a torque command is available, the torque loop control algorithm is executed for all six joint motors.

Then, energy calculations are made and back emfs are calculated prior to ending the program execution.

CONTROL ALGORITHMS

In FIG. 3, there is shown a detailed robot control loop arrangement for the specific embodiment. A more detailed diagram of the torque control loop portion of the overall robot control is shown in FIG. 7B-1 of incorporated by reference Ser. No. 932,976. The following control algorithms are executed in the torque loop calculator 610 in the implementation of the torque control loop portion of the overall robot control loop arrangement.

PI Control Algorithm

This algorithm is described in terms of a 250 microsecond sample period.

| (1) Input: | | |
|---|---|---|
| torque command | Tc | from SCM (1 ms. update rate) |
| feedback torque | T | from A/D converter (250 micro sec. update rate) |

Tc, T are scaled as follows: 10 significant bits stored in 16-bit quantity left justified with a sign bits. This format is selected to simplify the A/D interfacing.

```
             SDDD DDDD DDXX XXXX
Output:
PWM command   ·PWMout     to PWM command register
                          (250 micro sec. update rate)
```

(2) Principle:

$$PWMin = Kp \frac{(s + 1/tau)}{s} *Terr$$

Terr = Tc − T
Kp: torque loop proportional gain
tau: time constant of integral (mechanical time constant of motor)

(3) Algorithm
```
    /* get error */
    T(n) = (input data from A/D)
    /* normalize the same */
    Terr = (Tc(n)*2**10 − T(n)*2**10)/2**16
    /* compute next integral */
    temp(n) = integ + KI * Terr
    /* check the integration limit */
    if (temp <= − intlmt) then temp = −intlmt
    if (intlmt <= temp) then temp = intlmt
    /* store the integral value for next time */
    integ = temp
    /* get PI result */
    temp = integ/2**16 + KP * Terr
    /* check the overflow */
    if (temp > 78FF) then temp = 78FF
    if (temp > 8680) then temp = 8680
    /* now linearize the PWM* */
    if temp >= 200) then PWMout = temp + 700
    if 200 > temp >=0) then PWMout = temp *2 + 500
    if (0 > temp >= FDC0) then PWMout = temp *2 + FB80
    if (FDC0 > temp) then PWMout = temp + F980
    KI = (KP/tau)*Ts
    Ts = sample period = 250 micro sec.
```
(4) Scaling of KP and KI
  (i) dimensions   kp: [V/N-M]
                   tau, TS: [sec]

| Torque | Current | Terr*2**6 | PWMout | Motor Volt |
|---|---|---|---|---|
| N-M | A | bits | bits | Volt |

>-------Kt----------Kad----------KP*2**-16----------Kpwm------------->

← Kp →

| Kt | torque - current gain | [A/N-M] |
|---|---|---|
| Kad | A/D converter gain | [bit/A] |
| Kpwm | PWM gain | [V/bit] |

(ii) equation

Kt*(Kad)*KP*(2**(10-16))*Kpwm = Kp
Kp = KP*(2*6)/(Kt*Kad*Kpwm)
KI = KP*Ts/tau

Note:
1. If A/D converter full scale is +/− Imax then Kad = 2**15/Imax [bit/A]
2. If PWM chip and power block gain is +/− Vmax then Kpwm = Vmax/2**15 [V/bit], therefore, Kad*Kpwm = Vmax/Imax [V/A]

Back-emf Algorithm

The back-emf EMF calculation is used to provide an estimate of motor speed for safety purposes.

(1) Input:
| motor current | i | from A/D converter |
|---|---|---|
| motor voltage | Vin | from PWM command register |

Output:
Back-emf   VEL   estimated velocity (2) Principle:
   VEL = w*Ke = Vin − (L*di/dt + iR)
   R = motor resistant       [ohm]
   L = motor inductance      [H]
   Vin = motor terminal voltage  [V]
   Ke = motor Back-emf constant  [V/rad/sec]
   w = motor velocity        [rad/sec]
   i = motor current         [A]

(3) Algorithm:
   VEL(n) =
   [PWMout*2**9 − MOTL* i(n)−i(n−1) − i(n)*MOTR]/2**16
   where:
   i(n) is A/dD value shifted right 6 bits and
   accumulated 1 mesc/Ts times (running 1 msec average).
   Ts is PWM sample rate = 250 micro sec (4) Scaling of L, R:
   (i) equations:
       MOTR = 2**13 * Imax/Vmax * R(ohm)
       MOTL = 2**13 * Imax/Vmax * 1/delt * L(H)
       SV = 2**−8 * Vmax
       where Krpm = (SV/KE) * VEL
   (ii) example:
       Vmax = 300 V, Imax = 20 A, R = 0.49 ohm,
         L = 5.5 mh,
       KE = 120 V/Krpm, delt = 4 msec
       MOTR = 268, MOTL − 751
       Krpm = 9.76 * 10**−3 * VEL

| Vin | PWMout | VEL | VELemf |
|---|---|---|---|
| V | bits | bits | bits |

-----Kpwm-------------2−9--+------ 2−16*SV--------1/KE---
                             |
Iin                          |
A                            |       Kpwm = Vmax/2**15
----Kad--2*2−6)--MOTR-     |       Kad = 215/Imax
                 --MOTL-     |

Energy Check Algorithm

The energy check calculates motor energy and alarms the SCF when energy exceeds a specified limit for a specified period of time.

(1) Input:
| current | CUR1 | 1 msec averaged current |
|---|---|---|
| energy limit | ELIMIT | from SCM Board (constant) |
| time constant | TAU | from SCM Board (constant) |

Output:
alarm    ECODE    to SCM Board (2) Principle:
     i*i       Energy i-----X-----1/(1+as)-----------Threshold-----------Alarm
 |  |        1st order filter
 |---| i = current [A]
(3) Algorithm:

-continued

```
        temp = CUR1**2 − ENERGY
        ZOENGY = ZOENGY + temp
        ENERGY = ZOENGY / 2**16 * TAU
        if |ENERGY| > ELIMIT
            then ECODE = OVENGY
    (4) Scaling:
        (i) condition of alarm output
            if step input of i**2 = k*limit is applied, then
            output an alarm condition tx seconds after step
            is applied.
        (ii) equation
            a    = delt * 2**16/tau
            tau  = delt * 2**16/a
                 = about 20 to 40 for delt = 4 msec
```

TP CYCLING OPERATION

The cyclic operation of the TP circuitry is shown in FIG. 10B to clarify the manner in which the various control events are interselected. As shown by the upper scale, the SCM board 400 operates on a 1 millisecond cycle. The TP board 600 operates on a ¼ millisecond sampling cycle as shown by the lower scale. The four TP board sampling intervals are marked by ticks 0 through 3.

The latest torque commands are received by the torque manager 600 in the order shown in each sampling interval for the six joints on the 68K scale. With a 62.5 microsecond delay, the torque commands are transferred to the TP calculator in the same order. Current feedbacks are received at the beginning of each sampling interval for all joints and transferred to the TP calculator.

Torque Processor Board

The torque processor module 600 in FIG. 6 is implemented as a VME bus compatible single printed circuit board and is intended to provide the basis for mathematical calculations associated with digital torque loop closure in the UNIVAL TM robot controller. The hardware implementation of this module is sufficiently general to permit this function to be performed independent of the actual robot arm. All robot arm dependent hardware is implemented on a separate arm interface module. This module receives torque commands from a higher level controller, and provides voltage commands to the arm interface module. This module also receives position, velocity and current feedback information from the arm interface module.

This module, shown in more detail in FIGS. 10A-1 and 10A-2, primarily consists of a Motorola 68000 processor 602 with a TMS-320 serving as a peripheral co-processor 610 for performing high speed fixed point math calculations. The interface between the 68000 and the TMS-320 consists of bank switched memory 608, with handshake flags to provide command indication to the TMS-320, and to indicate the state of the 68000, TMS-320 interface.

Interface to the higher level controller is provided through implementation of dual-port memory resident within the module. Thus, this module serves as a slave to the VME bus 606. As such, the local processor 68000 cannot obtain direct access to the VME bus. In operation, the torque processor module receives torque commands and loop constants via the dual-port memory 608, and provides feedback consisting of position, velocity, current and status information to the higher level controller via the dual-port memory.

Interface between the torque processor and the arm interface module is provided by a local processor bus expansion and associated P2 connector (not specifically shown). The signal interchange associated with this bus follows the VMX bus 607 specifications for timing and signal pin number association. However, the full VMX bus specifications associated with arbitration, multiple bus masters, and 24-bit address capability is not supported. In addition, additional signals not specified in the VMX bus specifications are required for control, interrupt and error condition status indication.

Dual-Port Memory

Circuitry associated with the dual-port memory 608 is shown in FIGS. 11-A-1 and 11A-2 of the drawings. It is to be noted that this memory is implemented as dual-port and not shared memory. The distinction being that the system bus can have access to this memory without degrading the performance of the local processor, unless the local processor requests access to the memory while the system bus has control of the memory. As such, the dual-port memory utilizes address, data and control buses that are separate from the local processor buses. The interface between processor and the dual-port address and data buses are shown in FIG. 11C-3 of the drawings. The control interface is provided by the arbitration PAL device 16R4, U10 shown in FIG. 11A-1 of the drawings.

Indication of torque processor dual-port memory selection by the VME bus is provided by PAL device U5. Inputs to this device consist of the VME bus address bits A23 through A20, the VME bus address modifier bits AM5 through AM0, card slot identifier bits CA3 through CA1, and the inverted VME bus address strobe signal, SAS. The output of U5, which indicates VME bus selection is provided by signal VSEL. This signal will be asserted, low true when the input conditions meeting the PAL equations are satisfied. These conditions presently require A23 to be high, logical "1", the state of A22 through A20 to match the state of CA3 through CA1, the address modifier bits to be equal to a hexadecimal value of 39, with the VME bus address strobe signal, SASb, asserted.

Some description of the address modifier bits and their purpose is warranted. The address modifier bits are used by the VME bus master to indicate the type of transfer being performed. Transfer types presently specified include supervisory program execution, supervisory data transfer, user program execution, and user data transfer. Each of these basic transfers are further specified to be associated with long address, where 32 bits of address information is used to indicate the transfer location, or standard address, where 24 bits of address information is used to indicate the transfer location, or short address, where 16 bits of address information is used to specify the transfer location. The address modifier 39 code indicates user data, standard address type of transfer. However, the PAL equations can easily be written to provide any of the standard address type of transfers, or to ignore the state of the address modifier bits.

The dual-port arbitration logic is included within the PAL device U10. This device receives request for dual-port memory access by the local processor and by the VME bus, and assigns the memory to one and only of the requesting devices for the transfer. The arbitration logic presently gives the local processor the highest priority for obtaining access to the memory. That is, with simultaneous request by the local processor, and the VME bus, the request by the local processor will be granted before the request by the VME bus is granted.

Device U10 also generates the dual-port memory control signals. These signals include a write high byte, a write low byte, a read (DPRDb), start DTAC timer, and a local processor grant (LPDPE) signals. The DTAC timer is provided by device U7. Devices U11 provide for actual generation of the memory write enable signals. These devices receive the write signal enable outputs from device U10, and a signal from the DTAC timer. These devices are used to disable the write signal to the memory which is necessary to ensure hold time requirements for the memory devices are satisfied. It is to be noted that the VME bus specifications only provide for 10 nanosecond data hold time with respect to nonassertion of the data strobe signals. Worst case timing cannot be guaranteed without disabling the write enable signals by the logic circuitry U11.

The dual-port memory is implemented through devices associated with sockets U13 and U12. The memory can be implemented through usage of either 2K by 8-bit, or 8K by 8-bit memory devices. Jumpers are provided for making memory device type selection. Jumpers W1 and W3 must be installed with usage of 2K by 8-bit memory devices and jumpers W2 and W4 must be installed with usage of 8K by 8-bit memory devices. Memory devices with a maximum access time of 120 nanoseconds or less must be used for these devices with the DTAC timing presently provided.

The address interface with the VME bus is provided by devices U3 and U4. These edge-triggered latches are used to ensure meeting address hold time requirements. The VME bus is only guaranteed to hole the address bus stable for 10 nanoseconds after non-assertion of the data strobe signals and this time is not adequate to ensure that data hold time requirements with respect to read cycles are satisfied. Data is written into these latches when the address strobe signal input to U6 is asserted. The data bus interface with the VME bus is provided by devices U1 and U2. These 74ALS645 devices are used to ensure meeting VME bus specifications.

Local Processor

Figures 1, 11A:
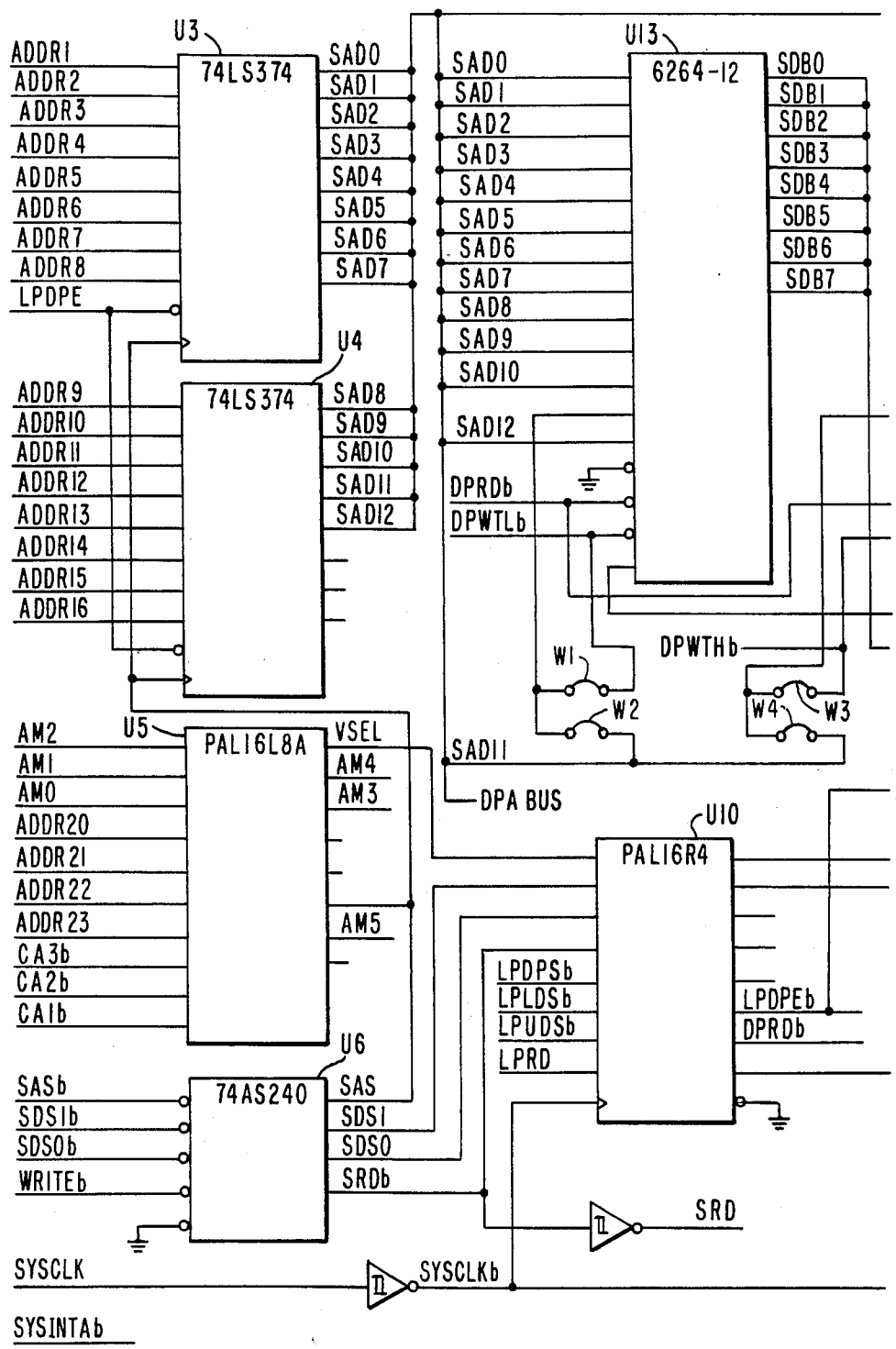
Figures 1, 11B:
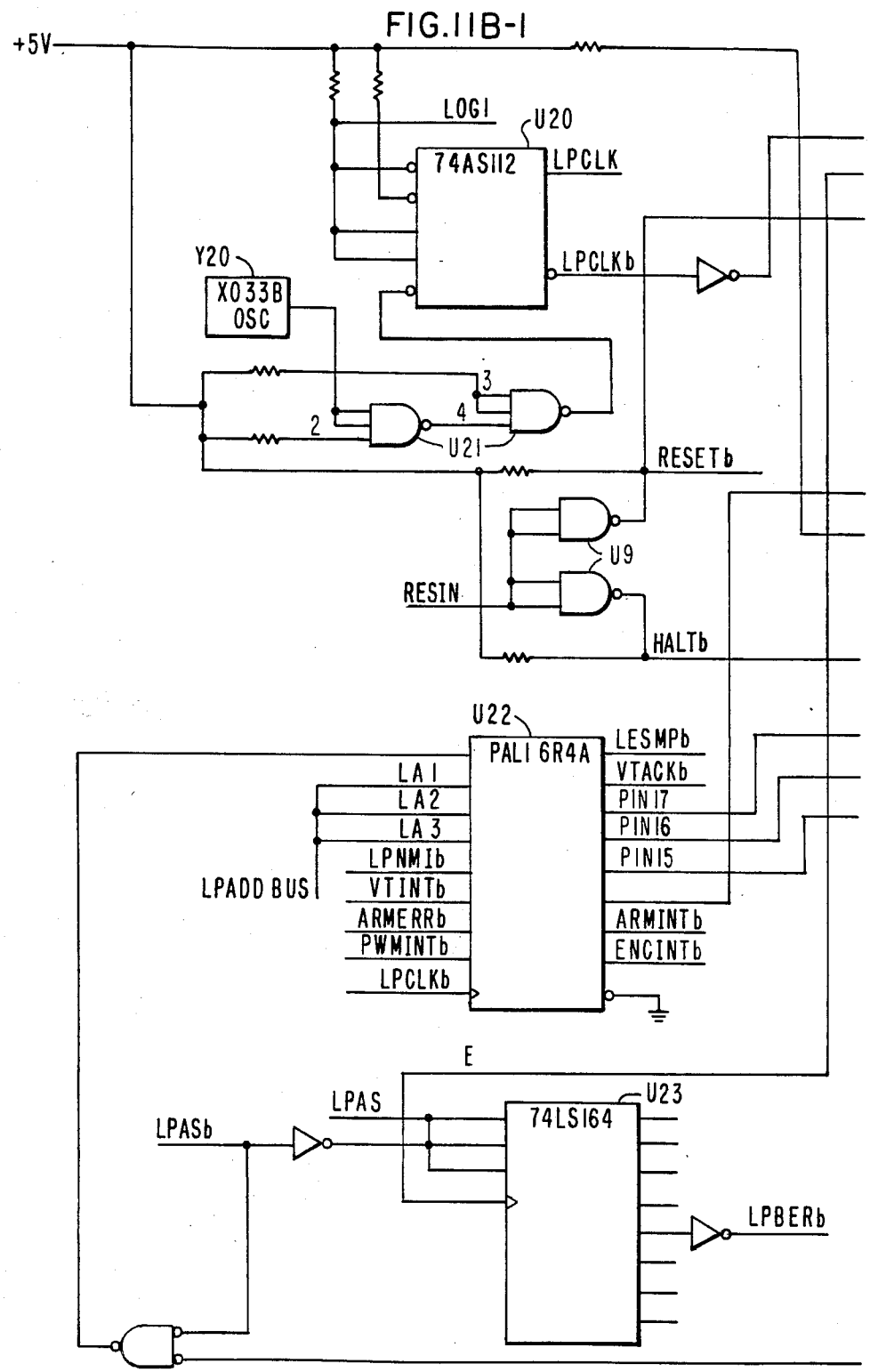
Figures 2, 11B:
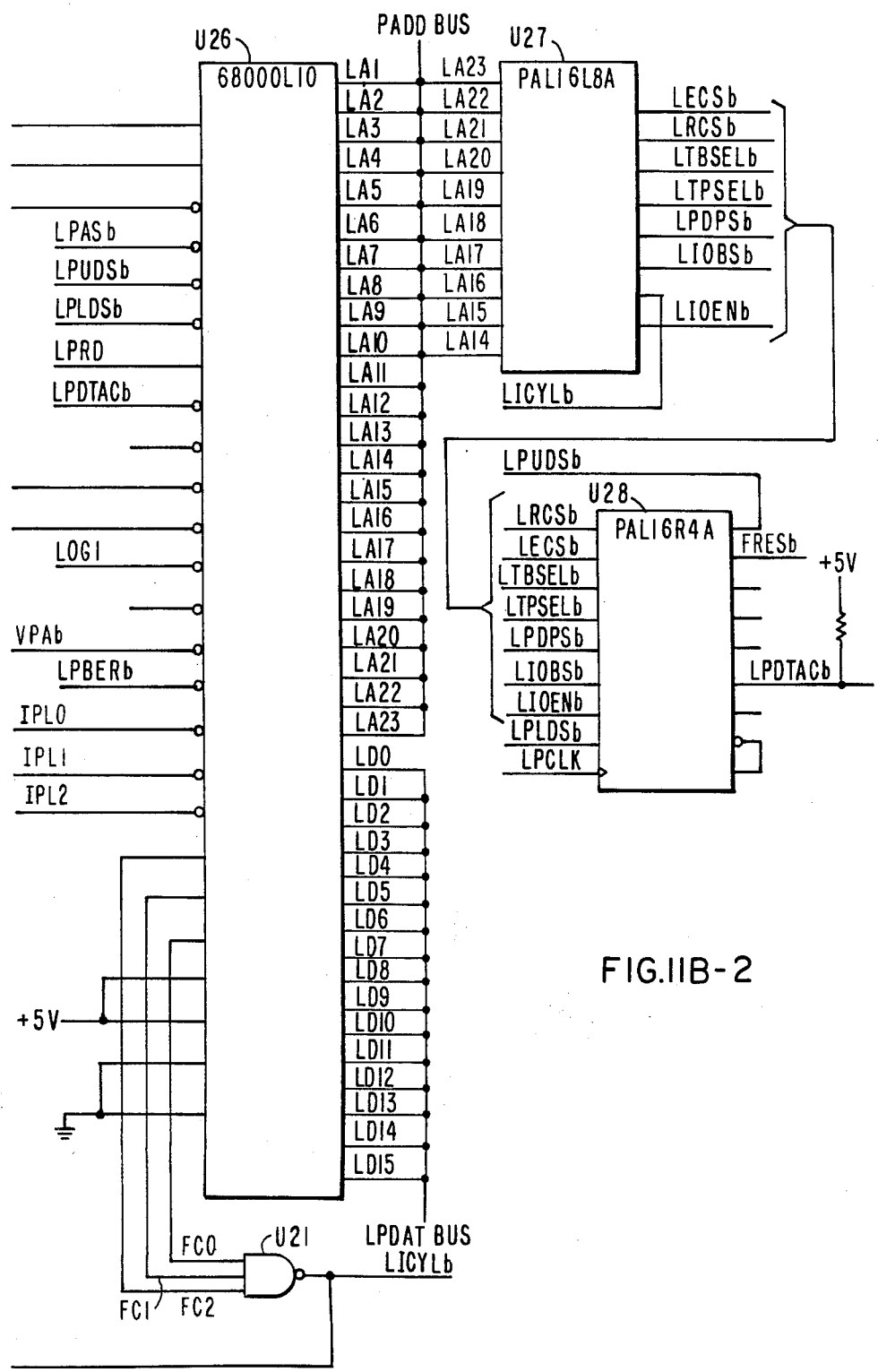

Circuitry associated with the local processor is shown in FIGS. 11B-1 and 11B-2 of the drawings. This circuitry consists of the loacl processor U26, the clock generator Y20, U20, interrupt encoding U22, local processor device selection U27, DTAC signal generation U28, and local processor bus transfer time out U23. A 20 MHz oscillator Y20 is used to generate the master clock. This frequency is divided by two by U20 which results in generation of the 10 MHz local processor clock signal. The gates associated with U21 are provided for manufacturing test purposes. Pin 2 of U21 can be grounded by a test probe to disable the oscillator. An external frequency can then be injected on pins 3 and 4 of U21 for testing purposes.

Circuitry associated with device U9 comprise the local processor reset function. The high asserted signal RESIN, received from the VME bus, forces both RESETb and HALTb signals to the device U26 which is a Motorola 68000 to be asserted. This condition forces the 68000 to execute the reset vector. The 68000 reset signal pin is bidirectional. Execution of a reset instruction by the 68000 will force the RESETb signal to be asserted without assertion of the HALTb signal. This condition permits the 68000 to reset the remainder of the torque processor module circuitry without itself being reset. Implementation of this function requires U9 to be an open collector device.

Local processor device selection is provided by device U27. This device has inputs consisting of local processor address bus bits 23 through 14, and the LICYLb signal. The LICYLb signal being asserted indicates that an interrupt acknowledge cycle is being executed by the 68000. Assertion of this signal prevents assertion of any of the outputs of U27. Execution of an interrupt acknowledge cycle is indicated by 68000 function lines, FC2-FC0, being in the all ones state. This condition is decoded by U21, the third section of which is in FIG. 10B-2, to generate the LICYLb signal. The following provides a listing of local processor address to device selection:

000000 to 007FFE LECSb Local Processor EPROM 03800 to 03BFFE LRCSb Local Processor RAM 034000 to 037FFE LPDPSb Local Processor Dual-Port 03C000 to 02C7FE LTBSELb Local Processor TMS Bank Memory 040000 to 041FFE LTPSELb Local Processor TMS Prog Memory 800000 to 803FFE LIOBSb VMX Bus 07Exxx LIOENb Local Processor I/O.

Device U28 is associated with generation of the local processor DTACb signal. This device will cause the DTACb signal to be asserted for selection of devices which within their own control do not assert the DTACb signal. This includes the dual-port memory and the VMX bus interface. It is to be also noted that U28 also provides for DTACb signal timing required for insertion of the proper number of wait states associated with the selected devices. Presently, all devices with the exception of the local EPROM require zero wait states, and the EPROM requires one wait state. Device U27 has one additional input in addition to the device selection signal lines. This signal, FRESb is used to provide indication that the TMS-320 is being held in the reset condtion. This signal is used by U27 to prevent assertion of the DTACb signal if an attempt is made to access the TMS-320 program memory without the TMS-320 being held reset. Under these conditions, the LPBERb signal will be asserted which will cause execution of the bus error exception vector. Device U23 provides for generation of the local processor bus error signal. This device is clocked by the E clock signal, approximately 1 mHz, generated by the 68000. The shift register is reset by local processor address strobe signal being nonasserted. Assertion of LPASb allows a "1" to be shifted through the shift register. If LPASb remains asserted for more than 5 microseconds, indicating the DTACb has not been asserted, the LPBERb signal will be asserted.

Device U22 provides the interrupt controller for the 68000. This device receives the interrupt request lines, and encodes these lines to produce the prioritized interrupt request for the 68000. The following indicates the presently implemented interrupts and associated priority levels. It is to be noted that level 7 is the highest priority interrupt.

| Signal | Priority | Function |
| --- | --- | --- |
| LPNMIb | 7 | Non-Maskable Interrupt |
| ARMERRb | 7 | Arm Interface Module Error |
| PWMINTb | 6 | PWM Device Sample Time |
| LESMPb | 5 | Encoder Sample Time |
| VTINTb | 4 | VME Bus Tick |
| ENCINTb | 3 | Encoder Index |

-continued

| Signal | Priority | Function |
| --- | --- | --- |
| ARMINTb | 2 | General Purpose Arm Interface |

The prioritized interrupt request are reflected on pins 17 through 15 of device U22, which are connected to the 68000 interrupt request inputs, signals IPL0b through IPL2b respectively. Interrupt processing by the 68000 can be either vectored or auto-vectored. The distinction between vectored or auto-vectored is determined by the state of the 68000 valid peripheral address, signal VPAb, when the interrupt acknowledge cycle is executed. Assertion of VPA indicates that the interrupt vector is to be obtained from the 68000 auto vector table. If VPAb is not asserted in the interrupt acknowledge cycle, the 68000 will input the state of data bus bits 0 through 7, shift this value two places to the left, and use the resulting number for exception table entry. Presently, all interrupts are auto-vectored. The other inputs to the interrupt controller PAL device U22 consist of local processor address bits 1 through 3, and the interrupt acknowledge signal. During the interrupt acknowledge cycle, the local processor address signal lines indicate the interrupt level being acknowledged. These signal lines are decoded to generate the specific interrupt acknowledge signal. The only interrupt request for which a specific interrupt acknowledge signal is generated is the VME bus tick interrupt, VTACKb. All other interrupts require some specific action to be performed in the interrupt routine provide indication of interrupt acknowledgement.

Local Memory

Figures 3, 11C:
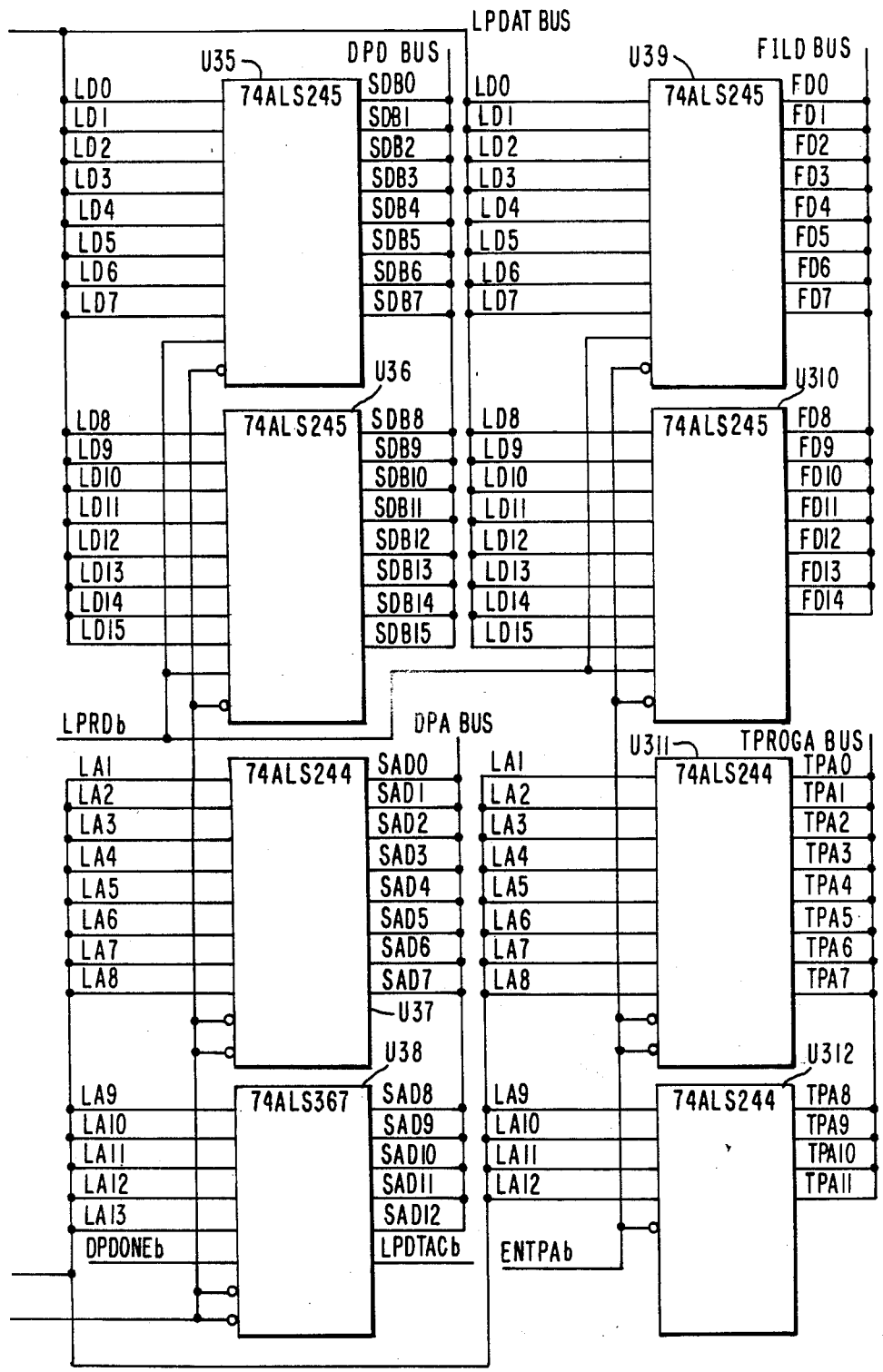

The local processor memory shown in FIGS. 11C-1 and 11C-2 consists of four sockets. Two sockets are associated with EPROM, U32 and U33, and two of which are associated wih RAM, U30 and U31. Circuitry associated with these devices is shown in FIGS. 11C-1 and 11C-2 of the drawings. The EPROM can be implemented with either 27128 or 27256 devices. Jumpers W32 and W33 are associated with EPROM device type usage. Jumper W32 must be installed with usage of 27128 devices and correspondingly, jumper W33 must be installed with usage of 27256 devices. The RAM can be implemented with either 2K by 8-bit or 8K by 8-bit devices. Jumpers W30, W31, W34 and W35 are associated with RAM device type usage. Jumpers W30 and W34 must be installed with usage of 8K by 8-bit devices, and correspondingly, jumpers W31 and W35 must be installed with usage of 2K by 8-bit devices.

TMS 320

Figures 1, 11D:
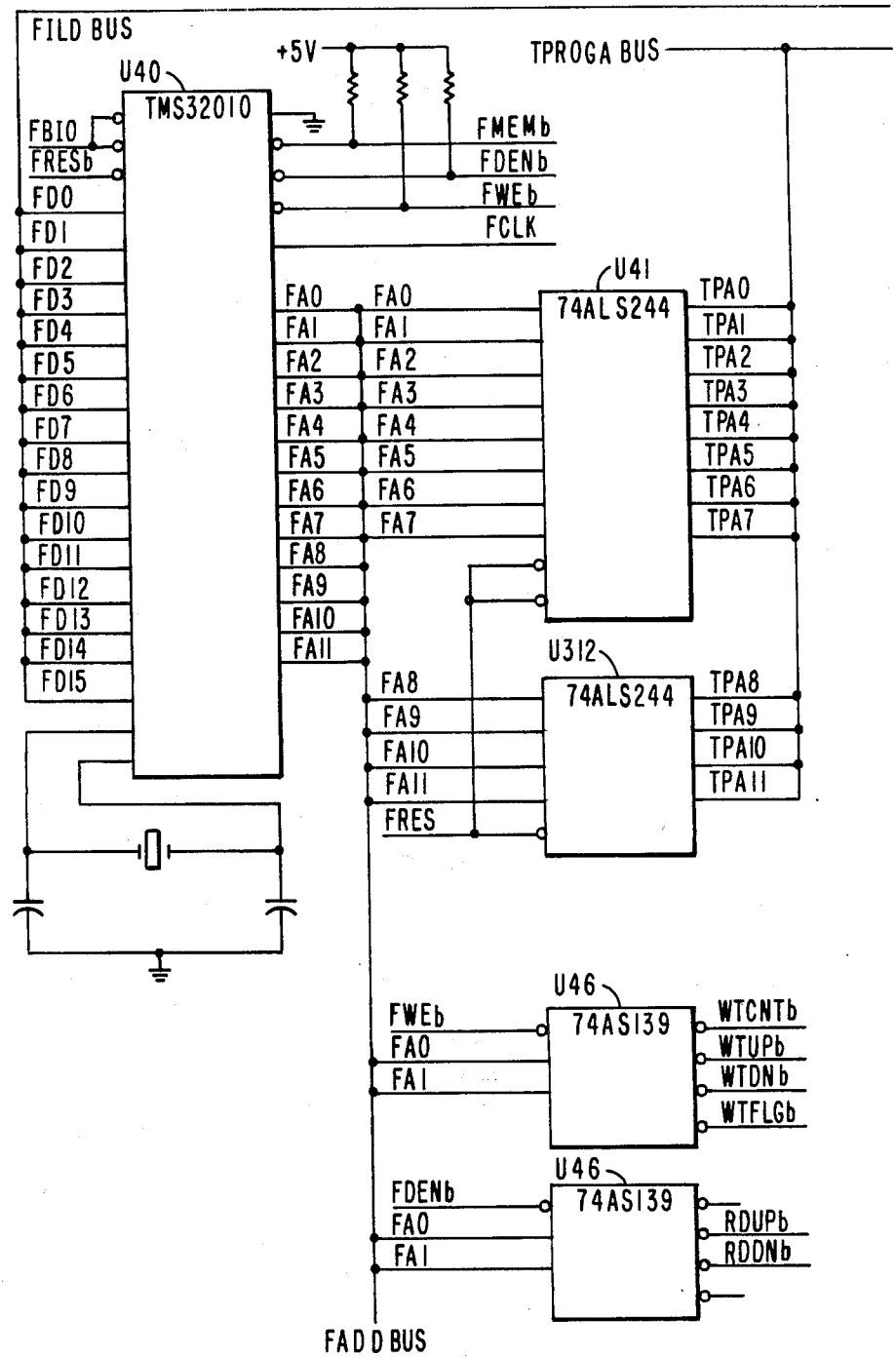
Figures 2, 11D:
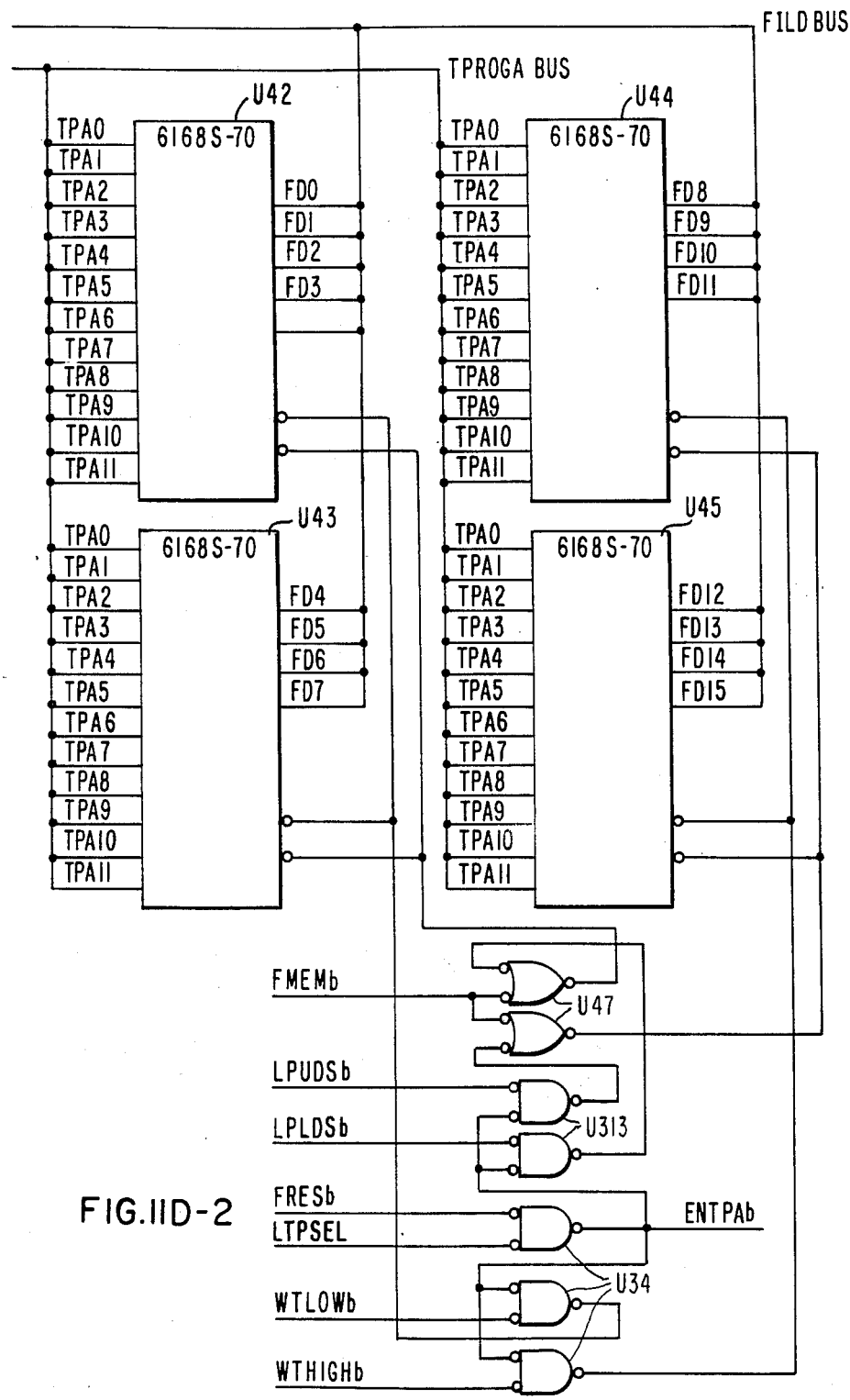

The external interface capability of the TMS 320 or U40 in FIG. 11D-1 reflects the fact that the device was primarily intended to be used in stand alone applications. The TMS 320 is very efficient at performing computational operations; however operation cannot be suspended to allow access to its peripheral circuitry by other devices. As such, usage of the device in a co-processor application requires specialized interface circuitry. This interface circuitry provides the capability for the 68000 to load the program memory of the TMS 320, and provides a facility for interchange of information between the TMS 320 and the 68000. Access to the TMS 320 program memory by the 68000 requires the TMS 320 be in the reset condition, that is the TMS 320 reset input must be asserted. The state of the TMS 320 reset signal, FRESb is directly controllable as a latched output from the 68000.

The primary interface for interchange of information between the TMS 320 and the 68000 is provided by implementation of a concept referred to as bank switched memory. The bank switched memory consists of two identical, physically separate, 1K, by 16-bit RAM arrays. These arrays are referred to as banks. Both banks are resident within the same address space. At any given point in time, ownership of one of the memory banks is associated with the 68000 and ownership of the other bank is associated with the TMS 320. Since the memory appears as a single 1K by 16-bit RAM, access to the memory by either processor is totally transparent to operations by the other processor. This provides for simultaneous access to the interface memory by both processors. Control and handshake signals are associated with switching of the bank ownership.

There are four states associated with the 68000 to TMS 320 interface. These states are referred to as idle, go, processing and done. Assertion of the TMS 320 reset signal forces the interface to be in the idle state. The interface will remain in the idle state until the go state is requested by the 68000. It is to be noted that bank switching can only be effected while the interface is in the idle state. A request for bank switching, at any other time will not be performed until the idle state is reached.

In operation, the 68000 will write information consisting of commands and data in the bank memory, request a bank switch, and set the go state. Switching of the banks makes this information available to the TMS 320. The TMS 320 detects the go state, sets the processing state, and operates on the data, writing the results back into the bank memory. Concurrently, the 68000 can write the bank memory with the next set of commands and data transparent to the TMS 320 operation. The TMS 320 will set the done state upon completion of the required processing. The 68000 detects the done state, forces the idle state, and switches the banks to obtain access to the results the TMS 320 calculations.

The bank switch memory appears as I/O locations to the TMS 320. Circuitry external to the TMS 320 is required for efficient usage of this memory by the TMS 320 because of the limited I/O ports provided by the TMS 320. Four TMS 320 I/O ports are associated with the bank switch memory and handshake flags. Access to the memory by the TMS 320 is provided by a binary up/down counter. The counter is operated in a post-decrement or post-increment mode. Execution of an output to I/O port 0 will result in the counter being loaded with the data value being output. This will then serve as the bank memory address for the next bank memory. Operations on I/O port 1 will result in either reading or writing of the bank memory with a post-increment of the memory address. Operations on I/O port 2 will result in either reading or writing of the bank memory with a post-decrement of the memory address. Thus, the memory address counter need only be preset to an address at the beginning of a series of read or write operations. Successive I/O operations on I/O ports 1 or 2 will result in access to successive memory locations.

The TMS 320 BIOb pin and I/O port 3 are associated with the handshake interface with 68000. The 68000 request the GO state by outputting a XXX1 to address 7EA07. This forces the TMS 320 BIOb signal pin the logical "1". The PROCESSING state is set by the TMS outputting a data value of XXX1 to I/O port 3. After completion of the required processing the TMS 320 sets the DONE sate by outputting a XXX2 to I/O port 3. The 68000 then forces the IDLE state of outputting a XXX0 to address 7EA07. Indication of the IDLE state is reflected by the BIOb signal pin being at a logical "0".

Circuitry associated with the TMS 320 processor and its program memory is shown in FIGS. 11D-1 and 11D-2 of the drawings. Circuitry shown in FIGS. 11E-1, E-2 and 11F-1, F-2 is associated with the bank switch memory. Circuitry shown in FIGS. 11G-1, 11G-2 of the drawings is primarily associated with bank memory addressing and bank switch control.

The TMS 320 program memory, 4K by 16-bits, is implemented with static high speed, access time of 70 nanoseconds or less, RAM provided by devices U42 through U45 as shown in FIG. 11D-2. Contents of this memory must be downloaded by the 68000 before the TMS can be allowed to begin program execution. Access to the TMS 320 program memory by the 68000 is only allowed when the TMS 320 is being held reset. The 68000 can force the TMS 320 to be reset by writing a 0 to location 7EA01 will release the reset to the TMS 320.

Assertion of the FRESb signal to the TMS 320 will force the TMS 320 to be reset. During reset, the TMS 320 will force its data and control lines to the tri-state condition. However, the address lines are not tri-stated. Therefore, address buffers, devices U41 and U312 in FIG. 11D-1 are required to permit access to the program memory by the 68000. The TMS 320 provides three signals for external indication of the operation being performed. These signals are FMEMb, which is asserted for indication of a program memory read operation; FDENb, which is asserted for indication of an I/O read operation; and FWEb, which is asserted for indication of either a program memory or I/O write operation. It is to be noted that circuitry external to the TMS 320 on the torque processor module does not support the TMS 320 table write instruction implementation. As such, the TMS 320 cannot write into its program memory. The memory devices used for implementation of the TMS 320 program memory include two input control signals, write enable, WEb, and chip select, CSb, which are not specifically shown. A memory read operation is performed by assertion of the CSb signal with the WEb signal non-asserted. A memory write operation is performed by assertion of both control signals. It is to be noted these devices do not provide an output enable signal. Therefore, assertion of CSb and WEb during memory write operations must be essentially coincident in order to prevent data bus contention between the memory devices and the data bus drivers.

The circuitry shown in FIG. 11D-2 of the drawings consisting of U47, U313, and U34 provides control signal interface to the TMS 320 program memory. This circuitry multiplexes the memory control signals between either the 68000 or the TMS 320, depending on the state of the TMS 320 reset signal, FRESb. Byte operations from the 68000 are supported. The signal ENTPAb is asserted provided the 68000 is attempting to access the TMS 320 program memory and the TMS 320 is reset. This signal being asserted in FIGS. 11G-1 and 11G-2 allows the 68000 write high, WTHIGHb, and write low, WTLOWb, signals to be gated to the write enable inputs of the respective bytes of TMS 320 program memory. Assertion of ENTPAb shown in FIG. 11D-2 also allows the 68000 data strobe signals, LPUDSb and LPLDSb to be gated to the chip enable inputs of the respective bytes of TMS 320 program memory.

The TMS 320 provides for implementation of eight I/O ports. The torque processor module implementation utilizes four of these I/O ports for operations related to the bank memory. No attempt is made to fully decode the I/O port addresses. As such, the four unused ports overlap the four used ports. That is, for example, TMS 320 operations on I/O port 0 or I/O port 4 will result in the same function being performed. Device U46, shown in FIG. 11D-1 of the drawings, is used to provide decoding of the TMS 320 port address for I/O operations. This device decodes the TMS 320 least significant two address signal lines to provide the decoded bank memory related control signals.

Figures 1, 11E:
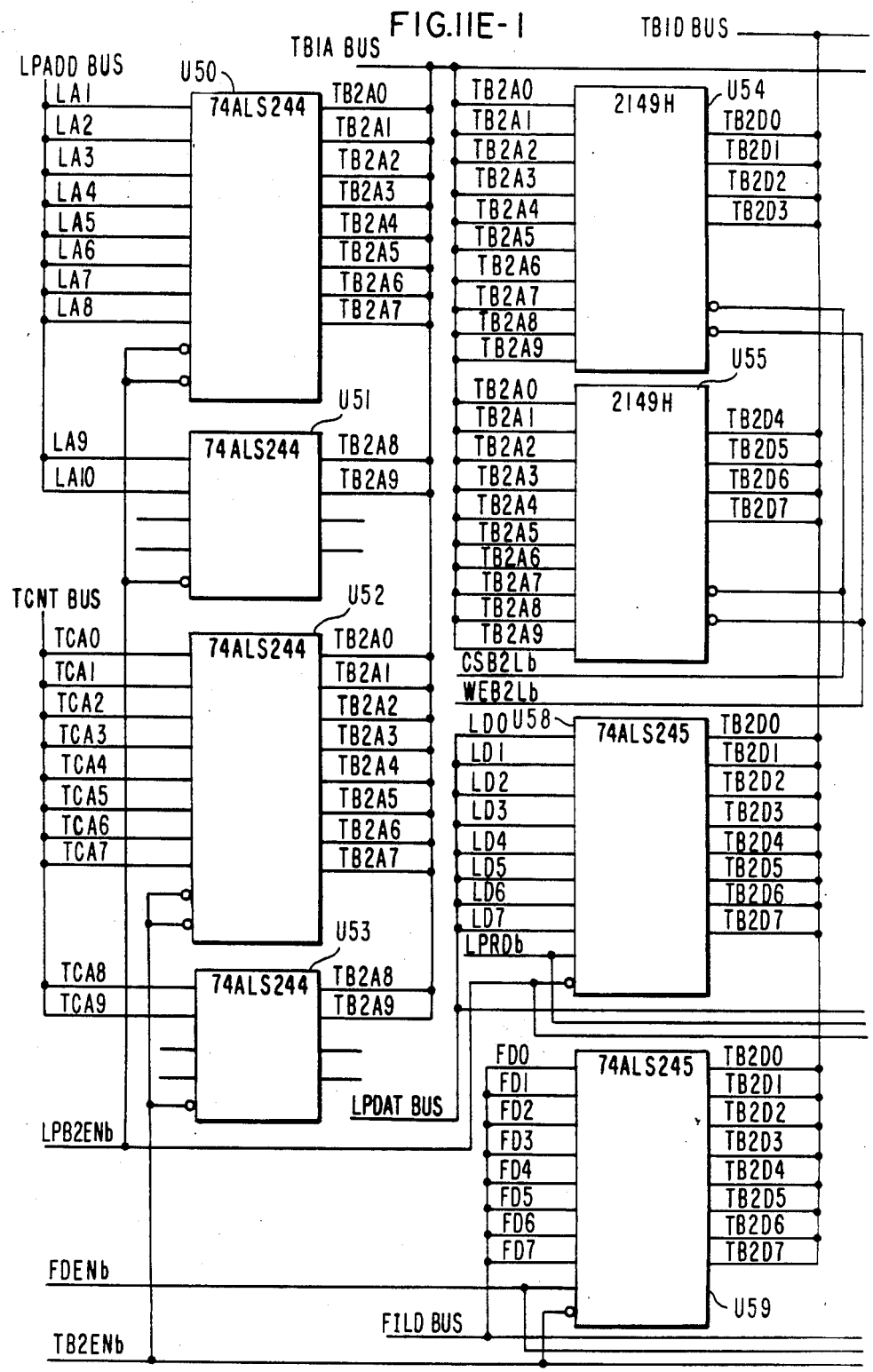
Figures 2, 11E:
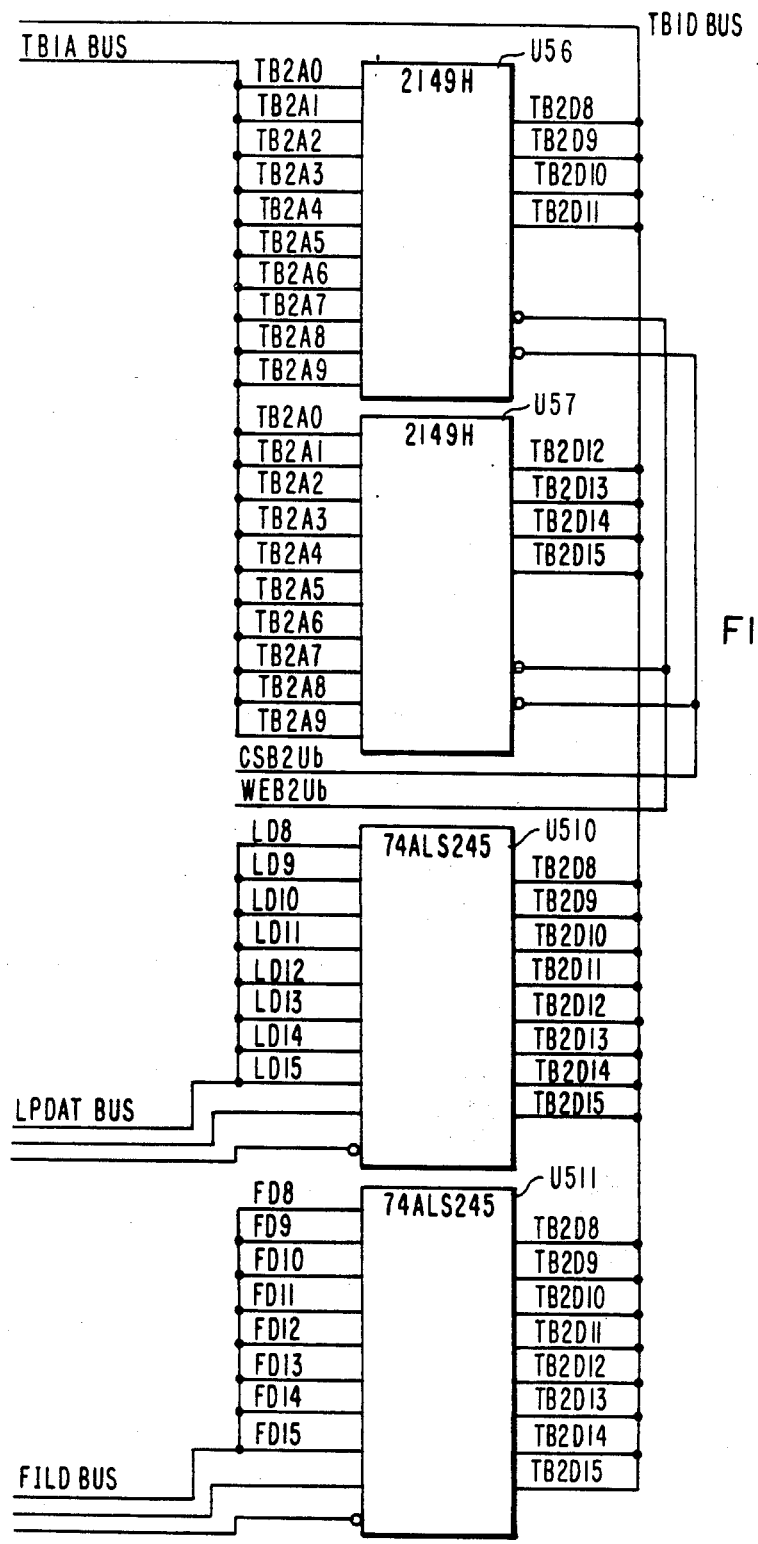
Figures 2, 11F:
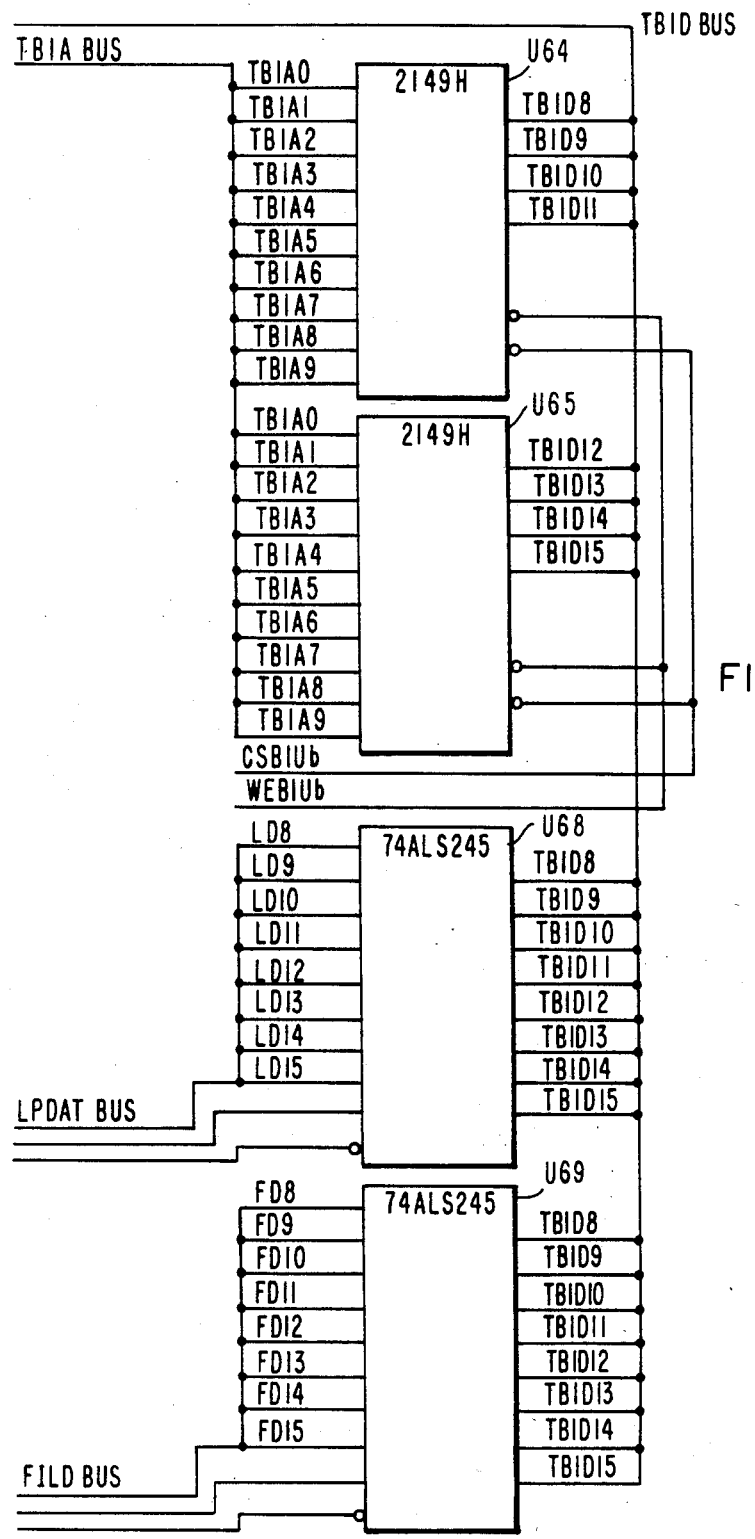

One portion of the bank memory is shown in FIGS. 11E-1 and 11E-2 and control signal and bank switch logic is shown in FIG. 11E-2. Devices U50, U51, U52 and U53 provide for bank memory address signal line multiplexing. Devices U50 and U51 are associated with the 68000, and devices U52 and U53 are associated with the TMS 320. Inputs to the 68000 address multiplexer consist of the 68000 address signal lines LA1 through LA10, and inputs to the TMS 320 multiplexer consist of the outputs of the bank memory address counter U70, U71, U72 shown in FIG. 11G-1. Devices U58, U510, U59, and U511 provide for bank memory data signal line multiplexing. Devices U58 and U510 are associated with the 68000, and devices U59 and U511 are associated with the TMS 320. Word and byte operations for 68000 related access to the bank memory are supported. Generation of multiplexer enable control signals is provided by the bank switch control PAL, U77, shown in FIG. 11G-1. The TMS 320 related multiplexer enable signal, TB1ENb, is asserted whenever the TMS 320 has ownership of the bank. The 68000 related multiplexer enable signal, LPB1ENb is only asserted when the 68000 has ownership of the bank and access to this memory by the 68000 is being attempted. A similar arrangement of the second portion of the bank memory is shown in FIGS. 11F-1 and 11F-2.

Figures 1, 11G:
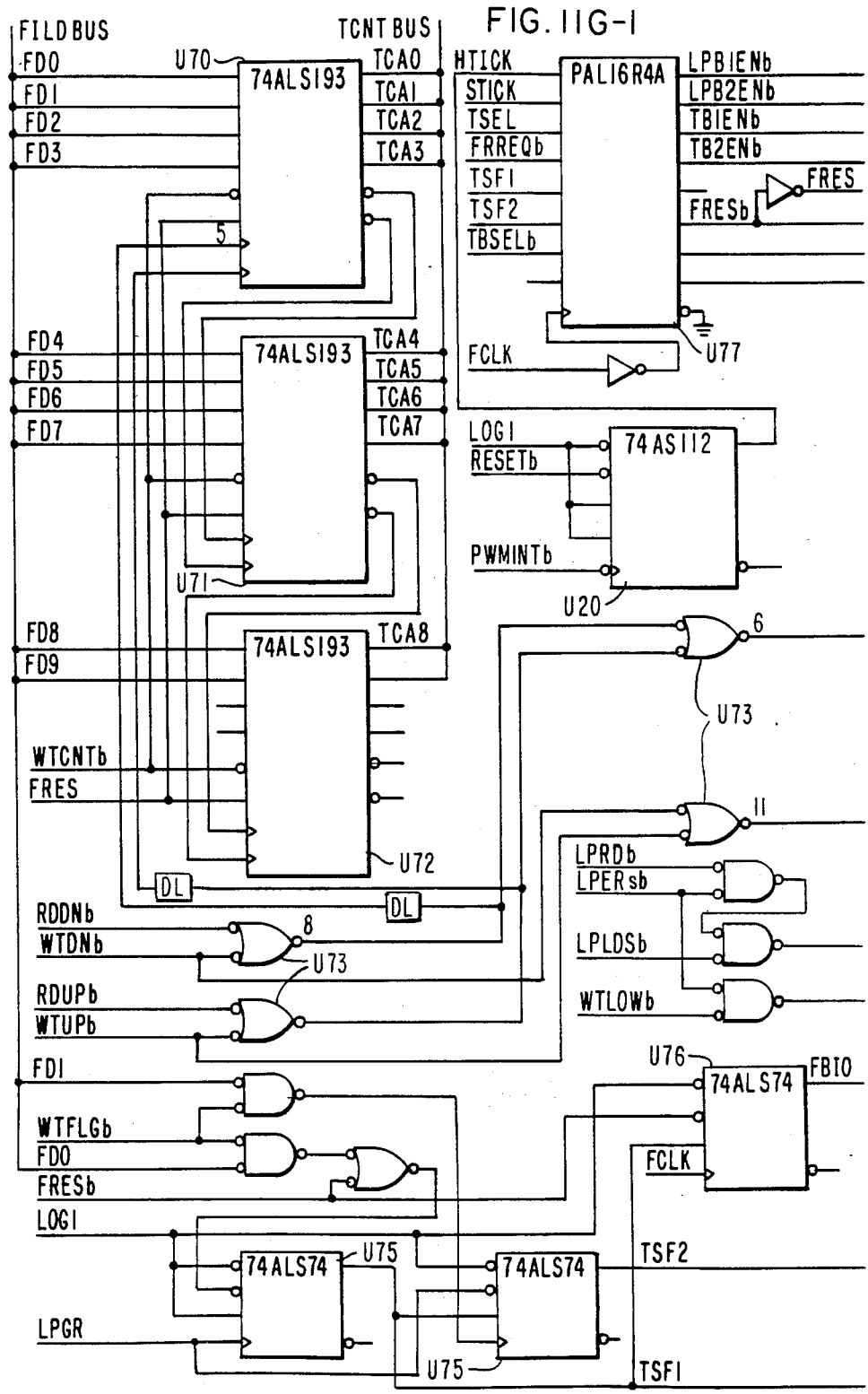

Bank memory bank switch control logic is shown in FIGS. 11G-1 and 11G-2. This logic consists of the bank switch control PAL, device U77, and the bank memory control signal multiplexers, devices U78 and U79. The bank switch logic supports two possible sources for determining bank switching. These two sources are referred to as hard tick and soft tick. The hard tick signal is derived from hardware on a fixed time basis. In the case of the torque processor module, this signal is derived by dividing the PWM ramp frequency by two. The soft tick, STICK, is derived from software. The signal TSEL is used to select between the hard and soft tick for determination of bank selection. TSEL is output controllable by the 68000. This signal being in the logical "0" state selects the STICK signal for bank switch selection. STICK being in the logical "0" state selects bank 1, circuitry shown in FIGS. 11E-1 and 11E-2 of the drawings, for ownership by the 68000. The state of TSEL is determined by the state of data bit 0 when a write operation is performed to location 7EA05, and the state of STICK is determined by the state of data bit 0 when a write operation is performed to location 7EA05. The presently intended applications of the torque processor module use the STICK signal for bank memory selection. The outer inputs to the bank switch control PAL device U77 of the 68000 bank memory select signal, TBSELb, and the interface handshake flags, TSF1 and TSF2. TSF1 and TSF2 are used by the bank switch control to effect bank switching only when the interface is in the idle state.

The outputs of device U77 consist of 68000 data and address signal line multiplexer enable signals, LPB1ENb and LPB2ENb; TMS 320 data and address signal multiplexer enable signals, TB1ENb and TB2ENb; and the bank memory control signal multiplexer enable signal lines, derived from the appropriate pins of U77. The signals TB1ENb and TB2ENb are also used to select the source for the bank memory control signals. Switching of the control lines for the bank memory during the bank switch operation requires a special sequence in order to ensure that the outputs of U78 and U79 in FIG. 11G-2 remain in the non-asserted state during the switching operation. This special sequence is as follows. First, both signal lines TB1ENb and TB2ENb are asserted, so that the TMS 320 related control signals are multiplexed to the bank memory control signals. Then the bank memory control signal multiplexer enable signals, are non-asserted, forcing the outputs of U78 and U79 to the tri-state condition. Then either TB1ENb or TB2ENb, according to corresponding new ownership of the bank memory by the 68000 as determined by the state of the selected tick signal, is nonasserted. This is then followed by assertion of the appropriate control signal multiplexer enable signal. The TMS 320 data and address multiplexer enable signal and memory control signal remain asserted until the next bank switch operation. The 68000 related data, address and memory control multiplexer enable signals only become asserted when the 68000 is requisitioning access to the bank memory.

Device U73 is used to generate the TMS 320 bank memory control signals. Pin 6 of U73 will be asserted whenever a TMS 320 bank memory read or write operation is performed. Pin 11 of U73 will be asserted whenever a TMS 320 bank memory write operation is performed. These signal lines are then multiplexed to the appropriate bank memory chip select and write enable signals by U78 or U79.

The bank memory address counter consists of devices U70 through U72. Assertion of the FRESb signal resets the counter. TMS 320 output on I/O port 0 or 4 forces WTCNTb to be asserted which forces the counter to be parallel loaded with the data value being output. Input or output on I/O ports 1 or 5 will result in reading or writing of data to or from the appropriate bank memory. This will force pin 8 of U73 to be asserted. Completion of the read operation will then force U73 pin 8 to be non-asserted, which will result in the address counter being incremented by one. The delay line in FIG. 11G-1 is inserted between U73 pin 8 and U70 pin 5 is required to ensure address hold time requirements for the bank memory are satisfied. In a corresponding sense, input or output on I/O ports 2 or 6 will result similar operation with the address counter being decremented.

Device U75 provides for state storage of the interface handshake flags. In the idle state both halves of U75 are reset. The 68000 request the go state by writing a 1 to address 7EA07. This forces the signal LPGR to transition to the logical "1" state, which clocks TSF1 to a logical "1". LPGR being in the logical "1" state also forces the reset signal to TSF2 to be non-asserted. Device U76 provides for synchronization of the FBIO signal with the TMS 320 clock. The TMS 320 sets the PROCESSING state by outputting a data value of XXX1 to I/O port 3 or 7. This results in setting TSF2 to a logical "1". The TMS 320 sets the DONE state of outputting a data value of XXX2 to port 3 or 7. This forces TSF2 to the logical "0" state. The 68000 forces the IDLE state by writing a 0 to address 7EA07, which forces LPGR to the logical "0" state, resetting TSF1.

Signals TSF1 and TSF2 are also connected to pins 2 and 4 respectively of U710 in FIG. 11G-2. This provides the capability for the state of the interface handshake signals to be monitored by the 68000. A 68000 read from location 7EA01 will result in the data bits 0 and 1 reflecting the state of TSF1 and TSF2 respectively. Device U710 also provides the capability for monitoring other status related signals as follows:

| Signal | Data Bit | Function |
|---|---|---|
| ARMERRb | 2 | Arm interface module error |
| PWMINTb | 3 | PWM sample interrupt state |
| ENCINTb | 4 | Encoder index interrupt state |
| LESMPb | 5 | Encoder sample interrupt state |
| LPWMEN | 6 | PWM enable signal state |
| VTICK | 7 | VME bus tick signal state |

Device U711 provides for storage of the TMS 320 control signals. U711 is an eight-bit addressable latch, which provides for implementation of an eight location, single bit wide memory element. Assertion of RESETb forces allocations to the logical "0" state. Three additional outputs not previously described are provided by U711. These signals are PWM clock enable, LPWMCEN; PMW reset, LPPWMRb; and a signal which provides the capability for the 68000 to interrupt the TMS 320, ITMSb. An address map for these devices is as follows:

| Address | Signal |
|---|---|
| 7EA01 | FRREQb |
| 7EA03 | STICK |
| 7EA05 | TSEL |
| 7EA07 | LPGR |
| 7EA09 | not used |
| 7EA0B | LPWMCEN |
| 7EA0D | LPPWMRb |
| 7EA0F | ITMSb |

External Bus Interface

The torque processor module provides an external bus for interface with arm related devices resident on the arm interface foundation module. This bus is patterned after the VMX bus specifications for timing and signal pin interconnection. Reference is made to this specification for timing information relating to interchange of data through usage of this bus. The actual bus implemented is considered a subset of the full VMX bus specifications. The areas of difference are as follows:

1. Multiple Masters: The VMX bus provides for multiple bus masters and this functionality is not supported. The torque processor module serves as the only VMX bus master and the arm interface foundation serves as the bus slave.

2. Bus Cycles: The VMX bus provides for several types of bus cycles. Only single cycles of transfer are supported by the torque processor module.

3. Data Transfers: The VMX bus supports longword, i.e., 32-bit transfers. This functionality is not supported.

4. Address Capability: The VMX bus supports 24-bit address definition. This is accomplished through multiplexing the 24 bits of address information onto 12 address signal lines and through usage of two address strobe signals, UASb and LASb (not specifically shown). This functionality is not supported. The torque processor module only provides 12 bits of address information and indication that the address is valid is provided by assertion of the UASb signal line. The LASb signal line is connected to a logical "0".

Figures 1, 11H:
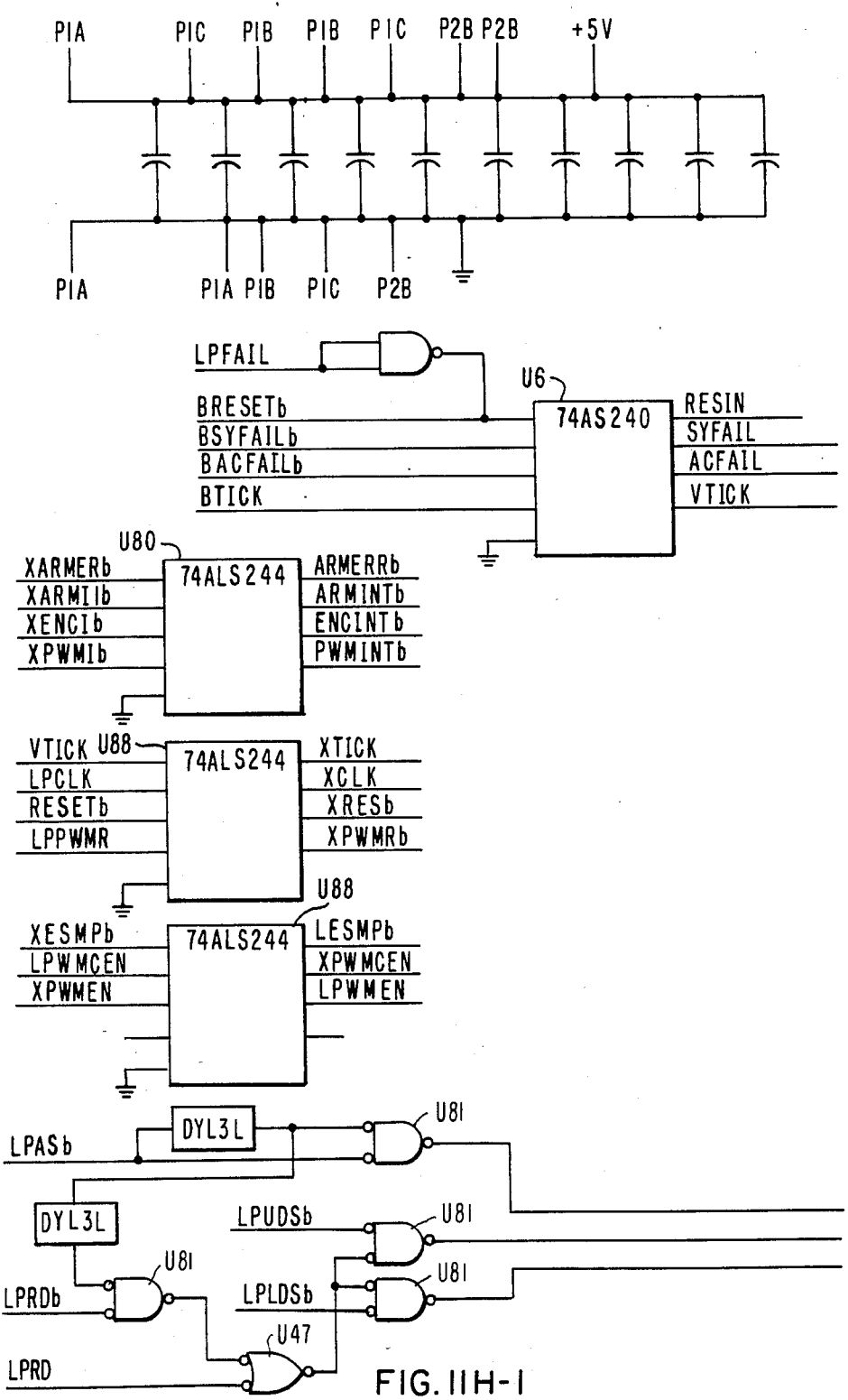

The VMX bus interface circuitry is shown in FIGS. 11H-1 and 11H-2 of the drawings. Devices U82 and U83 provide the data bus interface. Devices U84 and U85 provide the address bus interface. Control bus interface is provided by U85. The delay line and gates associated with U81 and U47 are necessary to ensure timing specifications for control signals with respect to address and data buses.

ARM INTERFACE CIRCUITRY

Figure 12A:
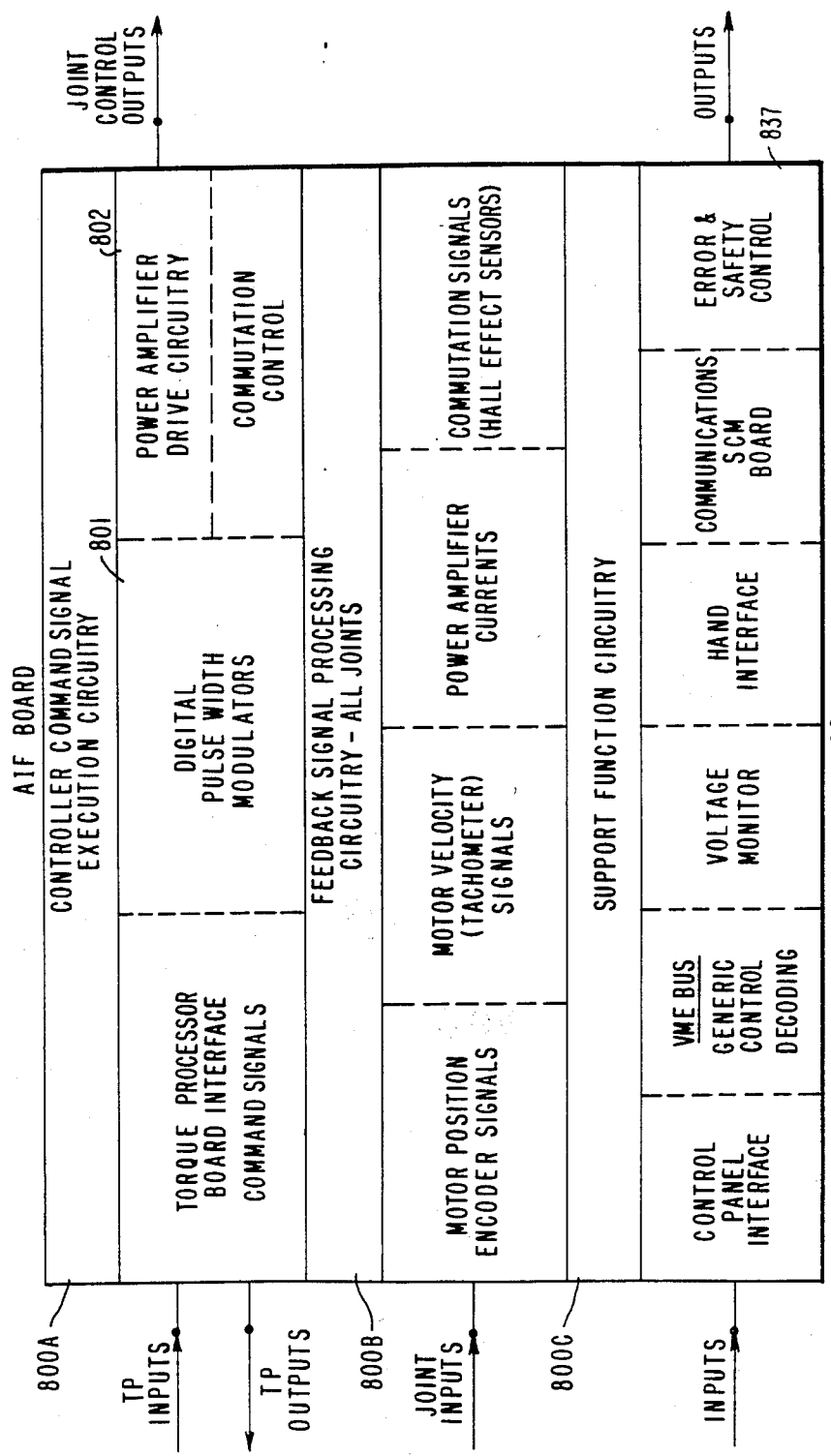
FIG. 12A shows a schematic diagram of an AIF board employed in the control.

The arm interface circuitry disposed on the arm interface board 800 of FIG. 6 and functionality interrelated in FIG. 12A operates primarily to:

1. Process control command signals to develop drive signals for power amplifiers which operate the axis motor as indicated by box 800A;
2. Process current, position, velocity and communication feedback signals as indicated by box 800B for use in the higher level control loops and the drive circuitry;
3. Perform various support functions as indicated by box 800C including control of VME bus operations, network communications interfacing, supply voltage monitoring, control panel interfacing, robot hand interfacing, and error and safety monitoring and control.

The digital robot control system is universally applicable to various kinds and sizes of robot arms because:

1. The overall control circuitry is generally structured to provide the basic control functions needed for universal application to robot arms;
2. The arm dependent board circuitry is disposed on the arm interface board—thereby enabling all higher level circuit boards to be packaged in a robot control system independently of the characteristics of the particular robot arm to be controlled;
3. The arm interface circuitry on the board 800 is organized so that a limited number of different arm interface boards can accommodate the requirements of a wide variety of robot arms including hydraulic robot arms, electric robot arms (brush type or brushless motors), large high power robot arms, small low power robot arms, robot arms produced by different manufacturers, etc.
4. Communications capability is included to enable application to robot arms in work cells, robot networks, and automated factories.

Thus, the robot control circuitry is structured to provide low cost control system manufacture and improved robot arm control and performance while simultaneously enabling ready modification of the robot control system for universal application to varied types of robot arms. In addition, as a result of its modularity, the control system can be readily packaged to provide different levels of control capacity and performance according to user needs.

ARMS DRIVE CONTROL

As previously described, the higher level control looping generates current command signals for the robot arm axes so that the arm workpoint (effector) is moved to commanded positions under controlled velocity, acceleration and torque in accordance with a user's robot program. Pulse width modulation circuitry 801 and drive circuitry 802 are provided on the arm interface board 800 to develop axis motor drive signals, in this instance for application to power amplifiers which provide the drive currents to brushless D.C. electric motors respectively associated with the six axes of arm motion. Amplifiers can be operated much more efficiently to control motor current levels through pulsating on/off control as opposed to continuous amplitude control.

PULSE WIDTH MODULATION SCHEME
GENERAL OVERVIEW

The pulse width modulation circuitry provides a digital interface for closing the torque or current control loop through the axis motor drive circuitry. The pulse width modulation concept is applied to control the conduction time width for the joint motor power switches and thereby satisfy motor voltage and torque commands.

Figure 12B:
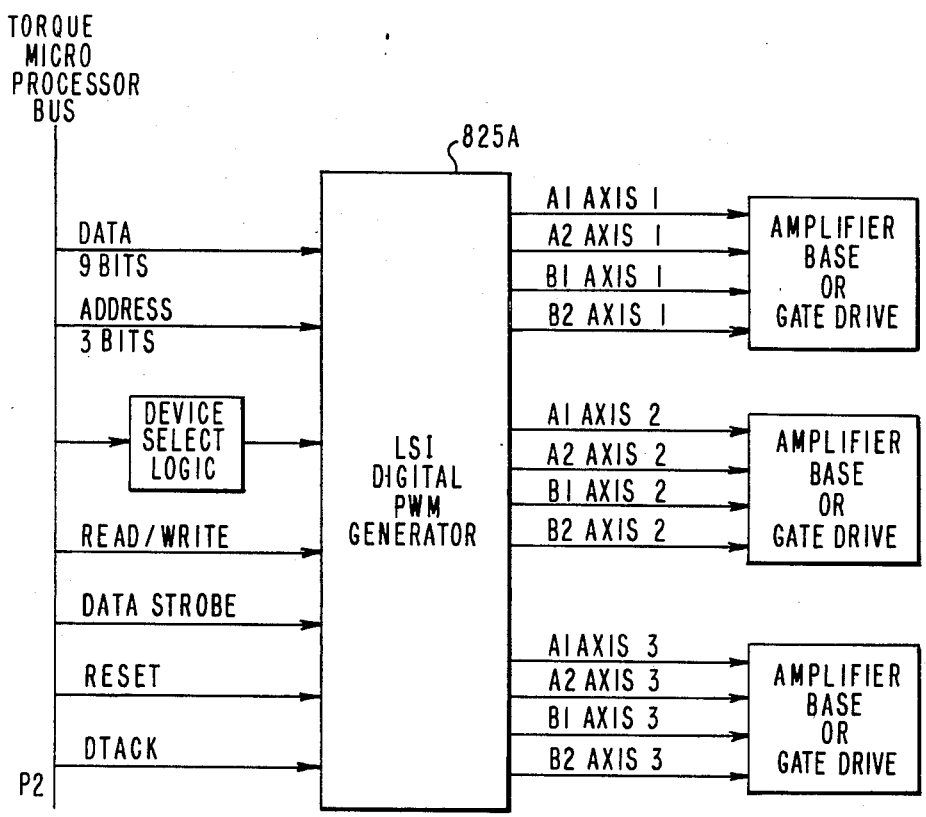
FIGS. 12B-12D show diagrams for a PWM scheme employed as the AIF board to produce power switch control pulses.
Figure 12C:
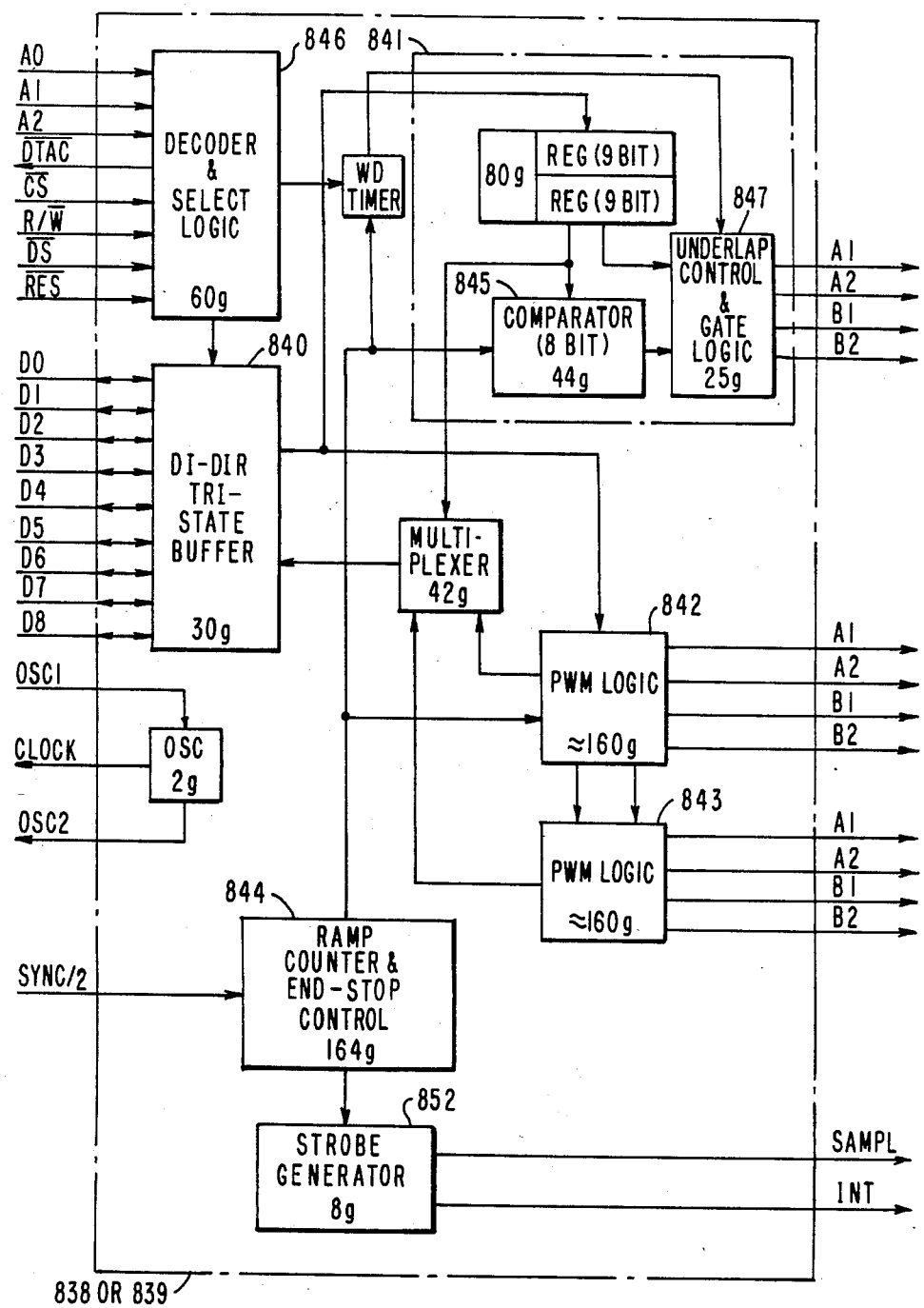
Figure 12D:
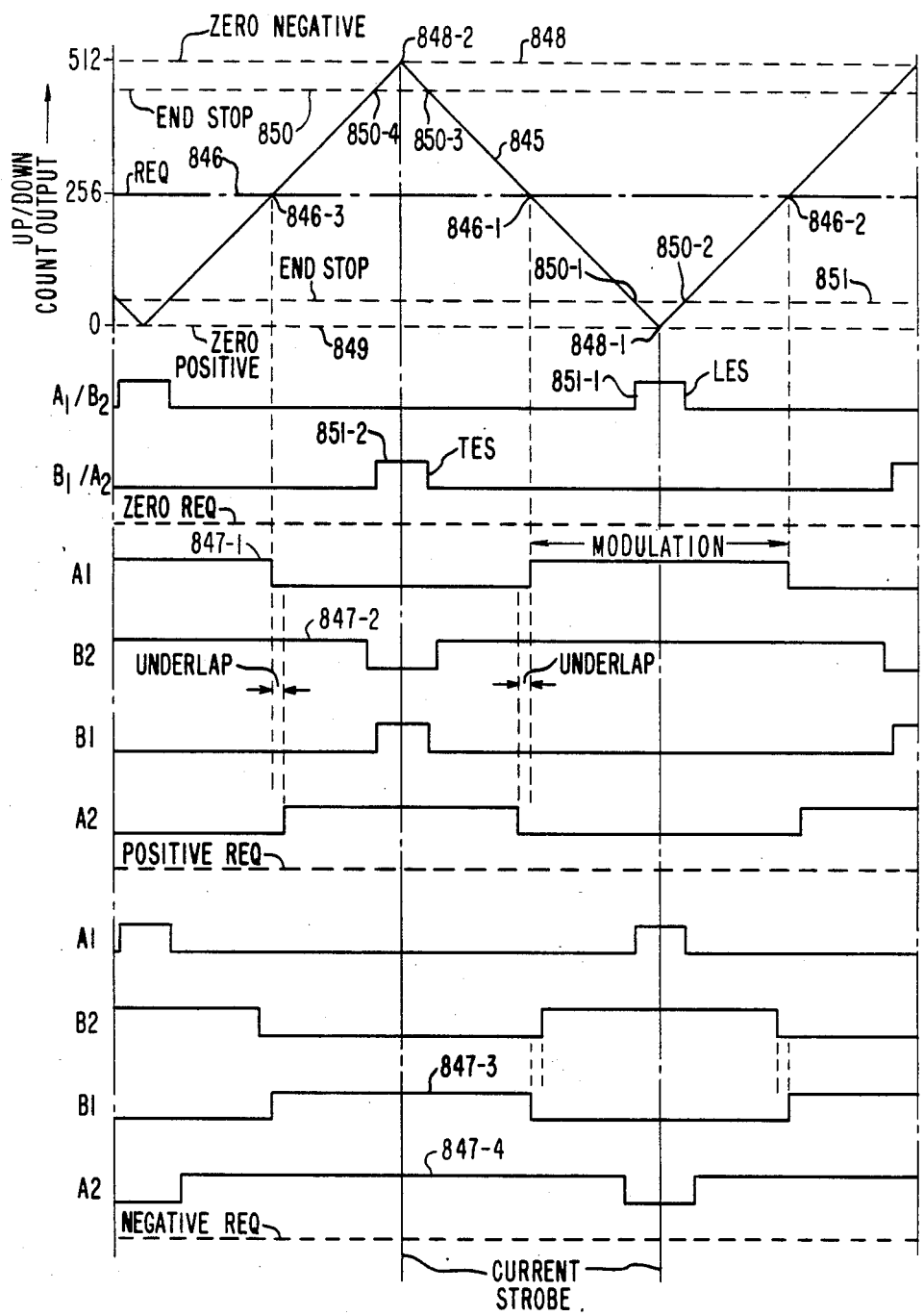

As shown in the generalized block diagram of FIG. 12B, a digital PWM generator 825A receives 9 bit data commands and 3 register address bits on the torque microprocessor P2 bus (not specifically shown). Additionally, device select logic, read/write, reset (initialization) and data strobe signals are received from the P2 bus. A DTACK (acknowledge) signal is returned to the bus by the PWM generator 825A after each reception from the torque calculator on the torque processor board.

The digital PWM generator 825A is preferably arranged to service three axes where, for example, either brushless or brush type DC motors are employed as the axis drives. Thus, a set of digital signals (in this instance four such signals A1, A2, B1, B2) is generated for controlling the amplifier base or gate drive circuitry associated with each axis motor whether the motor is the brushless type or the DC brush type.

Figures 1, 13A:
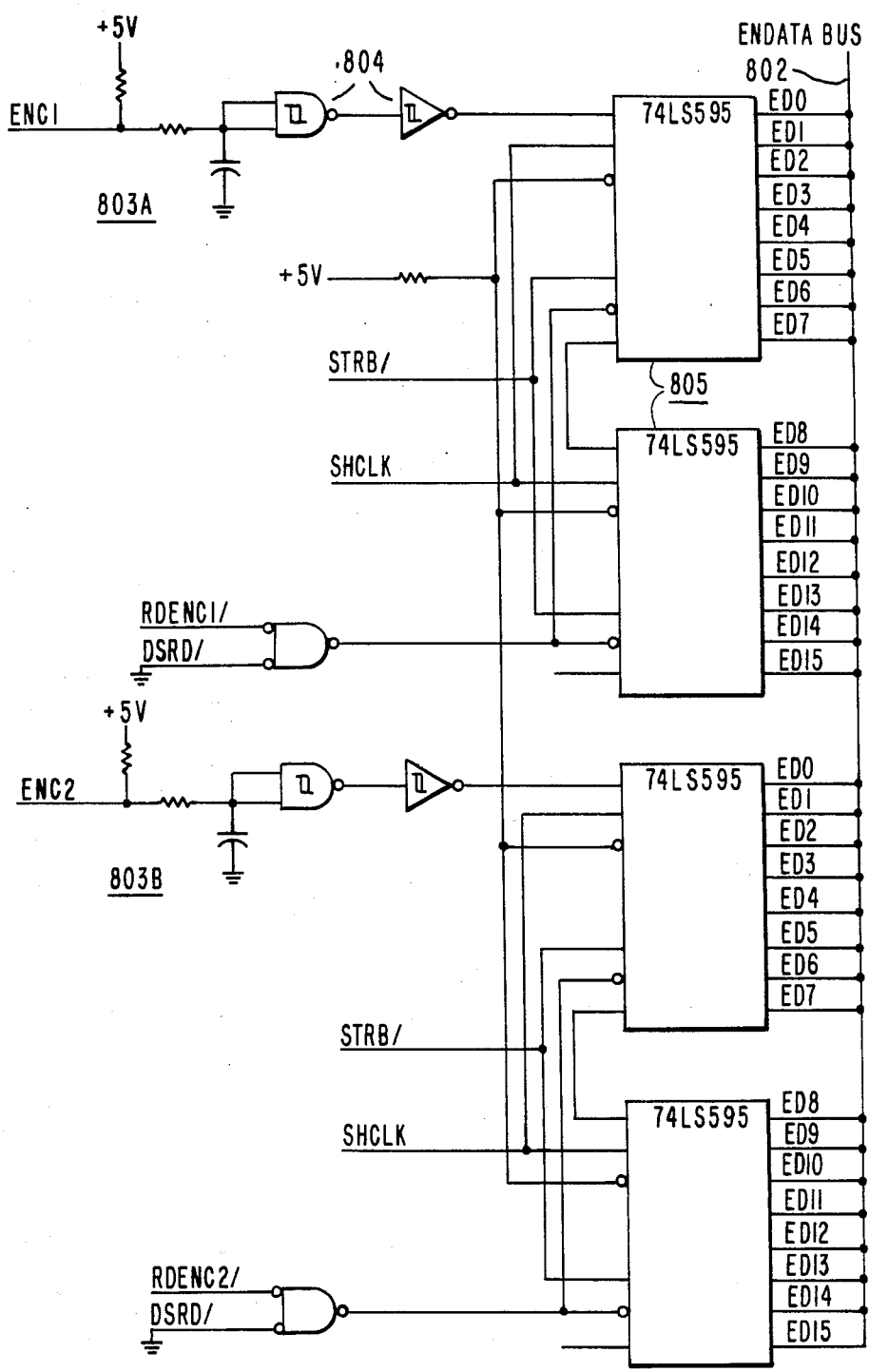
Figures 2, 13A:
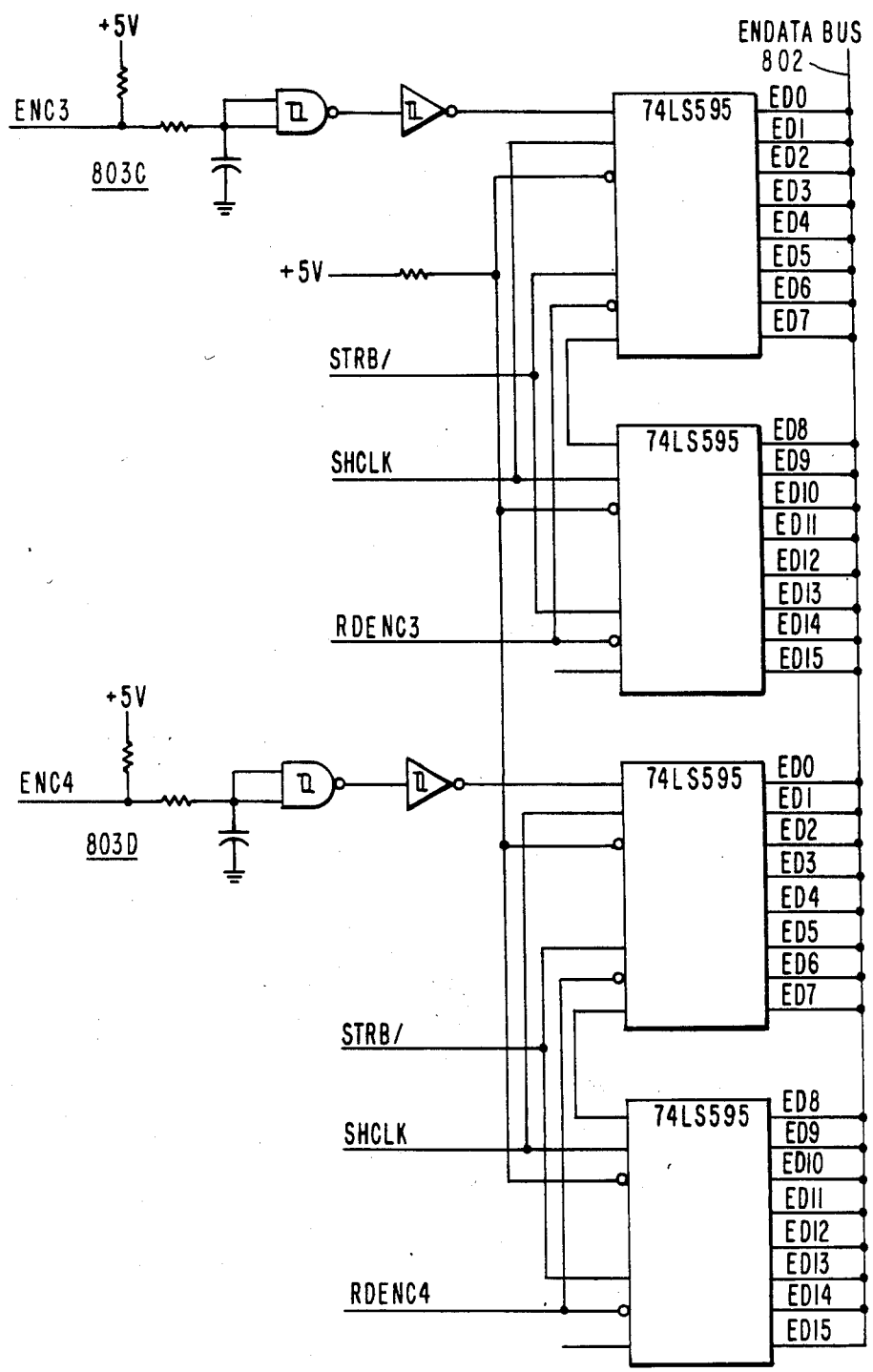
Figures 3, 13A:
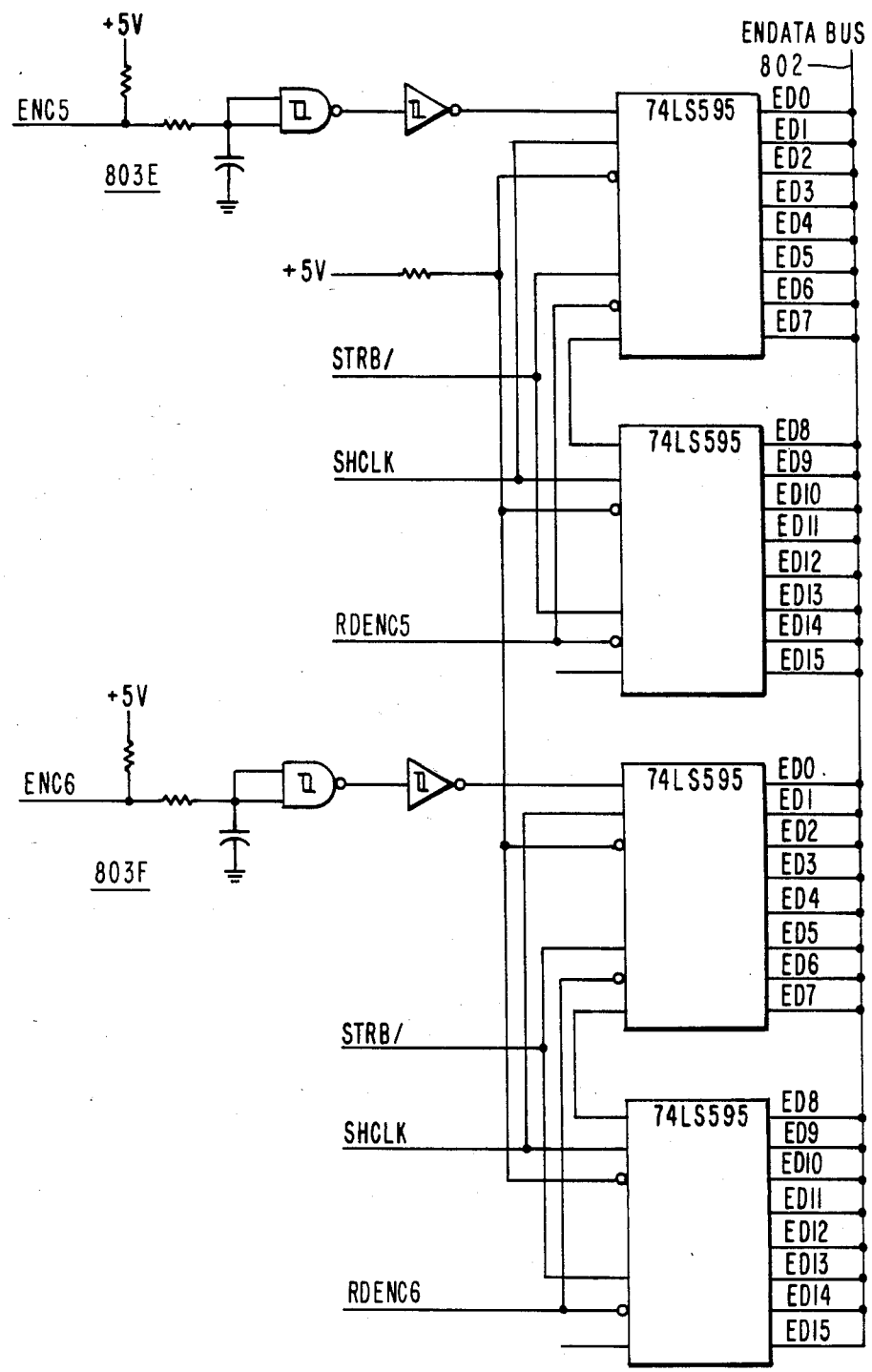
Figures 1, 13B:
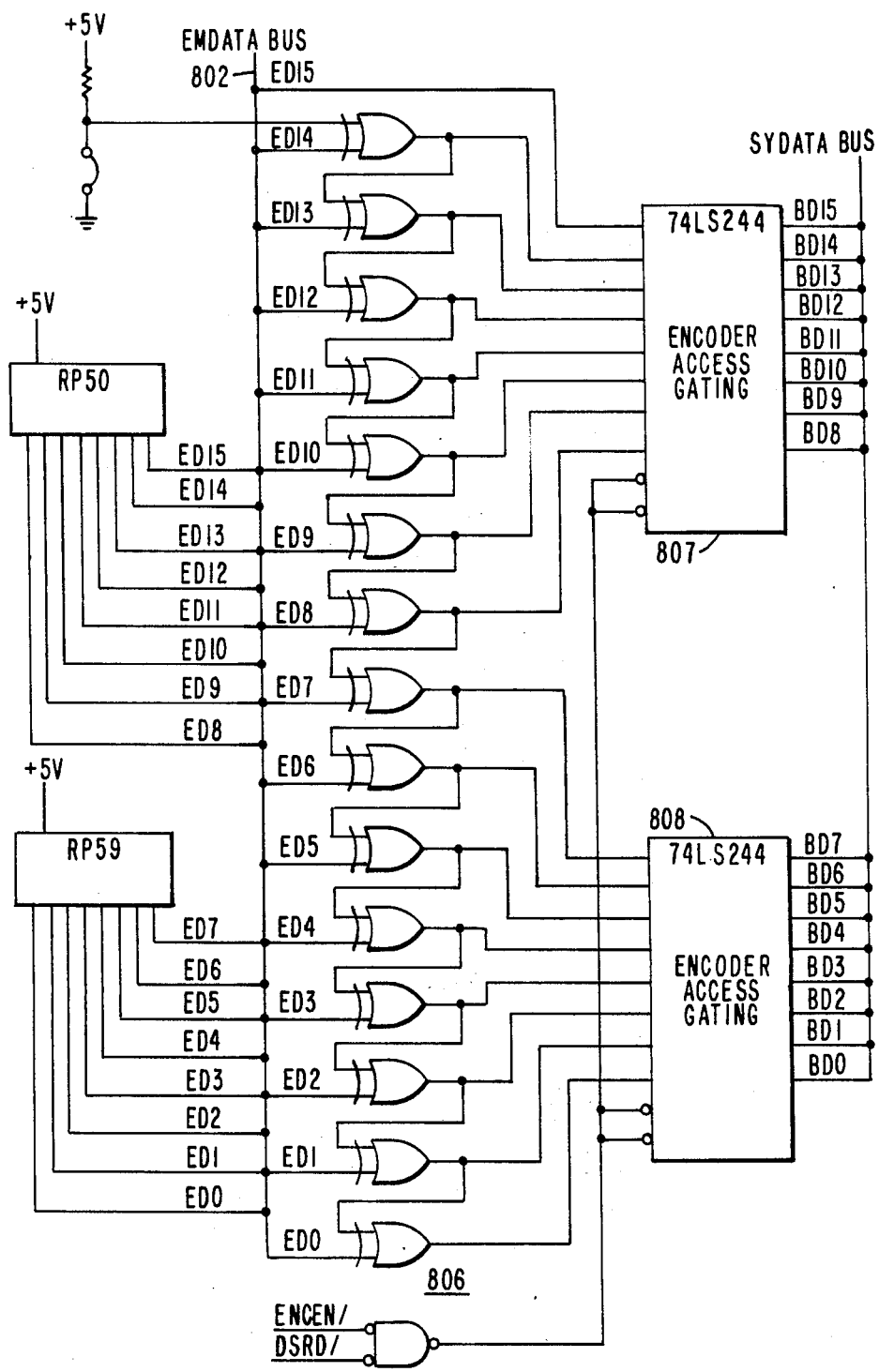
Figures 2, 13B:
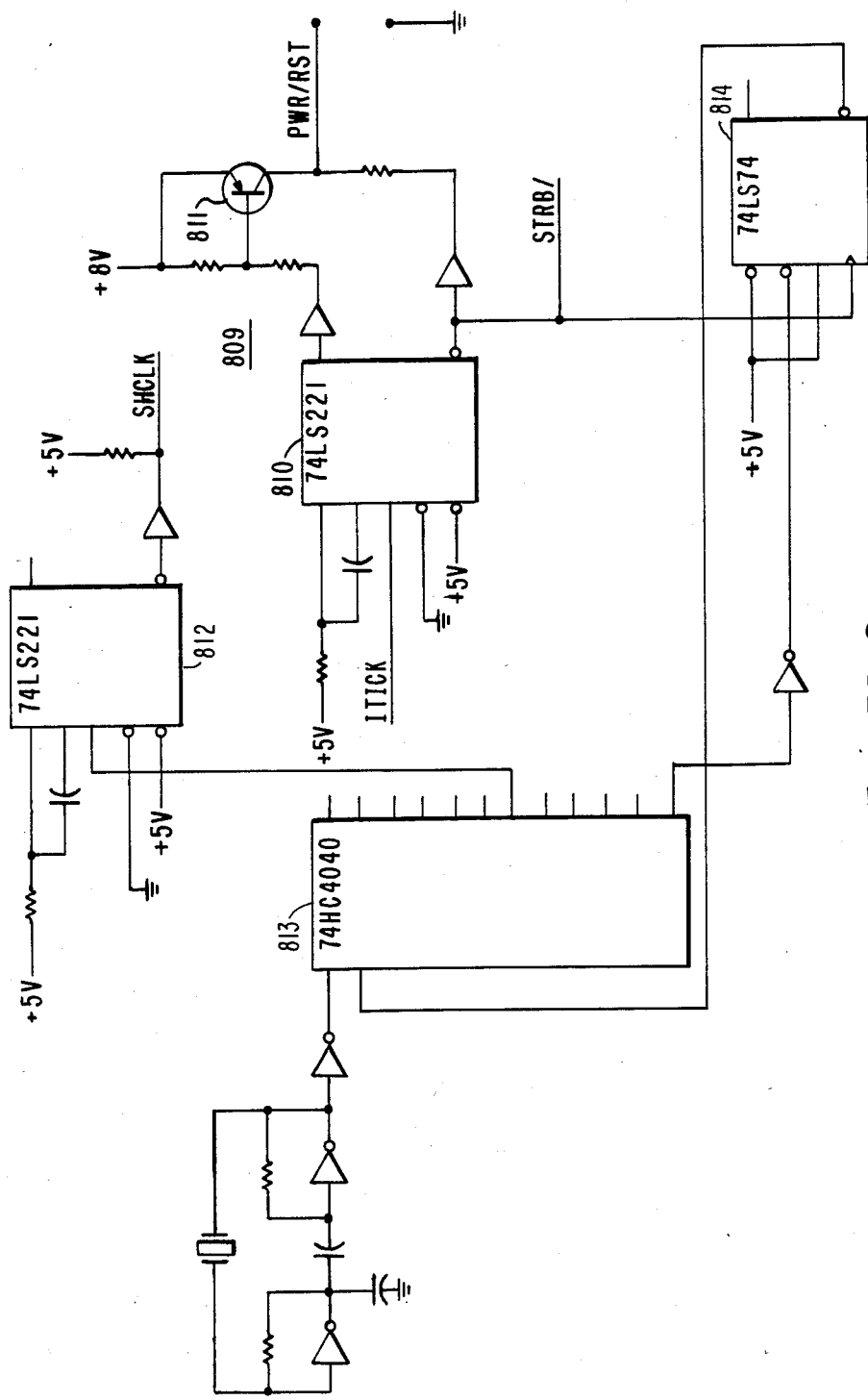
Figures 3, 13B:
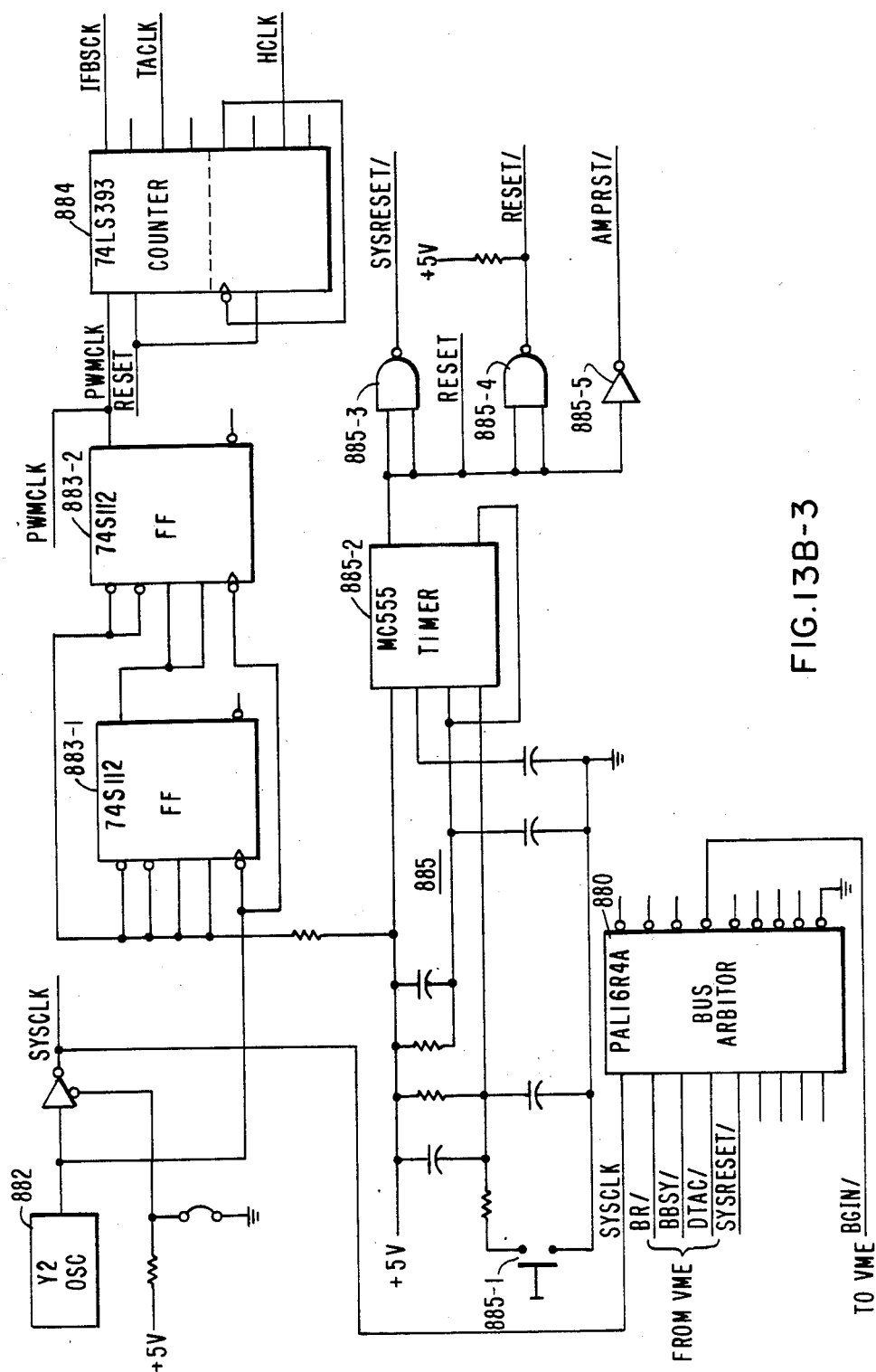
Figures 4, 13B:
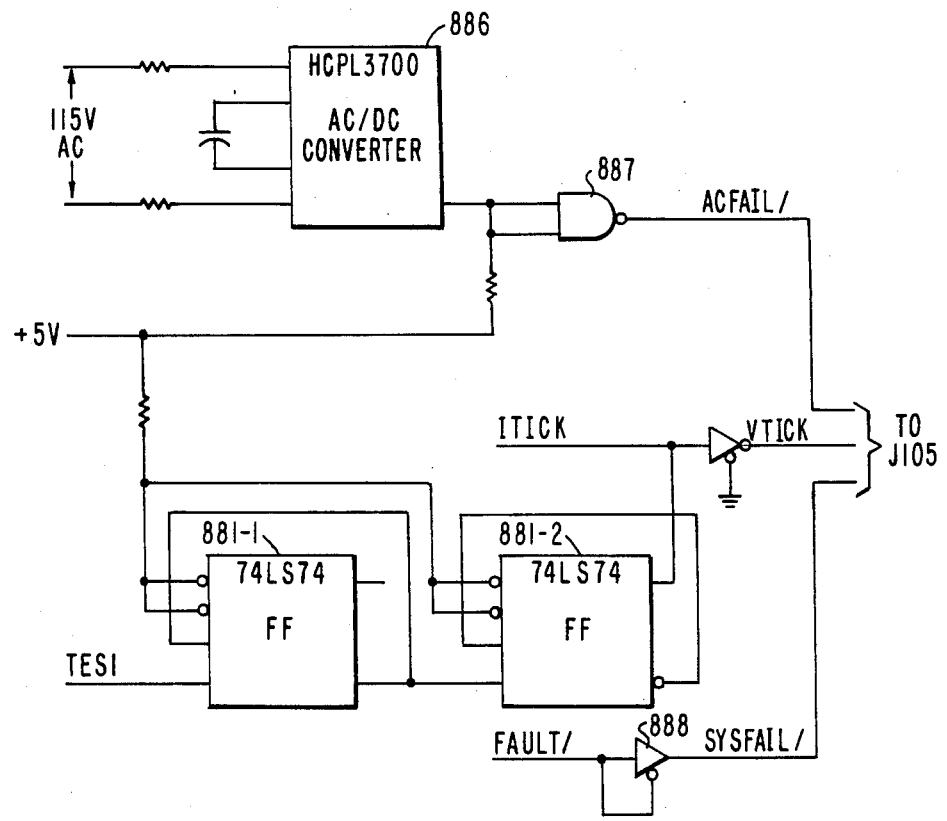
Figures 5, 13B:
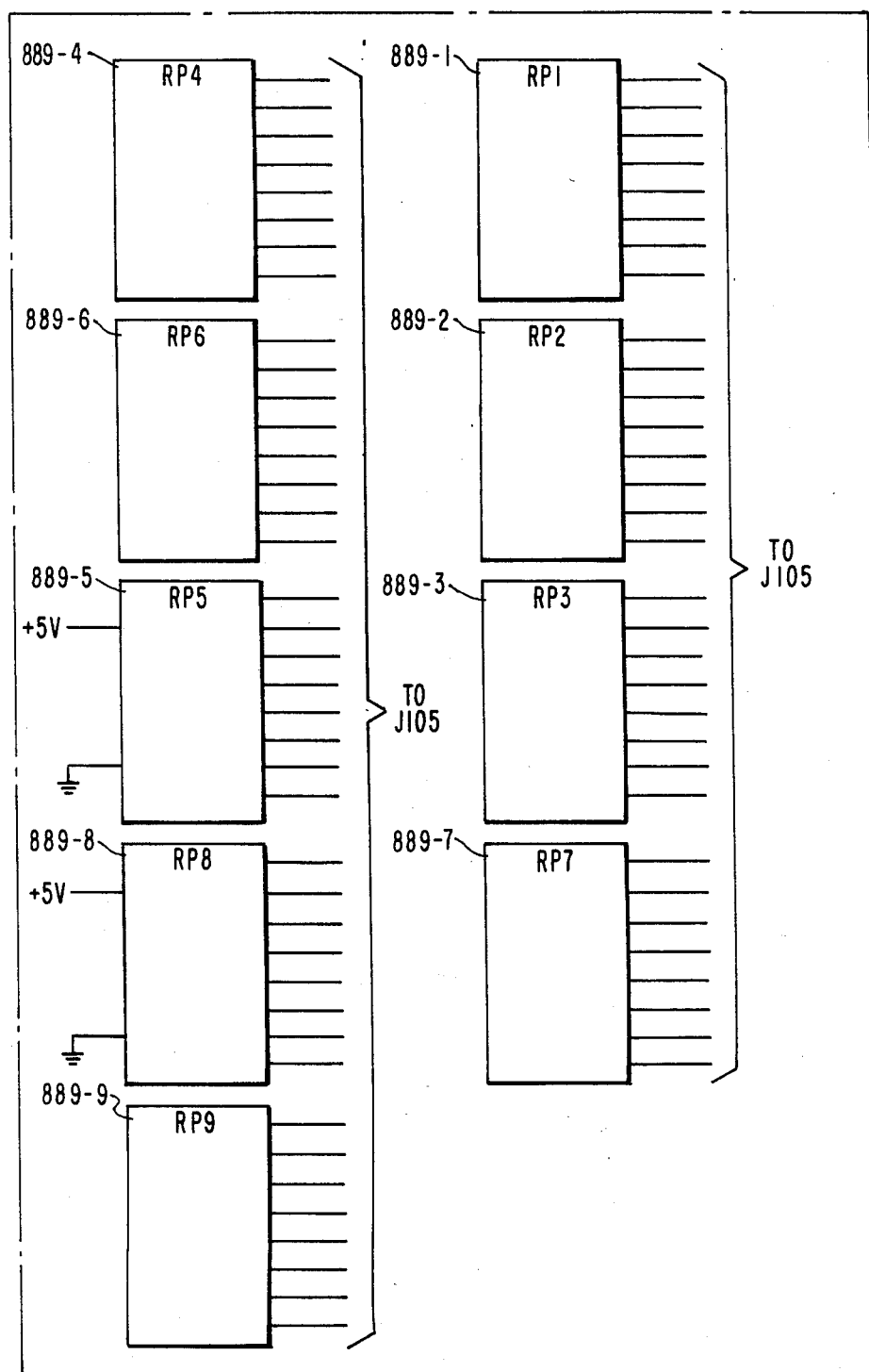
Figure 13C:
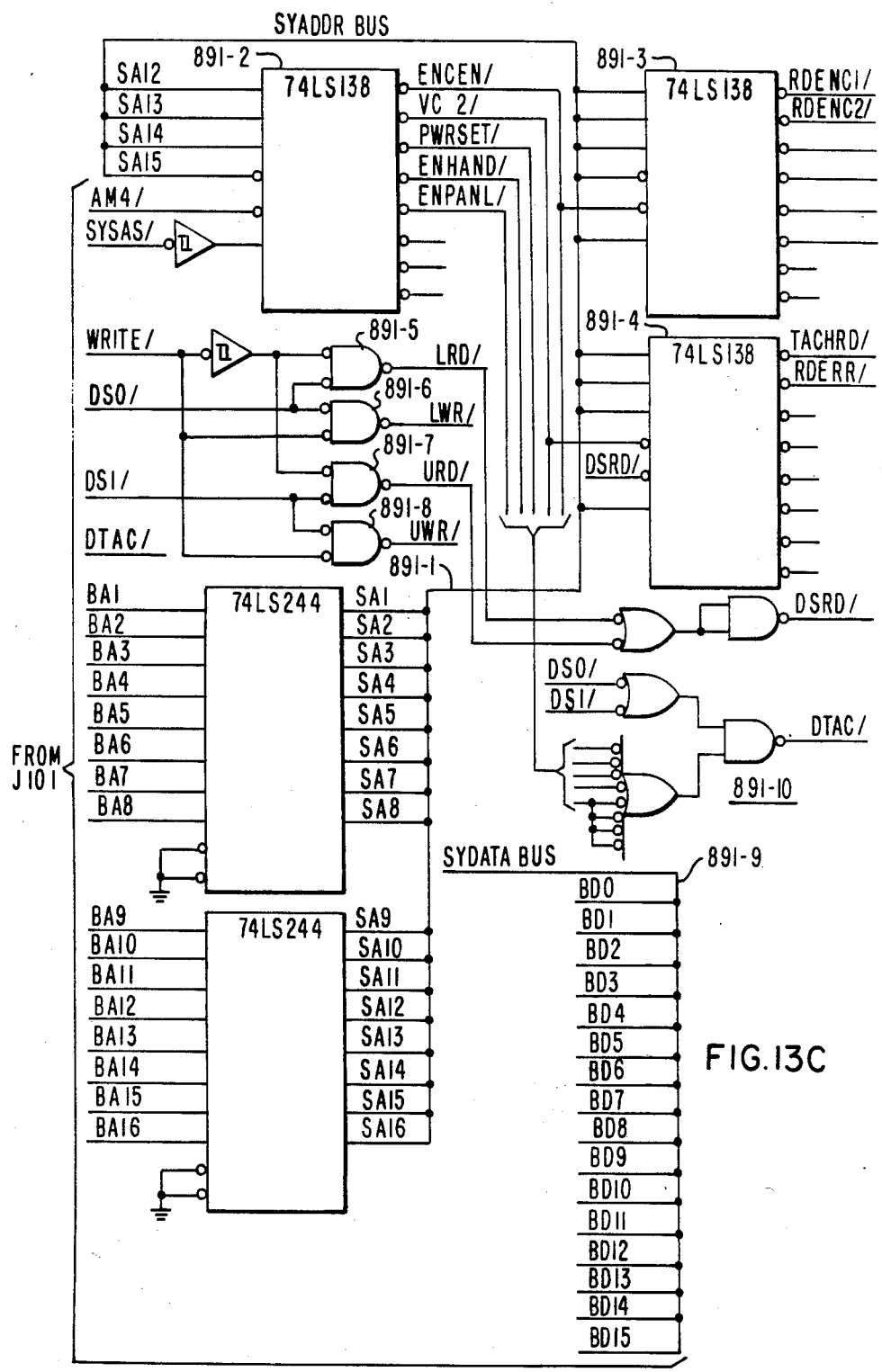
Figures 1, 13D:
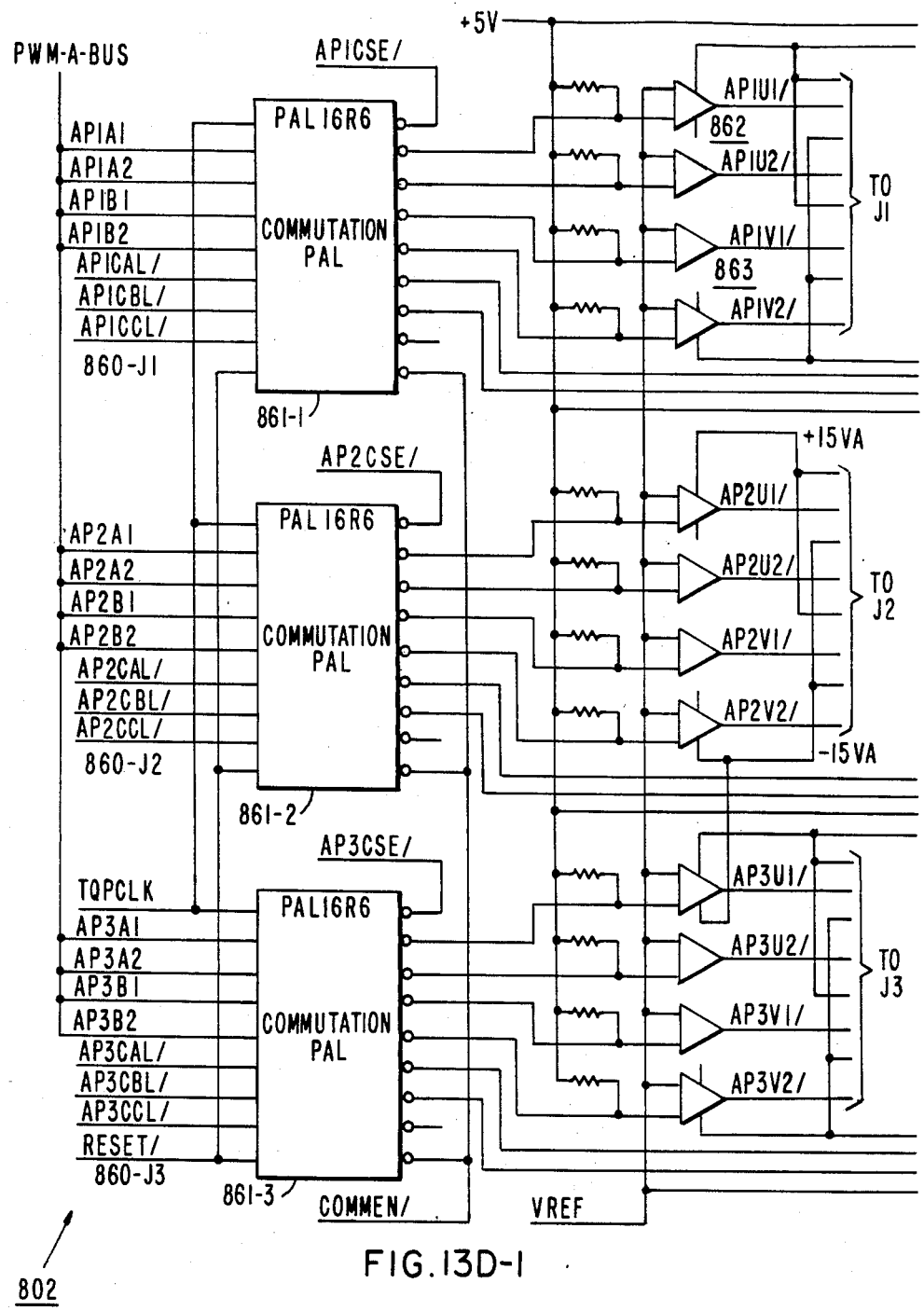
Figures 2, 13D:
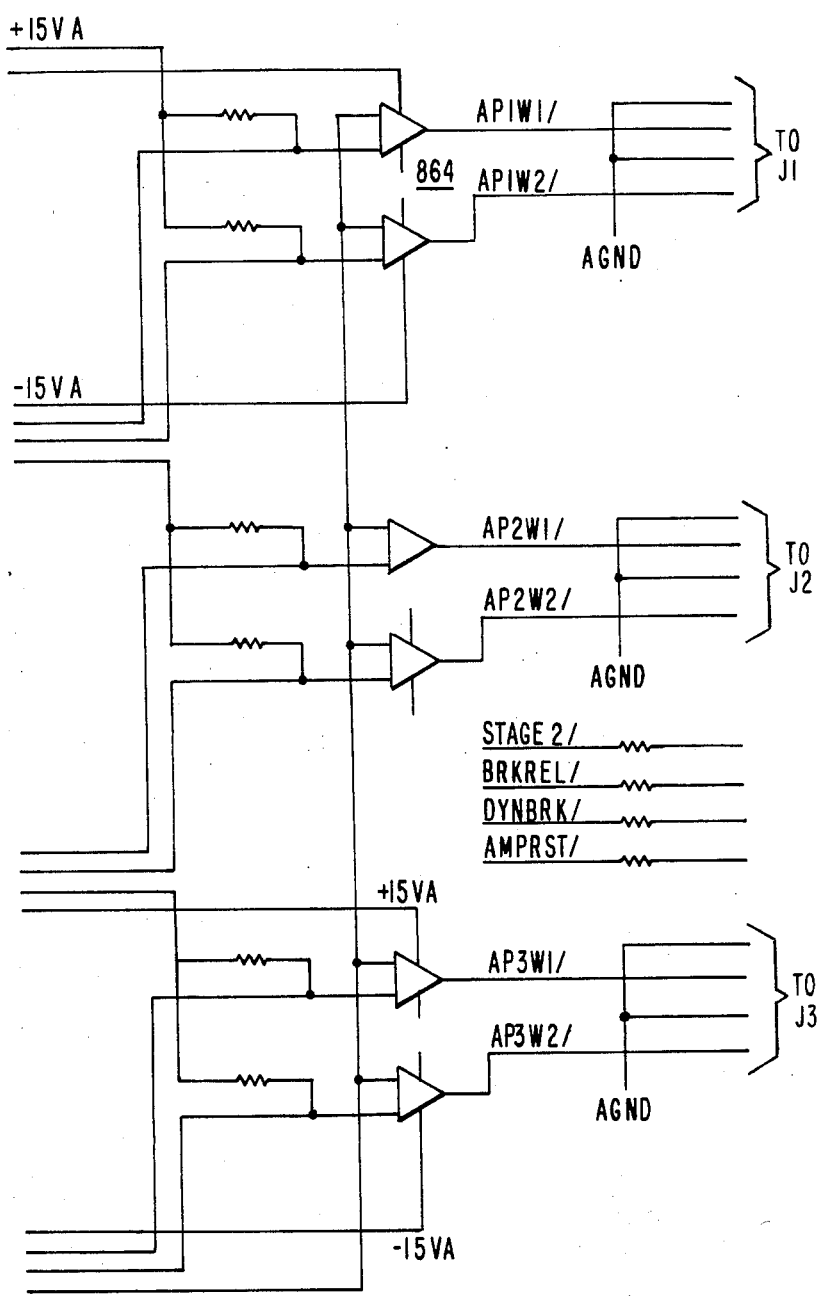
Figures 1, 13E:
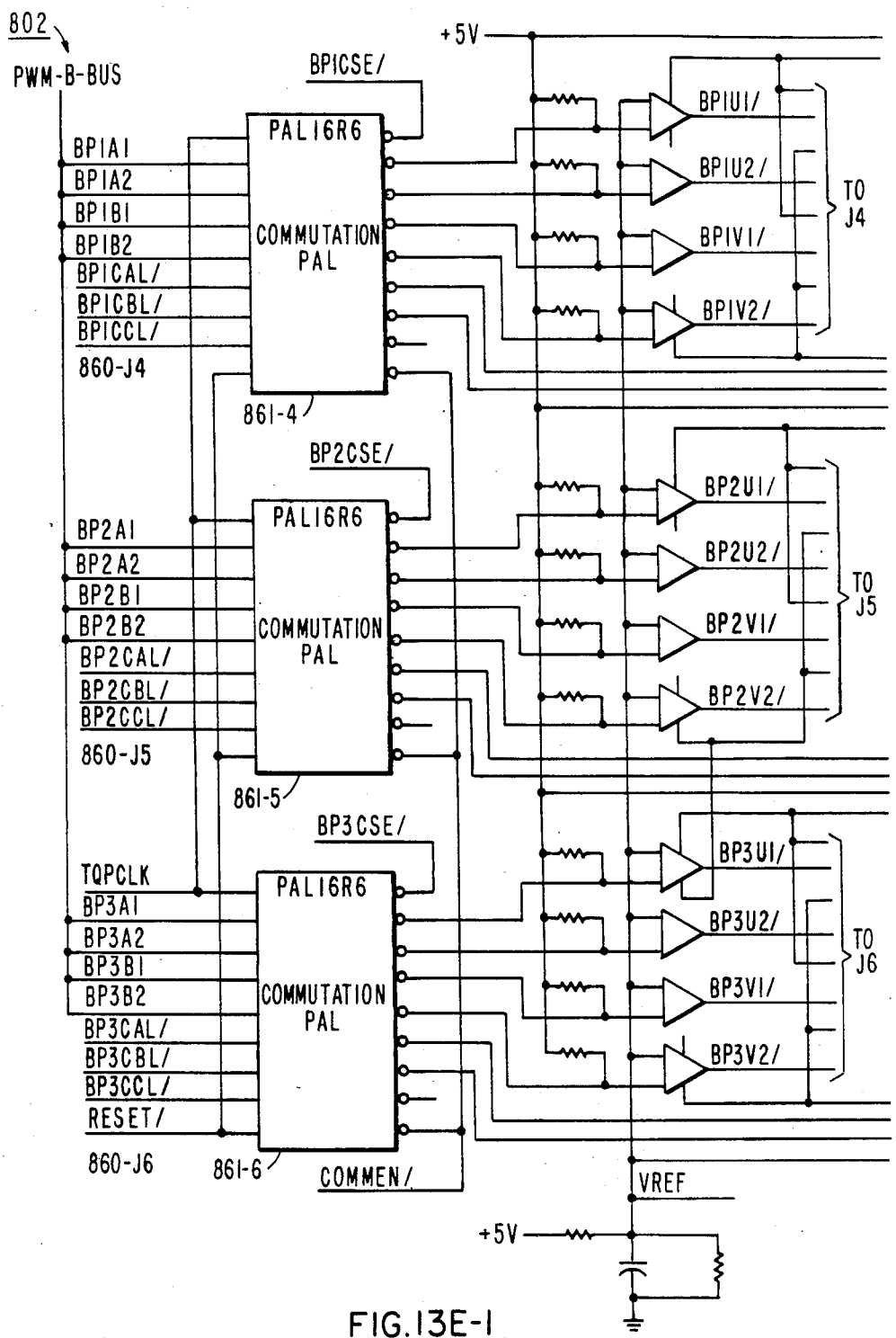
Figures 2, 13E:
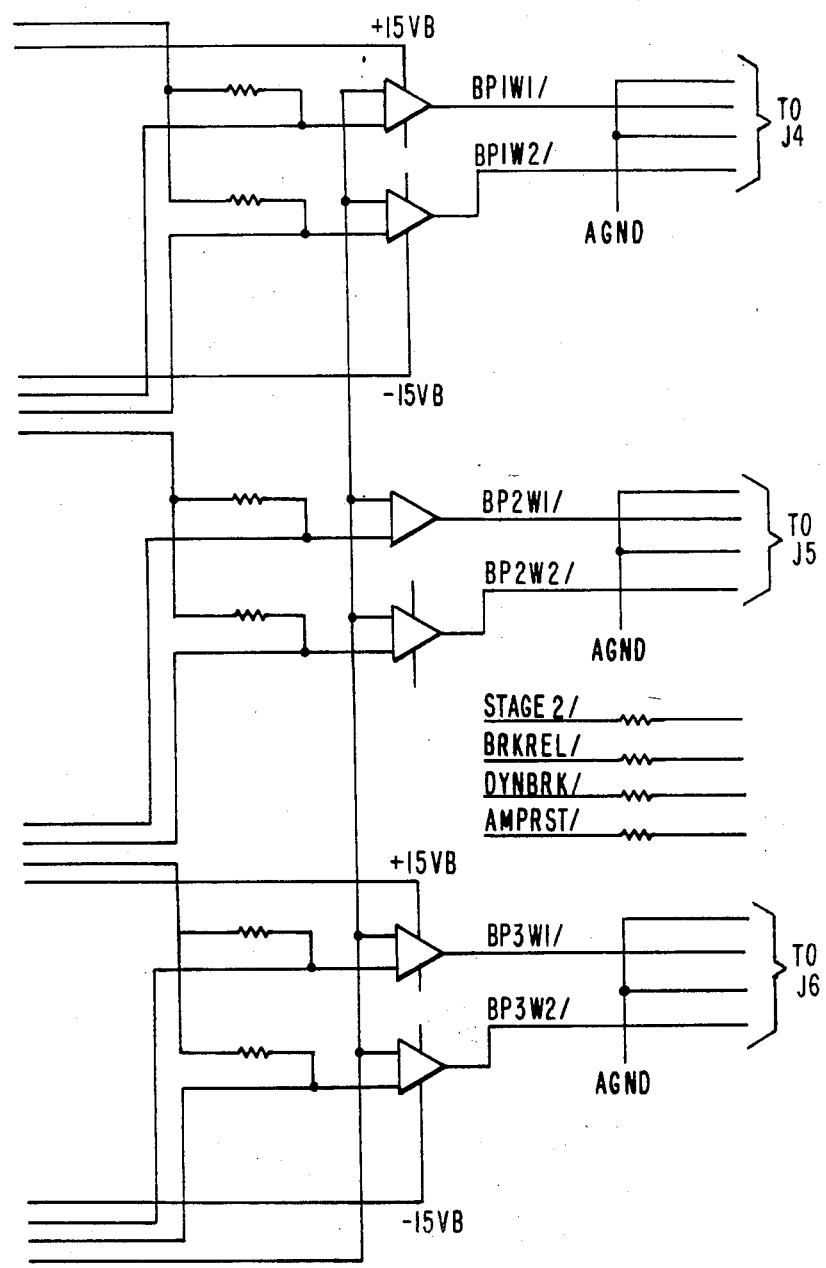
Figures 1, 13F:
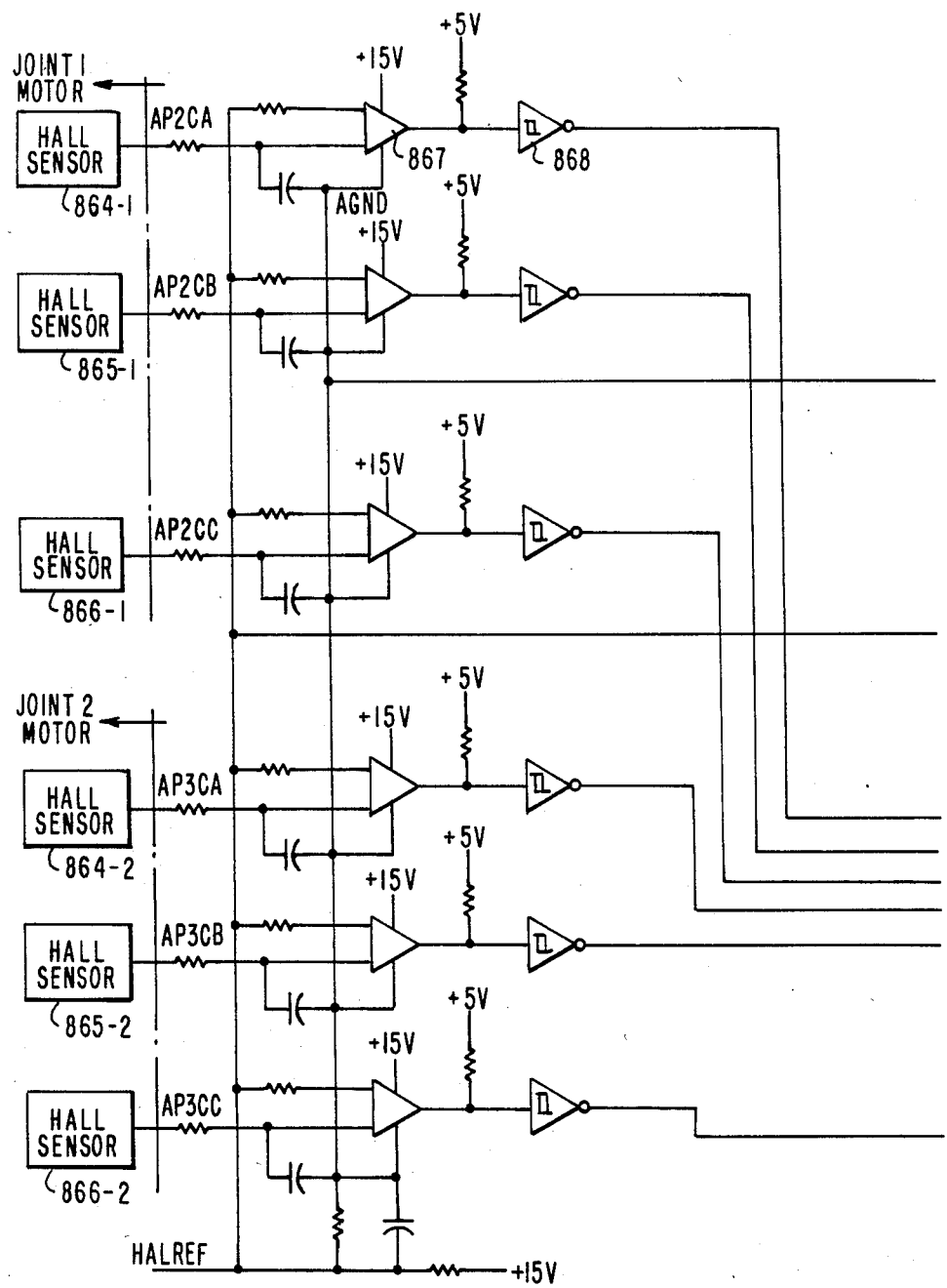
Figures 2, 13F:
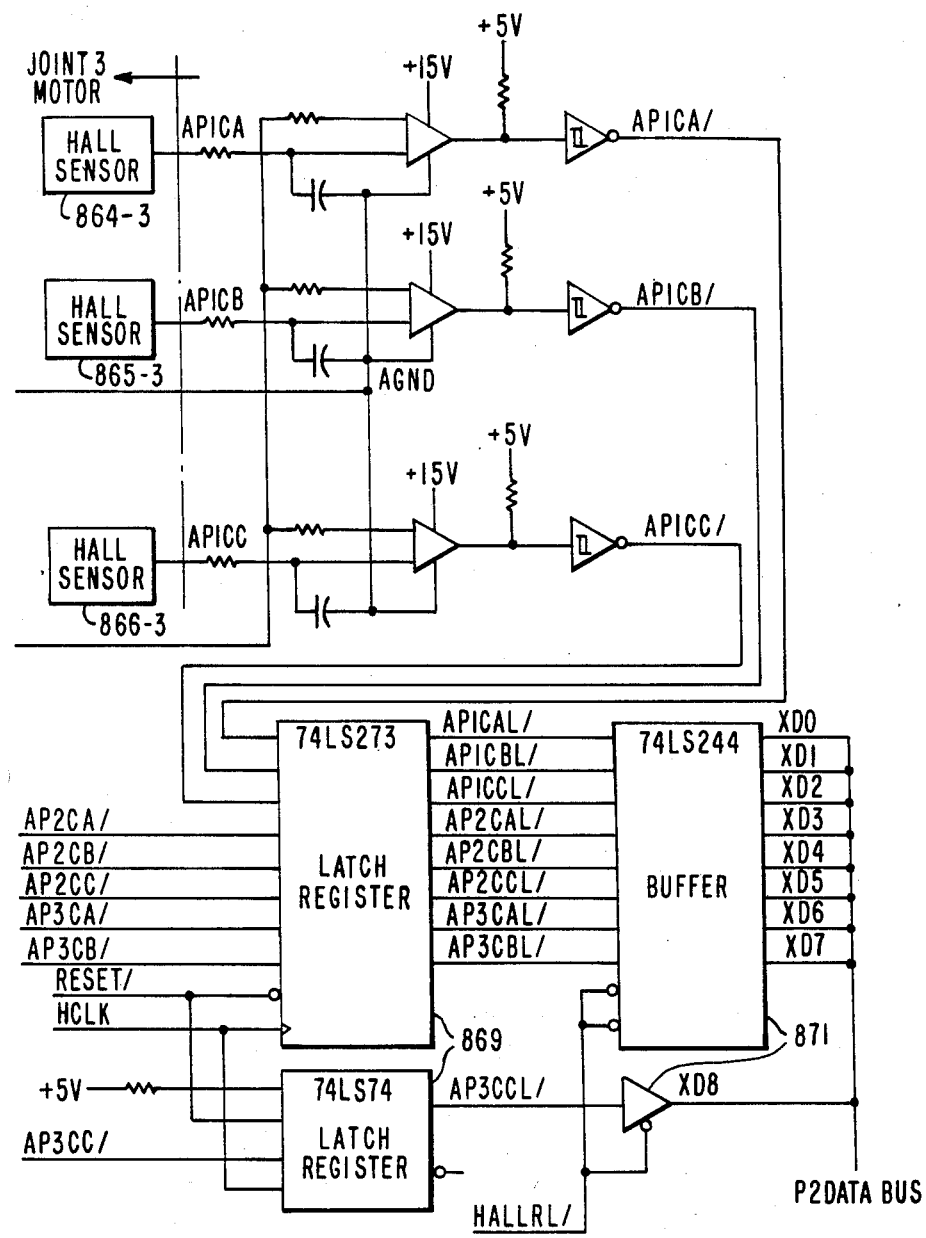
Figures 1, 13G:
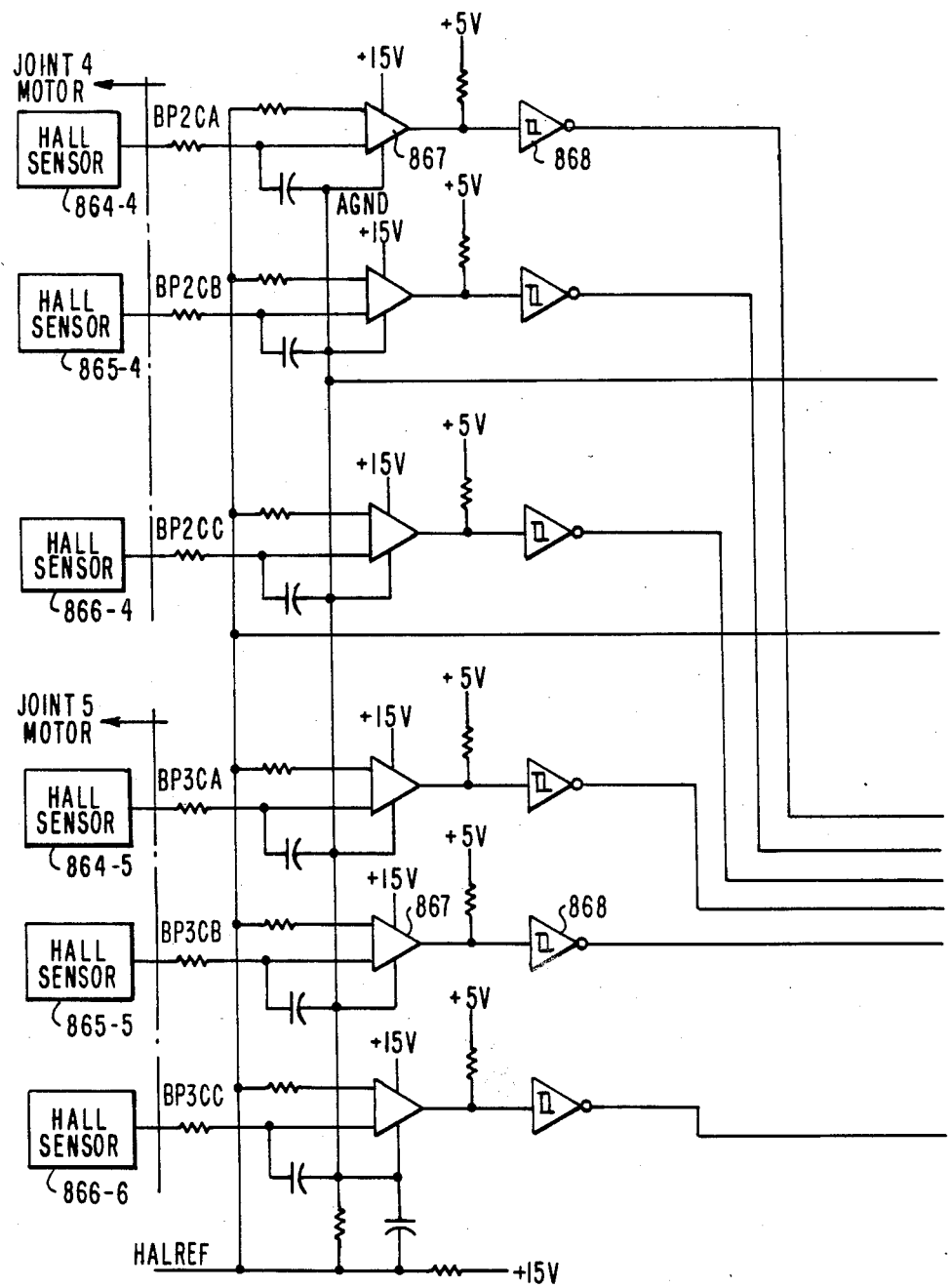
Figures 2, 13G:
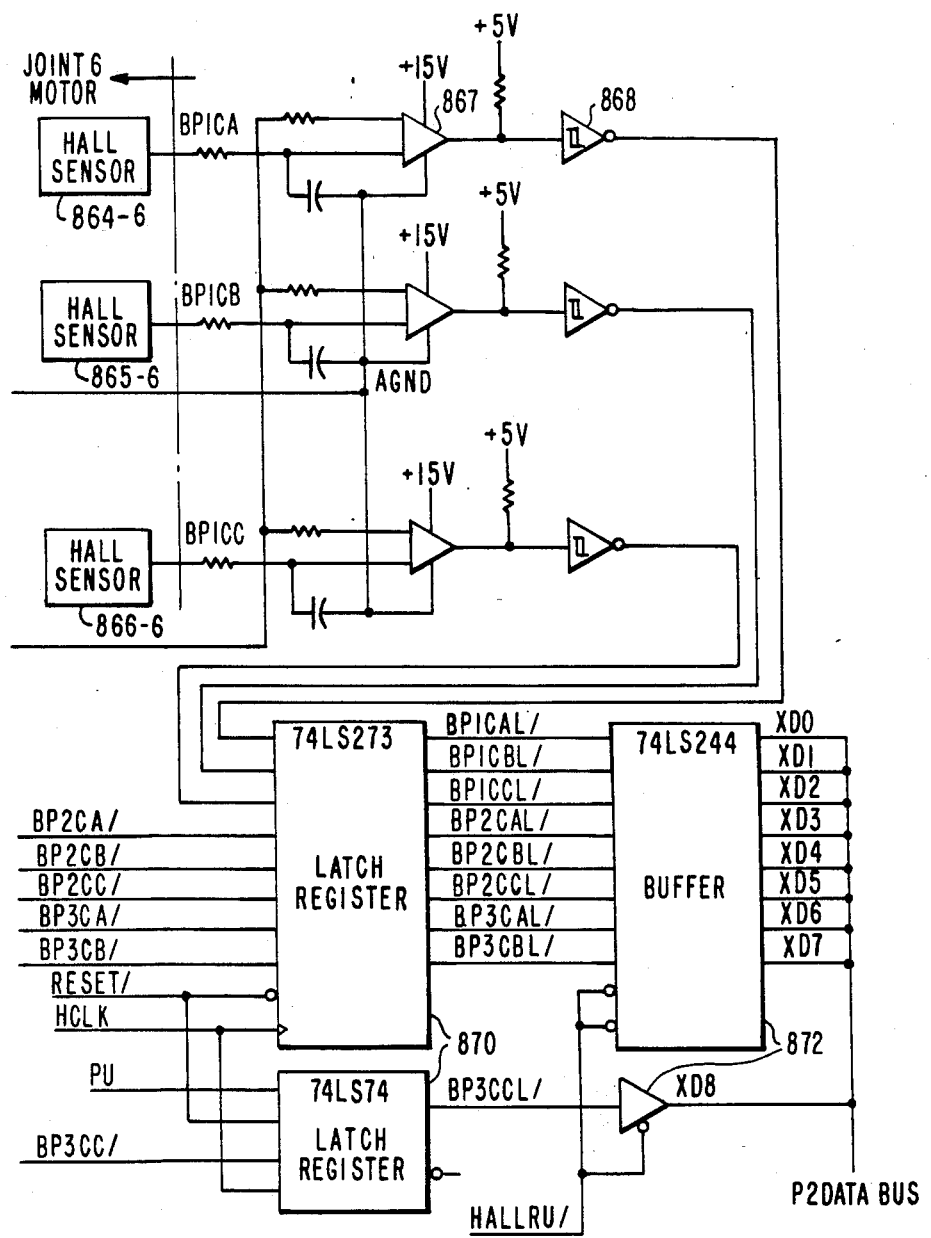
Figures 1, 13H:
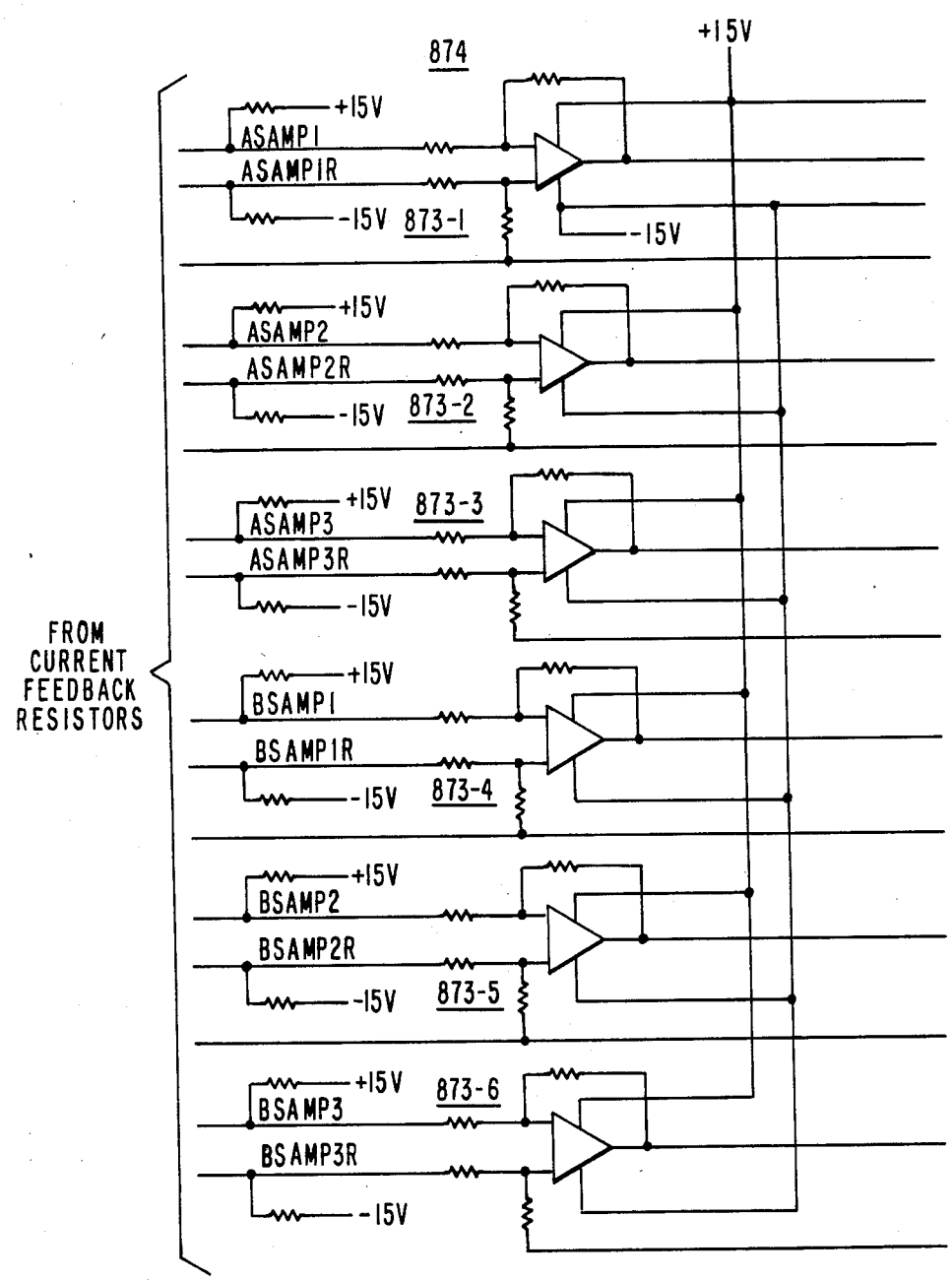
Figures 2, 13H:
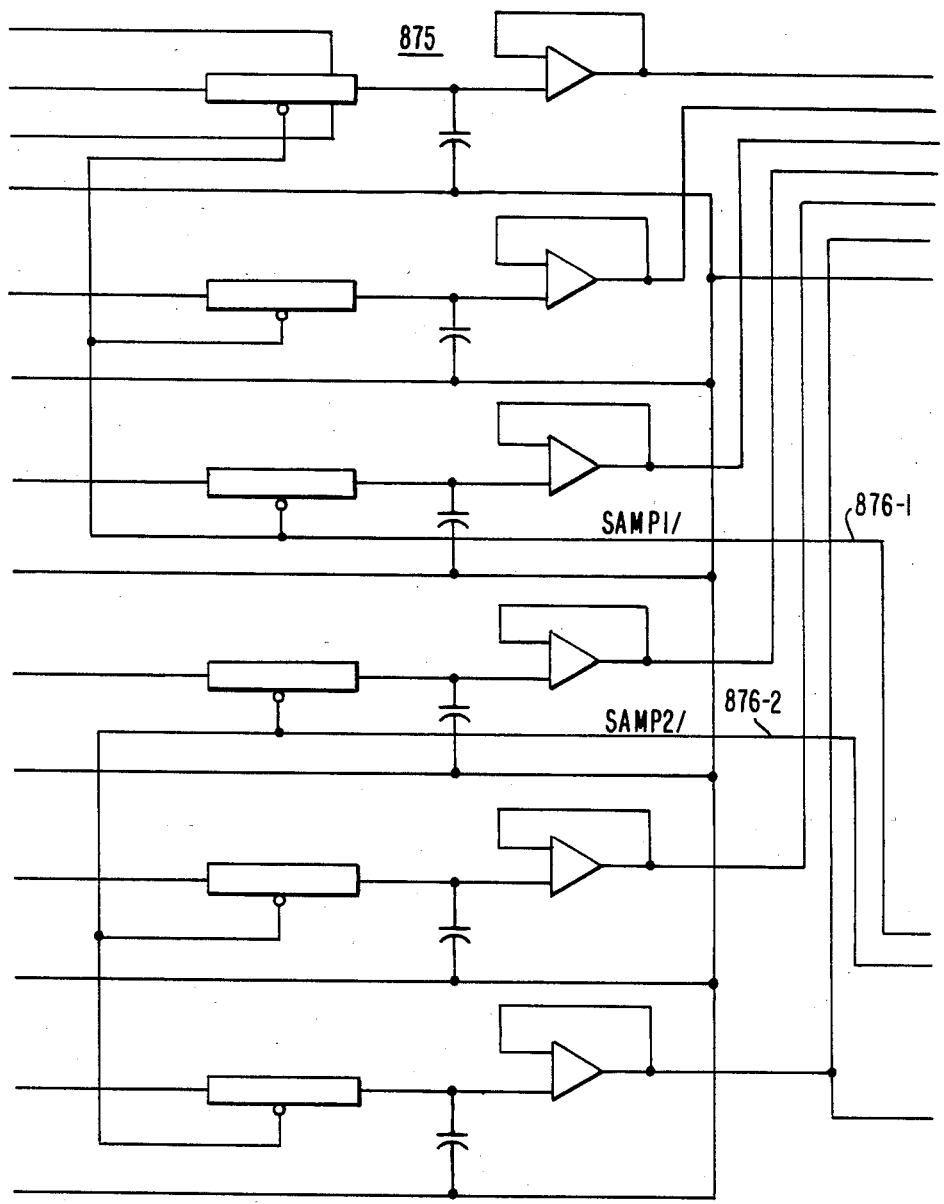
Figures 3, 13H:
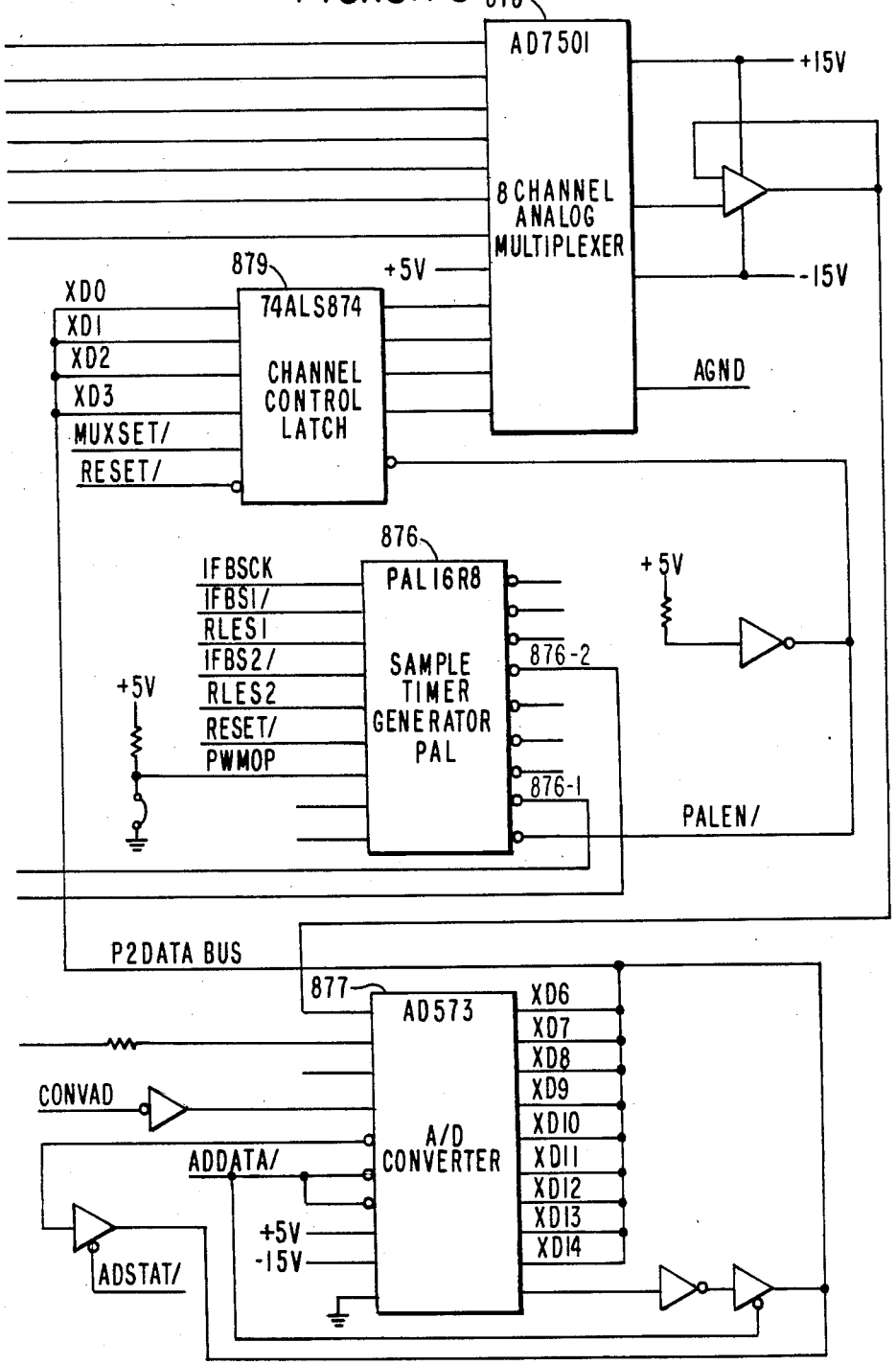
Figures 1, 131:
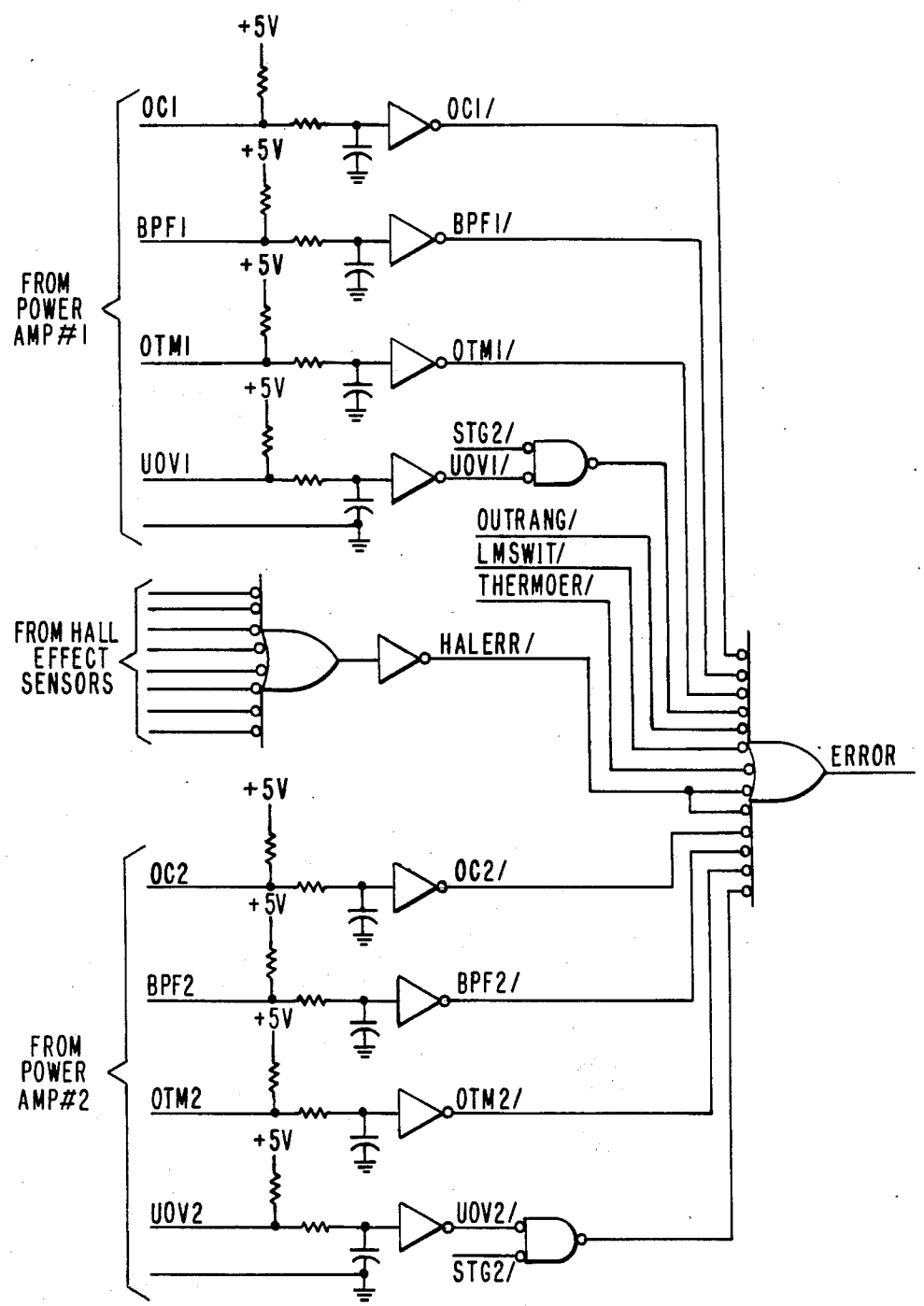
Figures 2, 131:
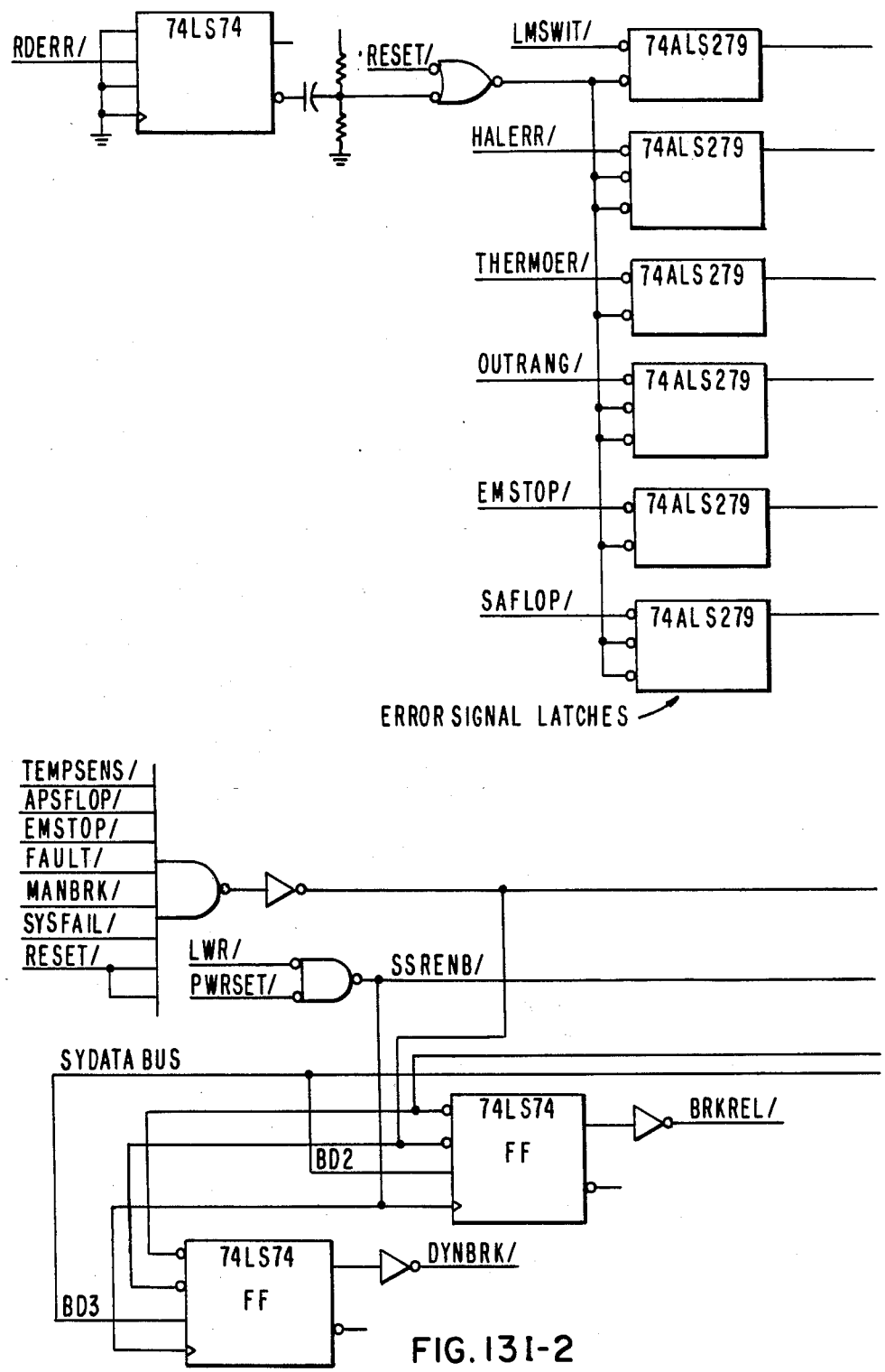
Figures 3, 131:
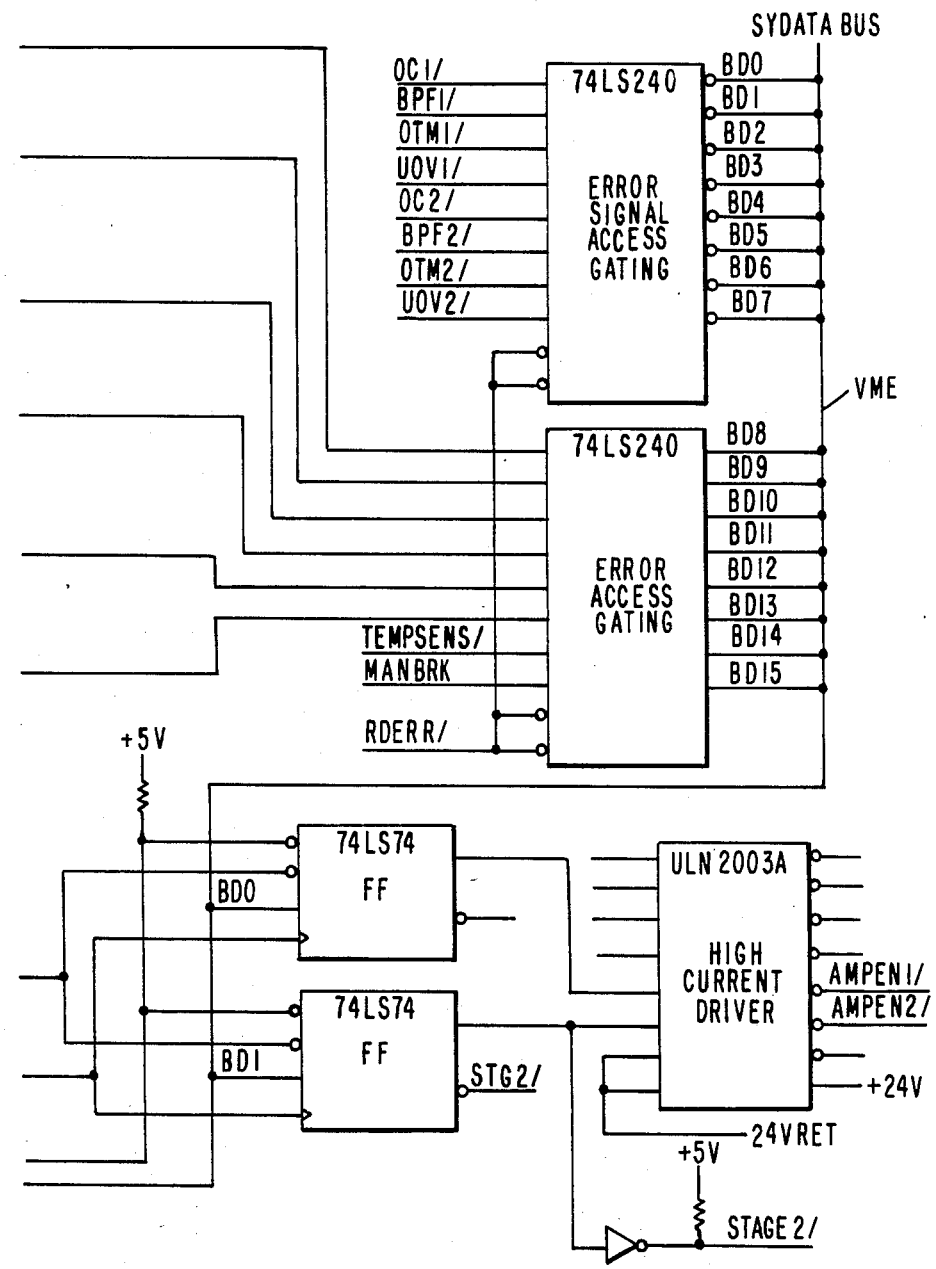
Figures 1, 13J:
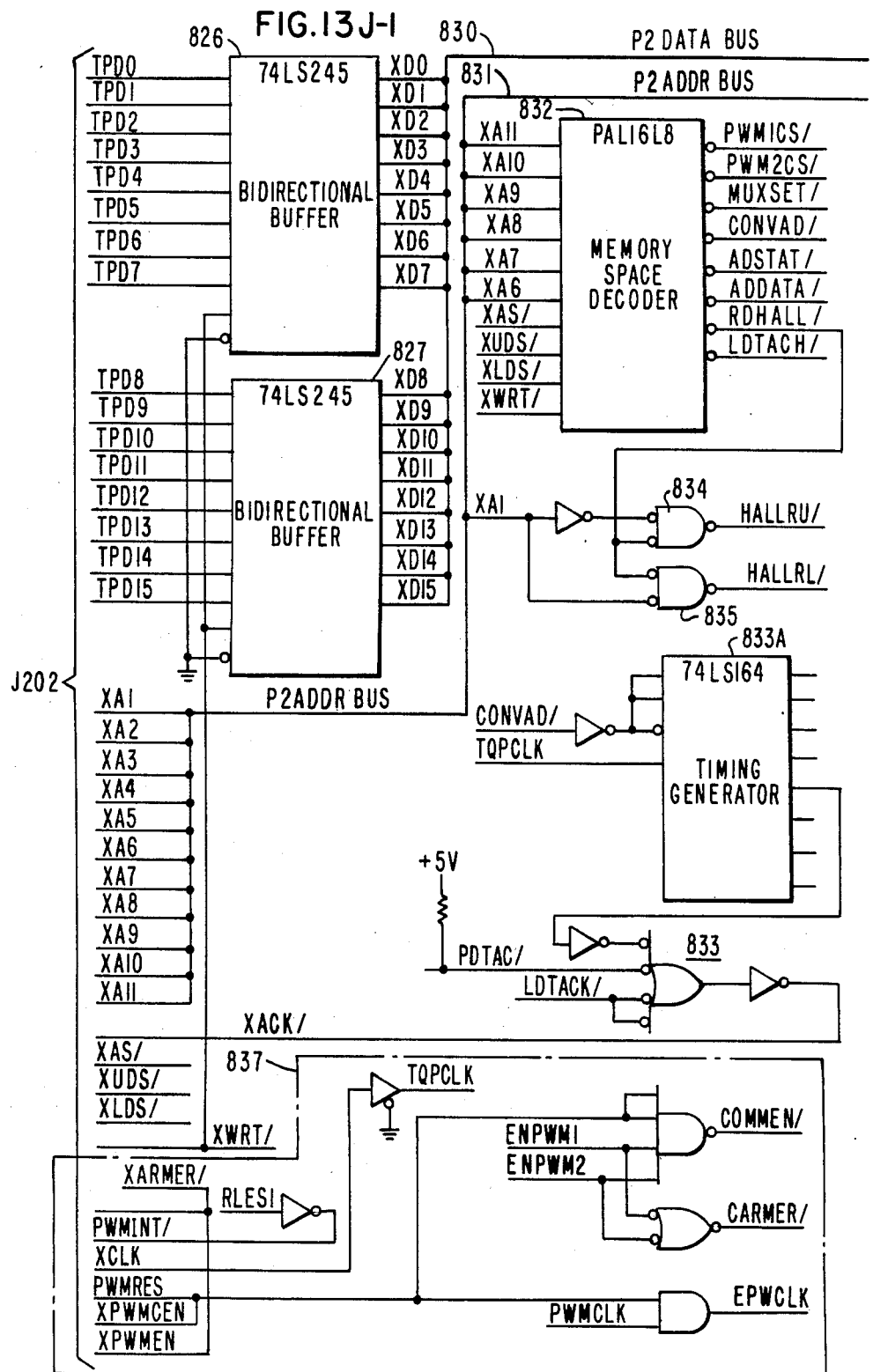
Figures 2, 13J:
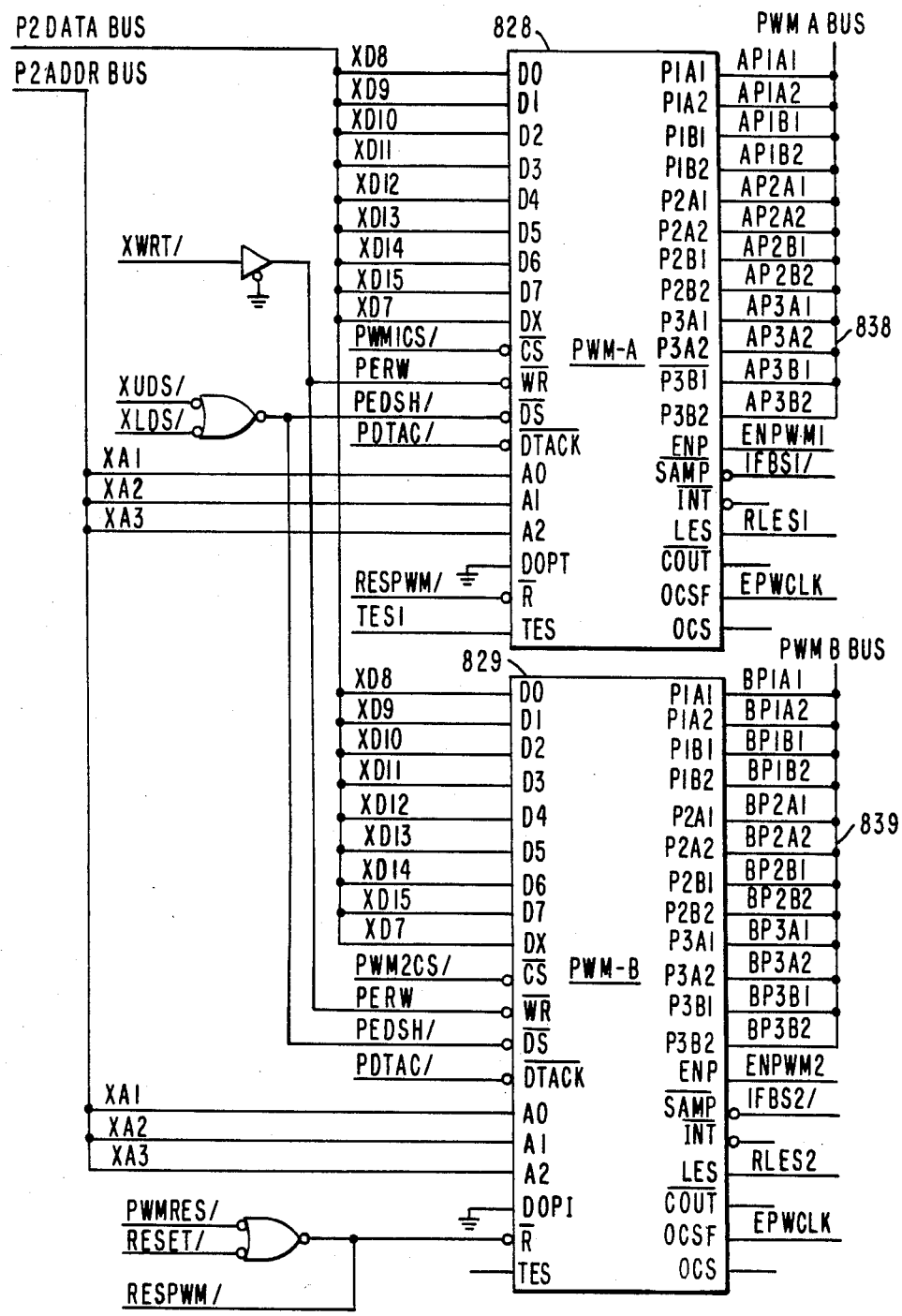

Safety/error control circuitry 837 responds to torque board reset signals PWMRES, as shown in FIG. 13J-1, to provide PWM reset independently of other control reset signals so as to assure that the PWM output is not started until everything else in the system is initialized. In addition, PWM reset allows direct PWM shutdown for drive or other error without requiring that other parts of the control ssytem be shut down. COMMEN is generated to disable motor commutation switching in the event switch logic failure occurs. EPWCLK is applied to the PWM chips 828 and 829 shown in FIG. 13J-2 to generate a modulation signal. XARMER represents an error condition in which the two PWM chips are determined to be out of synchronization.

Three sets of output drive control signals from the PWM chip 828 are applied to a bus 838 called PWM A BUS for the three corresponding monitor axes. Similarly, the output control signals from the PWM chip 829 are applied to a bus 839 called a PWM B BUS for the other three corresponding motor axes.

The output signal TES1 from the PWM chip 838 is a clock signal which is divided as shown in FIG. 13B-4 for later reference, on the AIF board to become the synchronizing signal VTICK for the higher level control loops.

More detail on the PWM circuitry is presented in Ser. No. 932,841.

POWER AMPLIFIER DRIVE CIRCUITRY FOR BRUSHLESS DC MOTORS

Separate drive circuit channels 860J1–860J6 in FIGS. 13D-1, D-2 and 13E-1, E-2 are provided on the AIF board 800 to process and couple the PWM digital outputs to the power amplifiers for the respective brushless DC robot joint motors. Since the drive circuit channels are alike, only one channel 860J1 will be described.

At the input of the drive circuit for this channel four PWM digital drive pulses AP1A1-A2 and AP1B1-A2 are applied to a PAL device 861-1. As previously described, the A and B pulses are time shifted, the A2 and B2 pulses are relatively wide enable pulses and the A1 and B1 pulses have varying time width to function as control pulses (within the B2 and A2 time spans, respectively).

In addition, three similarly prefixed feedback commutation signals AP1(CAL-CBL-CCL) from the joint 1 brushless DC motor are applied to the PAL device 861-1. As shown in FIG. 13F-1, three Hall effect sensors 864-1, 865-1, 866-1 are disposed about the periphery of the joint 1 motor to respond to magnetic flux changes and indicate the position of the rotor and which way the rotor is moving. Like sensors are employed for each joint motor as shown. Each sensor signal is routed to a comparator 867 which operates a gate 868 when the sensor signal reaches a reference level.

The nine gate output signals from the nine comparator circuit channels which process the Hall effect sensor signals from joint motors 1, 2 and 3 are applied to a two component latch register 869 in FIG. 13F-2 which in turn generates commutation signals for the commutation PALS 861-1 861-2, 861-3. A latch register 870 in FIG. 13G-2 similarly generates commutation signals that are applied to the PALS 861-4, 861-5, 861-6 for joint motors 4, 5 and 6. Respective buffers 871 and 872 access the commutation signals to the P2 data bus for the torque processor board 600 thereby providing a basis for modification of PWM output signals as a function of motor rotor position. These signals can also be used as the basis for providing software commutation in an alternative arrangement for control of the three motor windings.

Figure 14A:
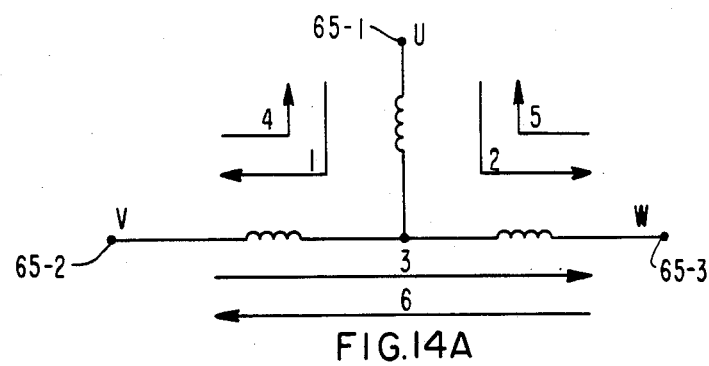
FIGS. 14A-C show respective bridge circuit configurations for brushless and brush type motor circuits.
Figure 14B:
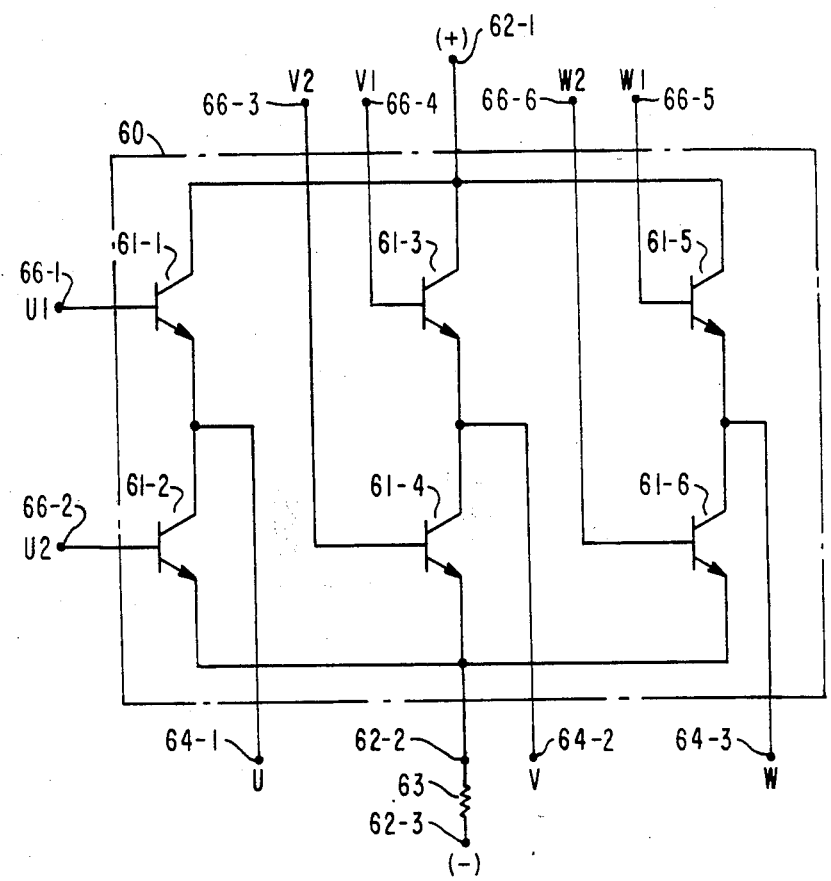

Thus, the PAL device 861-1 logically operates analog driver circuits 862, 863 and 864 in FIGS. 13D-1, 13D-2 to generate commutation timed signal sets AP 1U1-U2, AP1V1-V2 and AP1W1-W2 for application to the power amplifier switches shown conceptually in FIG. 14B which in turn direct motor drive current pulses through the joint 1 motor windings in accordance with the commutation control and in accordance with the pulse width modulation control. The currents through the windings of the other joint motors are similarly controlled by the other PAL devices 861-2 through 6.

The motor winding and power switch circuitry for each joint motor is shown in FIG. 14B. The switches are operated in bi-directional pairs in order to direct current through two of the three windings at any one point in time, and the winding connection switching is rotated about the windings under PAL device control. The effective magnitude of the motor current depends on the switch ON time which in turn is controlled by the PWM output.

FEEDBACK CIRCUITRY

Position Feedback

A position encoder (not specifically shown) is provided for each axis. In this case, the encoders are absolute position devices intended for use with Kawasaki 860 robot arms which are relatively large, high powered machines. An encoder position count is generated for each unit of movement, and the output from each encoder is applied as a serial data signal to the arm interface board 800 for routing over an encoder data bus 802 in FIG. 13A-1 and FIG. 13B-1 as feedback for the control looping on the servo control board 400.

In FIGS. 13A-1, A-2, A-3, there are shown six input circuits 803A–F for receiving the respective serial encoder data signals ENC1 to ENC6 for the respective arm axes. In this instance, the serial encoder signals are structured in the gray code with sixteen bits.

Each serial encoder signal is coupled through a respective channel gate circuit 804 to a 16-bit shift register 805 which converts the serial signal to a parallel data signal and applies it to the encoder data bus 802. All parallel encoder position signals are applied from the encoder bus 802 to gating circuitry 806 in FIG. 13B-1 which operates to convert the position feedback signals from gray code to binary code.

The parallel binary coded position feedback signals are then applied to encoder gating chips 807 and 808 in FIG. 13B-1 which access the position feedback signals to the VME data bus 155 for delivery to the servo calculator on the higher level SCM board 400. An encoder enable signal ENCEN from the SCM servo manager 402 in FIG. 8A-1 operates the encoder chips 807 and 808 to gate the position feedback signals to the VME bus 155.

Synchronization of the position feedback data flow is provided by circuitry 809 shown in FIG. 13B-2 Thus, chip 810 is cycled by the VTICK related signal ITICK signal to operate drive transistor 811 and produce the signal PWE/RST every millisecond to direct the encoders to transmit current position data in to a serial output to the arm interface encoder circuitry. Chips 812, 813 and 814 operate with associated circuitry to generate a signal SHCLK which synchronizes the serial-to-parallel conversion by the shift registers typified by 805 in FIG. 13A-1 with the transmit operation of the encoders. With the generation of updated position feedback data on the VME bus every millisecond, under VTICK control, such data is synchronously available for control command calculations every millisecond in the position, velocity and acceleration control on the SCM board 400.

VELOCITY FEEDBACK

Figures 1, 13K:
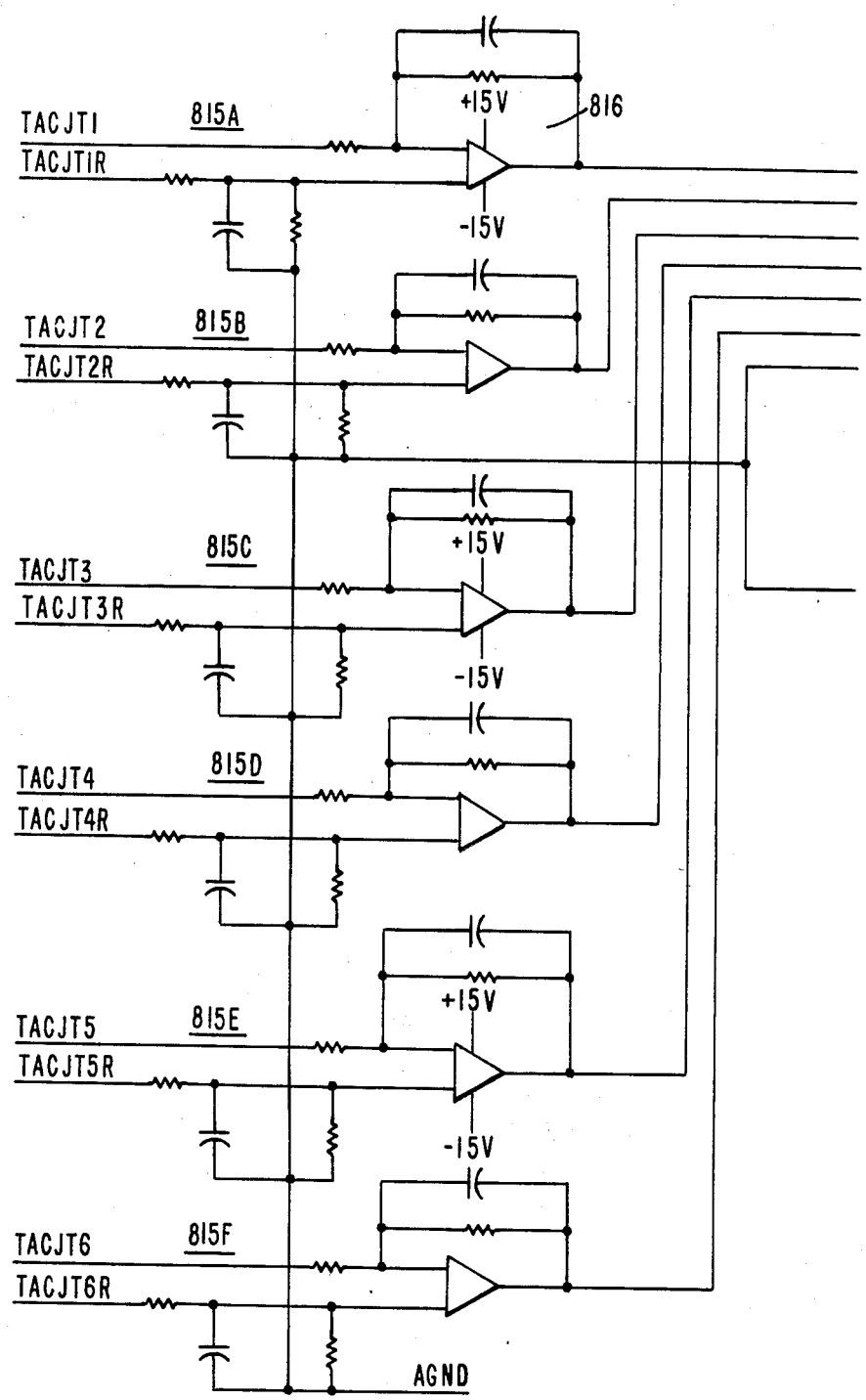
Figures 2, 13K:
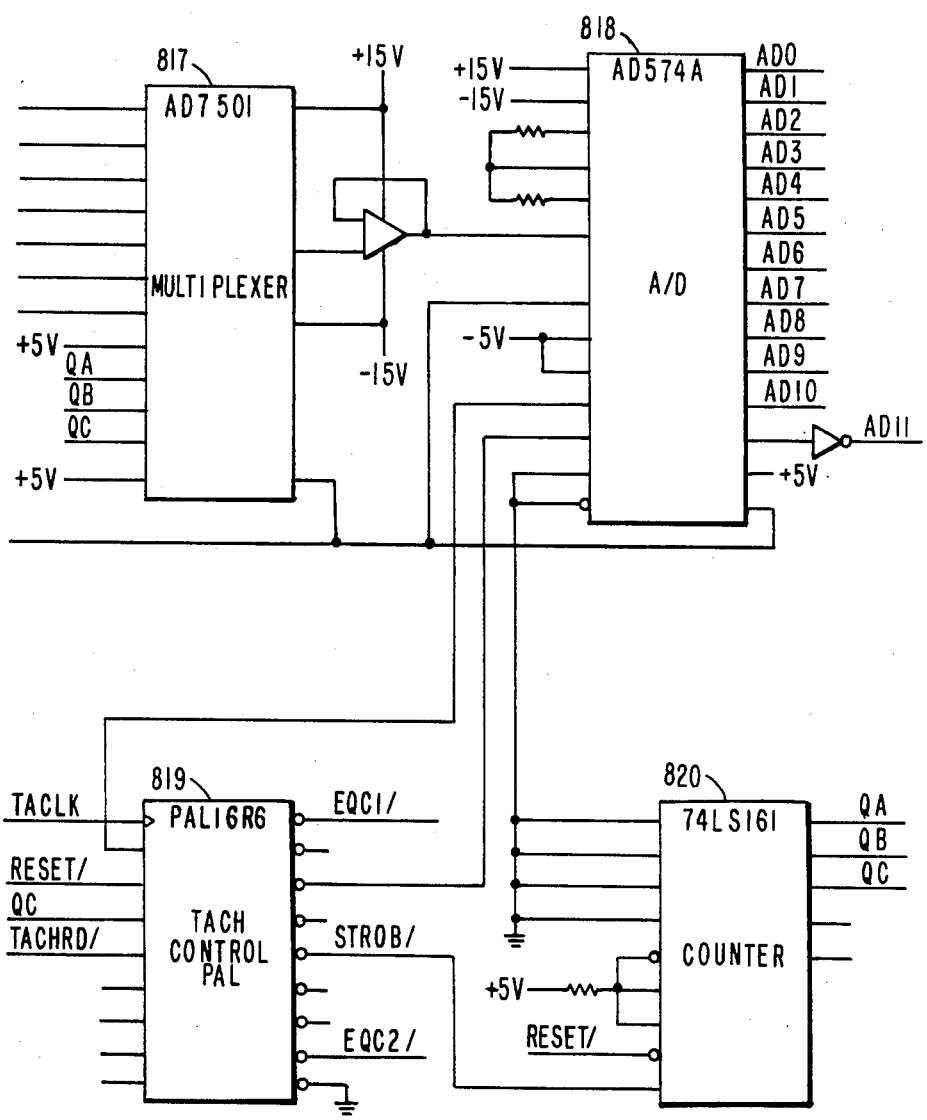

Analog velocity feedback signals typical for joint 1 are TACJT1, TACJT1R, and these are generated by tachometers (not shown) in FIG. 13K-1 over six analog channels 814A–F, one for each joint or arm axis. In each channel, the tachometer signal T1 and a reference tachometer signal T1R are applied to a difference amplifier 816 which generates an output signal representative of the joint velocity. The velocity output signals are all applied to the input of a multiplexer 817 in FIG. 13K-2 which in turn is coupled to an analog/digital converter 818.

A tachometer control PAL device 819 operates with counter 820 to control the multiplexer 817 and apply in sequence the multiplexer channels to the analog/digital converter 818. Further, the tachometer control PAL 819 controls the timing of the analog-to-digital conversion of successive velocity feedback signals from the six multiplexer channels. After each conversion, the resultant digital velocity feedback signal is stored in register circuitry 821 shown in FIG. 13L.

Figure 13L:
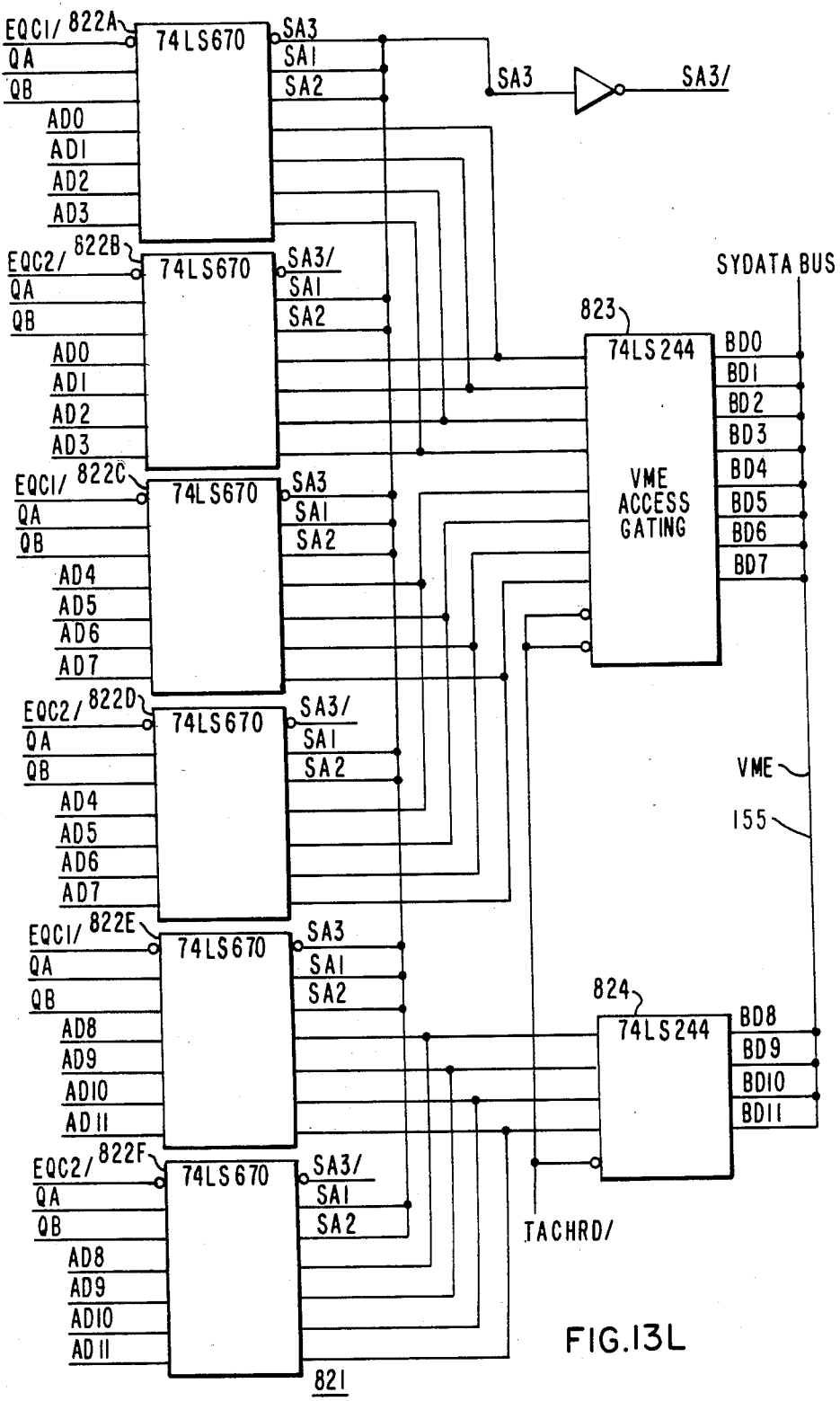

Six register chips 822A–F in FIG. 13L are included in the register circuitry 821. Each register chip is 4 bits wide by 4 bits deep. Since six joints require six-bit words for signal storage, register pairs are employed to provide the required storage depth. Three separate register pairs shown in FIG. 13L are employed to provide a 12-bit word width needed for the output signals from the analog/digital converter 818.

Velocity feedback signals are applied to the VME bus 155 through VME access gating chips 823 and 824 by a read request signal TACHRD under control of the servo control manager 402.

MOTOR DRIVE CURRENT FEEDBACK-TORQUE CONTROL

Feedback circuitry used to process the motor drive current feedback signals from the respective power amplifier feedback resistors (such as the one 63 shown in FIG. 14B) for the six joints is shown in FIG. 13H-1. The current feedback circuitry includes six respective feedback channels 873-1 through 873-6. Each feedback channel includes a differential operational amplifier 874 having its output coupled to a sample and hold circuit 875. A PAL device 876 in FIG. 13H-3 generates sample time signals 876-1 and 876-2 under PWM synchronizing control IFBSCK. The sample/hold feedback signals from all of the joints are coupled to an analog-to-digital converter 877 through a multiplexer 878 under the control of a channel control latch 879. A digital representation of motor current feedback is coupled to the P2 data bus for use by the digital torque loop control of the processor board 600.

GENERIC VME BUS CONTROL CIRCUITRY

Various generic control functions are provided for the VME bus by circuitry located on the AIF board 800. As shown in FIG. 13B-3, a PAL device 880 is programmed to operate as a bus arbiter, i.e., to arbitrate various requests for VME bus master operation.

A 4 KHz signal TES1 from the PWM chip 828 in FIG. 13J-2 is applied to a pair of flip-flops 881-1 and 881-2 in FIG. 13B-4 for division down to a 1 KHz signal, i.e., the system synchronizing signal VTICK.

A system MHz oscillator 882 generates the system 16 clock signal SYSCLK. It also has an output applied to a pair of flip flops 883-1 and 883-2 in FIG. 13B-3 for division down to a 4 MHz signal PWMCLK which is applied to the PWM chips. A counter 884 processes PWMCLK to generate still lower frequency output signals 1FBSCK, TACLK and HCLK.

Reset circuity 885 is provided on the AIF board 800 for the whole system. Thus, a reset button switch 885-1 on the control panel (not specifically shown) is coupled through RC circuitry to a timer 885-2 which filters reset switch operation. Gate devices 885-3, 885-4 and 885-5 respectively generate signals SYSRESET, RESET and AMPRST for resetting various system and AIF functions.

Monitoring circuity in FIG. 13B-4 includes an AC/DC converter 886 which operates a NOT gate 887 to generate a signal ACFAIL when there is a failure of the system 115 VAC applied to the input of the converter 886.

An error condition driver 888 generates a system signal SYSFAIL upon detection of the error signal FAULT. A plurality of resistors 889-1 through 889-9 operate as transmission line terminators shown in FIG. 13B-5 for the various bus conductor line circuits.

VME DECODING CIRCUITRY

Decoding circuitry is provided on the AIF board 800 to provide access from the VME bus to various AIF circuits in accordance with address signals on the VME bus. Thus, address signals are applied from the VME bus to a system address bus decoder 891-1 in FIG. 13C for function decoding by devices 891-2, 891-3 and 891-4.

Read/write control is provided by devices 891-5 through 891-8. Data is sent over a bus 891-9 called SYDATA-BUS which is also the VME data bus. Once data is transferred, it is acknowledged by a logic signal DTAC from logic circuit 891-10.

OTHER AIF CIRCUITRY

Additional circuitry on the AIF board 800 includes:

Control panel interface (not shown) detects panel switch operations and operates indicator lights on the panel.

Voltage monitor circuits (not shown) provide the various circuit supply voltages and are monitored by comparison to reference voltages; signals are generated to indicate out-of-range values.

Figure 13M:
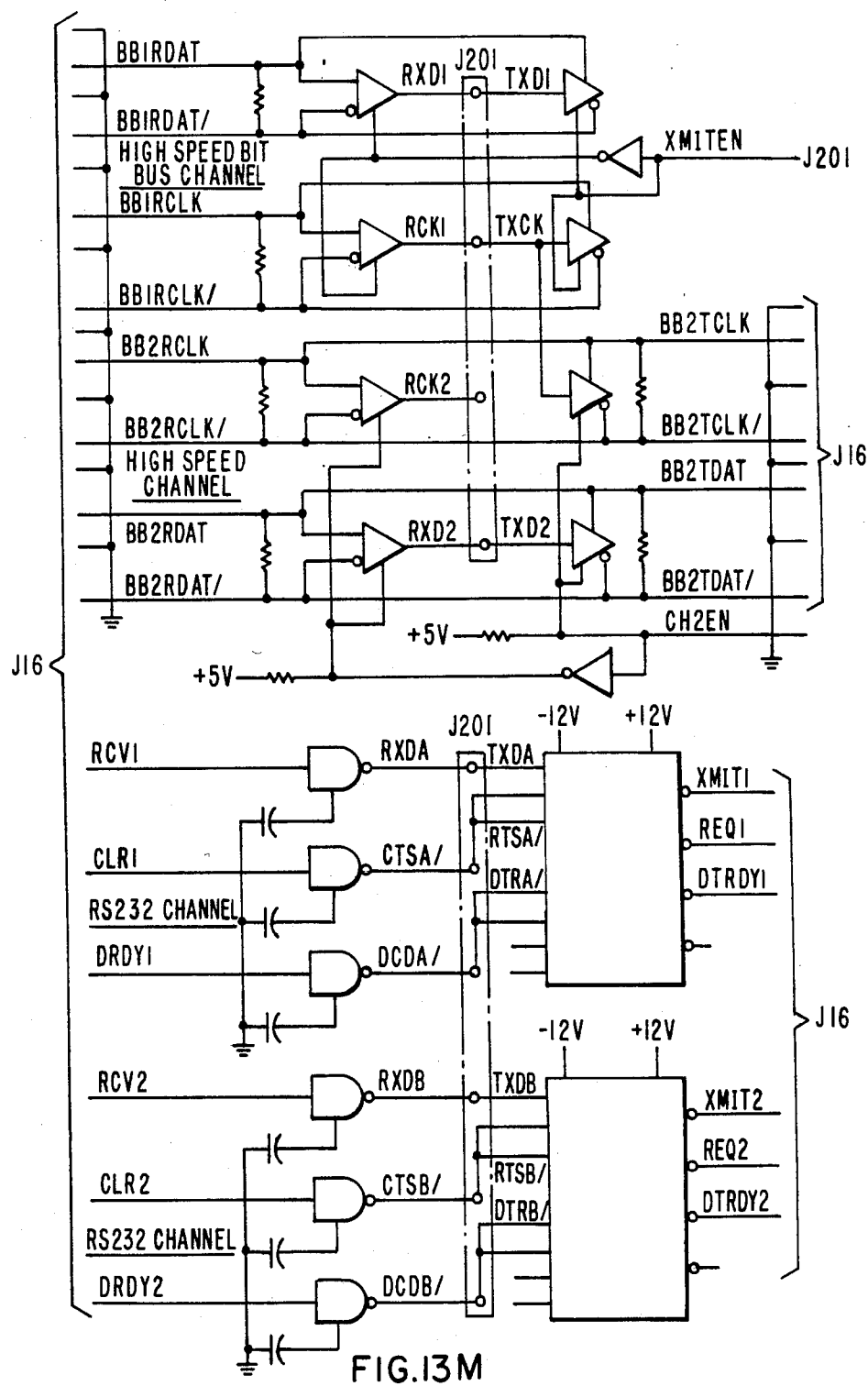
Figures 1, 13N:
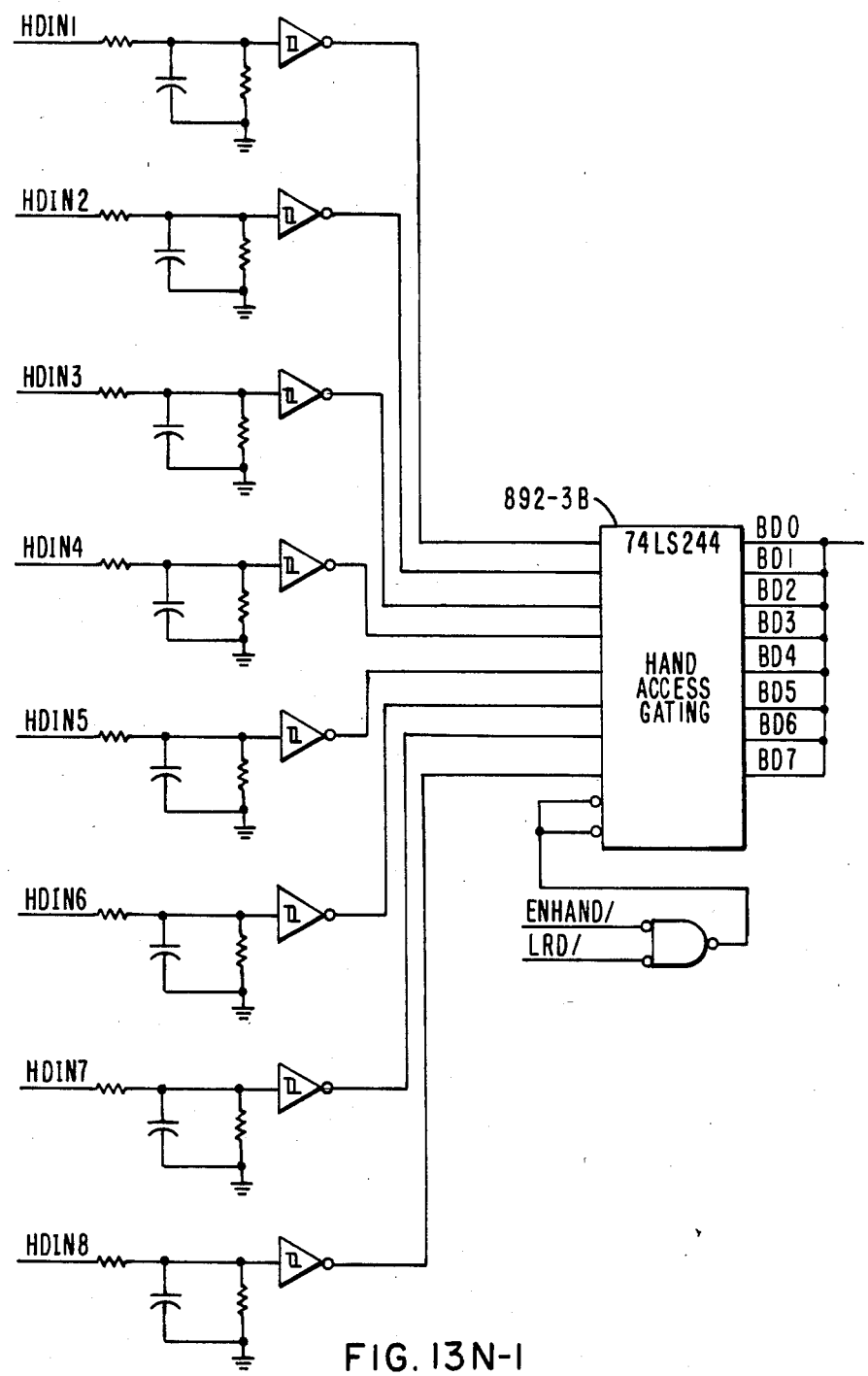
Figures 2, 13N:
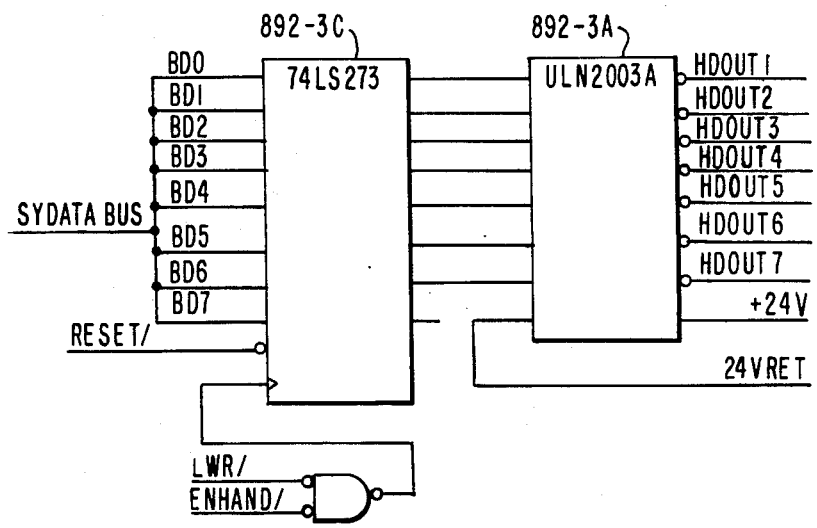

Hand interface 892-3 in FIG. 13N-1 provide seven user defined on/off output signals BD0 to BD7 are generated by block 892-3A to control the end effector; eight user defined arm tip inputs HDIN1 to HDIN8 are processed through access gate 892-3B.

Communications interface in FIG. 13M connects to the SCM board over communications connectors J16 and J201 and provides driver, receiver, and level converter circuitry for the two high speed (1 megaband) synchronous channels and the two slower standard RS232 synchronous communication channels (about 9600 band) as indicated.

Error and safety control (not shown) provides error signal processing circuitry to turn off the power amplifiers and stop the arm directly (i.e., as opposed to via microprocessors) under predetermined conditions; circuitry is also provided to operate LED states indicators (not shown) on the AIF board 800 for the following error conditions in FIGS. 13I-1 and 13I-2:

SYSFAIL—system failure
LMSWIT—robot envelope exceeded
SAFLOP—safety loop broken
TEMPSENS—temperature overheat
THERMOER—motor temperature overheat
OUTRANG—voltage out of range
FAULT—hardware failure
EMSTOP—emergency stop activated
MANBRK—manual brake released

BRUSHLESS DC MOTORS

In FIG. 14A, there is shown the stator winding circuitry for DC brushless motors employed as axis drives in various robots including the Unimation 860 robot which is more powerful than the Unimation 700 Series robot shown in FIG. 1.

Power switch circuitry for the windings is shown in FIG. 14B. The switches are operated to direct current through two of the three windings at any one point in time, and the winding connection switching is rotated about the windings under PAL device 861 control of FIG. 13B. The effective magnitude of the motor current depends on the switch ON time which in turn is controlled by the PWM output AP1A1, A2 generated by device 828 shown in FIGS. 13J-2 and 13D-1.

POWER AMPLIFIER FOR BRUSHLESS DC MOTORS

A commercially available, low cost hybrid power amplifier block 60 in FIG. 14B is provided for energizing the DC brushless motor windings. As indicated by the dotted box, the power amplifier block 60 is packaged to include the six semiconductor switches 61-1 through 61-6 needed for operating the three phase windings of the brushless DC motor. The block 60 is a low cost power amplifier mainly because the device is packaged to contain a simple switching circuit configuration without internal control loops.

The power amplifier block 60 is provided with external power supply terminals 62-1 and 62-2. A current sense resistor 63 is connected to the terminal 62-2 for series connection to the power supply so as to provide motor current feedback signals for control loop operation as more fully disclosed in cross-referenced patent application Ser. No. 923,975.

The power amplifier block 60 additionally includes external terminals 64-1, 64-2 and 64-3 for respective connection to the free ends 65-1, 65-2 and 65-3 of the Y connected motor windings in FIG. 14SA. External terminals 66-1 through 66-5 are also provided for application of the switch control signals U1 and U2, V1 and V2 and W1 and W2 from the PWM commutation circuitry. To prevent power supply shorting and switch burnout, the power switches are always controlled so that only one switch can be on at a time in each of the respective pairs of switches 61-1 and 1, 61-3 and 4 and 61-5 and 6.

The control signals U1, V1 and W1 are the basic pulse width control signals that control the level of drive current through the motor windings. The control signals U2, V2 and W2 enable the six motor windings conduction paths in rotation and generally provide for the flow of freewheeling motor currents. Reference is made to Ser. No. 932,974 for a more complete description of the brushless motor embodiment.

H BRIDGE AMPLIFIER-DC BRUSH TYPE MOTORS

Figure 14C:
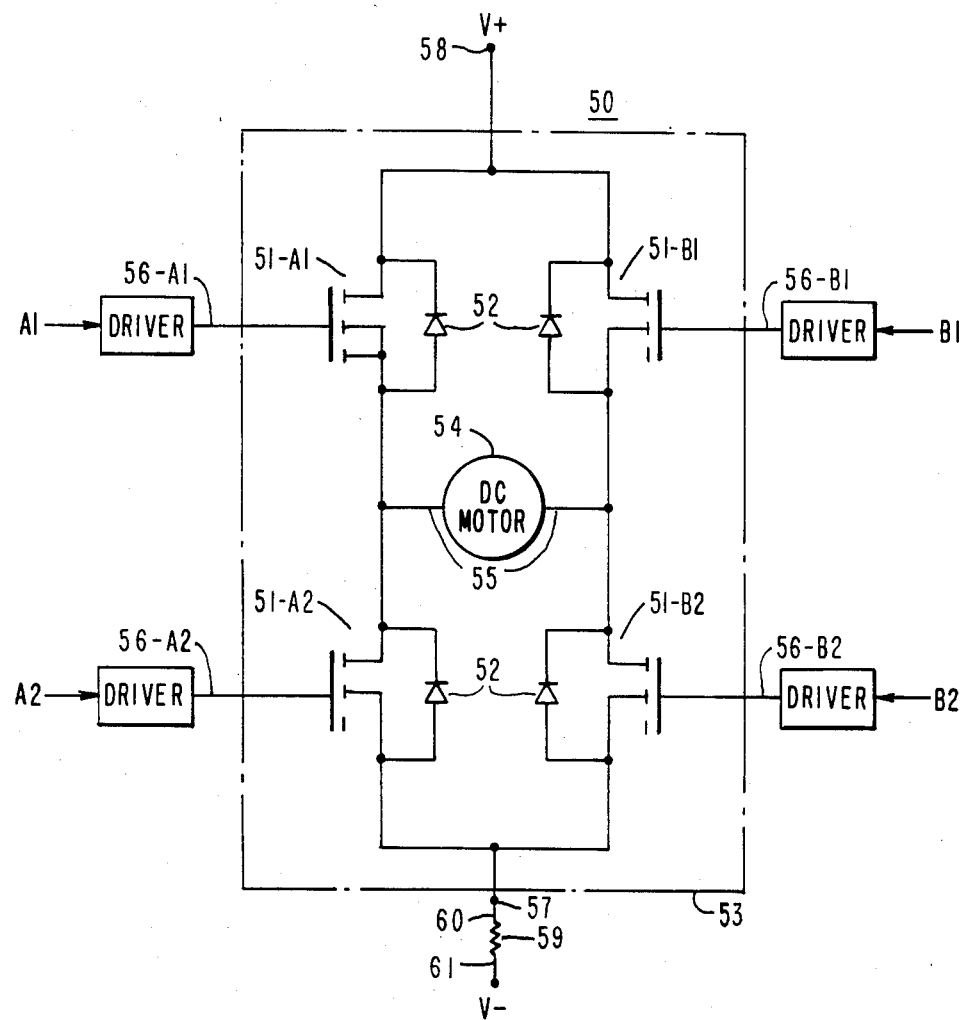

An H bridge power amplifier or block 50 of the low cost hybrid type is shown in FIG. 14C, and one of the power blocks 50 is employed to provide motor drive current for each robot arm joint motor in DC brush type motors.

The power block 50 includes four semiconductor switches 51-A1, 51-A2, 51-B1 and 51-B2. Respective protective back voltage diodes 52 are connected across the respective semiconductor switches to permit the flow of freewheeling currents when the switches 51-A1 and 51-B1 are turned off.

The switches and diodes are packaged within a block indicated by dotted line 53. As previously indicated, no internal control circuitry is included in the hybrid type power block thereby enabling flexible configuration of external controls.

A robot joint DC brush type motor 54 (representative of any of the joint motors included in the Unimation 700 series robot arm of FIG. 1) is connected in a cross-path 55 of the H bridge circuit. When switches 51-A1 and 51-B2 are turned on, a positive voltage is applied across the motor 54 and current flows to the right in the cross-path 55 to drive the motor in the forward direction. With switches 51-B1 and 51-A2 turned on, current flows through the crosspath 55 in the opposite direction to drive the motor in the reverse direction. The digital pulses A1 and B1 precisely control the on time of the switches 51-A1 and 51-B1 respectively so as to produce the motor current needed to satisfy control commands. The pulses A2 and B2 control the on time of the switches 51-A2 51-B2 so that the B2 and A2 on times respectively embrace the A1 and B1 on times (thereby providing closed paths for motor drive current during A1, B1 on time and circulating paths for motor freewheeling currents during A1, B1 off times) and so that the A1 and A2 switches are not on at the same time and the B1 and B2 switches are not on at the same time (to avoid shorting the power supply).

The digital pulse pairs A1, B2 and B1, A2 determine the switch on time for forward motor drive current and reverse motor drive current respectively. In turn, the switch on time determines the motor energization level, i.e., the motor torque.

Switch base leads 56A1, A2, B1, B2 extend from the switches to the outside of the block 53 where switch drive signals A1, A2, B1 and B2 are coupled from the pulse width modulator. Power supply voltage V is connected across external supply leads 57 and 58 to provide the motor drive current. An external current sensing resistor 59 is connected in series between the lead 57 and the power supply. Conductors 60 and 61 are connected from the two resistor terminals to apply the voltage drop across the current sensing resistor to the current feedback circuitry on the AIF board where it is processed for use in the current or torque control loop.

What is claimed is:
1. A completely digital control for a robot operating at a predetermined sampling rate and having an arm with each of a plurality of joints driven by an electric DC motor, each of said DC motors in turn supplied with drive current by a power amplifier bridge circuit having power switches connected therein to supply motor winding current in the positive direction or the negative direction, said robot control comprising:
digital means for generating position commands at the sampling rate for each of the robot axes in accordance with a stored robot program;
means for sensing the position of each of said motors;
means for generating digital position feedback signals synchronously with the sampling rate in response to said position sensing means;
means for generating digital velocity feedback signals synchronously with the sampling rate for each of said motors;
means for sensing the polarity and magnitude of motor current for each of said joint motors;
means for generating digital current feedback signals synchronously with the sampling rate in response to said current sensing means;
digital means for generating torque commands for each of the robot axes at the sampling rate in response to said position commands and said position and velocity feedback signals;

digital means for generating motor voltage commands for each of the robot axes at the sampling rate in response to said torque commands and said digital current feedback signals;

pulse width modulation means for generating digital motor control signals for each of the robot axes at the sampling rate in response to said voltage commands; and means for coupling said digital control signals for each axis to control terminals of the corresponding power switches to control on/off switch time and satisfy said motor voltage commands and thereby satisfy said position commands.

2. A digital robot control as set forth in claim 1 wherein said velocity feedback signal generating means includes a tachometer coupled to each of the joint motors.

3. A digital robot control as set forth in claim 1 wherein said digital means for generating torque commands includes a microprocessor system having a data manager microprocessor and a position/velocity calculating microprocessor coupled together, said data manager microprocessor controlling the timing and flow of control data to and from said calculating microprocessor.

4. A digital robot control as set forth in claim 1 wherein said motor voltage command generating means includes a microprocessor system having a data manager microprocessor and a torque calculating microprocessor coupled together, said data manager microprocessor controlling the timing and flow of control data to and from said calculating microprocessor.

5. A digital robot control as set forth in claim 4 wherein said digital means for generating torque commands includes a microprocessor system having a position/velocity data manager microprocessor and a position/velocity calculating microprocessor coupled together, said position/velocity data manager microprocessor controlling the timing and flow of control data to and from said calculating microprocessor.

6. A digital robot control as set forth in claim 3 wherein said position digital means for generating commands includes stored program means for generating position commands from programmed robot moves, said microprocessor system includes said position command generating means, and said data manager microprocessor executes said program means and manages the operation of said microprocessor system to generate said position commands.

7. A digital robot control as set forth in claim 3 wherein said digital means for generating commands includes stored program means for generating position commands from programmed robot moves and further includes a system data manager microprocessor and a system position command calculating microprocessor coupled together, said system data manager microprocessor executing said program means and controlling the timing and flow of control data to and from said position command calculating microprocessor.

8. A digital robot control as set forth in claim 5 wherein said digital means for generating includes stored program means for generating position commands from programmed robot moves and further includes a system data manager microprocessor and a system position command calculating microprocessor coupled together, said system data manager microprocessor executing said program means and controlling the timing and flow of control data to and from said position command calculating microprocessor.

* * * * *